United States Patent
Hoshino et al.

(10) Patent No.: US 11,623,824 B1
(45) Date of Patent: Apr. 11, 2023

(54) GARMENT PERSONALIZATION KIOSK WITH MOVABLE SYSTEM COMPONENTS

(71) Applicant: CreateMe Technologies LLC, New York, NY (US)

(72) Inventors: Yoshikazu Hoshino, San Francisco, CA (US); David Glen Barrett, San Francisco, CA (US); Scott Timothy Alberstein, San Francisco, CA (US); Gad Amit, San Mateo, CA (US); Stanislav Moiseyenko, San Rafael, CA (US); Yuri Viacheslav Litvinov, San Francisco, CA (US)

( * ) Notice: Subject to any disclaimer, the term of this patent is extended or adjusted under 35 U.S.C. 154(b) by 0 days.

(21) Appl. No.: 17/718,944

(22) Filed: Apr. 12, 2022

Related U.S. Application Data

(63) Continuation of application No. 17/718,256, filed on Apr. 11, 2022.

(51) Int. Cl.
  *B65G 1/137* (2006.01)
  *G07F 17/26* (2006.01)
  *B65D 85/18* (2006.01)

(52) U.S. Cl.
  CPC ............ *B65G 1/137* (2013.01); *B65D 85/182* (2013.01); *G07F 17/26* (2013.01)

(58) Field of Classification Search
  CPC ....... B65G 1/137; G07F 17/26; B65D 85/182; B65D 85/185; B65D 85/18
  USPC .................................................. 700/231–244
  See application file for complete search history.

(56) References Cited

U.S. PATENT DOCUMENTS

| | | | |
|---|---|---|---|
| 3,840,103 A | 10/1974 | Willis | |
| 4,873,643 A * | 10/1989 | Powell | B41F 15/0863 |
| | | | 700/87 |
| 4,875,416 A | 10/1989 | Duce | |
| 5,561,604 A | 10/1996 | Buckley et al. | |
| 5,664,659 A | 9/1997 | Gaertner | |
| 6,341,686 B1 | 1/2002 | Beyer | |
| 6,543,890 B1 * | 4/2003 | Ylitalo | B41J 11/00212 |
| | | | 347/102 |
| 6,604,019 B2 * | 8/2003 | Ahlin | G07F 7/069 |
| | | | 700/231 |
| 7,474,938 B2 | 1/2009 | Poliner | |
| 9,327,397 B1 | 5/2016 | Williams et al. | |
| 9,792,577 B2 | 10/2017 | Mountz et al. | |
| 10,065,442 B2 | 9/2018 | Will et al. | |
| 10,810,646 B2 | 10/2020 | DuBois | |

(Continued)

OTHER PUBLICATIONS

Precise Automation, PFDD Direct Drive Robot—The Next Generation of Collaborative Robots, retrieved Aug. 20, 2021, 2 pages <<http://preciseautomation.com/PFDD.html>>.

*Primary Examiner* — Michael Collins

(57) ABSTRACT

Embodiments provide for systems and methods related to kiosks for personalizing a packaged article. The kiosks may also be used for storage, inventory management, retrieval, packaging, and/or personalization of packaged articles. The kiosks discussed herein differ from non-kiosk personalization systems, such as personalization systems installed on a factory or warehouse floor, in that the kiosks are self-contained personalization systems. In some embodiments, the kiosks are portable and can be moved between different sites or events. This portability allows the kiosks to personalize packaged articles for concerts, festivals, conventions, trade shows, and the like.

13 Claims, 105 Drawing Sheets

(56) References Cited

U.S. PATENT DOCUMENTS

| | | | |
|---|---|---|---|
| 11,161,353 B1 | 11/2021 | Thammasouk et al. | |
| 11,198,963 B1 | 12/2021 | Thammasouk et al. | |
| 11,254,154 B1* | 2/2022 | Thammasouk | B41J 3/4078 |
| 11,413,882 B2 | 8/2022 | Myers et al. | |
| 11,485,577 B1* | 11/2022 | Hoshino | B65G 1/127 |
| 11,498,762 B1* | 11/2022 | Hoshino | B65G 1/137 |
| 11,498,763 B1* | 11/2022 | Hoshino | B65G 1/137 |
| 11,501,597 B1* | 11/2022 | Hoshino | B41J 3/4078 |
| 11,504,980 B2* | 11/2022 | Mombourquette | D06B 19/0011 |
| 2007/0185615 A1* | 8/2007 | Bossi | A61J 7/0084 700/244 |
| 2009/0056567 A1 | 3/2009 | Ando et al. | |
| 2013/0036018 A1* | 2/2013 | Dickerson | G07F 17/26 705/16 |
| 2016/0145045 A1 | 5/2016 | Mountz et al. | |
| 2020/0361711 A1 | 11/2020 | Must et al. | |
| 2020/0377300 A1 | 12/2020 | Chila et al. | |
| 2021/0103886 A1 | 4/2021 | Sezaki et al. | |
| 2021/0316945 A1 | 10/2021 | Lui | |
| 2021/0380342 A1 | 12/2021 | Wright et al. | |
| 2022/0143994 A1* | 5/2022 | Chow | B41J 3/4078 |
| 2022/0315338 A1 | 10/2022 | Malhotra et al. | |

* cited by examiner

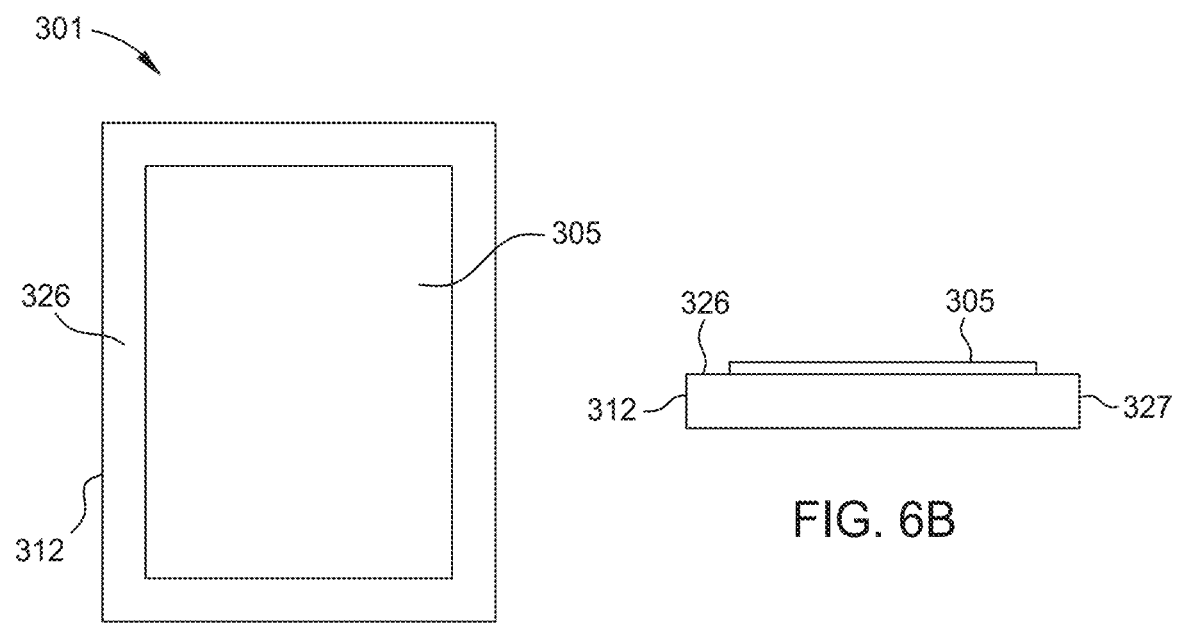

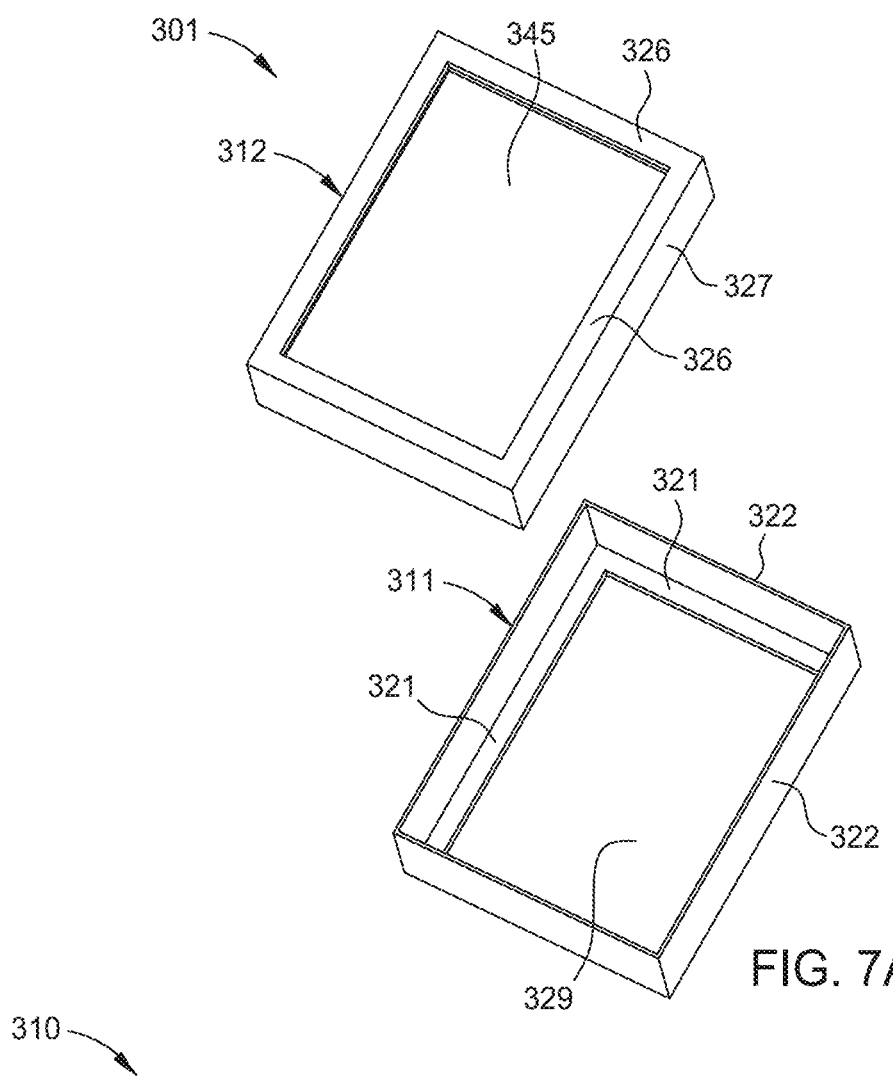
FIG. 7A
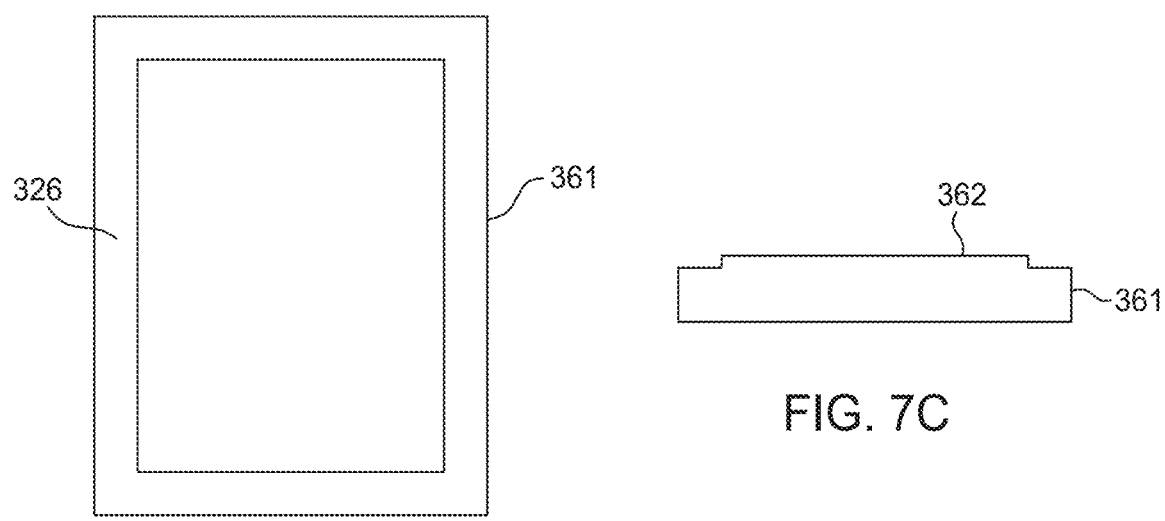
FIG. 7B
FIG. 7C

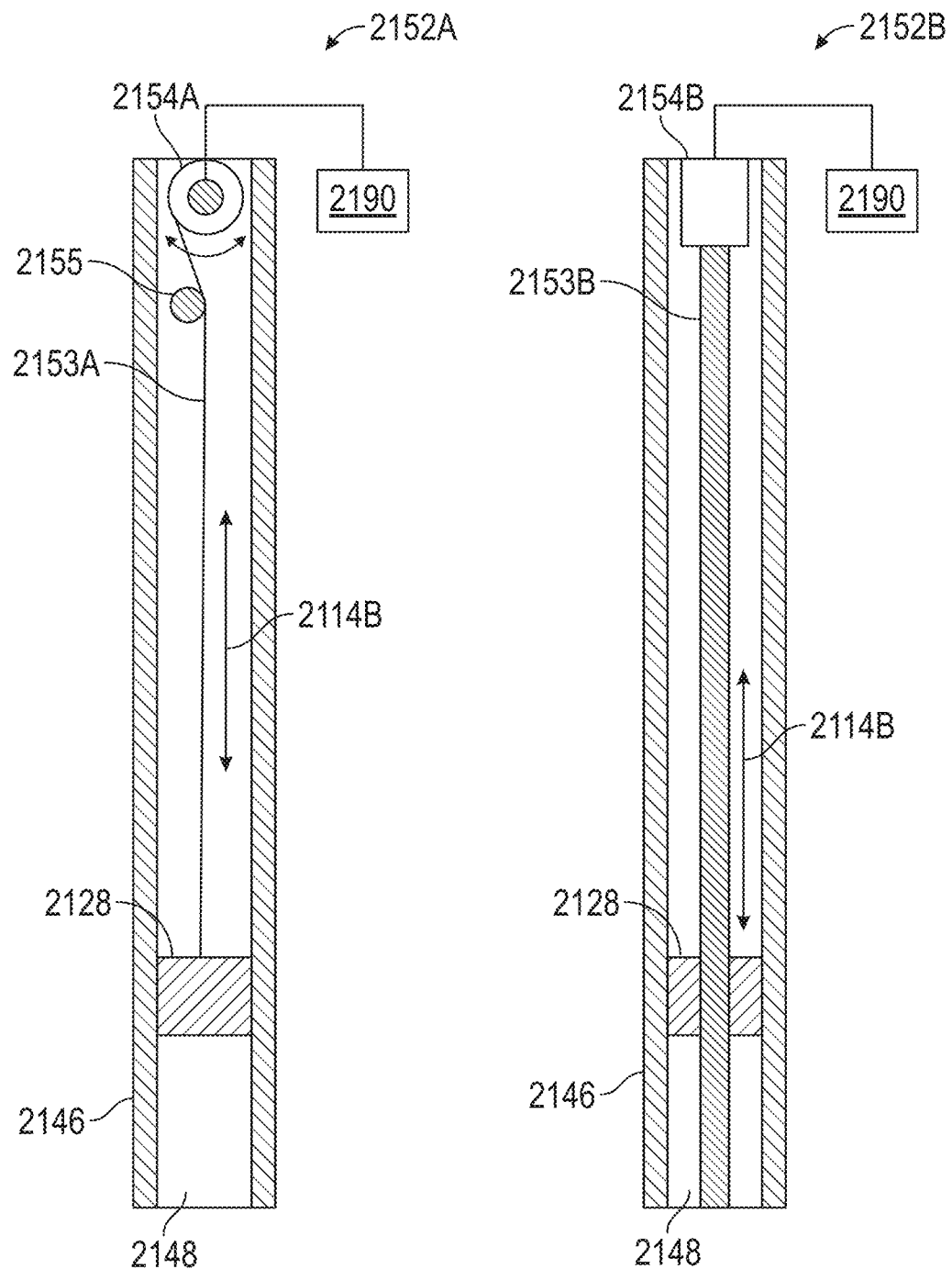

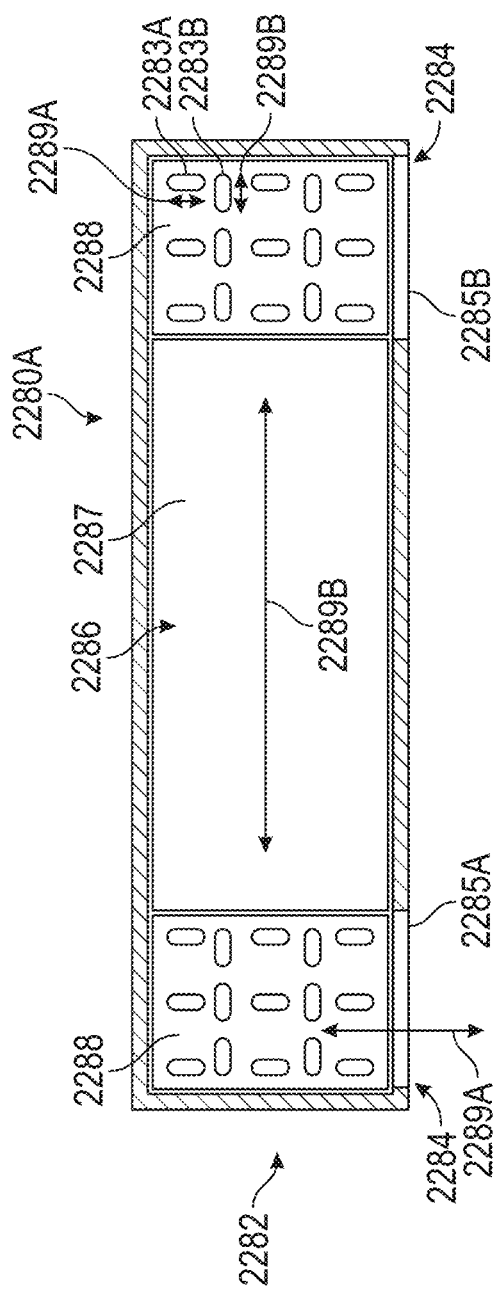
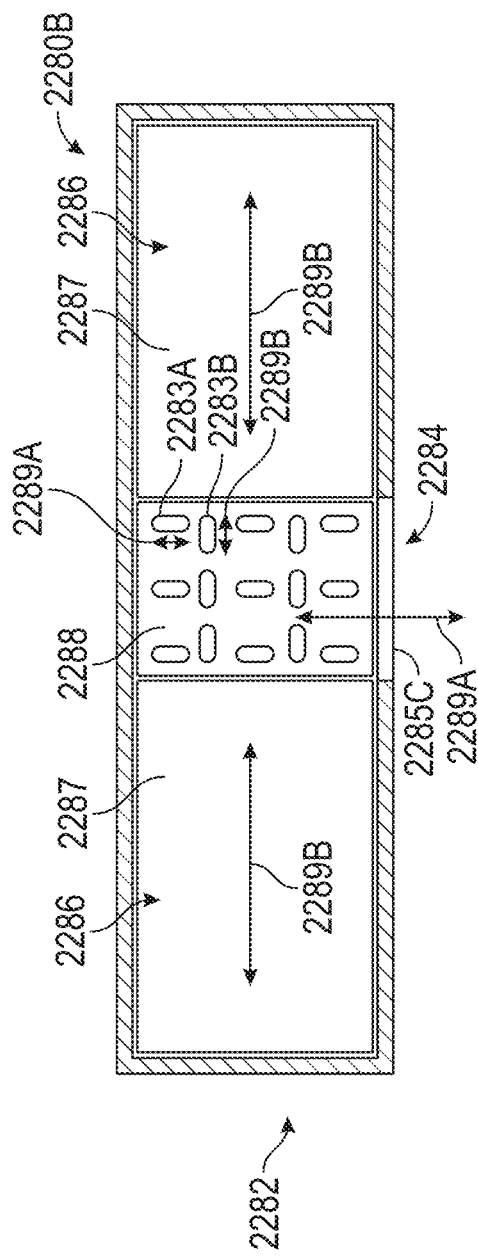
FIG. 22D
FIG. 22E

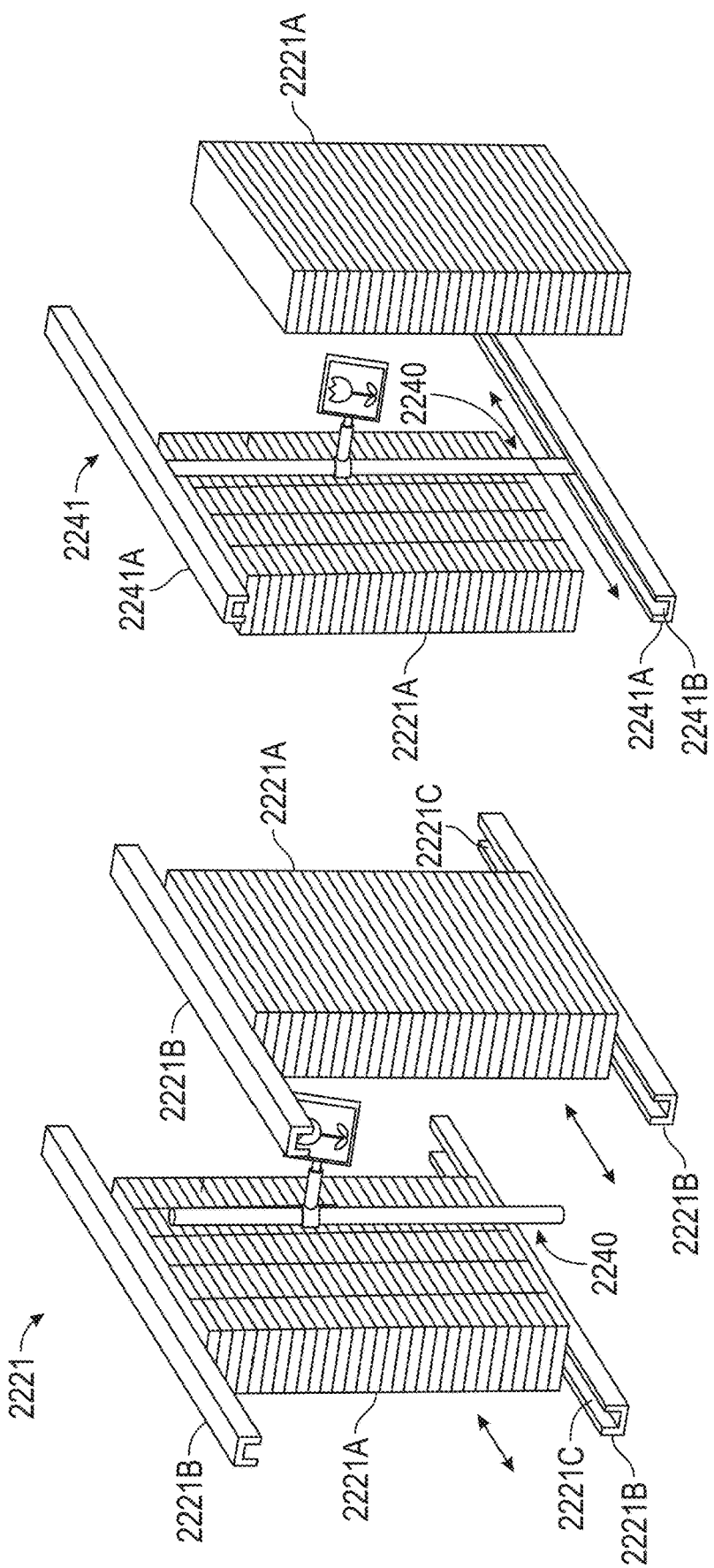

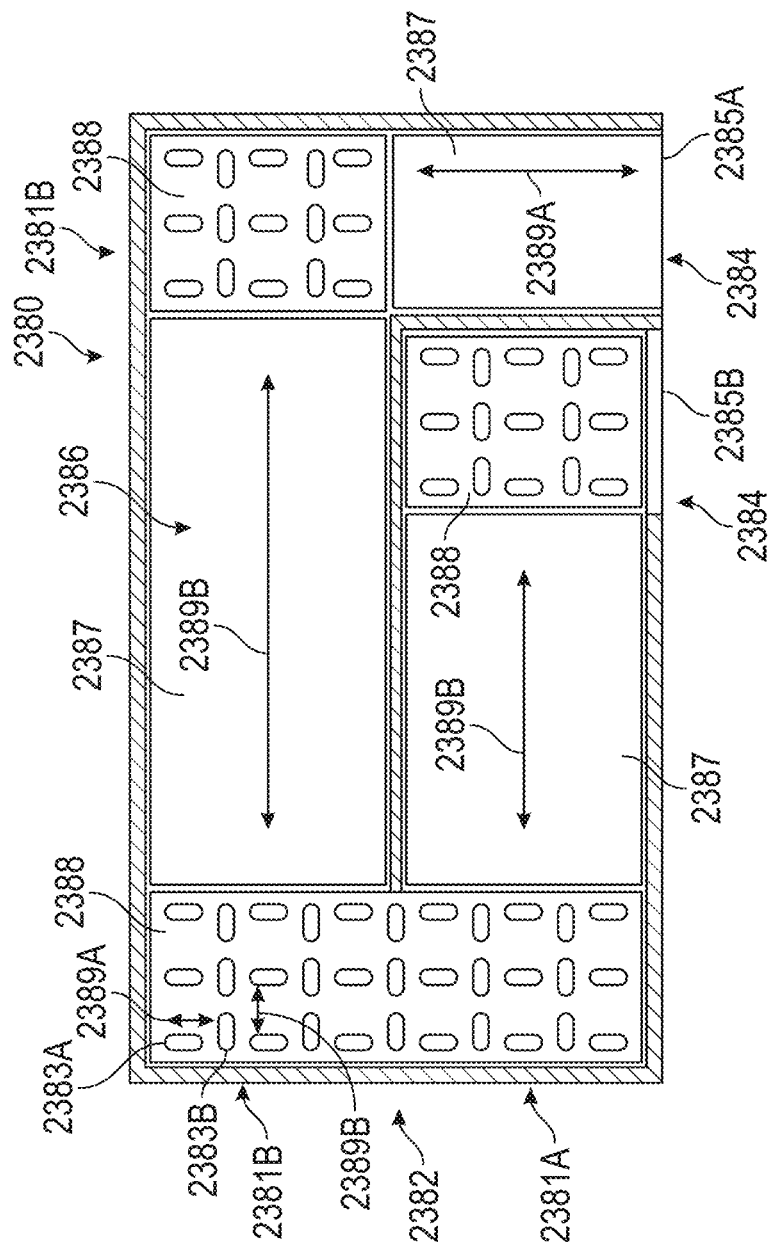

2398

2399A
Move a first packaged article from a first position through a first opening formed by a shelving unit 2399B
Retrieve the first packaged article using a carrier of a motion system 2399C
Move remaining packaged articles in the row through the first and second aisles towards the first position until a second packaged article is in the first position 2399D
Insert a third packaged article into a second opening formed by the shelving unit 2399E
Move the third packaged article to a second position, wherein the second position is adjacent to the second opening

FIG. 23D

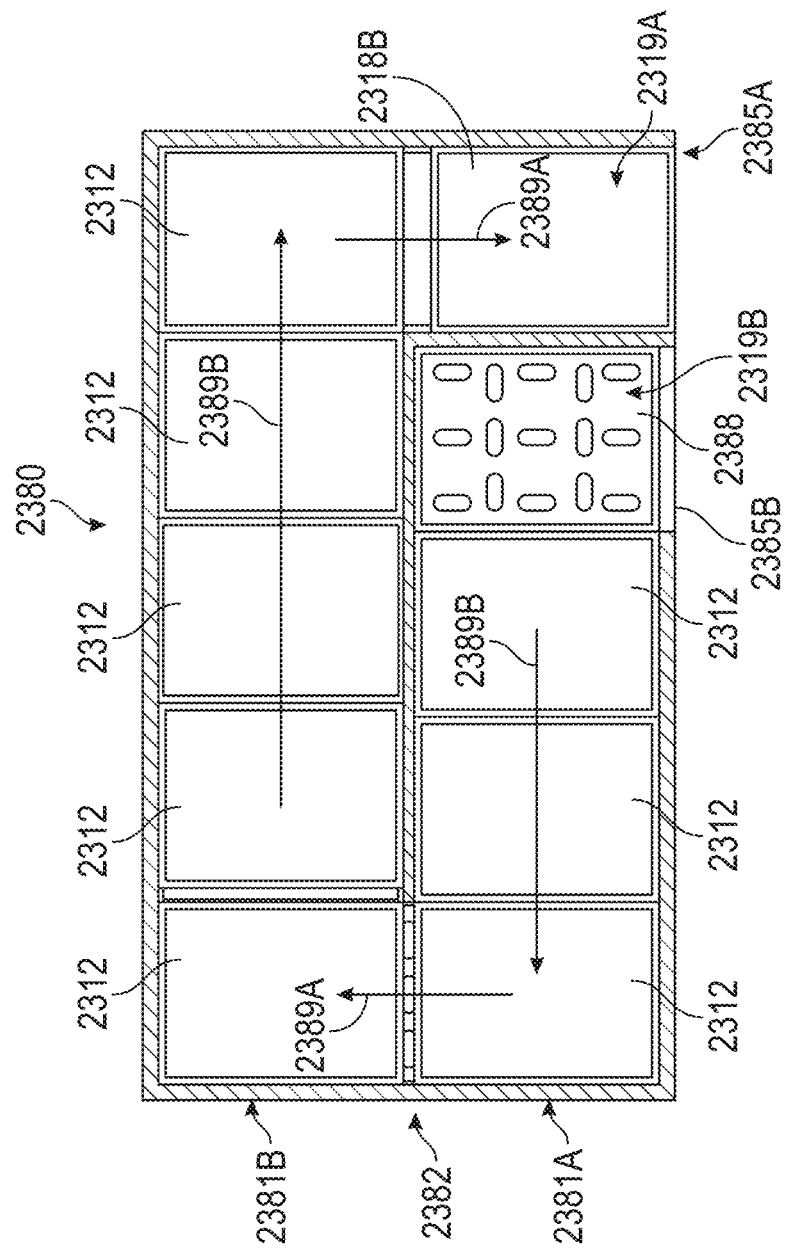

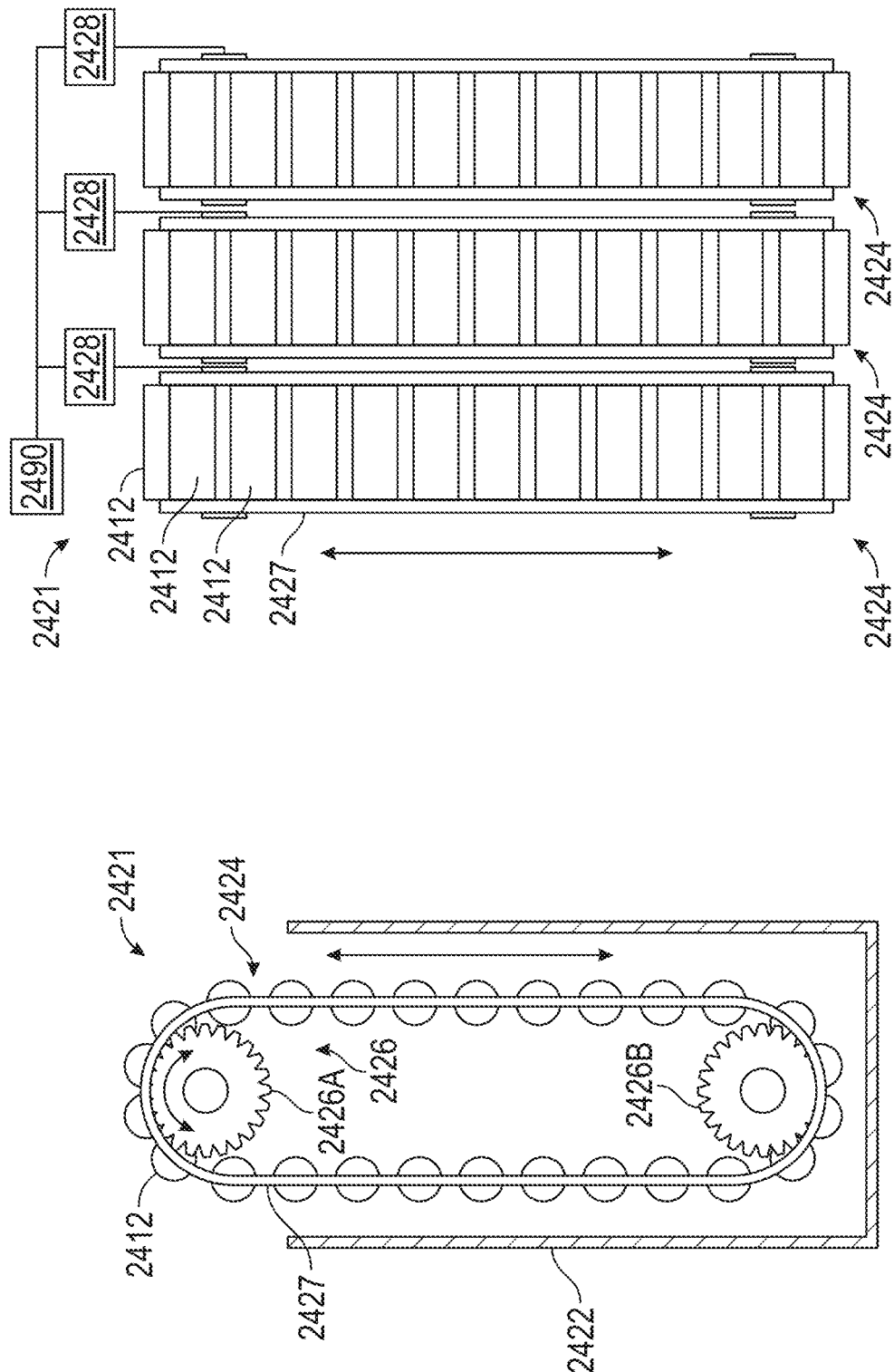

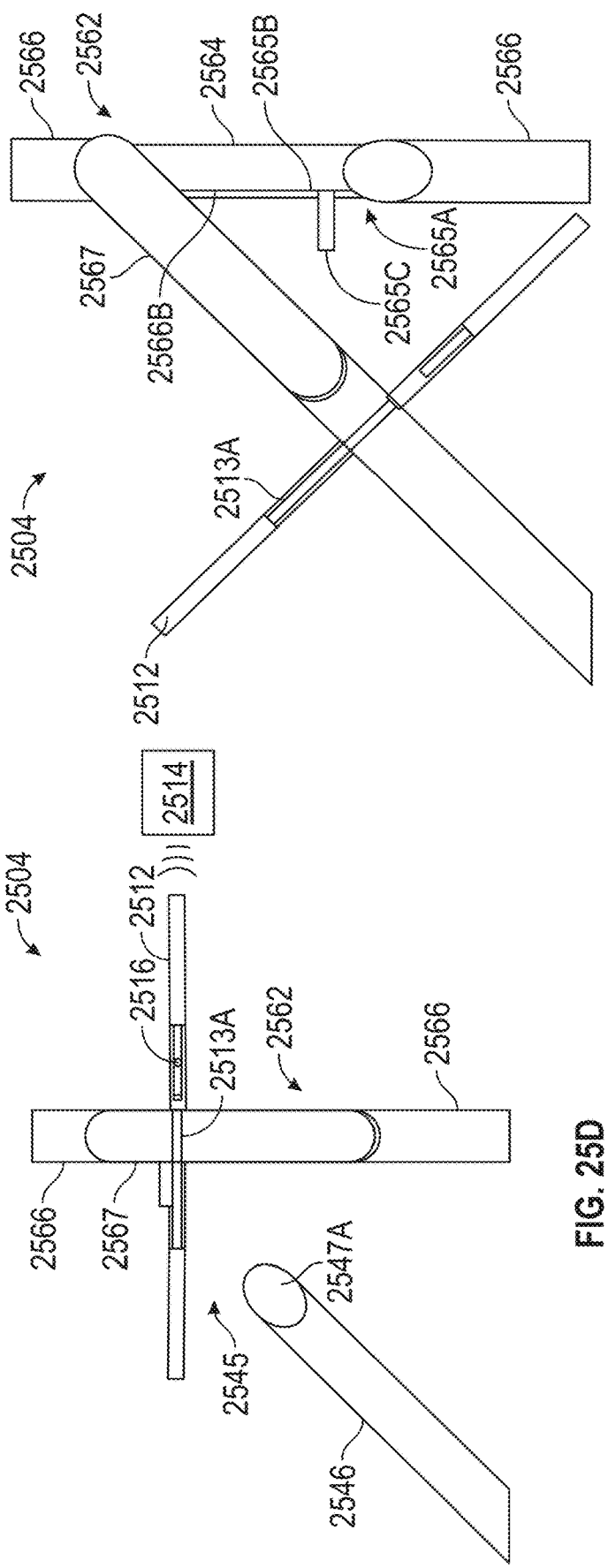
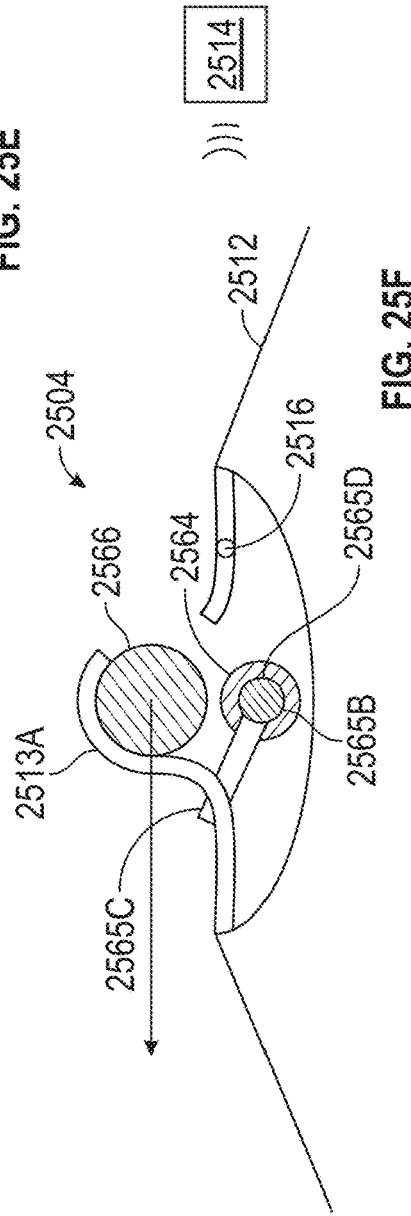
FIG. 25D
FIG. 25E
FIG. 25F

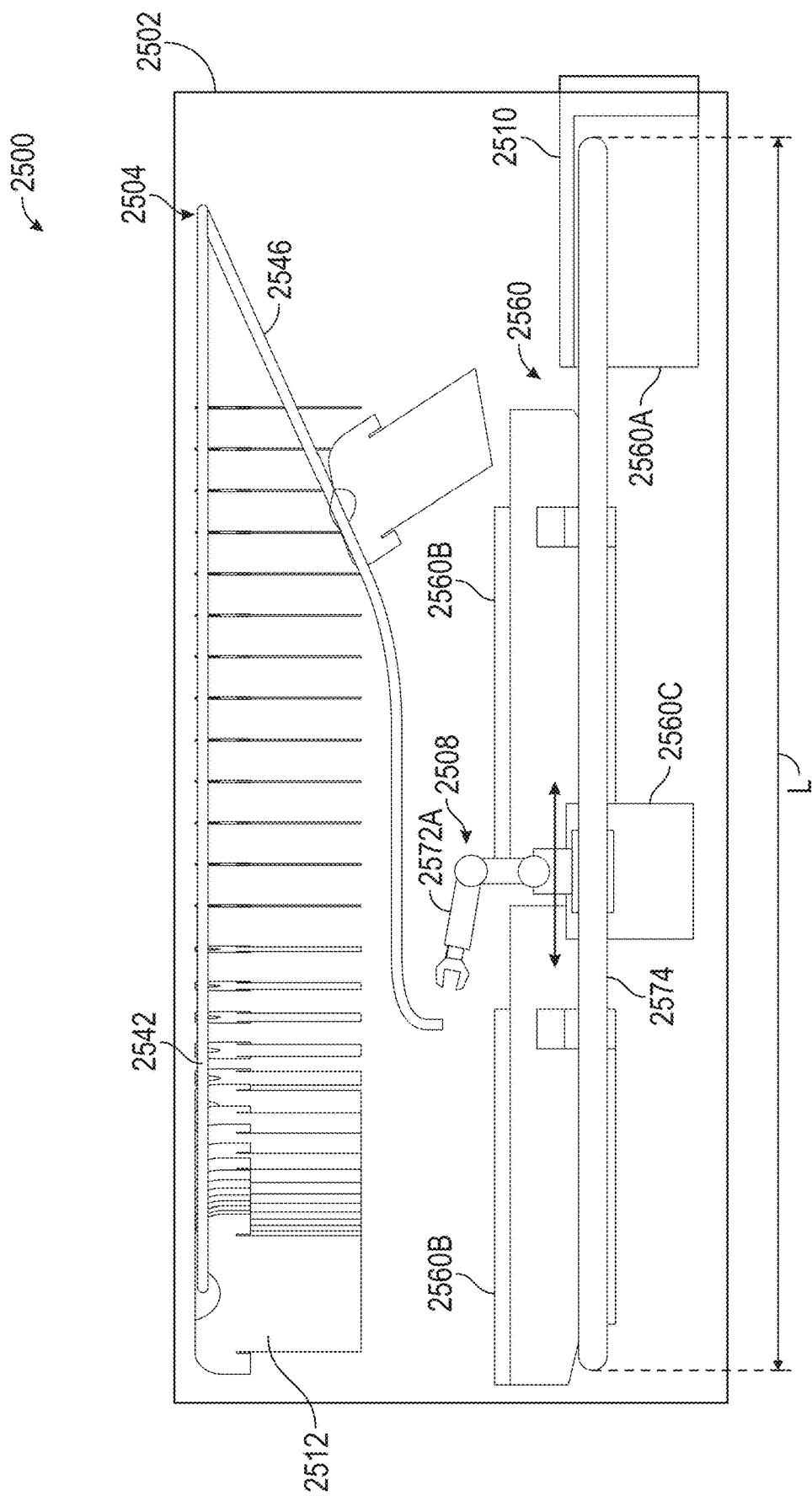

2698

2699A — Release a first packaged article onto a receiving station from a sleeve of a shelving system 2699B — Move the first packaged article away from the column using a motion system 2699C — Release a second packaged article from the sleeve 2699D — Move the second packaged article away from the column using the motion system 2699E — Move the third packaged article to a location on the receiving table adjacent to the column 2699F — Move the sleeve away from the column and towards the third packaged article 2699G — Grasp the third packaged article using the sleeve 2699H — Move the sleeve and the third packaged article towards the column

FIG. 26D

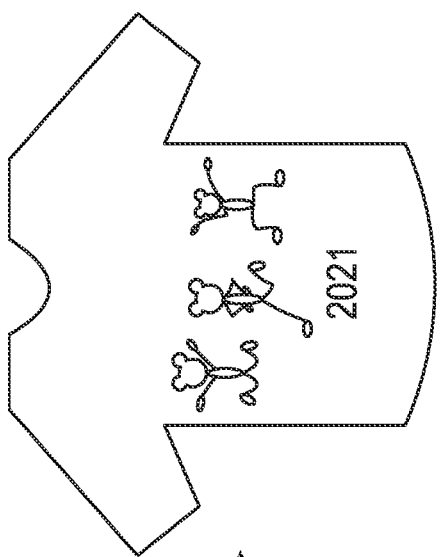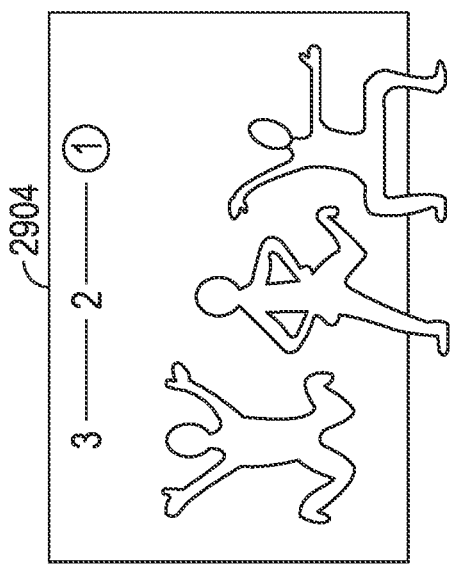
FIG. 51

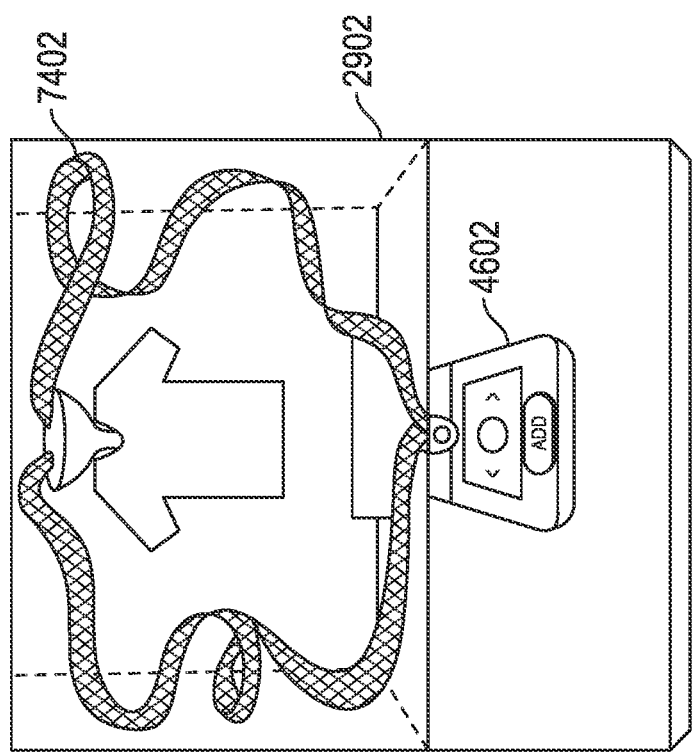

GARMENT PERSONALIZATION KIOSK WITH MOVABLE SYSTEM COMPONENTS

BACKGROUND

Personalization of articles, such as garments and accessories, is becoming more popular through embroidery and direct-to-garment (DTG) printing. Personalization of garments is currently a labor-intensive process that requires large areas for machines to be placed so that skilled operators can work around the machines in order to handle the garments and operate the machines. There is a desire for personalization to be on-demand, and in some cases, in small volume so that, for example, a customer can order a personalized garment and in a matter of minutes after placing the order receive the personalized garment. Large-scale operations are disadvantageous for on-demand personalization due to the high costs of the high-volume machinery, the required space, the non-portability of the equipment, and the skilled labor required. Accordingly, there is a need for on-demand personalization equipment requiring little to no labor, having a small footprint, capable of being moved to different locations, and capable of small volume orders.

SUMMARY

Certain embodiments provide a kiosk system for personalizing a packaged article. The kiosk system includes a housing, a staging area configured to receive the packaged article, and an article personalization system within the housing. The article personalization system includes a plurality of system components configured to personalize the packaged article. The plurality of system components includes a direct-to-garment (DTG) printing system and a curing system. The curing system is moveable in relation to the housing. The kiosk system further includes a control system to control the kiosk system.

Other embodiments provide a kiosk system for personalizing a packaged article. The kiosk system includes a housing and an article personalization system within the housing. The article personalization system includes a plurality of system components configured to personalize the packaged article. The plurality of system components includes a direct-to-garment (DTG) printing system and a curing system. The DTG printing system includes a platform configured to receive the packaged article. The curing system is moveable in relation to the housing. The kiosk system further includes a control system to control the kiosk system.

BRIEF DESCRIPTION OF THE DRAWINGS

FIGS. 6A-B illustrate another embodiment of a packaging suitable for retaining an article for customization. FIG. 6A is a top view of the packaging, and FIG. 6B a side view of the packaging assembled with an article.

FIG. 7A illustrates the upper packaging portion and the lower packaging portion of the packaging of FIGS. 6A-B.

FIGS. 7B and 7C are top and side views of an exemplary embodiment of a stiffener having a stepped configuration.

FIG. 8A is a top view of the packaging, and FIG. 8B is perspective view of the bottom of the packaging.

FIG. 9A is a top view of the packaging, and FIG. 9B is perspective view of the bottom of the packaging. FIG. 9C shows the packaging without the article.

FIG. 13 illustrates an exemplary embodiment of a hanger of the packaging disposed in the article, such as a T-shirt. FIG. 14 illustrates an exemplary container of the packaging for housing the hanger and the T-shirt. FIG. 15 illustrates the T-shirt and the hanger disposed in the container.

FIG. 19 illustrates an exemplary embodiment of a hanger frame in an expanded position and disposed inside an article, such as a T-shirt. FIG. 20 illustrates the hanger frame in a retracted position.

FIGS. 21K-21P depict cross-sectional views of different actuation systems used to move a motion system, according to some embodiments.

FIGS. 22D-22E depict cross-sectional top views of shelving units, according to some embodiments.

FIG. 22N depicts a trimetric view of a movable shelving system, according to some embodiments.

FIG. 22O depicts a trimetric view of a motion system, according to some embodiments.

FIG. 23C depicts a cross-sectional top view of a shelving unit, according to some embodiments.

FIG. 23D depicts a flow diagram that illustrates a process for moving packaged articles through a shelving unit, according to some embodiments.

FIGS. 23E-23G schematically illustrate cross-sectional views of packaged articles at different operations of the process depicted in FIG. 23D, according to some embodiments.

FIGS. 24B and 24C depict side and front views of a rotatable shelving system, according to some embodiments.

FIGS. 25D and 25E depict a top view of an article retrieval system, according to some embodiments.

FIG. 25F depicts a front view of the article retrieval system from FIG. 25D, according to some embodiments.

FIG. 25G depicts a side view of a transfer system of an on-demand personalization kiosk, according to some embodiments.

FIG. 26D depicts a flow diagram that illustrates a process for moving packaged articles through a shelving unit, according to some embodiments.

FIG. 51 illustrates an example customization based on user poses.

FIG. 75 illustrates an example customization feature.

DETAILED DESCRIPTION

Figure 1:
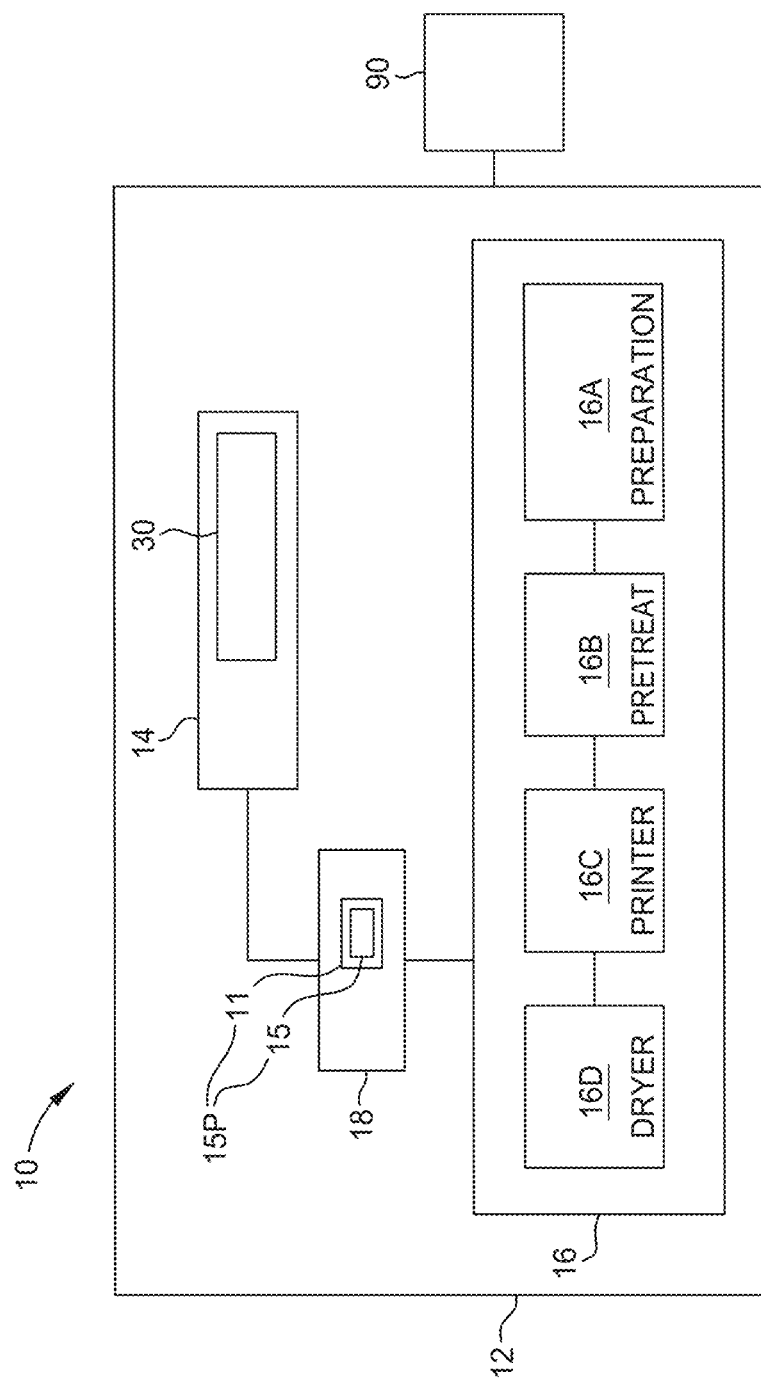
FIG. 1 illustrate a schematic view of an on-demand personalization kiosk, according to some embodiments.

The present technology includes systems and methods related to on-demand personalization of articles. For example, the present technology includes systems and methods related to kiosks for storage, inventory management, retrieval, packaging, and/or personalization of articles, for example clothing articles. A kiosk may include one or more system components for one or more of: storage/inventory/product retrieval, packaging, and personalization, inside of a housing of the kiosk. The kiosk may include a control system coupled to, for example, actuators in to order be fully and/or partially automated so that in response to receiving a user input, the control system causes the actuators to perform one or more steps related to storage, inventory management, retrieval, packaging, and/or personalization of articles. The controller may also control the system components to personalize the article.

The kiosks discussed herein may differ from non-kiosk personalization systems, such as personalization systems installed on a factory or warehouse floor, in that the kiosks are self-contained personalization systems. In some embodiments, the kiosks are portable and can be moved between different sites or events. This portability allows the kiosks to personalize packaged articles for concerts, festivals, conventions, trade shows, and the like.

The packaged articles include an article to be personalized and accompanying packaging. The article may be a garment or piece of clothing, such as a shirt, jacket, or sweater. The packaging is used to shape the article. For example, the packaging is used to present an area of the article for personalization as a flat surface and in some embodiments help affixing the article for personalization.

Certain technical features may be added to an on-demand personalization kiosk to enhance the user experience. First, the kiosk may use machine learning and an image or video of the user to simulate the look and fit of an article (e.g., a shirt) with a design on the user's body. The design may include one or more user-selected personalization embellishments (e.g., a graphic, a message, a pattern, etc.). The kiosk may display a simulated image or video that shows the user wearing the article with the design so that the user can confirm the look and fit of the article with the design before the user purchases, confirms, or creates the article with the design. In this manner, the kiosk increases user satisfaction and reduces material waste caused by returns, in certain embodiments.

Second, the kiosk may include a projector that projects a design onto the user. The kiosk may detect a position of the user based on a captured image or video of the user. The kiosk then adjusts a projector based on the detected position so that the projector projects a design onto the user. The user may then see how the design would appear on the user's clothing (e.g., the user's shirt) before purchasing, selecting, or ordering of an article with the design. In this manner, the kiosk increases user satisfaction and reduces waste caused by returns, in certain embodiments.

Third, the kiosk may include a viewing arrangement that allows a user to see inside the kiosk when an article with a design is being created. For example, the viewing arrangement may include a viewport formed using a curved, translucent viewing panel that allows the user to see inside the kiosk as the article with the design is being created. As another example, the viewing arrangement may include a viewing pane that spans across multiple sides of the kiosk. The viewing pane may be a translucent material (e.g., glass or plastic) that allows the user to see inside the kiosk when the article with the design is being created.

As used herein, the term "article", may refer to one or more items including, but not limited to, a piece of clothing (e.g. shirts, pants, socks, shoes, shorts, coats, jackets, skirts, dresses, underwear, hats, headbands, etc.), accessories (e.g. wallet, purse, etc.), and homewares (e.g. towels, pillow cases, blankets, mats, etc.). In embodiments, the term "packaged article" may refer to the article in combination with a packaging, portion of a packaging, and/or a personalization support. As shown in some of the figures, the article is shown as a T-shirt. However, a T-shirt is a non-limiting example of an article or a portion thereof, and any of the system components disclosed herein may be used with any type of article.

FIG. 1 illustrate a schematic view of an on-demand personalization kiosk 10, according to some embodiments.

The on-demand personalization kiosk 10 (referred to as the kiosk 10) includes a housing 12. An article retrieval system 14, an article personalization system 16, and a transfer system 18 are disposed within the housing 12. The kiosk 10 further includes a control system 90 for controlling the systems of the kiosk 10. In one example, the kiosk 10 is a direct-to-garment vending machine.

In some embodiments, the article retrieval system 14 includes a storage area 30 for housing a plurality of articles 15 to be personalized. The articles 15 may be stored as a packaged article 15P, i.e., pre-packaged with a packaging 11. In one example, the packaged article 15P may be stored in a shelving system of the storage area 30. In some embodiments, the retrieval system 14 includes a motion system for retrieving the packaged articles 15P from the storage area 30.

The article personalization system 16 includes a plurality of system components used to personalize the packaged articles 15P. The system components may vary depending on how the packaged article 15P is to be personalized. In some embodiments, the system components include a preparation system 16A, a pretreatment system 16B, a direct-to-garment (DTG) printer 16C, and a curing system 16D. In some embodiments, the system components include embroidery system.

The article preparation system 16A prepares the packaged articles 15P for processing, such as DTG printing. In one embodiment, the article preparation system 16A includes an ironing system, a heat lamp, or a heat press. The article preparation system 16A prepares a to-be printed surface of the packaged articles 15P by removing wrinkles from the packaged articles 15P, which may beneficially provide an even surface for printing and reduce defects in the packaged articles 15P.

The pretreatment system 16B prepares the packaged articles 15P for printing by applying a pretreatment solution. The pretreatment solution provides a base layer on which the DTG printer 16C may print. The pretreatment system 16B may apply the pretreatment solution to an entire side of the packaged article 15P to be customized or only to a portion to be printed on according to the personalization order. For example, if a personalization order indicated the printing area to be a 4"×4" area on the left front breast of a T-shirt, the pretreatment solution is only applied to that area, instead of a larger portion of the shirt, for example the entire front portion, or an area spanning the entire width of the shirt. After the pretreatment solution is applied, the article preparation system 16A may be used to at least partially cure the pretreatment solution. In some embodiments, the heat press may hover over the packaged article 15P until the pretreatment solution is cured to the desired amount. In one example, heat from a heat lamp maybe transferred via convection or radiation to dry the packaged article 15P. For example, heat transfer via convection or radiation may be suitable for some packaging materials, such as cardboard, paper, rubbers, and plastic. In some embodiments, the preparation system 16A and the pretreatment system 16B are integrated as one system.

The DTG printer 16C is used to print a graphic such as an image or design on the packaged articles 15P. The graphic may be colored, black and white, or greyscale. For example, the DTG printer 16C may print a graphic selected by a user for personalization. If a pretreatment solution was applied to the packaged articles 15P, then the DTG printer 16C prints over at least a portion of the area treated with pretreatment solution. The graphic printed on the packaged article 15P may be wet after printing and require additional processing.

The curing system 16D cures, such as by drying, the printed graphic on the packaged articles 15P. In some embodiments, the curing system 16D dries the packaged articles 15P by applying a pressure and/or temperature using a heat plate and/or heat lamp. Once the graphic reaches a predetermined dryness level, the article, such as a shirt, may be presented to the user. For example, the article may be presented to the user through a dispenser of the kiosk 10.

The transfer system 18 transfers the packaged articles 15P to, from, and/or between the system components of the kiosk 10 for processing. The transfer system 18 also transfers the packaged articles 15P from the system components to the dispenser. In some embodiments, the kiosk 10 is equipped with the transfer system 18 and the motion system of the retrieval system 14. For example, the motion system may retrieve and present the packaged articles 15P to the transfer system 18. In some embodiments, the transfer system 18 may also function as the motion system for the retrieval system 14, or the motion system may function as the transfer system 18. In some embodiments, the transfer system 18 may include a combination of one or more of: robotic arms, actuators, grippers, platens, conveyor belts (horizontal, vertical, curved and/or angled), railed vehicles, trackless vehicles, and similar conveying means. In some embodiments, the transfer system 18 may be configured for manipulating system components, articles, and portions thereof within the kiosk 10. For example, the transfer system 18 may unpack the packaged articles 15P from a box, hanger, tube, retainer, or fixture or may package the articles 15 into a box or tube, or onto a hanger or fixture.

The control system 90 controls the kiosk 10. For example, the control system 90 controls the motion system and the transfer system 18. In one example, in response to receiving user input of a personalization order, the control system 90 may determine instructions for the motion system to retrieve the packaged articles 15P from the storage area, and for the transfer system 18 to transfer the packaged articles 15P to and from the system components. In another example, in response to receiving user input of a personalization order, the control system 90 may determine instructions for the transfer system to retrieve the packaged articles 15P from the storage area, and for the transfer system 18 to transfer the packaged articles 15P to and from the system components.

The control system 90 may be connected to one or more, including all, of the system components of the article personalization system 16 in order to automate processes of the kiosk 10. For example, the control system 90 may cause the transfer system 18 to transfer the packaged article 15P from the motion system to the article preparation system 16A, may cause the article preparation system 16A to remove wrinkles from the packaged article 15P, may cause the transfer system 18 to transfer the packaged article 15 from the article preparation system 16A to the pretreatment system 16B, may cause the pretreatment system 16B to apply the pretreatment solution to the packaged article 15P, may cause the transfer system 18 to transfer the packaged article 15P from the pretreatment system 16B to the DTG printer 16C, may cause the DTG printer 16C to print a personalization on the packaged article 15P, may cause the transfer system 18 to transfer the packaged article 15P from the DTG printer 16C to a curing system 16D, may cause the curing system 16D to dry the packaged article 15P, and may cause the transfer system 18 to transfer the packaged article 15P from the curing system 16D to the dispenser for pick-up. In some embodiments, the control system 90 may cause the transfer system 18 to transfer the packaged article 15P to a drying system 16D after the pretreatment system 16B and/or the DTG printer 16C.

The control system 90 may also be connected to the storage area and the packaged articles 15P in order to manage an inventory of the packaged articles 15P. For example, the control system 90 may know what types of packaged articles 15P are loaded in the storage area, such as packing type, garment type (e.g., hoodies or shirts), garment sizes, garment colors, garment material, garment fit type (e.g., loose fit, modern fit, fitted, or big and tall), and the like. Information on the types of packaged articles 15P may be entered manually or automatically detected by the control system 90 using a sensor or indicator in or on the packaging (e.g., a bar code, QR code, RFID tag, and the like). Once an order is received, the control system 90 directs the motion system or the transfer system 18 retrieve a packaged article 15P to fulfill the user's personalization order. The information on the types of packaged articles 15P available may also be used to modify a display or user interface available to the user, such as presenting only available inventory or designs to the user.

The system components may be arranged in any physical orientation relative to each other, and the transfer system 18 may transfer the packaged articles 15P between the system components during a DTG process, including transferring an article to the same system component twice at different stages of the DTG process.

In some embodiments, the DTG printer 16C may operate as a wet-on-wet DTG printing process, and therefore, after applying the pretreatment solution, the DTG printing operation may be initiated without first drying the packaged article 15P. In other configurations, a wet-on-dry printing system may be used, and thereby requiring a drying process after the application of a pretreatment solution.

In some embodiments, the system components do not include the pretreat system 16B. Instead, the packaged articles 15P may be pretreated with a pretreatment solution, which may be the same or different than the pretreatment solution dispensed by the pretreatment system 16B. The pretreating of the packaged articles 15P may occur at an earlier step, such as prior to the packaged articles 15P being loaded into the storage area of the kiosk 10. The pretreated packaged articles 15P may have the pretreatment solution applied to the entire side of the article 15 or only to a portion to be printed on according to the personalization orders that are expected or anticipated. For example, the articles 15 may be pretreated to accommodate a finite number of printing graphics, such as a 20 or less graphics, such as 15 or less graphics, such as 10 or less graphics, such as 5 or less graphics, such as 3 or less graphics, such as 1 graphic.

In some embodiments, the article preparation system 16A may be used to activate the pretreatment solution embedded in the packaged articles 15P prior to DTG printing.

In some embodiments, any of the system components may include the article preparation system 16A or the curing system 16D. For example, the pretreatment system 16B may include the curing system 16D. In some embodiments, the control system 90 may cause the transfer system 18 to transfer a packaged article 15P to the curing system 16D after any process stage.

In some embodiments, the article preparation system 16A and/or the curing system 16D may use direct application of a radiant heat source, convection heat via forced air, and/or applying radiation from a light source (e.g. an LED light source) to dry the ink from the DTG printer 16C and pretreatment solution from the pretreatment system 16B.

In some embodiments, one or more, including all, of the system components of the kiosk 10 may be fully sealed and/or vented to the outside of the kiosk 10 in order to prevent spreading undesirable chemicals and vapors within the kiosk housing 12 and/or to the immediate vicinity outside of the kiosk 10.

In some embodiments, the packaging for customizing an article may be configured to store and allow manipulation of articles to be printed, such as by Direct to Garment (DTG) printing. While embodiments disclosed herein use printing as an example of a customization of an article, the packaging may be used with other customization processes such as embroidery.

The article to be customized may be pre-assembled with the packaging and stored as a packaged article in a kiosk prior to being printed. The packaged article may be configured so that it may be at least one of: stackable, reduced in height, and/or reduced in size. In one embodiment, the packaged article may be generally flat so that the packaged article may be stacked, for example for storage and transport. In some embodiments, the packaged article may transition from a packaged configuration, e.g., wherein the article is folded or rolled, to a printing configuration, e.g., where the article is unfolded or unrolled. In some embodiments, a plurality of packaged articles may be nested to occupy less volume during storage and may be un-nested during or after retrieval of the package article for personalization. The packaged article may include features that are accessible to a robot in order for the robot to automatically move and manipulate the packaged article, for example, but not limited to, from a storage location to a DTG machine.

First Packaging Embodiment

Figure 2A:
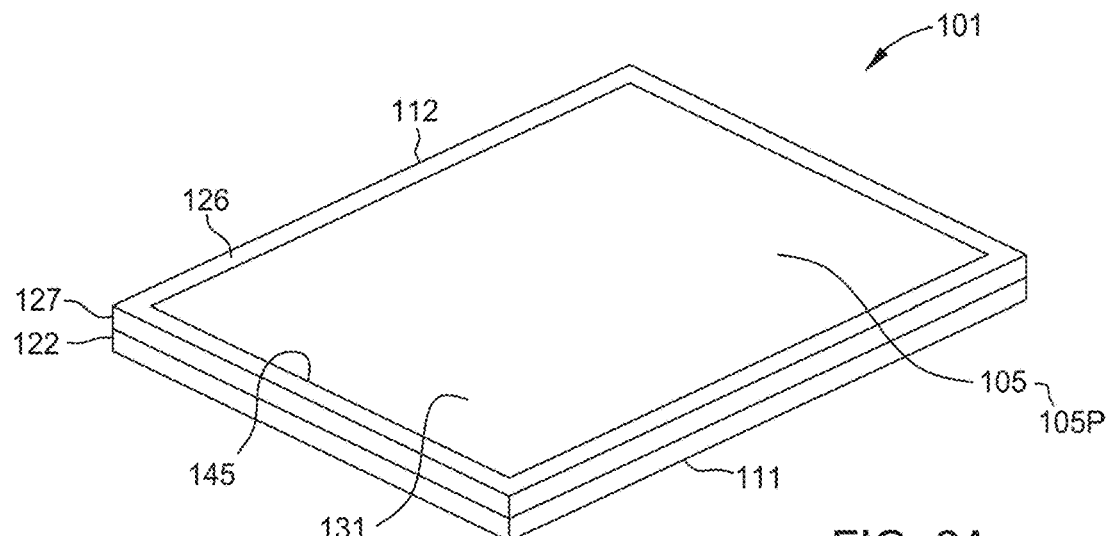
FIG. 2A shows an exemplary embodiment of a packaging in a closed position with an article disposed therein.
Figure 2B:
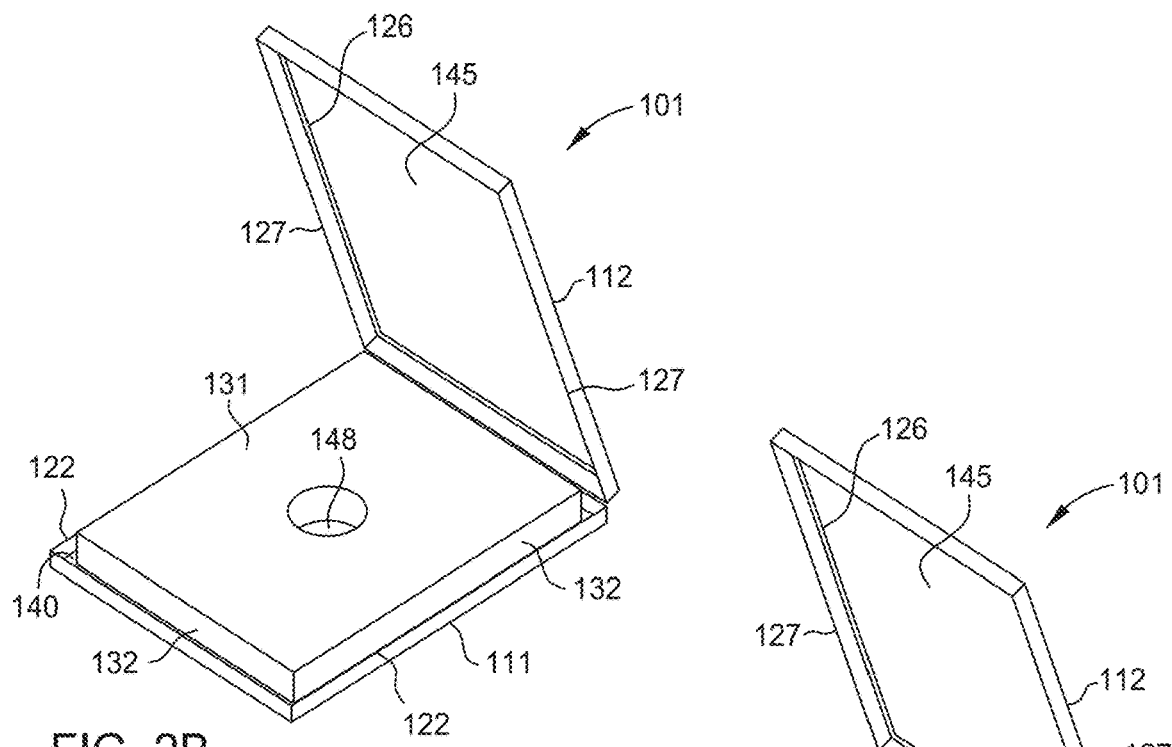
FIG. 2B shows the packaging of FIG. 2A in the open position without the article.
Figure 3:
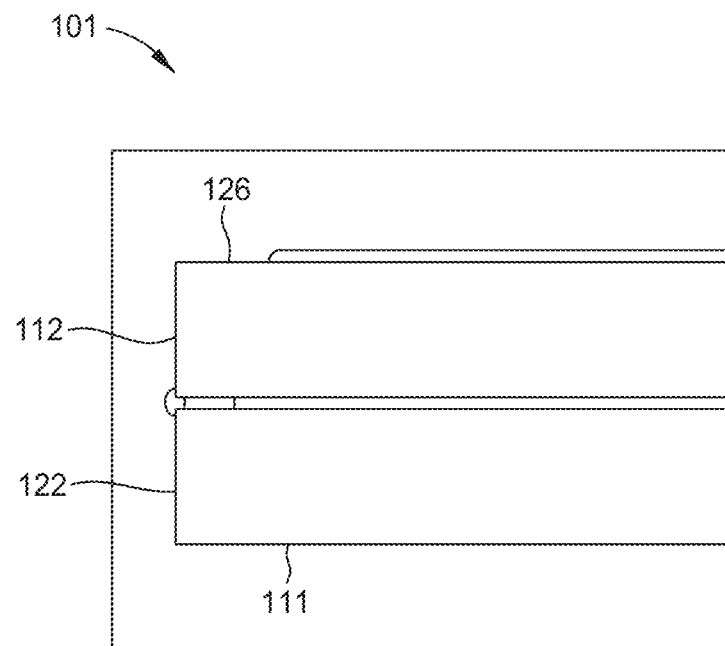
FIG. 3 shows a partial side view of the packaging of FIG. 2A.
Figure 4:
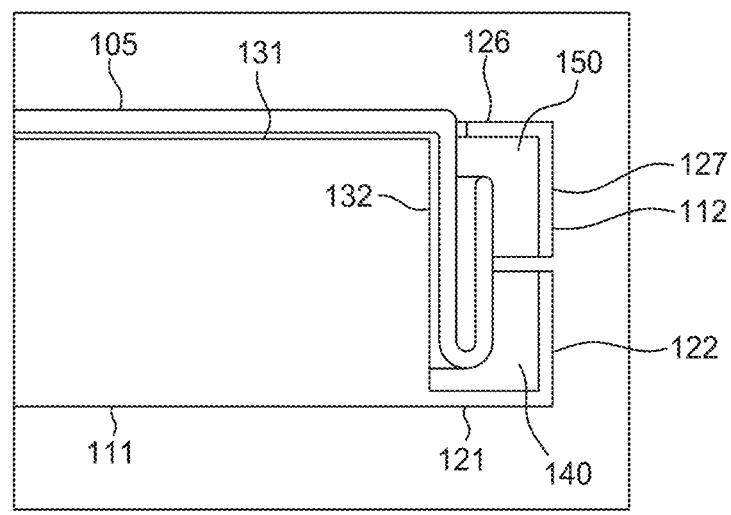
FIG. 4 shows a partial, cross-sectional view of the packaging of FIG. 2A.

FIG. 2A illustrates an exemplary embodiment of a packaging 101 suitable for retaining an article for customization. FIG. 2A shows the packaging 101 in the closed position with an article 105 disposed therein, and FIG. 2B shows the packaging 101 in the open position without the article. In some embodiments, the packaging 101 may be in the form of a box during storage, printing, or retail presentation. Although a box is disclosed in this embodiment, the packaging 101 may have any suitable shape, such as a triangle, pentagon, hexagon, octagon, and other suitable polygonal shapes; arcuate shapes such as circle and ellipse; and other suitable symmetrical or asymmetrical shapes. FIG. 3 shows a partial side view of the packaging 101, and FIG. 4 shows a partial, cross-sectional view of the packaging 101.

Figure 2C:
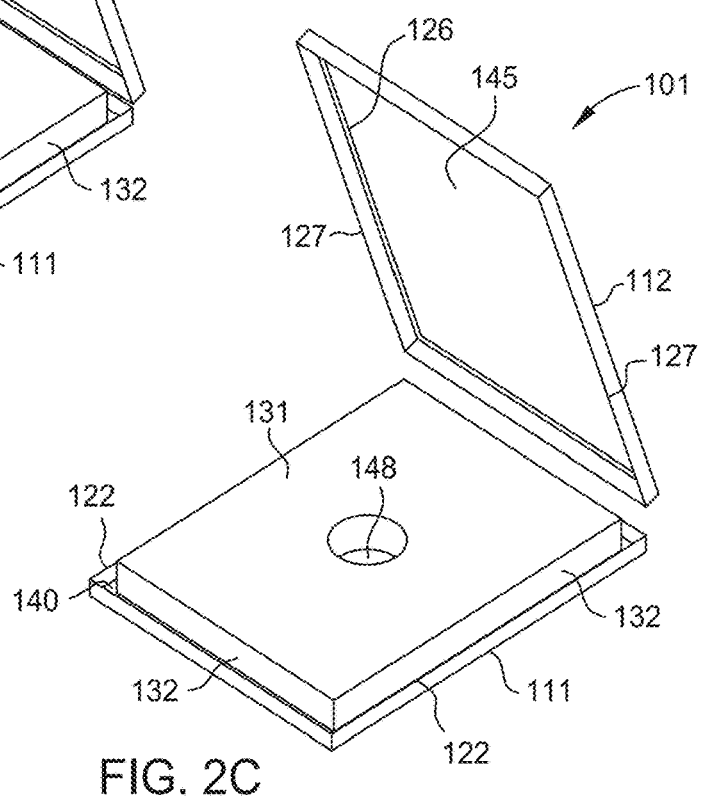
FIG. 2C shows another embodiment of the packaging of FIG. 2A in the open position without the article.

In one embodiment, the packaging 101 may include a lower packaging portion 111 and an upper packaging portion 112. The upper packaging portion 112 may be coupled or decoupled from the lower packaging portion 111. For example, the upper packaging portion 112 may be pivotally connected to the lower packaging portion 111 so the upper packaging portion 112 may swing open relative to the lower packaging portion 111. In alternative embodiments, the upper packaging portion 112 is fully separable from the lower packaging portion 111, as illustrated in FIG. 2C.

In one embodiment, the lower packaging portion 111 includes a bottom wall 121 and a plurality of outer sidewalls 122. As shown, four outer sidewalls 122 are provided along the perimeter of the bottom wall 121. The lower packaging portion 111 also includes a support surface for supporting the article 105 to be personalized. The support surface 131 is disposed on a plurality of inner sidewalls 132, such as four inner sidewalls 132. In some embodiments, the support surface 131 may function as a platen or a supporting platform during the printing process. The support surface 131 is sized to provide the desired printing area for the article 105. In one embodiment, the perimeter of the support surface 131 has a shape that is similar to the shape of the packaging 101. As shown, the support surface 131 has a rectangular shape. In one embodiment, a channel 140 is formed between the inner sidewalls 132 and the outer sidewalls 122. In some embodiments, the channel 140 is sufficiently sized to receive portions of the article 105 that extend beyond and below the support surface 131. In this way, an article 105 could be disposed across the support surface 131 with excess portions of the article 105 being tucked into the channel 140 (as shown for example in FIG. 4). The channel width could be sized to ensure that the excess portions of the material are sufficiently snug to retain the excess portions of the article 105. In some embodiments, the channel 140 formed around each side of the support surface 131 may have the same or different widths. For example, the channel 140 formed on the left and right sides may be narrower than the channel 140 formed on the top and bottom sides. In another example, the channel 140 at the top side may be narrower than the channel 140 at the bottom side. Although FIG. 2B shows the channel 140 extending around the four sides of the support surface 131, it is contemplated the channel 140 may be formed on three sides, two sides, or one side of the support surface 131. In some embodiments, the height of the support surface 131 is higher than the height of the outer sidewalls 122. In alternative embodiments, the channel 140 accommodates part of the garment and the remainder of the garment may accumulate within a cavity (not shown) under the support surface 131. In some embodiments, an optional opening 148 is formed through the support surface 131 to facilitate removal of the article 105 from the packaging 101. For example, a user or a robot can insert a hand or an arm through the opening 148 from the bottom of the packaging 101 and push the article 105 away from the support surface 131 to be grasped by the user or the robot.

In some embodiments, the upper packaging portion 112 includes a window 145 to allow access to the article 105 during the printing process. In some embodiments, the upper packaging portion 112 includes a top wall 126 and the window 145 is formed through the top wall 126. In some embodiments, the size of the window 145 is larger than, smaller than, or same as the size of the support surface 131. In one embodiment, the window 145 is the same or slightly larger than the size of the graphic to be printed. FIG. 4 shows the window 145 is slightly larger than the support surface 131, and optionally, larger than the size of the support surface 131 with the article 105 disposed thereon.

In some embodiments, the upper packaging portion 112 includes a plurality of outer sidewalls 127 attached to the top wall 126. For example, four outer sidewalls 127 may extend down from the top wall 126 toward the plurality of sidewalls 122 of the lower packaging portion 111. As shown in FIGS. 3 and 4, the perimeter formed by the plurality of sidewalls 127 is the same as or substantially the same as the perimeter formed by the plurality of outer sidewalls 122 of the lower packaging portion 111. In one embodiment, the upper and lower packaging portions 112, 111 may be coupled by attaching one of the outer sidewalls 127 of the upper packaging portion 112 to an outer sidewall 122 of the lower packaging portion 111. In some embodiments, a channel 150 is formed between the inner sidewalls 132 and the outer sidewalls 127. The channel 150 is sufficiently sized to receive portions of the article 105 that extend below the support surface 131. In some embodiments, the channel 150 formed around each side of the support surface 131 may have the same or different widths. In one embodiment, the upper channel 150 has the same width configuration as the lower channel 140. In some embodiments, the upper packaging portion 112 is pivotally attached one side of the lower packaging portion 111, such as a sidewall 127 of the upper packaging portion 112 attached to a sidewall 122 of the lower packaging portion 111.

In some embodiments, the top wall 126 of the upper packaging portion 112 is in line or slightly below the support surface 131 of the lower packaging portion 111, when the packaging 101 is closed. In some embodiments, the printing surface of the article 105 is positioned slightly higher (i.e., closer to the printing head) than the top wall 126. In some embodiments, the support surface 131 is configured to position the printing surface of the article 105 at a distance from 1 mm to 20 mm or from 2 to 10 mm away from the printing head. In some embodiments, the upper packaging portion 112 and the lower packaging portion 111 are configured to keep the article 105 taut during the DTG process.

For example, the window 145 of the upper packaging portion 112 may be sized to press the article 105 against the inner sidewalls 132 around the support surface 131. In some embodiments, the packaging has a height from 1.25 inches to 5 inches or from 1.5 inches to 3.5 inches. In some embodiments, the printable area of the packaging 101 has a width from 3 inches to 30 inches or from 10 inches to 25 inches, and a length from 3 inches to 30 inches or from 15 inches to 28 inches. In some embodiment, the lower packaging portion 111 and the upper packaging portion 112 may be manufactured from one or more of: cardboard, paper, plastic, rubbers, metal, glass, wood, and composites. In one embodiment, the packaging 101 is made from cardboard and can be reloaded with another article 104 and reused. In some embodiments, the lower and upper packaging portions 111, 112 include a registration feature used by the transfer system 18 and the personalization system 16 to ensure proper positioning of the packaged article 105P relative to the systems. For example, the top edge of the upper packaging portion 112 may be used as a reference point when gripped by the robot. That reference point may be aligned with a corresponding reference point on the printer 16C.

FIG. 1 shows an exemplary embodiment of a personalization kiosk 10 capable of storing, retrieving, manipulating, moving and dispensing a packaged article 105P. The personalization kiosk 10 includes a window and/or a user interface. In response to receiving a personalization order, a control system 90 may cause a transfer system 18 to retrieve a packaged article 105P from a storage area 30, such as a shelving system of the storage area 30. In this example, article 105 contained in the package article 105P is a T-shirt. The packaged article 105P is retrieved from the storage area 30 storing a plurality of packaged articles 105P with T-shirts of different sizes, styles, color, and combinations thereof. The transfer system 18 may transfer the retrieved packaged article 105P within the kiosk 10 to be personalized according to the personalization order. In some embodiments, the transfer system 18 may include a robot arm configured to retrieve the selected packaged article 105P and transfer packaged article 105P to a conveyor belt of the transfer system 18 or to components of the personalization system 16.

In one example, the packaged article 105P may be transferred by the transfer system 18 through each component of the personalization system 16. For example, the packaged article 105P may be transferred initially to the preparation system 16A, wherein the article 105 may be heat pressed. The packaged article 105P may then be transferred to the pretreatment system 16B. The pretreatment system 16B may apply a pretreatment solution to an entire side of the article 105 to be DTG printed on or may only apply pretreatment solution to a portion of the article 105 to be printed on according to the personalization order. For example, if a personalization order indicated the printing area to be a 6" by 6" area on the left front breast of a T-shirt, the pretreatment solution is only applied to that area, instead of a larger portion of the shirt. In some embodiments, the transfer system 18 may use a registration feature of the packaged article 105P, such as an edge, for alignment with the pretreatment system 16B. Pretreating the article 105 may facilitate the bonding of the ink from the DTG printer to the article 105. Thereafter, the packaged article 105P may be transferred to the preparation system 16A or the curing system 16D for drying. In some embodiments, the pretreatment system 16B has its own dryer, and the article 105 may be transferred to the pretreatment dryer. In some embodiments, the packaged article 105P is initially transferred from the storage area 30 to the pretreatment system 16B. After pretreatment, the packaged article 105P is transferred to the preparation system 16A for drying. In a WET-ON-WET process, the packaged article 105P may be transferred to the DTG printer 16C. In some embodiments, the WET_ON_WET process may include a process step where the article 105P is pressed with a roller or flat press to cause the fabric fibers to flatten and point in a given direction, thereby improving the print quality. In some embodiments, while the packaged article 105P is being process, e.g., pretreated, dried, or printed, the robot arm may be directed to handle a different packaged article and directed back to retrieve the packaged article 105P after processing.

After pretreatment and drying, the printing area of the article 105 may be flat and wrinkle free and ready for print. The robot arm of the transfer system 18 removes the packaged article 105P from the dryer 16D and transfers the packaged article 105P to the DTG printer 16C. The transfer system 18 also aligns the print-access window 145 with the printer head of the printer 16C. The printer 16C digitally prints the article 105 according to the personalized order. In some embodiments, the printable area of the article 105 is located above the top wall 126 and closer to the printing head of the DTG printer 16C. After printing, the packaged article 105P is transferred to a dryer 16D, and the article 105 is heated to dry the ink. The packaged article 105P is retrieved from the dryer 16D and delivered to the window of the kiosk for pickup by the user. In this example, the packaging 101 of the packaged article 105P also serves as the retail packaging that is delivered to the user. In some embodiments, the packaged article 105P is opened, and the article 105 is removed from the support surface 131 before delivery to the user. In another embodiment, the article 105 is removed from the packaging 101 by pushing out from the bottom of the lower packaging portion 111 via the opening 148. Then the article 105 can be pulled through the window 145 in the upper packaging portion 112. In some embodiments, the packaging 101 can be reloaded with a new article 105 and reused.

In some embodiments, the packaging 101 may include identification ("ID") tags that help identify the article in the packaging, communicate with control system, provide for "Internet of Things" operation, and remote operation by allowing each packaged article to be tracked and inventoried within the kiosk 10. The ID tags are configured to communicate with the control system 90 to facilitate operations of the transfer system 18, the article retrieval system 14, and the personalization system 16. For example, the ID tag allows multiple packaged articles to be tracked within the personalization system 16 as the packaged articles move from component to component. Exemplary ID tags include radio frequency ID tags ("RFID") and near-field communication ("NFC") tags. The ID tag may be disposed on any suitable portion of the packaging 101, such as the upper packaging portion 112 and the lower packaging portion 111. It is contemplated the ID tag may be included with other packaging embodiments described herein, such as packaging 201, 301, 401, 501, 601, 701, 801, 901, and 1001.

Embodiments of the packaging 101, 201, 301, 401, 501, 601, 701, 801, 901, and 1001 described herein use minimal amounts of packaging material. In this respect, the packaging is more friendly to the environment by conserving resources and reducing waste. Also, the packaging occupies less storage space, thereby allowing more inventory to be stored in a confined space, such as a kiosk. The minimal packaging may increase efficiency and reduce costs by reducing packaging efforts and packaging costs. The packaging may reduce the manipulation of the packaging as the article moves through the kiosk. For example, the smaller packaging can be more easily handled by the transfer system 18 or accommodated within the personalization system 16, such as the DTG printer 16C and the pretreatment system 16B. In some embodiments, the packaging also serves as the retail packaging that is delivered to the user.

Second Packaging Embodiment

Figure 5A:
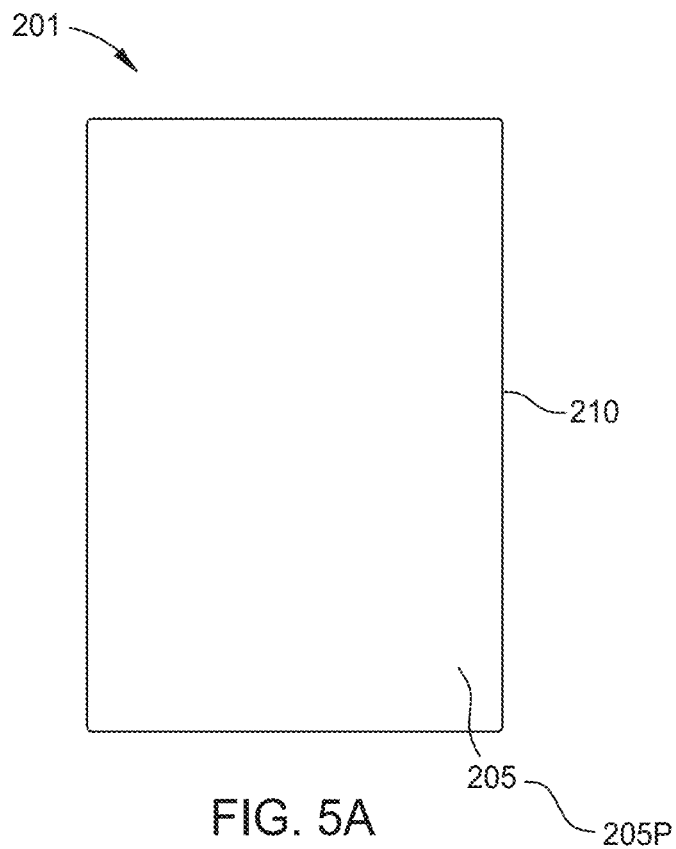
FIGS. 5A-5B illustrates another embodiment of a packaging suitable for retaining an article for customization.
Figure 5B:
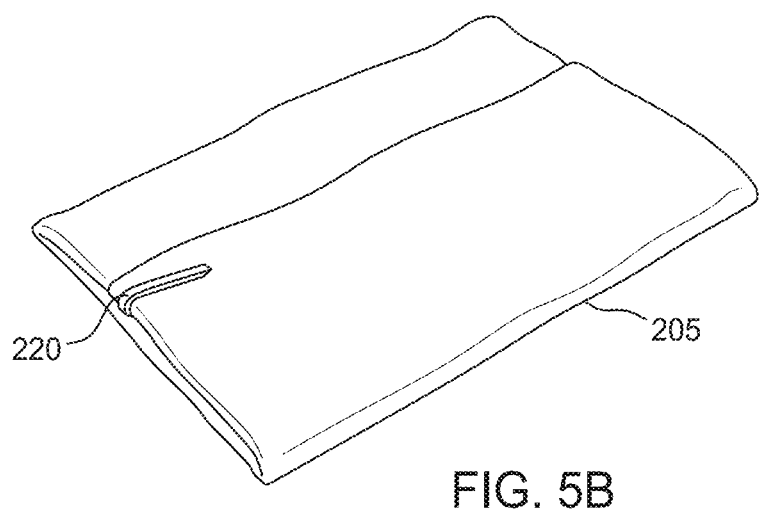

FIGS. 5A-5B illustrates another embodiment of a packaging 201 suitable for retaining an article for customization. The packaging 201 includes a stiffener 210 disposed inside the article 205. As shown, the article 205 is a T-shirt. FIG. 5A is a front view of the article 205, and FIG. 5B is a back view of the article 205. The article 205 and the packaging 201 may be referred to as a packaged article 205P. It is contemplated the front and/or the back of the article 205 may be personalized.

The stiffener 210 provides support for the article 205 and a flat surface for the DTG printing process. In one embodiment, the stiffener 210 includes a flat surface and is disposed inside the article 205, i.e., the article may be wrapped around the stiffener 210 or the stiffener may be disposed inside a cavity of the article. The portions of the article 205 beyond the stiffener 210 may be wrapped around the edges of the stiffener 210. In some embodiments, the folded portions are held together using a retainer 220, such as a clip. Other exemplary retainers 220 include tapes, adhesive, and other suitable retainers. In the embodiment as shown, the clip remains below the print area of the article 205 while securing the folded portions. In this respect, the fastener 220 does not obstruct the printing area. The minimal packaging material used may expose the maximum area for printing. In this example, the entire surface between the edges of the stiffener 210 may be used as the printing area. In some embodiments, the printable area may extend to at least one edge of the stiffener 210, for example, two, three, or four edges. The minimal packaging also saves manufacturing costs.

Embodiments of the stiffener 210 may be made from one or more of: cardboard, paper, plastic, rubbers, metal, glass, wood, and composites. In one embodiment, the stiffener 210 is made of cardboard and has a rectangular shape. However, the stiffener 210 may have any shape suitable for the DTG printer. The stiffener 210 may have any size that is suitable for the DTG printer. For example, the stiffener 210 can have a width from 5 in. to 20 in., a length from 5 in. to 20 in., and a thickness from 0.002 in. to 1 in. The article 205 assembled with the packaging 201 provides a thin profile allows more inventory to be stored in a confined space, such as a kiosk. In some embodiments, the article 205 and the stiffener 210 has an overall thickness from 0.01 inches to 3 inches or from 0.1 inches to 1 inch. In some embodiments, the stiffener 210 is configured to position the printing surface of the article 205 at a distance from 1 mm to 20 mm or from 2 to 10 mm away from the printing head. In some embodiments described herein, the stiffener 210 may include an ID tag to facilitate tracking of the article 205 during the printing process, as discussed above. In some embodiments, the packaging 201 also serves as the retail packaging that is delivered to the user. In some embodiments, the stiffener 210 may be used as registration feature to facilitate alignment with the DTG printer or the pretreatment system.

Third Packaging Embodiment

FIGS. 6A-B and 7A-7C illustrate another embodiment of a packaging 301 suitable for retaining an article for customization. FIG. 6A is a top view of the packaging 301, and FIG. 6B a side view of the packaging 301. FIG. 7A illustrates the upper packaging portion 312 and the lower packaging portion 311 of the packaging 301. As shown, the packaging 301 is in the form of a box shape, but may be in any suitable shape. FIGS. 6A-6B show the packaging 301 with an article 305 disposed therein. In some embodiments, the article 305 may be assembled with a stiffener, such as a stiffener 210 disclosed with respect to FIGS. 5A-5B. In some embodiments, the packaging 301 may include a retainer, such as the retainer 220 disclosed with respect to FIGS. 5A-5B.

Referring to FIG. 7A, the lower packaging portion 311 includes a bottom wall 321 and a plurality of sidewalls 322. The article 305 is disposed on the bottom wall 321 of the packaging 301, and the article 305 may optionally include a stiffener 310. In some embodiments, the bottom wall 321 includes a bottom window 329 for accessing a printable area on the article 305. In this embodiment, the article 305 includes a stiffener 310 to provide additional support for the article 305. The bottom window 329 may have any suitable shapes and/or sizes. As shown, the bottom window 329 has a rectangular shape and has a width and a length that are shorter than the width and length of the bottom wall 321. In some embodiments, the height of the plurality of sidewalls 322 is substantially the same as the thickness of the article 305 in the lower packaging portion 311. For example, the height of the plurality of sidewalls 322 may be from 0.70× to 1.25× the thickness of the article 305 or from 0.85× to 1.15× the thickness of the article 305. In another example, the height of the plurality of sidewalls 322 is from 0.85× to 1× the thickness of the article 305 including the stiffener, if the stiffener is used.

The upper packaging portion 312 includes a window 345 to allow access to the article 305 during the printing process. In some embodiments, the upper packaging portion 312 includes a top wall 326, and the window 345 is formed through the top wall 326. As shown, the top wall 326 forms a rim around the window 345. The window 345 may have any suitable shapes and/or sizes. As shown, the window 345 has a rectangular shape and has a width and a length that are shorter than the width and length of the top wall 326. The upper packaging portion 312 also has a plurality of sidewalls 327 attached to the top wall 326. The plurality of sidewalls 327 may extend down from the top wall 326 toward the plurality of sidewalls 322 of the lower packaging portion 311. In some embodiments, the sidewalls 327 of the upper packaging portion 312 overlap with the sidewalls 322 of the lower packaging portion 311. In this example, the sidewalls 322 of the lower packaging portion 311 are disposed inside the sidewalls 327 of the upper packaging portion 312. However, the sidewalls 322 may be disposed around the outside of the sidewalls of the lower packaging portion 312. In some embodiments, the height of the sidewalls 327 is the same as or shorter than the height of the sidewalls 322 of the lower packaging portion 311. In some embodiments, the packaging 301 is configured to position the printing surface of the article 305 at a distance from 1 mm to 20 mm or from 2 to 10 mm away from the printing head.

In some embodiments, the printing surface of the article 305 is positioned slightly higher (i.e., closer to the printing nozzle) than the top wall 326, as shown in FIG. 6B, when the upper packaging portion 312 is disposed over the lower packaging portion 312. For example, the article 305 may be supported by a stiffener 310 having a stepped configuration, as shown in FIGS. 7B and 7C. The stiffener 310 includes a body 361 and a raised support surface 362. The body 361 has a shape and a size that is substantially the same as the lower packaging portion 311. In this respect, the body 361 may minimize movement of the article relative to the lower packaging portion 311. The raised support surface 362 of the stiffener 310 may have a shape and size that is substantially the same as or slightly smaller than the window 345. In this respect, the raised support surface 362 positions the printable area of the article 305 through the window 345 and closer to the printing nozzle.

In some embodiments described herein, the packaging 301 may include an ID tag to facilitate tracking of the article 305 during the printing process, as discussed above. The ID tag may be disposed on any suitable portion of the packaging 301, such as the upper packaging portion 312, the lower packaging portion 311, and the stiffener 310. In some embodiments, the lower and upper packaging portions 311, 312 includes a registration feature used by the transfer system 18 and the personalization system 16 to ensure proper positioning of the packaged article relative to the systems. For example, one or more sides of the upper packaging portion 312 may be used as a reference point when gripped by the robot. That reference point may be aligned with a corresponding reference point on the printer 16C. In some embodiment, the lower packaging portion 311 and the upper packaging portion 312 may be manufactured from one or more of: cardboard, paper, plastic, rubbers, metal, glass, wood, and composites. In one embodiment, the packaging 301 is made from cardboard and can be reloaded with another article and reused. In some embodiments, the packaging also serves as the retail packaging that is delivered to the user.

Fourth Packaging Embodiment

Figure 8A:
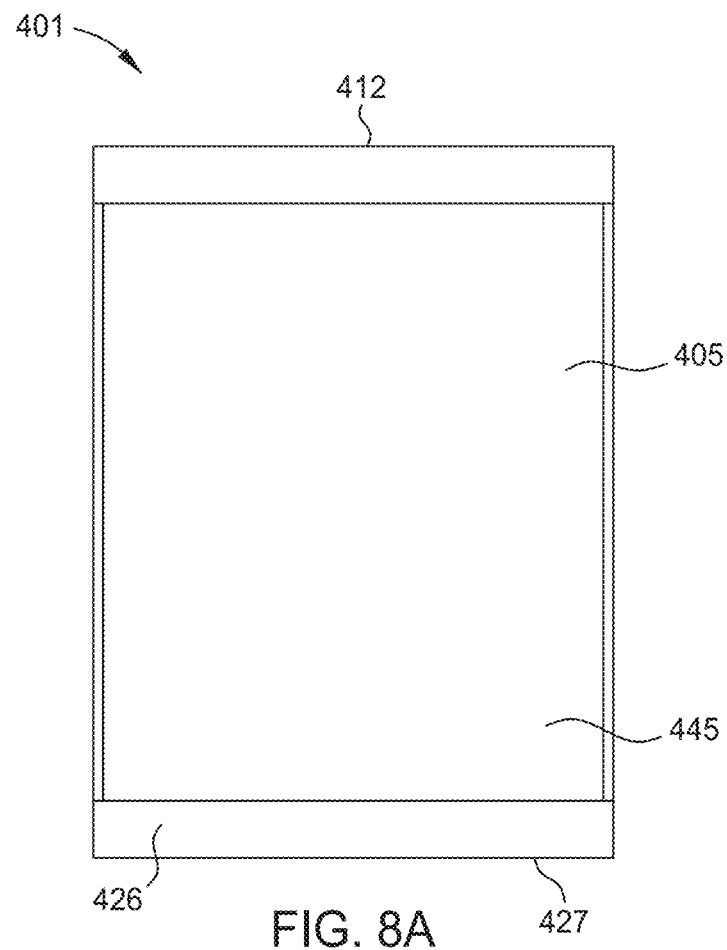
FIGS. 8A-8B illustrate another embodiment of a packaging suitable for retaining an article for customization.
Figure 8B:
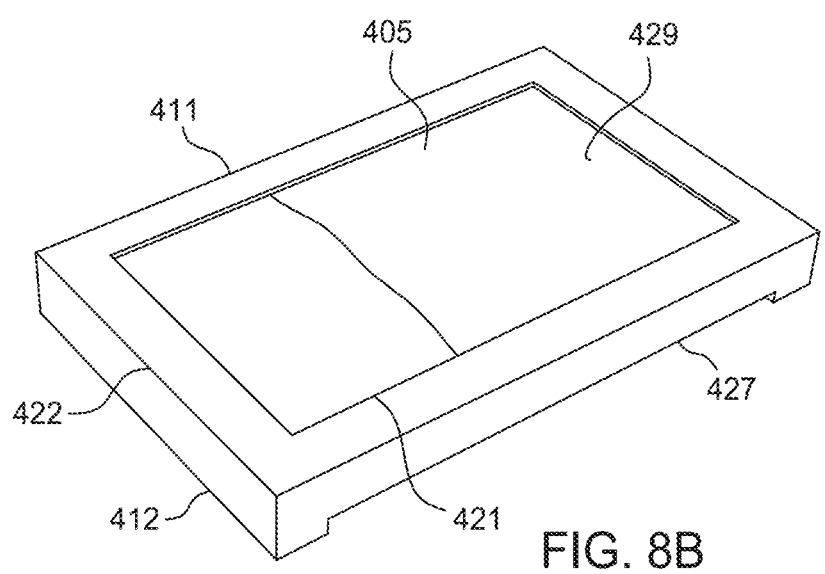

FIGS. 8A-8B illustrate another embodiment of a packaging 401 suitable for retaining an article for customization. FIG. 8A is a top view of the packaging 401, and FIG. 8B is perspective view of the bottom of the packaging 401. The packaging 401 is similar and to the packaging 301 of FIGS. 6A-B and 7A-7C. For clarity, similar features will not be further discussed in detail and will be identified with similar reference numbers. In this embodiment, the packaging 401 includes an upper packaging portion 412 and a lower packaging portion 411. FIGS. 8A-8B are shown with the article 405 disposed therein.

The lower packaging portion 411 includes a bottom wall 421 and a plurality of sidewalls 422. In some embodiments, the bottom wall 421 includes a bottom window 429 for accessing a printable area at the bottom of the article 405. In this embodiment, the article 405 includes a stiffener to provide additional support for the article 405. The article 405 may include a retainer for securing the folded portions of the article 405. The bottom window 429 may have any suitable shapes and/or sizes.

The upper packaging portion 412 includes a window 445 to allow access to the printable area of the article 405 during the printing process. In some embodiments, the upper packaging portion 412 includes a top wall 426 and the window 445 is formed through the top wall 426. As shown, the window 445 has a rectangular shape and a length that is shorter than the length of the top wall 421. In comparison to the window 345 of the packaging 301 shown in FIG. 6A, the width of the window 445 extends the entire width of the top wall 426, thereby providing a larger printable area. The upper packaging portion 412 also has a plurality of sidewalls 427 extending down from the top wall 426 toward the plurality of sidewalls 422 of the lower packaging portion 411. In some embodiments, the sidewalls 427 of the upper packaging portion 412 overlap with the sidewalls 422 of the lower packaging portion 411 when the packaging 401 is closed. The sidewalls 422 of the lower packaging portion 411 can be disposed inside or outside of the sidewalls 427 of the upper packaging portion 412. In some embodiments, the packaging 401 is configured to position the printing surface of the article 405 at a distance from 1 mm to 20 mm or from 2 to 10 mm away from the printing head. In some embodiments, a stepped stiffener may be used to position the printing surface of the article 405 slightly higher (i.e., closer to the printing nozzle) than the top wall 426, when the upper packaging portion 412 is disposed over the lower packaging portion 412. In some embodiment, the lower packaging portion 411 and the upper packaging portion 412 may be manufactured from one or more of: cardboard, paper, plastic, rubbers, metal, glass, wood, and composites. In one embodiment, the packaging 401 is made from cardboard and can be reloaded with another article and reused.

In some embodiments, the packaging 401 may include identification ("ID") tags that help identify the article in the packaging, communicate with control system, provide for "Internet of Things" operation, and remote operation by allowing each packaged article to be tracked and inventoried within the kiosk 10. The ID tags are configured to communicate with the control system 90 to facilitate operations of the transfer system 18, the article retrieval system 14, and the personalization system 16. For example, the ID tag allows multiple packaged articles to be tracked within the personalization system 16 as the packaged articles move from component to component. Exemplary ID tags include radio frequency ID tags ("RFID") and near-field communication ("NFC") tags. The ID tag may be disposed on any suitable portion of the packaging 401, such as the upper packaging portion 412, the lower packaging portion 411, and the stiffener. It is contemplated ID tags may be included with other packaging embodiments described herein, such as packaging 101, 201, 301, 501, 601, 701, 801, 901, and 1001.

In some embodiments, the lower and upper packaging portions 411, 412 includes a registration feature used by the transfer system 18 and the personalization system 16 to ensure proper positioning of the packaged article relative to the systems. For example, one or more sides of the upper packaging portion 412 may be used as a reference point when gripped by the robot. That reference point may be aligned with a corresponding reference point on the printer 16C.

Embodiments of the packaging 401 use minimal amounts of packaging material. In this respect, the packaging is more friendly to the environment by conserving resources and reducing waste. Also, the minimal packaging occupies less storage space, thereby allowing more inventory to be stored in a confined space, such as a kiosk. The packaging may increase efficiency and reduce costs by reducing packaging efforts and packaging costs. The minimal packaging may reduce the manipulation of the packaging as the article moves through the kiosk. For example, the smaller packaging can be more easily handled by the transfer system 18 or accommodated within the personalization system 16, such as the DTG printer 16C and the pretreatment system 16B. In some embodiments, the packaging also serves as the retail packaging that is delivered to the user.

Fifth Packaging Embodiment

Figure 9A:
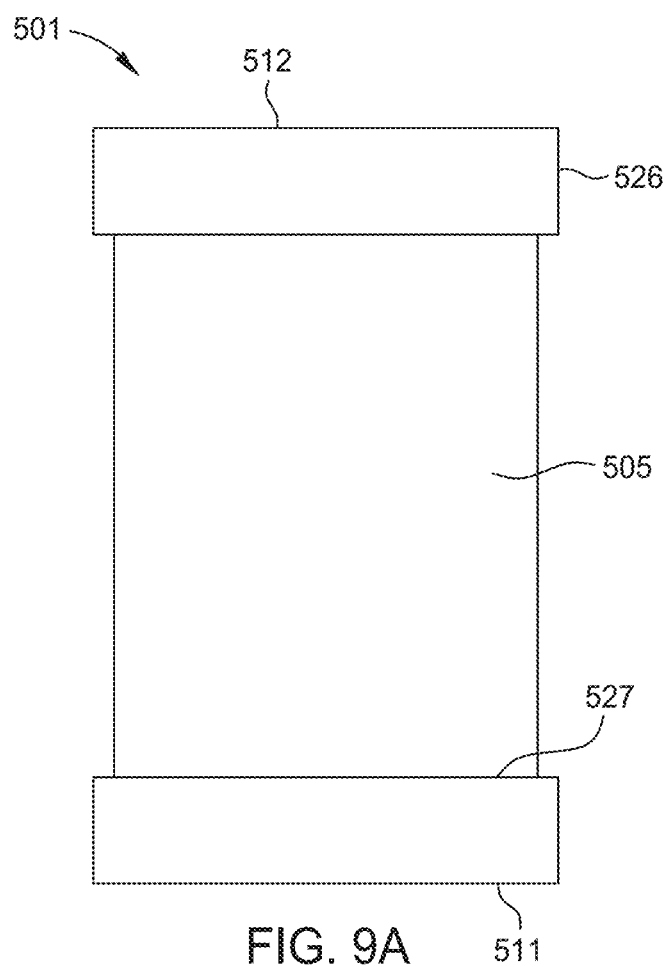
FIGS. 9A-9C illustrate another embodiment of a packaging suitable for retaining an article for customization.
Figure 9B:
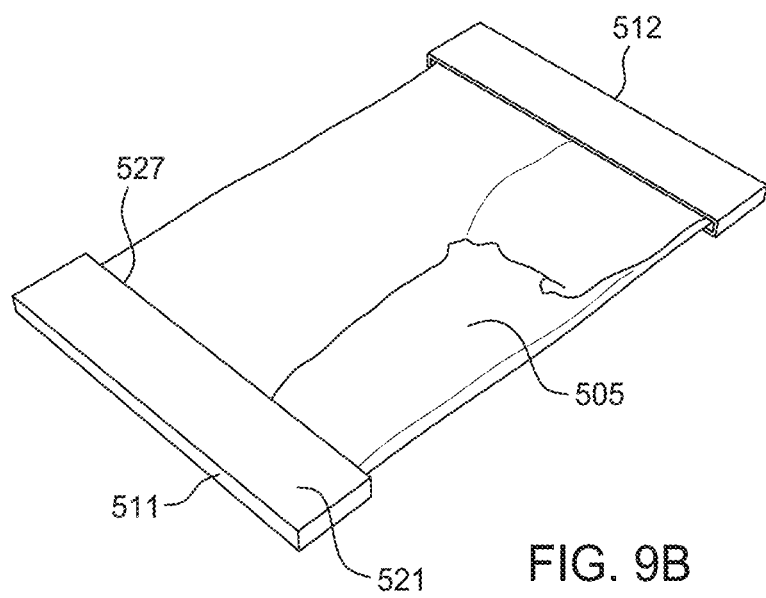
Figure 9C:
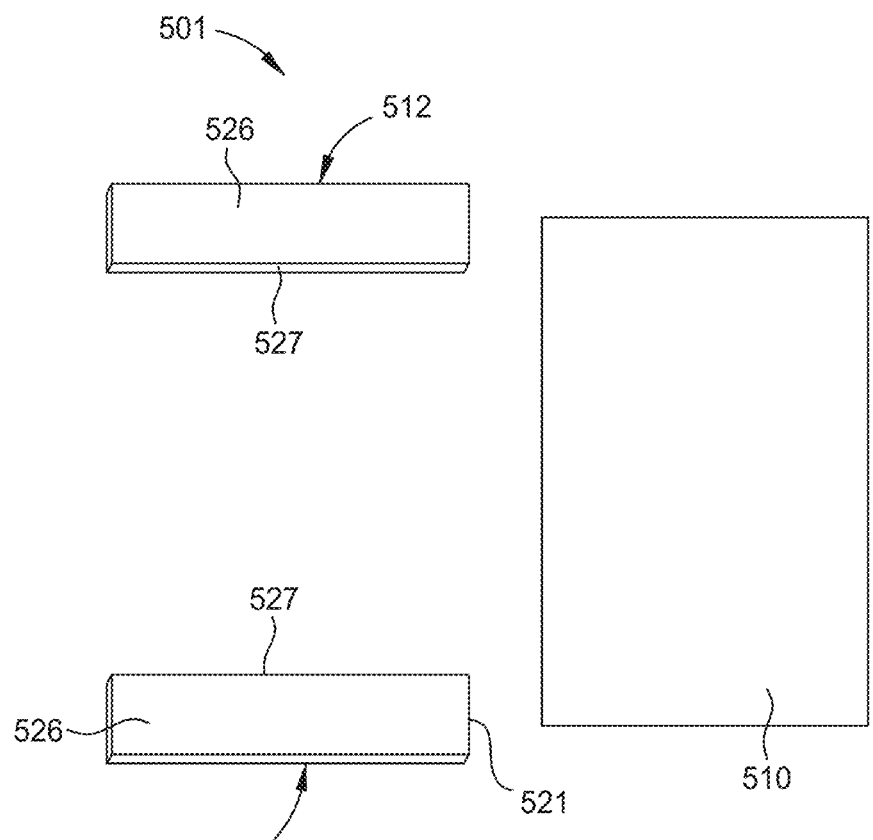

FIGS. 9A-9C illustrate another embodiment of a packaging 501 suitable for retaining an article for customization. FIG. 9A is a top view of the packaging 501, and FIG. 9B is perspective view of the bottom of the packaging 501. FIGS. 9A-9B show the packaging 501 assembled with the article 505. FIG. 9C shows the packaging 501 without the article 505.

In some embodiments, the lower packaging portion 511 and the upper packaging portion 512 are endcaps that fit over the bottom end and the top end of the article 501. In one embodiment, the endcaps 511, 512 includes a front wall 526 connected to a back wall 521, and an opening 527 formed between the front and back walls 526, 521. In some embodiments, a connecting wall connects the front wall 526 to the back wall 521. In some embodiments, the front wall 526 connects directly to the back wall 521. In some embodiments, the front wall 526, back wall 521, and, if present, the connecting wall are made from a single piece of material, such as cardboard. The opening 527 of the endcaps 511, 512 is configured to grip and secure the ends of the article 505. A stiffener 510 is used to provide rigidity to the article 505. The stiffener 510 may optionally include a raised support surface, similar to the stiffener 310. Because the endcaps 511, 512 can secure the folded portions of the article 505, use of a retainer is optional. The endcaps 511, 512 may have any suitable length, which can be based on the desired the printable area. In some embodiments, the endcaps 511, 512 may be used as a registration feature for the transfer system 18 and the personalization system 16 to ensure proper positioning of the article 505 relative to the systems. For example, the top edge of the upper end cap 512 may be used as a reference point when gripped by the robot. That reference point may be aligned with a corresponding reference point on the printer 16C. In some embodiments, the packaging 501 is configured to position the printing surface of the article 305 at a distance from 1 mm to 20 mm or from 2 to 10 mm away from the printing head.

In some embodiments, the packaging 501 may include identification ("ID") tags that help identify the article in the packaging, communicate with control system, provide for "Internet of Things" operation, and remote operation by allowing each packaged article to be tracked and inventoried within the kiosk 10. The ID tags are configured to communicate with the control system 90 to facilitate operations of the transfer system 18, the article retrieval system 14, and the personalization system 16. For example, the ID tag allows multiple packaged articles to be tracked within the personalization system 16 as the packaged articles move from component to component. Exemplary ID tags include radio frequency ID tags ("RFID") and near-field communication ("NFC") tags. The ID tag may be disposed on any suitable portion of the packaging 501, such as the endcaps 511, 512 and the stiffener 510.

Embodiments of the packaging 501 use minimal amounts of packaging material. In this respect, the packaging is more friendly to the environment by conserving resources and reducing waste. Also, the packaging occupies less storage space, thereby allowing more inventory to be stored in a confined space, such as a kiosk. The minimal packaging may increase efficiency and reduce costs by reducing packaging efforts and packaging costs. The packaging may reduce the manipulation of the packaging as the article moves through the kiosk. For example, the smaller packaging can be more easily handled by the transfer system 18 or accommodated within the personalization system 16, such as the DTG printer 16C and the pretreatment system 16B. In some embodiments, the packaging also serves as the retail packaging that is delivered to the user.

In some embodiment, the lower packaging portion 511 and the upper packaging portion 512 may be manufactured from one or more of: cardboard, paper, plastic, rubbers, metal, glass, wood, and composites. In one embodiment, the packaging 501 is made from cardboard. After the DTG process, the endcaps 511, 512 can be collected and reused with another article.

Sixth Packaging Embodiment

Figure 10:
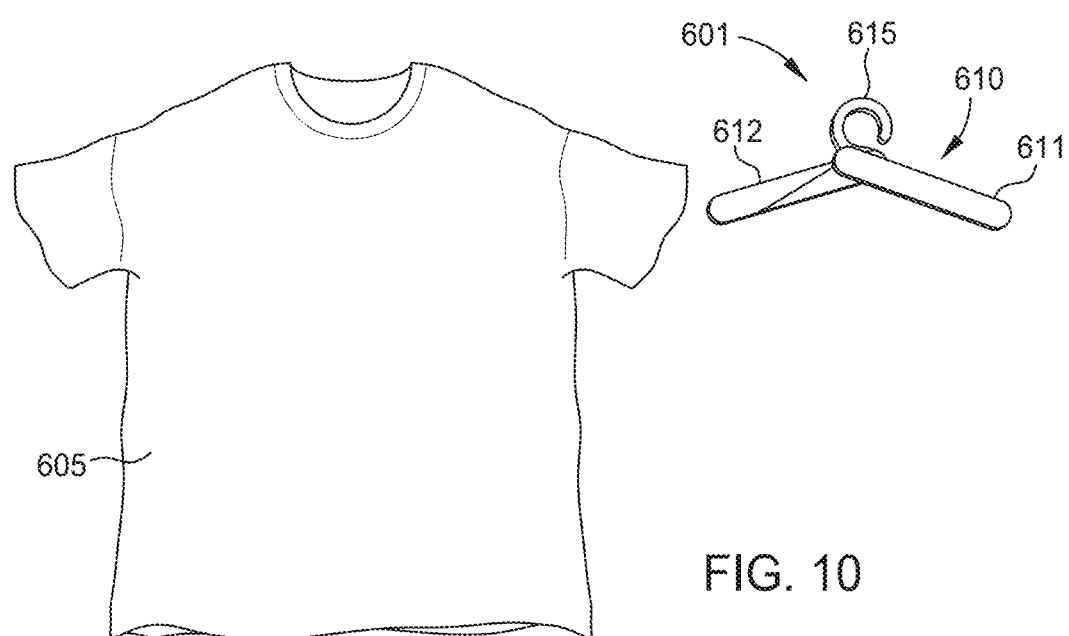
FIG. 10 illustrates an exemplary embodiment of a retractable hanger as a packaging.
Figure 11:
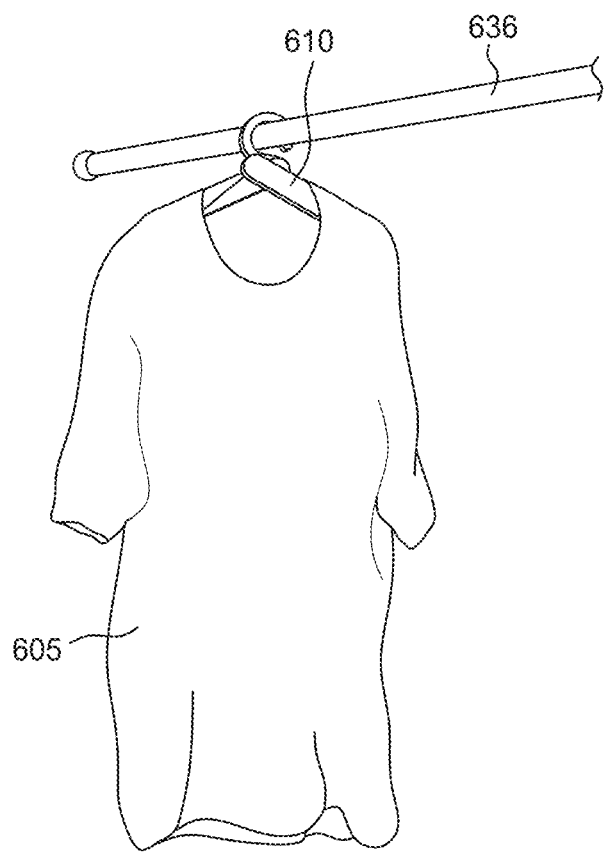
FIG. 11 illustrates a T-shirt supported on the retractable hanger of FIG. 10.

FIGS. 10-11 illustrate another embodiment of a packaging 601 suitable for retaining an article for customization. The packaging 601 includes a retractable hanger 610. FIG. 10 illustrates the retractable hanger 610 and an article, such as a T-shirt 605. FIG. 11 illustrates the T-shirt 605 supported on the hanger 610.

In some embodiments, the hanger 610 includes a first hanging arm 611 connected to a second hanging arm 612. A hook 615 is attached to at least one of the arms 611, 612. In this embodiment, the first and second arms 611, 612 are collapsible. For example, at least one of the first and second arms 611, 162 may bend or break to form a collapsed configuration in response to a pull force. In some embodiments, the first and second arms 611, 612 are pivotable relative to each other. For example, the first and second arms 611, 612 may be hinged at respective ends to form a pivot point about which the arms can pivot relative to each other. The degree of rotation is sufficient to allow a garment disposed on the hanger 610 to be removed from the hanger 610 by collapsing the arms 611, 612. In some embodiments, a biasing member such as a spring is used to bias the first arm 611 and the second arm 612 between an extended position and a retracted position. In some embodiments, the first and second arms 611, 612 may be locked at various angled positions to accommodate different sizes of articles and loading or unloading of the article into/onto the packaging 601 and other suitable packaging embodiments described herein such as packaging 801, 1001. Embodiments of the first and second arms 611, 612 may be made from one or more of: cardboard, paper, plastic, rubbers, metal, glass, wood, and composites. In FIG. 11, the hanger 610 is made of cardboard and shaped like a rectangle with curved ends, such as a semicircle. In some embodiments, the arms 611, 612 may be collapsed by pulling the garment away from the hanger 610 with sufficient force, or by applying another external force to the hanger arms 611, 612. The hanger arms 611, 612 may be configured with a sufficient breakaway force which, when achieved, allow the arms 611, 612 to collapse with a lesser force. In some embodiments, the hanger arms 611, 612 may include one or more of a crease, a partial cut, and perforations to facilitate the collapse of the arms 611, 612. In one embodiment, the arms 611, 612 are integrated into a single arm that that is collapsible.

In one embodiment, the hanger 610 may be hanging from a rod 636 in an automated or semi-automated DTG vending kiosk. In alternative embodiments, the hanger 610 may be used in a large personalization factory where conveyance of the hangers from location to location and station to station may be performed by one or more of rails, slides, robotic arms, chains, conveyors, and other similar means. The arms 611, 612 are disposed inside the T-shirt 605 and supporting the shoulders of the T-shirt 605. In response to receiving a personalization order, a control system 90 may cause a transfer system 18 to retrieve the T-shirt 605 to be personalized. In one example, the T-shirt 605 is selected from the storage area 30 containing different T-shirts of different sizes, styles, color, and combinations thereof.

The transfer system 18 may retrieve the T-shirt 605 by pulling the T-shirt 605 off the hanger 610. In one embodiment, the transfer system 18 includes one or more robotic arms having grippers for gripping the T-shirt 605. In one example, the robotic arm includes joints that allow a plurality of degrees of freedom, and soft grippers for grasping the T-shirt 605. The robotic arm may be used to grab the T-shirt 605 and either place it on the platen of a DTG component, or pull it onto the platen. In embodiments, the robotic arm grippers may be soft grippers that may include an outer skin made of rubber or similar material. In some embodiments, the grippers have fingers or claws that open and close via electromechanical motors, or pneumatic motors. An exemplary embodiment of the robotic arm is disclosed in U.S. Pat. No. 11,161,353, which patent, including at least column 15, line 29 to column 15, line 64, is incorporated herein by reference in its entirety.

The two grippers grip the shoulders of the T-shirt 605 and pull the T-shirt 605 away from the hanger 610. The pull force causes the hanging arms 611, 612 to collapse, thereby allowing removal of the hanging arms 611, 612 via the neck opening of the T-shirt 605. In some embodiments, the hanger arms 611, 612 are made of cardboard that fold and/or tear in response to the pull force. The grippers of the transfer system 18 function as the tensioner to keep the T-shirt 605 taut during the DTG process. In some embodiments, the grippers also function as the registration feature to ensure proper positioning of the T-shirt 605 during DTG process. In this respect, the grippers may grip predetermined locations of the T-shirt 605 on the hanger 610 and maintain that gripped location throughout the DTG process. In some embodiments, additional grippers are used to grip other portions of the T-shirt 605. For example, two additional gripper are used to grip the left and right lower portions of the T-shirt 650. The four grippers cooperate to keep the printable area in a taut configuration.

The T-shirt 605 may be transferred by the transfer system 18 through each system component. In one example, the T-shirt 605 is transferred initially to the preparation system 16A, which the T-shirt 605 is heat pressed. Then the T-shirt 605 is transferred to the pretreatment system 16B. The pretreatment system 16B applies a pretreatment solution to an entire side of the T-shirt 605 to be DTG printed on or may only apply pretreatment solution to a portion to be printed on according to the personalization order. In some embodiments, the grippers position the T-shirt 605 in proper alignment with the pretreatment system 16B and apply tension to keep the T-shirt 605 taut. Pretreating the article 605 may facilitate the bonding of the ink from the DTG printer to the T-shirt 605. Thereafter, the T-shirt 605 may be transferred to the preparation system 16A or the dryer of the curing system 16D. In some embodiments, the pretreatment system 16B has its own dryer, and the T-shirt 605 is transferred to the pretreatment dryer. In a WET-ON-WET process, the T-shirt 605 may bypass the dryer 16D and transferred to the DTG printer 16C.

After pretreatment and drying, the printing area of the T-shirt 605 may be flat and wrinkle free and ready for print. The robotic arms of the transfer system 18 removes the T-shirt 605 from the dryer 16D and transfers the T-shirt 605 to the DTG printer 16C. The T-shirt 605 may be placed on a platen of the DTG printer 16C. In some embodiments, a cover having a window for the printable area may be used to secure the T-shirt 605 is place. The DTG printer 16C digitally prints the T-shirt 605 according to the personalized order. After printing, the T-shirt 605 is transferred to a dryer 16D, and the T-shirt 605 is heated to cure the ink. The T-shirt 605 is retrieved from the dryer 16D and delivered to the window of the kiosk for pickup by the user. In one embodiment, the T-shirt 605 is folded and/or placed in a container, such as a box or bag, prior to delivery to the user.

Seventh Packaging Embodiment

Figure 12A:
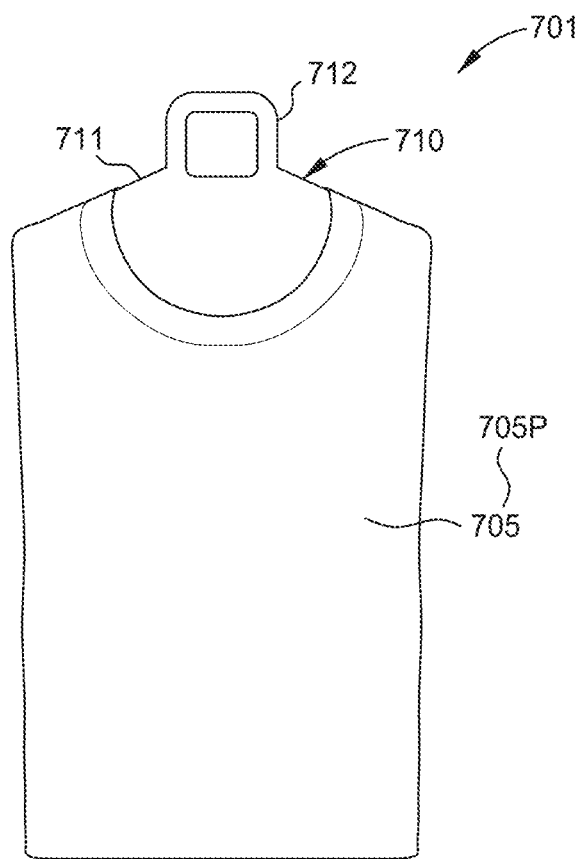
FIG. 12A is a front view of another embodiment of a packaging suitable for retaining an article for customization.
Figure 12B:
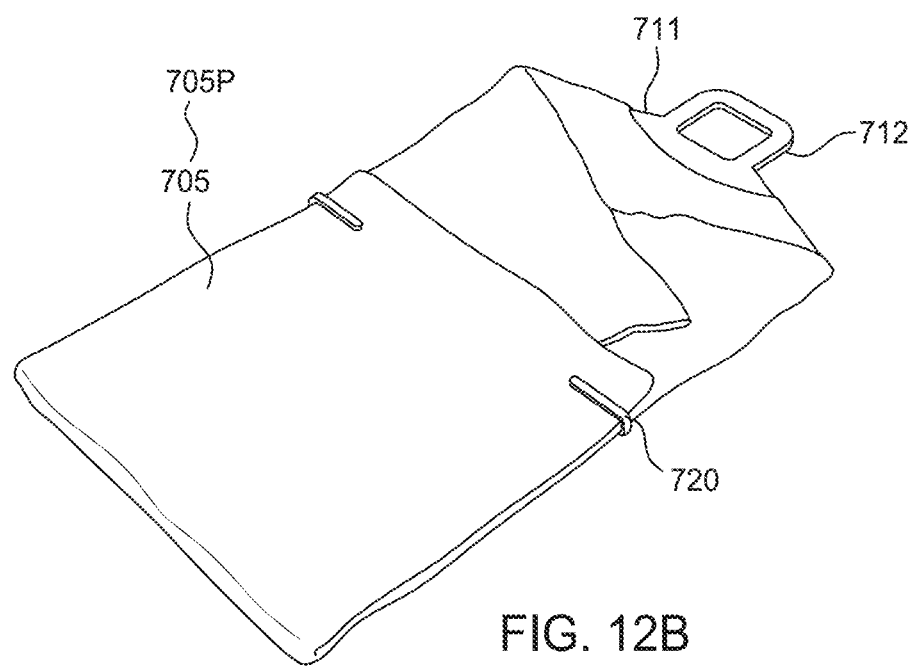
FIG. 12B is a back view of the packaging of FIG. 12A.

FIGS. 12A-12B illustrates another embodiment of a packaging 701 suitable for retaining an article for customization. The packaging 701 includes a stiffener 710 disposed inside the article 705. In the example as shown, the article 705 is a T-shirt. FIG. 12A is a front view of the article 705 assembled with the stiffener 710, and FIG. 12B is a back view of the article 705 and the stiffener 710. The article 705 and the packaging 701 may be referred to as a packaged article. It is contemplated the front and/or the back of the article 705 may be personalized.

In FIGS. 12A-B, the stiffener 710 includes a support body 711 and a handle 712. The stiffener 710 provides support for the article 705 and a flat surface for the DTG printing process. In one embodiment, the support body 711 includes a flat surface and is disposed inside the article 705. The portions of the article 705 beyond the stiffener 710 may be folded around the edges of the stiffener 710. In another embodiment, the article 705 is wrapped around the stiffener 710, instead of being disposed therein. In some embodiments, the folded portions are held together using a retainer 720, such as a clip. Other exemplary retainers 720 include tapes, adhesive, and other suitable retainers. In the embodiment as shown, the clip remains below the printing area of the article 705 while securing the folded portions. In this respect, the fastener 720 does not obstruct the printing area. In some embodiments, the stiffener 710 may be configured to collapse to facilitate loading or unloading of an article. For example, the stiffener 710 may include one or more of a crease, a partial cut, and perforations to facilitate the collapse of the stiffener 710. In one example, the stiffener 710 has one or more creases disposed vertical on the support body 711. The creases allow the stiffener 710 to adjust to the size of the article 705 and keep it taut during the DTG process.

The handle 712 may protrude through the neck opening of the article 705. As shown, the handle 712 has a U-shape and is attached to the support body 711 at two locations. It is contemplated the handle 712 may attach to the support body 711 at one or more locations. For example, the handle 712 can be attached to the support body 711 at a single location. In yet another example, the handle 712 has a T-shape. In some embodiments, the handle 712 includes a curved shape, such as a hook. For example, the handle 712 has a hook and is attached to the support body 711 at a single location. In some embodiments, the hook includes a hole or suitable attachment devices for coupling to a rail or conveyance mechanisms. In some embodiments, the support body 711 includes angled sides to accommodate the shoulder portions of the article 705.

The minimal material used to make the packaging 701 may expose the maximum area for printing. In this example, the entire surface of the article 705 on the stiffener 710 may be used as the printing area. In some embodiments, the printable area may extend to at least one edge of the stiffener 710, for example, two, three, or four edges. The minimal packaging is more friendly to the environment by conserving resources and reducing waste. Also, the packaging occupies less storage space, thereby allowing more inventory to be stored in a confined space, such as a kiosk. The minimal packaging may increase efficiency and reduce costs by reducing packaging efforts and packaging costs. The packaging may reduce the manipulation of the packaging as the article moves through the kiosk. For example, the smaller packaging can be more easily handled by the transfer system 18 or accommodated within the personalization system 16, such as the DTG printer 16C and the pretreatment system 16B. In some embodiments, the packaging also serves as the retail packaging that is delivered to the user.

Embodiments of the stiffener 710 may be made from one or more of: cardboard, paper, plastic, rubbers, metal, glass, wood, and composites. In one embodiment, the stiffener 710 is made of cardboard and has a rectangular shape. The stiffener 710 may have any shape suitable for the DTG printer. The stiffener 710 may have any size that is suitable for the DTG printer. For example, the stiffener 710 can have a width from 5 in. to 20 in., a length from 5 in. to 20 in., and a thickness from 0.002 in. to 1 in. The article 705 assembled with the packaging 701 provides a thin profile allows more inventory to be stored in a confined space, such as a kiosk. In some embodiments, the article 705 and the stiffener 710 has an overall thickness from 0.01 inches to 3 inches or from 0.1 inches to 1 inch. In some embodiments, the packaged article 705P including may be stacked on top of each other or hung next to each other. In one embodiment, the packaged article 705P may be hanging from a rod in an automated or semi-automated DTG vending kiosk. In alternative embodiments, the packaging 710 may be used in a large personalization factory where conveyance of the hangers from location to location and station to station may be performed by one or more of rails, slides, robotic arms, chains, conveyors, and other similar means.

In some embodiments, the packaging 701 may include identification ("ID") tags that help identify the article in the packaging, communicate with control system, provide for "Internet of Things" operation, and remote operation by allowing each packaged article to be tracked and inventoried within the kiosk 10. The ID tags are configured to communicate with the control system 90 to facilitate operations of the transfer system 18, the article retrieval system 14, and the personalization system 16. For example, the ID tag allows multiple packaged articles to be tracked within the personalization system 16 as the packaged articles move from component to component. Exemplary ID tags include radio frequency ID tags ("RFID") and near-field communication ("NFC") tags. The ID tag may be disposed on any suitable portion of the packaging 701, such as the support body 711 and the handle 712 of the stiffener 710.

In one embodiment, a packaged article 705P is stored in a storage area 30 of a kiosk. In this example, the article 705 is a T-shirt. In response to receiving a personalization order, a control system 90 may cause a transfer system 18 to retrieve the T-shirt 705 to be personalized. In one example, the T-shirt 705 is selected from the storage area 30 containing different T-shirts of different sizes, styles, color, and combinations thereof.

The transfer system 18 retrieves the selected packaged article 705P and transfers the packaged article 705P through the system components. The robotic arm of the transfer system 18 may retain the packaged article 705P by gripping the handle 712 of the packaging 701. In one example, the packaged article 705P is transferred initially to the preparation system 16A, wherein the article 705 may be heat pressed. The packaged article 705P is then transferred to the pretreatment system 16B. The pretreatment system 16B applies a pretreatment solution to an entire side of the article 705 to be DTG printed on or only apply pretreatment solution to a portion of the article 705 to be printed on according to the personalization order. In some embodiments, the transfer system 18 uses a portion of the stiffener 710, such as the handle 712, as a registration feature to position the T-shirt 705 in proper alignment with the pretreatment system 16B. Pretreating the article 705 may facilitate the bonding of the ink from the DTG printer to the T-shirt 705. Thereafter, the T-shirt 705 may be transferred to the dryer 16D. In some embodiments, the pretreatment system 16B has its own dryer, and the T-shirt 705 is transferred to the pretreatment dryer. In a WET-ON-WET process, the T-shirt 705 may bypass the dryer 16D and transferred to the DTG printer 16C.

After pretreatment and drying, the printing area of the T-shirt 705 may be flat and wrinkle free and ready for print. The robotic arm of the transfer system 18 removes the T-shirt 705 from the dryer 16D and transfers the T-shirt 705 to the DTG printer 16C. The T-shirt 605 may be placed on a platen of the DTG printer 16C. In some embodiments, the printing surface of the article 705 is positioned at a distance from 1 mm to 20 mm or from 2 to 10 mm away from the printing head of the DTG printer 16C. In some embodiments, a cover having a window for the printable area may be used to secure the T-shirt 705 in place. The DTG printer 16C digitally prints the T-shirt 705 according to the personalized order. After printing, the T-shirt 705 is transferred to a dryer 16D, and the T-shirt 705 is heated to cure the ink. The T-shirt 705 is retrieved from the dryer 16D and delivered to the window of the kiosk for pickup by the user. In one embodiment, the user may pick up the T-shirt 705 by grabbing the handle 712 of the packaging 701.

Eighth Packaging Embodiment

Figure 13:
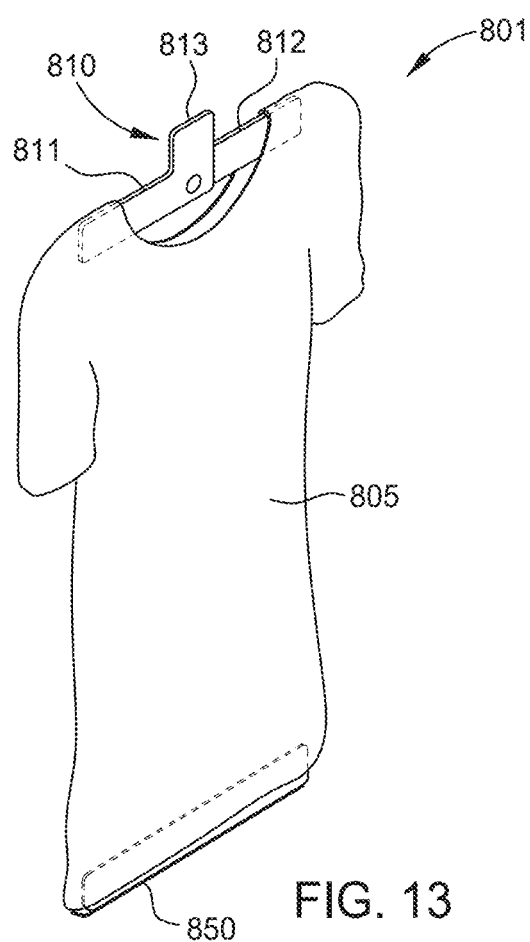
FIGS. 13-15 illustrate another embodiment of a packaging suitable for customization.
Figure 14:
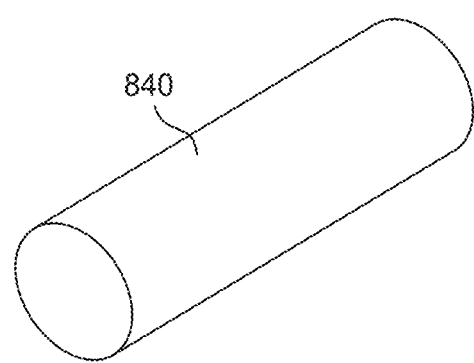
Figure 15:
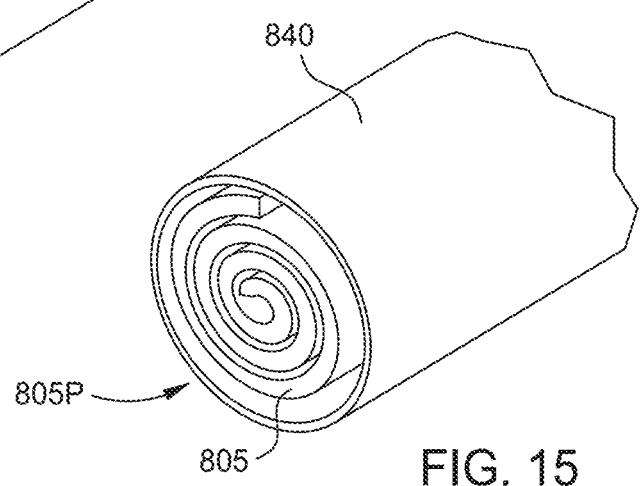

FIGS. 13-15 illustrate another embodiment of a packaging 801 suitable for retaining an article for customization. The packaging 801 includes a hanger 810 for supporting an article. FIG. 13 illustrates the hanger 810 disposed in the article, such as a T-shirt 805. FIG. 14 illustrates an exemplary container 840 for housing the hanger 810 and the T-shirt 805, and FIG. 15 illustrates the T-shirt 805 and the hanger 810 disposed in the container 840.

In some embodiments, the hanger 810 includes a first hanging arm 811 connected to a second hanging arm 812. For example, the first and second arms 811, 812 may be hinged at respective ends to form a pivot point about which the arms 811, 812 can pivot relative to each other. The degree of rotation is sufficient to allow a garment disposed on the hanger 810 to be removed from the hanger 810 by pivoting the arms 811, 812 closer to each other. In an embodiment, the arms 811, 812 have a straight portion that has a flat or round profile. In one embodiment, at least one of the arms 811, 812 includes an upset 813. The upset 813 may be protrude out of a neck opening of the article 805. In some embodiments, the first and second arms 811, 812 are pivotable relative to each other. In some embodiments, a biasing member such as a spring is used to bias the first arm 811 and the second arm 812 between an extended position and a retracted position. Embodiments of the first and second arms 811, 812 may be made from one or more of: cardboard, paper, plastic, rubbers, metal, glass, wood, and composites. For example, the hanger 810 may be made from cardboard or plastic. The arms 811, 812 may formed a small angle therebetween; for example, the angle may be from 150° to 210° or from 165° to 205°. In some embodiments, the first and second arms 811, 812 are collapsible. In some embodiments, the arms 811, 812 may be configured to collapse to facilitate loading or unloading of an article. For example, the arms 811, 812 may include one or more of a crease, a partial cut, and perforations to facilitate the collapse of the arms 811, 812. In some embodiments, the arms 811, 812 are configured to collapse in response to a pull force. For example, the arms 811, 812 may be collapsed by pulling the garment away from the hanger 810 with sufficient force, or by applying another external force to the hanger arms 811, 812. In one embodiment, the arms 811, 812 are integrated into a single arm that is collapsible. In some embodiments, the creases allow the arms 811, 812 to adjust to the size of the article 805 and keep it taut during the DTG process.

As shown in FIG. 13, the arms 811, 812 of the hanger 810 are disposed inside the T-shirt 805 and supporting the shoulders of the T-shirt 805. The arms 811, 812 may form a straight line or have a small angle therebetween, so long as the arms 811, 812 can fit into the container 840.

In some embodiments, the packaging 801 includes a bottom support member 850. The bottom support member 850 may be a straight bar and have a flat or round profile. The bottom support member 850 may be disposed inside the T-shirt 805 at or near the bottom portion of the T-shirt 805. FIG. 13 shows the bottom support member 850 disposed inside the T-shirt 805.

FIG. 15 shows the T-shirt 810, the hanger 810, and the bottom support member 850 rolled into a cylindrical configuration and disposed inside the container 840, also referred as the packaged article 805P. In one example, the container 840 has a cylindrical shape for receiving the rolled T-shirt 810. However, the container 840 may have a polygonal shape such as a rectangle or a hexagon. In some embodiments, the T-shirt 805 is rolled together with only the hanger 810 or the bottom support member 850. In some embodiments, the T-shirt 810, the hanger 810, and optionally, the bottom support member 850 may be folded and disposed inside the container 840.

In some embodiments, the packaging 801 may include identification ("ID") tags that help identify the article in the packaging, communicate with control system, provide for "Internet of Things" operation, and remote operation by allowing each packaged article to be tracked and inventoried within the kiosk 10. The ID tags are configured to communicate with the control system 90 to facilitate operations of the transfer system 18, the article retrieval system 14, and the personalization system 16. For example, the ID tag allows multiple packaged articles to be tracked within the personalization system 16 as the packaged articles move from component to component. Exemplary ID tags include radio frequency ID tags ("RFID") and near-field communication ("NFC") tags. The ID tag may be disposed on any suitable portion of the packaging 801, such as the hanger 810, the bottom support member 850, and the container 840.

Embodiments of the packaging 801 use minimal amounts of packaging material. In this respect, the packaging is more friendly to the environment by conserving resources and reducing waste. Also, the minimal packaging occupies less storage space, thereby allowing more inventory to be stored in a confined space, such as a kiosk. The packaging may increase efficiency and reduce costs by reducing packaging efforts and packaging costs. The minimal packaging may reduce the manipulation of the packaging as the article moves through the kiosk. For example, the smaller packaging can be more easily handled by the transfer system 18 or accommodated within the personalization system 16, such as the DTG printer 16C and the pretreatment system 16B. In some embodiments, the packaging also serves as the retail packaging that is delivered to the user.

In one embodiment, the packaged article 805P is stored in a storage area 30 of a kiosk. In this example, the article is a T-shirt 805. In response to receiving a personalization order, a control system 90 may cause a transfer system 18 to retrieve the T-shirt 805 to be personalized. In one example, the T-shirt 805 is selected from the storage area 30 containing different T-shirts of different sizes, styles, color, and combinations thereof.

The transfer system 18 may retrieve the packaged article 805P using one or more robotic arms. In one embodiment, the container 850 is inserted into a chute and transferred to the article personalization system 16. One of the robotic arms removes the T-shirt 805 from the container 850. The robotic arms may have grippers for gripping the T-shirt 805. After removal from the container 850, the grippers unroll the T-shirt 805 into a flat configuration. In this example, the T-shirt 805 was rolled together with only the hanger 810 during pre-packaging. Two grippers grip the shoulders of the T-shirt 805 and the hanger 810 inside the shoulders. After unrolling, the robotic arm may either place the T-shirt 805 on the platen of a DTG component, or pull the T-shirt 805 onto the platen. The grippers of the transfer system 18 may function as a tensioner to keep the T-shirt 805 taut during the DTG process. In some embodiments, the hanger 810 or the grippers also function as the registration feature to ensure proper positioning of the T-shirt 805 during the DTG process. In this respect, the grippers may grip predetermined locations of the hanger 810 and the T-shirt 805 and maintain that gripped location throughout the DTG process. In some embodiments, additional grippers are used to grip other portions of the T-shirt 805. For example, if a bottom support member 850 is used, two additional grippers may grip the left and right lower portions of the T-shirt 805 and the bottom support member 850. In this example, the four grippers cooperate to keep the printable area of the T-shirt 805 in a taut configuration.

The T-shirt 805 may be transferred by the transfer system 18 through each DTG system component. In one example, the T-shirt 805 may be transferred initially to the preparation system 16A, wherein the T-shirt 805 may be heat pressed. The T-shirt 805 may then be transferred to the pretreatment system 16B. The pretreatment system 16B may apply a pretreatment solution to an entire side of T-shirt 805 to be DTG printed on or may only apply pretreatment solution to a portion of the T-shirt 805 to be printed on according to the personalization order. In some embodiments, the grippers position the T-shirt 805 in proper alignment with the pretreatment system 16B and apply tension to keep the T-shirt 805 taut. Pretreating the article 101 may facilitate the bonding of the ink from the DTG printer to the T-shirt 805. Thereafter, the T-shirt 805 may be transferred to the preparation system 16A or the dryer 16D. In some embodiments, the pretreatment system 16B has its own dryer, and the T-shirt 805 is transferred to the pretreatment dryer. In a WET-ON-WET process, the T-shirt 805 may bypass the dryer 16D and transferred to the DTG printer 16C.

After pretreatment and drying, the printing area of the T-shirt 805 may be flat and wrinkle free and ready for print. The robotic arms of the transfer system 18 removes the T-shirt 805 from the dryer 16D and transfers the T-shirt 805 to the DTG printer 16C. The T-shirt 805 may be placed on a platen of the DTG printer 16C. In some embodiments, the printing surface of the article 805 is positioned at a distance from 1 mm to 20 mm or from 2 to 10 mm away from the printing head of the DTG printer 16C. In some embodiments, a cover having a window for the printable area may be used to secure the T-shirt 805 is place. The DTG printer 16C digitally prints a graphic on the T-shirt 805 according to the personalized order. After printing, the T-shirt 805 is transferred to the curing system 16D, and the T-shirt 805 is heated to cure the ink. The T-shirt 805 is retrieved from the curing system 16D and delivered to the window of the kiosk for pickup by the user. In one embodiment, the hanger 810 is removed and the T-shirt 805 is rolled or folded and placed in the container 850, or another suitable container such as a box or bag, prior to delivery to the user.

Ninth Packaging Embodiment

Figure 16:
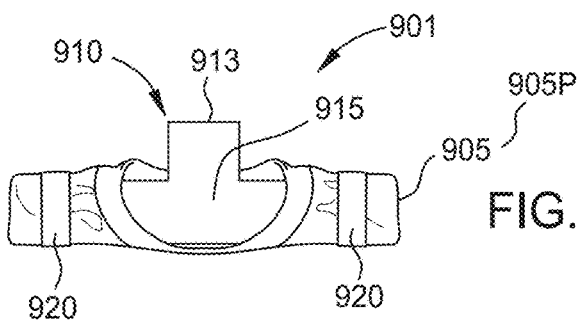
FIG. 16 illustrates another embodiment of a packaged article suitable for customization.
Figure 17:
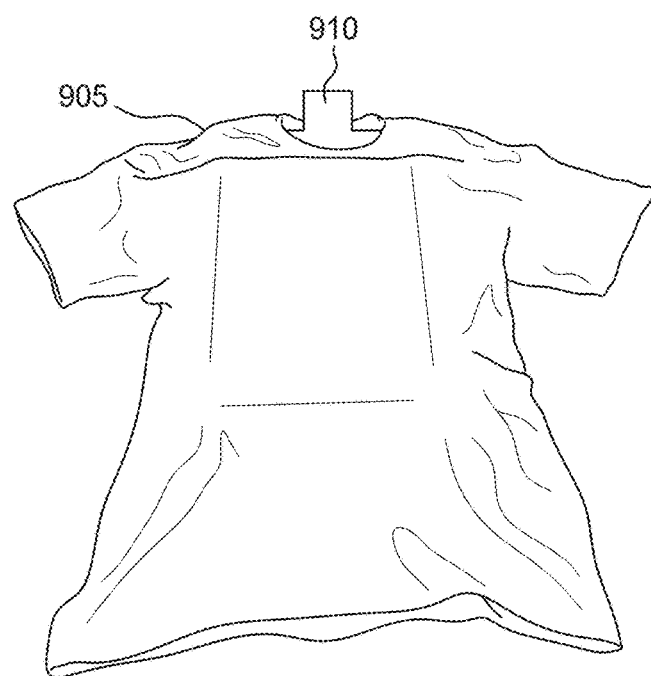
FIG. 17 illustrates an exemplary hanger of the packaging and a T-shirt disposed on a platen.
Figure 18:
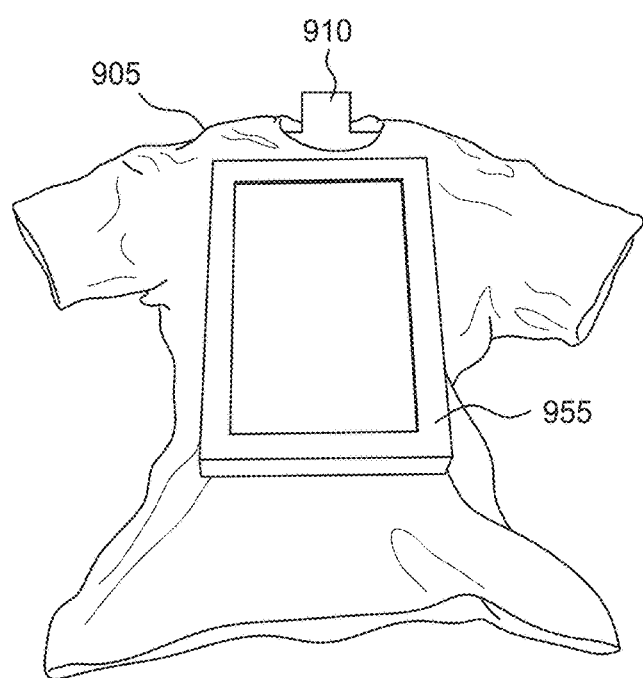
FIG. 18 illustrates an exemplary securing ring disposed on the T-shirt.

FIG. 16 illustrates another embodiment of a packaging 901 suitable for retaining an article for customization. The packaging 901 includes a hanger 910 for supporting the article, such as a T-shirt 905. FIG. 17 illustrates the hanger 910 and the T-shirt having a printable area disposed on a platen. FIG. 18 illustrates a securing ring 955 disposed on the T-shirt 905.

In some embodiments, the hanger 910 includes a hanging arm 915 having an upset 913. The hanging arm 915 may be straight and has a flat or round profile. The upset 913 may protrude out of a neck opening of the article 905. In some embodiments, the hanging arm 915 includes two or more arm portions coupled each other. In some embodiments, the hanging arm 915 is configured to collapse in response to a pull force. In some embodiments, the hanging arm 915 may include one or more of a crease, a partial cut, and perforations to facilitate the collapse of the hanging arm 915. Embodiments of the hanger 910 may be made from one or more of: cardboard, paper, plastic, rubbers, metal, glass, wood, and composites. For example, the hanger 910 may be made from cardboard or plastic. The upset 913 may have any suitable shape such as rectangular, arcuate, or a handle.

As shown in FIG. 16, the ends of the hanging arm 915 are disposed inside the T-shirt 905 and supporting the shoulders of the T-shirt 905. The upset 913 of the hanger 910 protrudes out of the neck opening of the T-shirt 905. In some embodiments, the hanging arm 915 may have a width from 5 in. to 20 in. and a length from 1 in. to 6 in. or from 1 in. to 4 in. The T-shirt 910 and the hanger 910 are rolled into a cylindrical configuration. In one example, the T-shirt 905 is rolled upwards from the bottom toward the neck opening. In some embodiments, the T-shirt 910 may be folded instead of rolled. In some embodiments, one or more retainers 920 are used to secure the T-shirt 905 in the rolled configuration. For example, ties can be placed around each side of the hanging arm 915. Other exemplary retainers 920 include a clip, a tape, adhesive, rubber band, or other suitable retainers. The retainers 920 may be made from one or more of: cardboard, paper, plastic, rubbers, metal, glass, wood, and composites. In one example, the hanger 910 and the ties 920 are made from the same material, such as cardboard or plastic. The rolled configuration of the article 905 may allow more inventory to be stored in a confined space, such as a kiosk.

In some embodiments, the packaging 901 may include identification ("ID") tags that help identify the article in the packaging 901, communicate with control system 90, provide for "Internet of Things" operation, and remote operation by allowing each packaged article to be tracked and inventoried within the kiosk 10. The ID tags are configured to communicate with the control system 90 to facilitate operations of the transfer system 18, the article retrieval system 14, and the personalization system 16. For example, the ID tag allows multiple packaged articles to be tracked within the personalization system 16 as the packaged articles move from component to component. Exemplary ID tags include radio frequency ID tags ("RFID") and near-field communication ("NFC") tags. The ID tag may be disposed on any suitable portion of the packaging 901, such as the hanging arm 915 and the upset 913 of the hanger 910.

Embodiments of the packaging 901 use minimal amounts of packaging material. In this respect, the packaging is more friendly to the environment by conserving resources and reducing waste. Also, the minimal packaging occupies less storage space, thereby allowing more inventory to be stored in a confined space, such as a kiosk. The packaging may increase efficiency and reduce costs by reducing packaging efforts and packaging costs. The minimal packaging may reduce the manipulation of the packaging as the article moves through the kiosk. For example, the smaller packaging can be more easily handled by the transfer system 18 or accommodated within the personalization system 16, such as the DTG printer 16C and the pretreatment system 16B. In some embodiments, the packaging also serves as the retail packaging that is delivered to the user.

In one embodiment, a packaged article 905P is stored in a rolled configuration 905 in a storage area 30 of a kiosk. In this example, the article is a T-shirt 905. In response to receiving a personalization order, a control system 90 may cause a transfer system 18 to retrieve the packaged article 905P to be personalized. In one example, the packaged article 905P is selected from the storage area 30 containing packaged articles of different T-shirts of different sizes, styles, color, and combinations thereof.

The transfer system 18 may retrieve the packaged article 905P containing the selected T-shirt 905 using one or more robotic arms. The robotic arms may have grippers for gripping the T-shirt 905. The grippers may remove the retainer 920, such as ties, and unroll the T-shirt 905 into a flat configuration. Two grippers grip the left and right sides of the T-shirt 905 and the hanger 910 inside the T-shirt 905. After unrolling, the robotic arm may either place the T-shirt 905 on the platen of a DTG component, or pull the T-shirt 905 onto the platen. The grippers of the transfer system 18 may function as a tensioner to keep the T-shirt 905 taut during the DTG process. In some embodiments, the hanger 910 or the grippers also function as the registration feature to ensure proper positioning of the T-shirt 905 during DTG process. In this respect, the grippers may grip predetermined locations on the hanger 910 and the T-shirt 905 and maintain that gripped location throughout the DTG process. In some embodiments, additional grippers are used to grip other portions of the T-shirt 905. For example, two additional gripper may grip the left and right lower portions of the T-shirt 905. In this example, the four grippers cooperate to keep the printable area of the T-shirt 905 in a taut configuration.

The T-shirt 905 may be transferred by the transfer system 18 through each DTG system component. In one example, the T-shirt 905 is transferred initially to the preparation system 16A, wherein the T-shirt 905 may be heat pressed. The T-shirt 905 may then be transferred to the pretreatment system 16B. The pretreatment system 16B may apply a pretreatment solution to an entire side of T-shirt 905 to be DTG printed on or may only apply pretreatment solution to a portion of the T-shirt 905 to be printed on according to the personalization order. In some embodiments, the grippers position the T-shirt 905 in proper alignment with the pretreatment system 16B and apply tension to keep the T-shirt 905 taut. Pretreating the T-shirt 905 may facilitate the bonding of the ink from the DTG printer 16C to the T-shirt 905. Thereafter, the T-shirt 905 may be transferred to the preparation system 16A or the dryer 16D. In some embodiments, the pretreatment system 16B has its own dryer, and the T-shirt 905 is transferred to the pretreatment dryer. In a WET-ON-WET process, the T-shirt 905 may bypass the dryer 16D and transferred to the DTG printer 16C.

After pretreatment and drying, the printable area of the T-shirt 905 may be flat and wrinkle free and ready for print. The robotic arms of the transfer system 18 removes the T-shirt 905 from the dryer 16D and transfers the T-shirt 905 to the DTG printer 16C. The T-shirt 905 may be placed on a platen of the DTG printer 16C, as shown in FIG. 17. In some embodiments, the printing surface of the article 905 is positioned at a distance from 1 mm to 20 mm or from 2 to 10 mm away from the printing head of the DTG printer 16C. In some embodiments, a cover 955 having a print-access window for the printable area may be used to secure the T-shirt 905 in place, as shown in FIG. 18. The DTG printer 16C digitally prints a graphic on the T-shirt 905 according to the personalized order. After printing, the T-shirt 905 is transferred to a dryer 16D, and the T-shirt 905 is heated to cure the ink. The T-shirt 905 is retrieved from the dryer 16D and delivered to the window of the kiosk for pickup by the user. In one embodiment, the printed T-shirt 905 is rolled with the hanger 910 and secured using a retainer such as ties, prior to delivery to the user.

Tenth Packaging Embodiment

Figure 19:
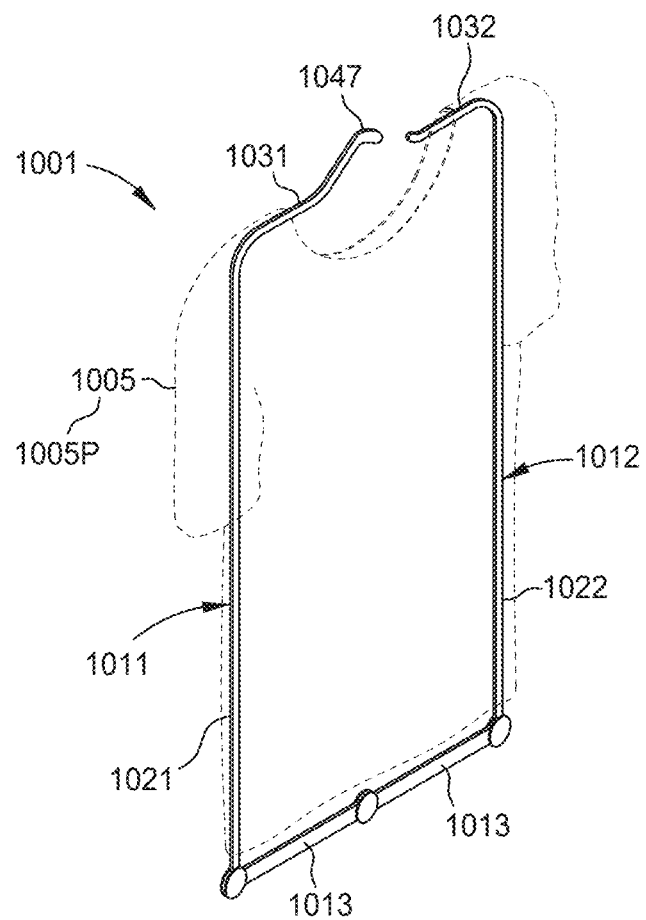
FIGS. 19-20 illustrate another embodiment of a packaging suitable for retaining an article for customization.
Figure 20:
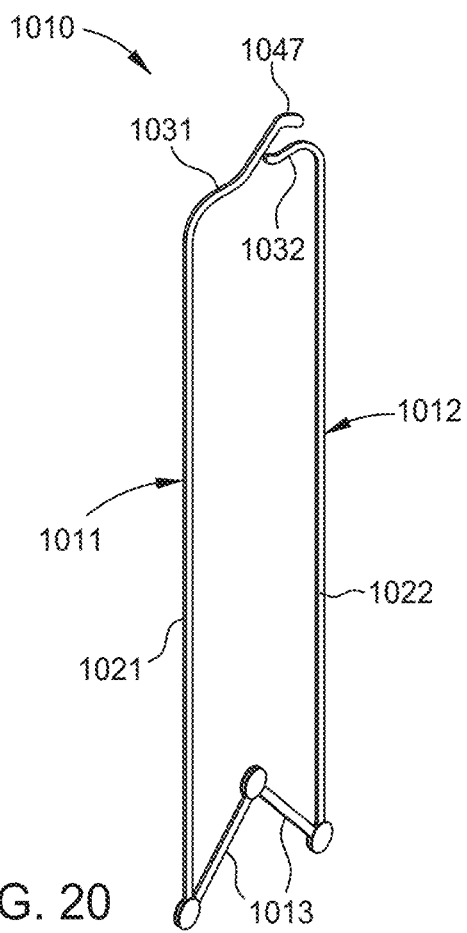

FIGS. 19-20 illustrate another embodiment of a packaging 1001 suitable for retaining an article for customization. In one embodiment, the packaging 1001 includes a hanger frame 1010. FIG. 19 illustrates the hanger frame 1010 in an expanded position and disposed inside an article, such as a T-shirt 1005. FIG. 20 illustrates the hanger frame 1010 in a retracted position.

In some embodiments, the frame 1010 comprises a body configured to support the article. As shown in FIG. 19, the body includes a left joint 1011 and a right joint 1012 pivotally coupled to a plurality of expansion joints 1013. The left and right joints 1011, 1012 include a body portion 1021, 1022 and a neck portion 1031, 1032. As shown, a bend couples the neck portions 1031, 1032 to the body portions 1021, 1022. The body portions 1021, 1022 extend along the length of the T-shirt 1005, and the neck portions 1031, 1032 extend along the shoulder portion of the T-shirt 1005. For example, the neck portion 1031 of the left joint 1011 is angled toward the right joint 1012, and the neck portion 1032 of the right joint 1012 is angled toward the left joint 1011. In this example, the ends of the neck portions 1031, 1032 of the left and right joints 1011, 1012 face each other and are separated by a gap. The end of the neck portion 1031 of the left joint 1011 or the right joint 1012 may optionally include a hook feature 1047. In some embodiments, one or more of the joints 1011, 1012, 1013 can be wires, rods, or other suitable joints. In one example, each of the left and right joints 1011, 1012 are made from a wire having a bend between the body portion 1021, 1022 and the neck portion 1031, 1032. In another example, the body portion 1021, 1022 and the neck portion 1031, 1032 can be two portions that are connected together.

The lower ends of the left and the right joints 1011, 1012 are connected to one end of the two expansion joints 1013. The other ends of the two expansion joints 1013 are pivotally connected to each other, thereby linking the left and right joints 1011, 1012. During expansion, the expansion joints 1013 pushes the left and right joints 1011, 1012 away from each other. As shown in FIG. 19, the left and right joints 1011, 1012 expand along a width of the T-shirt 1005. Expansion of the left and right joints 1011, 1012 may expand the T-shirt 1005 to a taut position for printing. The printable area of the T-shirt 1005 is located between the left and right joints 1011, 1012 in the expanded position. To retract the frame 1010, the expansion joints 1013 are pivoted inwardly to move the left and right joints 1011, 1012 closer to each other, as shown in FIG. 20. In some embodiments, a bias member such as a spring is used to bias the frame 1010 between the extended position and the retracted position. In the retracted position, the neck portions 1031, 1032 may overlap. In one example, the neck portion of the right joint 1012 may slide under the hook feature 1047 of the left joint 1011. The retracted position of the frame 1010 may facilitate insertion or removal of the frame 1010 from the T-shirt 1005. In alternative embodiments, the expansion joints 1013 extend or retract in a telescoping manner, such that during retraction, one expansion joint 1013 slides into a hollow portion of the other expansion joint 1013. In alternative embodiments, the expansion joints 1013 extend or retract by sliding past one another to collapse into a shorter overall length, thereby facilitating the dressing or undressing of a garment onto the frame 1010. In these arrangements, an optional lock mechanism (not shown) may be used to lock the expansion joints 1013 in the extended or retracted position, such as at the maximum length. In one embodiment, one end of one joint 1013 is abutted against an end of the other joint 10130. In alternative embodiments, the pivot coupling may be capable of being locked into one or more positions to lock one joint 1013 at desired fixed angle with respect to the other joint 1013. For example, the pivot coupling may lock at 30 degrees, 60 degrees, 90 degrees, 120 degrees, 150 degrees or 180 degrees. The various joints 1011, 1012, 1013 and the coupling pivot connecting the joints 1011, 1012, 1013 may be adjusted according to the article 1005 size and whether the frame 1010 is kept in a taut setting ready for printing, or in a collapsed or reduced size setting ready for dressing the article onto the frame 1010.

As shown in FIG. 19, the frame 1010 extends below the bottom of the T-shirt 1005. However, it is contemplated the bottom of the frame 1010 may be disposed inside the T-shirt 1005. For example, the length of the frame 1010 can be shortened in instances where the printable area is small. A smaller frame 1010 may allow more inventory to be stored in a confined space, such as a kiosk. In some embodiments, the frame 1010 may have the same length for all of the sizes, which may result in the bottom of the frame 1010 being below or inside the T-shirt 1005, depending on the size of the T-shirt 1005. Embodiments of the frame 1010 may be made from one or more of: cardboard, paper, plastic, rubbers, metal, glass, wood, and composites. In one example, the frame 101 is at least partially made of metal wires. In another example, the frame 1010 is at least partially made of plastic, such as a thermoplastic polymer.

In some embodiments, the packaging 1001 may include identification ("ID") tags that help identify the article in the packaging 1001, communicate with control system 90, provide for "Internet of Things" operation, and remote operation by allowing each packaged article to be tracked and inventoried within the kiosk 10. The ID tags are configured to communicate with the control system 90 to facilitate operations of the transfer system 18, the article retrieval system 14, and the personalization system 16. For example, the ID tag allows multiple packaged articles to be tracked within the personalization system 16 as the packaged articles move from component to component. Exemplary ID tags include radio frequency ID tags ("RFID") and near-field communication ("NFC") tags. The ID tag may be disposed on any suitable portion of the packaging 1001, such as the left and right joints 1011, 1012 and the plurality of expansion joints 1013.

Embodiments of the packaging 1001 use minimal amounts of packaging material. In some embodiments, the packaging 1001 is reloadable and reusable. In this respect, the packaging is more friendly to the environment by conserving resources and reducing waste. Also, the minimal packaging occupies less storage space, thereby allowing more inventory to be stored in a confined space, such as a kiosk. The packaging may increase efficiency and reduce costs by reducing packaging efforts and packaging costs. The minimal packaging may reduce the manipulation of the packaging as the article moves through the kiosk. For example, the smaller packaging can be more easily handled by the transfer system 18 or accommodated within the personalization system 16, such as the DTG printer 16C and the pretreatment system 16B.

In one embodiment, the frame 1010 may be hanging from a rod in a storage area 30 of a kiosk. The frame 1010 is at least partially disposed inside the T-shirt 1005 and supporting the T-shirt 1005. In some embodiments, the frame 1010 is stacked on or next to another frame 1010 in the storage area 30. The frame 1010 may be pre-assembled with an article such as a T-shirt 1005. In response to receiving a personalization order, a control system 90 may cause a transfer system 18 to retrieve the T-shirt 1005 to be personalized. In one example, the T-shirt 1005 is selected from the storage area 30 containing different T-shirts of different sizes, styles, color, and combinations thereof.

The transfer system 18 may retrieve the T-shirt 1005 by removing the frame 1010 from the hanging rod. In one embodiment, the transfer system 18 includes one or more robotic arms having grippers for gripping the T-shirt 1005 and the frame 1010. In one example, the robotic arm includes joints that allow a plurality of degrees of freedom, and one or more grippers for grasping the T-shirt 1005 and the frame 1010. The robotic arm may grab the T-shirt 1005 and either place it on the platen of a DTG component, or pull it onto the platen. In embodiments, the robotic arm grippers may be soft grippers that may include an outer skin made of rubber or similar material. In some embodiments, the grippers have fingers or claws that open and close via electromechanical motors, or pneumatic motors.

Two grippers grip the shoulder of the T-shirt 1005 and remove the T-shirt 1005 and the frame 1010 away from the hanging rod. In another embodiment, the robotic arm uses a single gripper to grip the T-shirt 1005. Because the frame 1010 is expanded, the frame 1010 maintains the T-shirt 1005 in a taut configuration during the DTG process. In some embodiments, the hanger 1010 or the grippers also function as the registration feature to ensure proper positioning of the T-shirt 1005 during DTG process. In this respect, the grippers may grip a predetermined location on the hanger 1010 and the T-shirt 1005 and maintain that gripped location throughout the DTG process. In some embodiments, one or more grippers are used to grip other portions of the T-shirt 1005. For example, an additional gripper may grip a lower portion of the T-shirt 1005. In this example, the grippers cooperate to maintain control of the T-shirt 1005 during transfer, pretreatment, printing, or other DTG operations. In some embodiments, the transfer system 18 may use a combination of one or more of: robotic arms, actuators, grippers, platens, conveyor belts (horizontal, vertical, curved and/or angled), railed vehicles, trackless vehicles, and similar conveying means to transfer the article throughout the DTG process. In some embodiments, the frame 1010 may be used in a large personalization factory where conveyance of the packaging from a location, component, or station to another location, component, or station may be performed by one or more of rails, slides, robotic arms, chains, conveyors, and other similar means.

The T-shirt 1005 may be transferred by the transfer system 18 through each DTG system component. In some embodiments, the T-shirt 1005 is placed on a track or other suitable conveying device. In one example, the T-shirt 1005 is transferred initially to the preparation system 16A, wherein the T-shirt 1005 may be heat pressed. The T-shirt 1005 may then be transferred to the pretreatment system 16B. The pretreatment system 16B may apply a pretreatment solution to an entire side of T-shirt 1005 to be DTG printed on or may only apply pretreatment solution to a portion of the T-shirt 1005 to be printed on according to the personalization order. In some embodiments, the grippers position the T-shirt 1005 in proper alignment with the pretreatment system 16B. Pretreating the T-shirt 905 may facilitate the bonding of the ink from the DTG printer 16C to the T-shirt 1005. Thereafter, the T-shirt 1005 may be transferred to the preparation system 16A or the dryer 16D. In some embodiments, the pretreatment system 16B has its own dryer, and the T-shirt 1005 is transferred to the pretreatment dryer. In a WET-ON-WET process, the T-shirt 1005 may bypass the dryer 16D and transferred to the DTG printer 16C.

After pretreatment and drying, the printing area of the T-shirt 1005 may be flat and wrinkle free and ready for print. The robotic arms of the transfer system 18 removes the T-shirt 1005 from the dryer 16D and transfers the T-shirt 1005 to the DTG printer 16C. In some embodiments, the printing surface of the article 1005 is positioned at a distance from 1 mm to 20 mm or from 2 to 10 mm away from the printing head of the DTG printer 16C. The T-shirt 1005 may be placed on a platen of the DTG printer 16C. The DTG printer 16C digitally prints a graphic on the T-shirt 1005 according to the personalized order. After printing, the T-shirt 1005 is transferred to a dryer 16D, and the T-shirt 1005 is heated to cure the ink. The T-shirt 1005 is retrieved from the dryer 16D and delivered to the window of the kiosk for pickup by the user. In one embodiment, the printed T-shirt 1005 is removed from the frame 1010 prior to delivery to the user.

Although a box is disclosed in several embodiments, it is contemplated that any of the packaging 101, 201, 301, 401, 501, 701, 801 disclosed herein may have any suitable shape, such as a triangle, pentagon, hexagon, octagon, and other suitable polygonal shapes; arcuate shapes such as circle and ellipse; and other suitable symmetrical or asymmetrical shapes.

It is contemplated features disclosed in one packaging embodiment 101, 201, 301, 401, 501, 601, 701, 801, 901, 1001 may be suitably used with any other packaging embodiments 101, 201, 301, 401, 501, 601, 701, 801, 901, 1001 disclosed herein. For example, the retainers 920 may be used to secure the article 801 to the hanger 810, and use of the container 850 may be optional. In another example, the stepped stiffener 310 of FIG. 7B may be used with the packaging 101 of FIG. 2A. In yet another embodiment, the packaging embodiments 101, 201, 301, 401, 501, 601, 701, 801, 901, 1001 may be suitably used with any personalization process or system disclosed herein. For example, the pretreatment step or printing step disclosed in one packaging embodiment 101, 201, 301, 401, 501, 601, 701, 801, 901, 1001 may be used with another packaging embodiment 101, 201, 301, 401, 501, 601, 701, 801, 901, 1001. In one example, the WET_ON_WET process steps disclosed with personalizing packaging 101 and article 105 may be used with another packaging embodiment 201, 301, 401, 501, 601, 701, 801, 901, 1001 disclosed herein.

In alternative embodiments, the packaging embodiments 101, 201, 301, 401, 501, 601, 701, 801, 901, 1001 disclosed herein may be used in a large personalization factory where conveyance of the packaging from a location, component, or station to another location, component, or station may be performed by one or more of rails, slides, robotic arms, chains, conveyors, and other similar means.

While the above examples pertained to kiosk for personalization of an article including embroidering and DTG, the same systems and methods may be used to personalize an article with other techniques, such as, but not limited to a combination of one or more of embroidery, dye sublimation, heat transfer printing processes, acid washing, and laser etching.

Garment Personalization Kiosk with Orthogonal Robotic Retrieval System

Figure 21A:
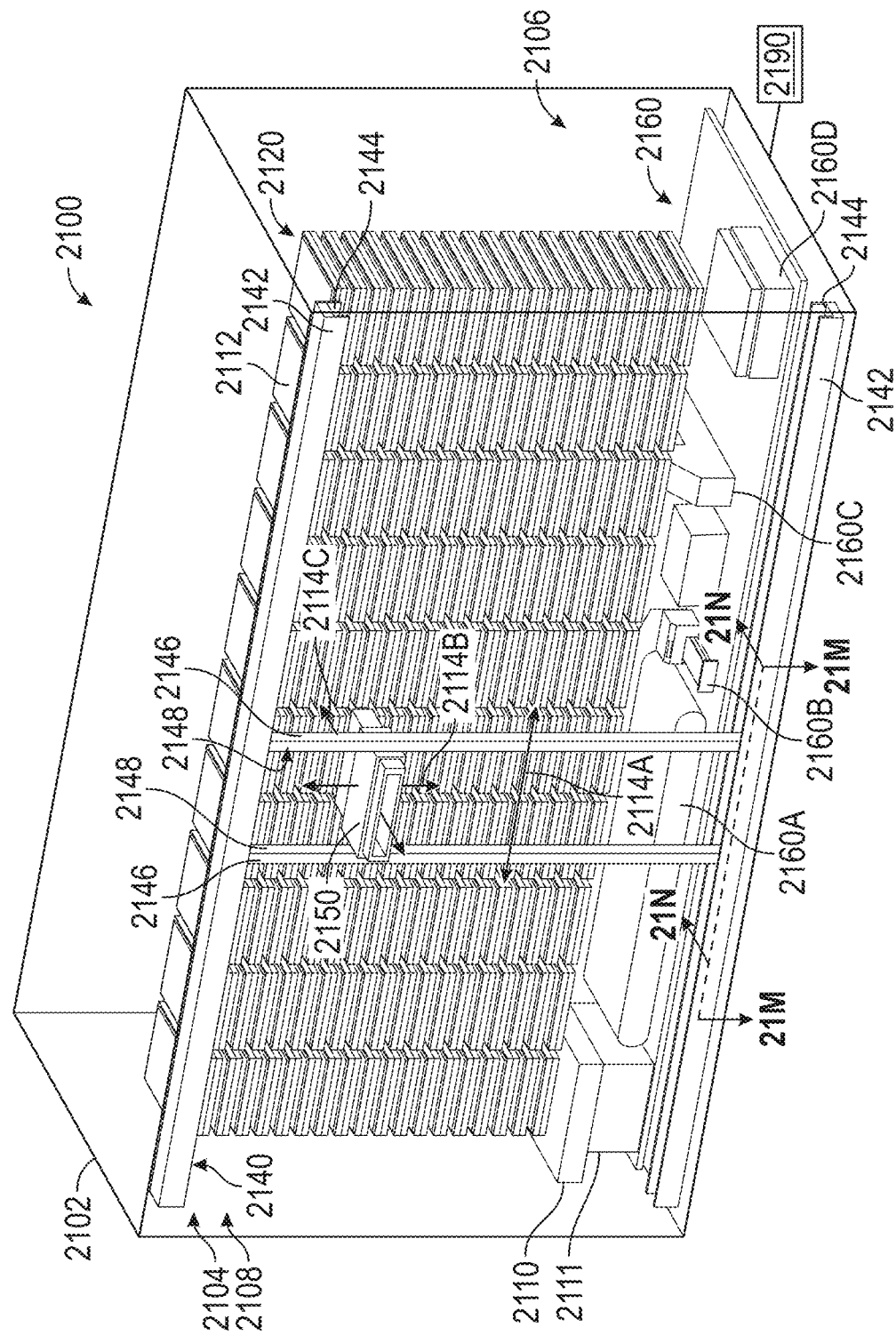
FIGS. 21A and 21B depict trimetric views of an on-demand personalization kiosk, according to some embodiments.
Figure 21B:
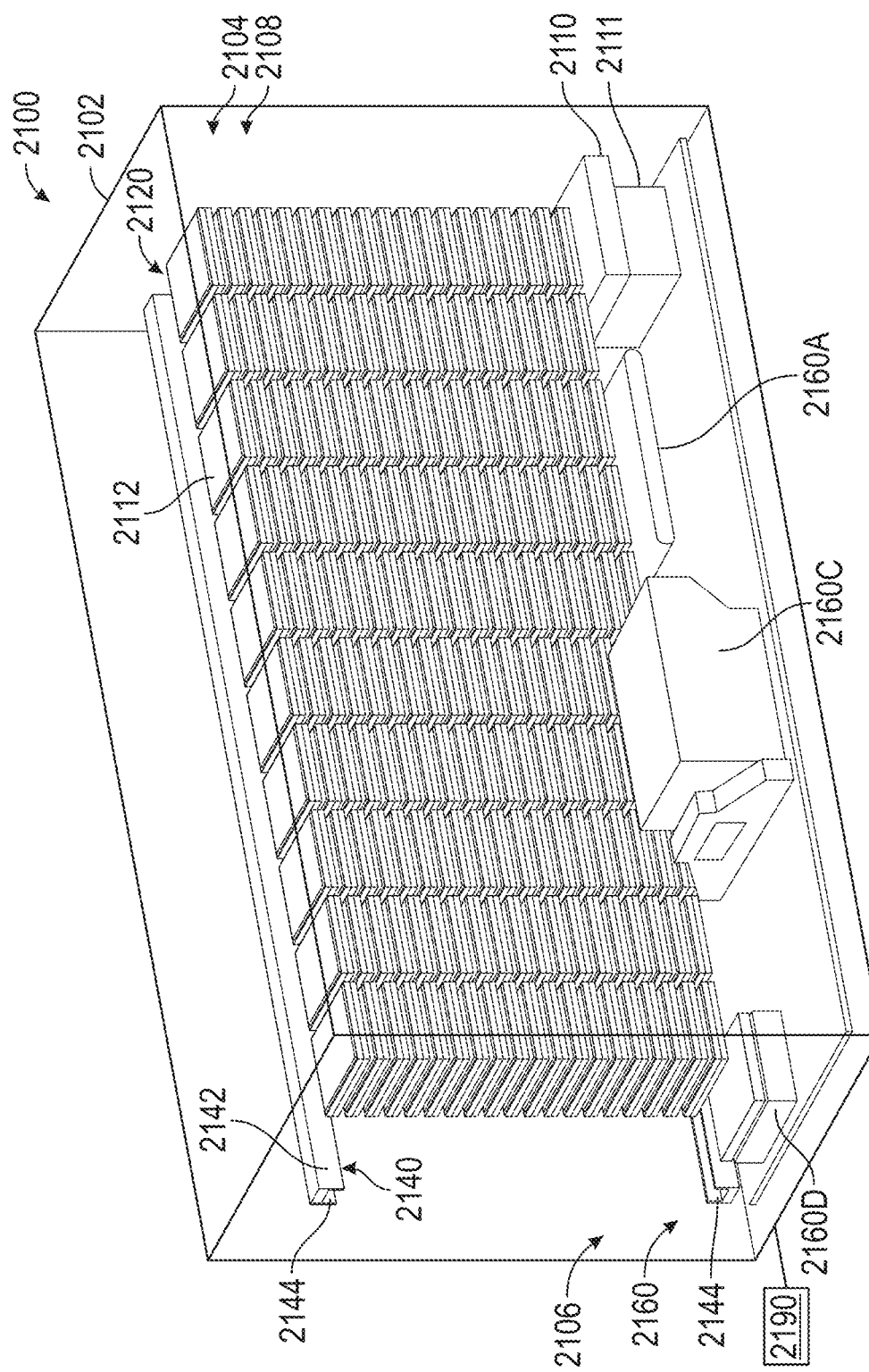

FIGS. 21A and 21B depict trimetric views of an on-demand personalization kiosk 2100, according to some embodiments. In particular, FIG. 21A depicts a top-front-right trimetric view of the on-demand personalization kiosk 2100 and FIG. 21B depicts a top-left-rear trimetric view of the on-demand personalization kiosk 2100.

The on-demand personalization kiosk 2100 (referred to as the kiosk 2100) includes a housing 2102. An article retrieval system 2104, an article personalization system 2106, and a transfer system 2108 are disposed within the housing 2102. The kiosk 2100 further includes a dispenser 2110 and a control system 2190.

The article retrieval system 2104 includes a shelving system 2120 and a motion system 2140. The shelving system 2120 houses a plurality of packaged articles 2112 to be personalized by the kiosk 2100, and in particular, by the article personalization system 2106. In the depicted embodiment, the packaged articles 2112 include the packaging 101 and article 105 discussed in relation to FIGS. 2-4, although the kiosk 2100 may be configured to use packaged articles having other packaging and articles discussed herein, such as the packaging 201 and the article 205 discussed in relation to FIGS. 5A and 5B, such as the packaging 301 and the article 305 discussed in relation to FIGS. 6 and 7, such as the packaging 401 and article 405 discussed in relation to FIGS. 8A and 8B, such as the packaging 501 and article 505 discussed in relation to FIGS. 9A-9C, such as the packaging 701 and article 705 discussed in relation to FIGS. 12A and 12B. The packaged articles 2112 are arranged in several columns of the shelving system 2120. In the embodiment depicted in FIGS. 21A and 21B, the columns of packaged articles 2112 are arranged in a line. In some embodiments, the columns may be arranged another formation such as an arc, or sides of a triangle, a rectangle, and the like.

The motion system 2140 is used to retrieve a packaged article 2112 of the packaged articles 2112 from the shelving system 2120. The motion system 2140 includes a first pair of rails 2142 having a first set of tracks 2144, a second pair of rails 2146 having a second set of tracks 2148, and a carrier 2150, which is used to grasp the packaged articles 2112. The first and second pair of rails 2142 and 2146 are channel beams and the first and second set of tracks 2144 and 2148 are channels of the channel beams.

The motion system 2140 moves the carrier 2150 in a first direction 2114A, a second direction 2114B, and a third direction 2114C. In the embodiment depicted in FIG. 21A, the second pair of rails 2146 moves along the first set of tracks 2144 in the first direction 2114A and the carrier 2150 moves along the second set of tracks 2148 in the second direction 2114B. The first pair of rails 2142 are coupled to the housing 2102, such as to a ceiling, floor, or shelf of the housing 2102. The second pair of rails 2146 are orthogonal to the first pair of rails 2142 and the second direction 2114B is orthogonal to the first direction 2114A. Thus, the first and second tracks 2144 and 2148 allow the carrier 2150 to move in two independent directions to position the carrier 2150 at a location to grasp a desired packaged article 2112 in the shelving system 2120. The independent movement beneficially allows the carrier 2150 to access locations at different heights (as shown on the page) in each column of packaged articles 2112. The motion system 2140 includes a first actuation system (e.g., a first actuation system 2156A in FIGS. 21M and 21N) to move the second pair of rails 2146 on the first set of tracks 2144 and a second actuation system (e.g., a second actuation system 2152A in FIG. 21K) to move the carrier 2150 on the second set of tracks 2148.

Once at the location to grasp the desired packaged article 2112, the carrier 2150 moves toward and away from the shelving system 2120 in a third direction 2114C to grasp the packaged article 2112, such as discussed in relation to FIGS. 21D-21G. The third direction 2114C is orthogonal to both the first and second directions 2112A and 2112B. The motion system 2140 further includes a third actuation system (e.g, a third actuation system 2132 in FIG. 21F) to move the carrier 2150 towards and away from the shelving system 2120.

The article personalization system 2106 includes a plurality of system components 2160 used to personalize the packaged articles 2112. The system components 2160 may vary depending on how the packaged article 2112 is to be personalized. The system components 2160 include an article preparation system 2160A, a pretreatment system 2160B, a direct-to-garment (DTG) printer 2160C, and a curing system 2160D. The system components 2160 depicted in FIG. 21A are for illustrative purposes and the actual system components 2160 may have any shape. In some embodiments, the DTG printer 2160C does not include an outer shell or casing. The lack of casing or outer shell helps accommodate repairs, maintenance, restocking, automated loading and unloading, or manual loading and unloading by an operator or a user, for example, in a semi-manual embodiment of the kiosk 2100.

The article preparation system 2160A prepares the packaged articles 2112 for processing, such as DTG printing. In the embodiment depicted in FIGS. 21A and 21B, the article preparation system 2160A is an ironing system or a heat press. The article preparation system 2160A prepares a to-be printed surface of the packaged articles 2112 by removing wrinkles from the packaged articles 2112, which may beneficially provide an even surface for printing and reduce defects in the packaged articles 2112.

The pretreatment system 2160B prepares the packaged articles 2112 for printing by applying a pretreatment solution. The pretreatment solution provides a base layer on which the DTG printer 2160C may print. The pretreatment system 2160B may apply the pretreatment solution to an entire side of the packaged article 2112 to be customized or only to a portion to be printed on according to the personalization order. For example, if a personalization order indicated the printing area to be a 4"×4" area on the left front breast of a T-shirt, the pretreatment solution is only applied to that area, instead of a larger portion of the shirt, for example the entire front portion, or an area spanning the entire width of the shirt. After the pretreatment solution is applied, the article preparation system 2160A may be used to at least partially cure the pretreatment solution. In some embodiments, the ironing system or heat press may hover over the packaged article 2112 until the pretreatment solution is cured to the desired amount.

The DTG printer 2160C is used to print an image or design on the packaged articles 2112. The image may be colored, black and white, or greyscale. For example, the DTG printer 2160C may print a graphic selected by a user as discussed in relation to FIGS. 29-75. If a pretreatment solution was applied to the packaged articles 2112, then the DTG printer 2160C prints over at least a portion of the pretreatment solution. The image or design printed on the packaged article 2112 may be wet after printing and require additional processing.

The curing system 2160D cures or dries the printed image or design on the packaged articles 2112. In the embodiment depicted in FIGS. 21A and 21B, the curing system 2160D dries the packaged articles 2112 by applying a pressure and temperature using a heat plate. Once the image or design is cured, the packaged article 2112 may be presented to the user, such as through the dispenser 2110. If the user approves, the dispenser 2110 dispenses the personalized packaged articles 2112. If the user does not approve, the dispenser 2110 moves the rejected packaged article 2112 to a storage system 2111 to be later evaluated by an operator.

The transfer system 2108 transfers the packaged articles 2112 to/from/between the system components 2160 for processing. The transfer system 2108 also transfers the packaged article 2112 from the system components 2160 to the dispenser 2110. In the embodiment depicted in FIGS. 21A and 21B, the transfer system is the motion system 2140. Once the carrier 2150 retrieves the packaged article 2112 from the shelving system 2120, the carrier 2150 moves along the first and second set of tracks 2144 and 2148 to a location where the carrier 2150 can access the system components 2160. For example, the carrier 2150 may move to a location below the shelving system 2120 (as shown on the page) and extend underneath the shelving system 2120 to transfer the packaged article 2112 to the article preparation system 2160A.

The control system 2190 controls the kiosk 2100. In particular, the control system 2190 controls the motion and transfer systems 2140 and 2108. For example, in response to receiving user input of a personalization order, the control system 2190 may determine instructions for the motion system 2140 to retrieve the packaged articles 2112 from the shelving system 2120, and for the transfer system 2108 to transfer the packaged articles 2112 to and from the system components 2160.

The control system 2190 may be connected to one or more, including all, of the system components 2160 of the article personalization system 2106 in order to automate processes of the kiosk 2100. For example, the control system 2190 may cause the transfer system 2108 to transfer the packaged article 2112 from the motion system 2140 to the article preparation system 2160A, may cause the article preparation system 2160A to remove wrinkles from the packaged article 2112, may cause the transfer system 2108 to transfer the packaged article 2112 from the article preparation system 2160A to the pretreatment system 2160B, may cause the pretreatment system 2160B to apply the pretreatment solution to the packaged article 2112, may cause the transfer system 2108 to transfer the packaged article 2112 from the pretreatment system 2160B to the DTG printer 2160C, may cause the DTG printer 2160C to print a personalization on the packaged article 2112, may cause the transfer system 2108 to transfer the packaged article 2112 from the DTG printer 2160C to a curing system 2160D, may cause the curing system 2160D to dry the packaged article 2112 with the DTG printed personalization, and may cause the transfer system 2108 to transfer the packaged article 2112 from the curing system 2160D to the dispenser 2110 for pick-up. In some embodiments, the control system may cause the transfer system 2108 to transfer the packaged article 2112 to a drying system 2160D after the pretreatment system 2160B and/or the DTG printer 2160C.

The control system 2190 may also be connected to the shelving system 2120 and the packaged articles 2112 in order to manage an inventory of the packaged articles 2112. For example, the control system 2190 may know what types of packaged articles 2112 are loaded into the shelving system 2120, such as packing type, garment type (e.g., hoodies or shirts), garment sizes, garment colors, garment material, garment fit type (e.g., loose fit, modern fit, fitted, or big and tall), and the like. Information on the types of packaged articles 2112 may be entered manually or automatically detected by the control system 2190 using a sensor, indicator, or ID tag in or on the packaging (e.g., a bar code, QR code, near field communication (NFC) tag, radio frequency ID (RFID) tag, and the like). Once an order is received, the control system 2190 directs the motion system 2140 to move the carrier 2150 to a packaged article 2112 to personalize to fulfill the user's order. The information on the types of packaged articles 2112 available (e.g., information on characteristics of the packaged articles 2112) may also be used to modify a display or user interface available to the user, such as presenting only available inventory or designs to the user as discussed in relation to FIGS. 29-75. In some embodiments, if a packaged article 2112 having characteristics (e.g., article type, shirt size, shirt type, material type, shirt fit, and the like) desired by a user (referred to as the product) is unavailable within an inventory of the shelving system 2120, the article personalization system 2106 may provide the user an option of placing an order for the product at the user interface and to receive a delivery of the product by a user-selected method at a later time (e.g., ground shipping, expedited shipping, or a delivery service). In some embodiments, the article personalization system 2106 may provide information to the user, though the user interface, of available inventory of the product at the next few closest kiosks for the user order and pickup at one of the kiosks.

The kiosk 2100 differs from non-kiosk personalization systems in that at least a portion of its personalization systems (e.g., the article retrieval system 2104, the article personalization system 2106, and the transfer system 2108) are disposed within the housing 2102 of the kiosk 2100. The housing 2102 provides an enclosure to help arrange the systems 2104, 2106, and 2108. For example, any floors, platforms, walls, and ceilings of the housing 2102 may be used to mount the systems 2104, 2106, and 2108. The housing 2102 also encourages safety in the personalization process by restricting users or other people and animals outside the housing 2102 from operations of the systems 2104, 2106, and 2108 inside the housing 2102. In some embodiments, the article retrieval system 2104, the article personalization system 2106, and the transfer system 2108 are all disposed inside the housing 2102. In some embodiments, the shelving system 2120 is located outside the housing 2102, which may reduce a footprint or size of the housing 2102. In such embodiments, the packaged articles 2112 may be loaded into the kiosk 2100 manually, semi-automatically, or automatically. Loading the packaged articles 2112 manually increases the user activity with the kiosk 2100 and may result in a more enjoyable experience for the user. One embodiment of a kiosk having the shelving system disposed outside the housing is a kiosk 2700 discussed in relation to the top-left-front views of FIGS. 27A and 27B.

The system components 2160 may be arranged in any physical orientation relative to each other and the motion and transfer systems 2140 and 2108 may transfer the packaged articles 2112 between the system components 2160 during a DTG process, including transferring an article to the same system component 2160 twice at different stages of the DTG process.

In some embodiments, the first pair of rails 2142 may include a shaft, a rail, a tube, a beam, a column, a pillar, and the like. The first set of tracks 2144 may be a groove in or an extension on the first pair of rails 2142. For example, the first set of tracks 2144 may be a rack gear, an I-beam or cutouts of an I-beam. In some embodiments, the second pair of rails 2146 may include a shaft, a rail, a beam, a tube, and the like and the second set of tracks 2148 may be a groove in or an extension on the second pair of rails 2146.

In some embodiments, the DTG printer 2160C may operate as a wet-on-wet DTG printing process, and therefore, after applying the pretreatment solution, the DTG printing operation may be initiated without first drying the packaged article 2112.

In some embodiments, the system components 2160 do not include the pretreat system 2160B. Instead, the packaged articles 2112 may be pretreated with a pretreatment solution, which may be the same or different than the pretreatment solution dispensed by the pretreatment system 2160B. The pretreating of the packaged articles 2112 occurs at an earlier step, such as prior to the packaged articles 2112 being loaded into the shelving system 2120. The pretreated packaged articles 2112 may have the pretreatment solution applied to an entire printable area of the packaged articles 2112 or only to a portion of the printed area, according to the personalization orders that are expected or anticipated. For example, the pretreated packaged articles 2112 may be pretreated to accommodate a finite number of printing images or designs, such as a 20 or less designs, such as 15 or less designs, such as 10 or less designs, such as 5 or less designs, such as 3 or less designs, such as 1 design. In one example, the pretreated packaged articles 2112 loaded in the shelving system 2120 are configured for 3 designs using pretreatment on the entire printable area, 5 designs using pretreatment on half of the printable area, and 2 designs using pretreatment on a quarter of the printable area, resulting in three types of pretreated packaged articles 2112 to support the 10 designs. The numbers and quantities discussed in the previous examples are for explanatory purposes only and are not meant to be limiting.

In some embodiments, the article preparation system 2160A is used to activate the pretreatment solution embedded in the packaged articles 2112 prior to DTG printing. In some embodiments, the article preparation system 2160A includes a heat radiation system or heat convection system to prepare a to-be printed surface of the packaged articles 2112. In some embodiments, the heat radiation system or heat convection system is used in place of the ironing system or heat press. In some embodiments, a roller or pinch rollers may be used with or instead of the ironing system, heat press, heat radiation system, or heat convection system to prepare the to-be printed surface of the packaged articles 2112 by removing wrinkles from the packaged articles 2112 and/or align or press the fibers of packaged articles 2112 to help improve the print quality. In some embodiments, the roller or pinch rollers are heated and neither the ironing system, heat press, heat radiation system, nor heat convection system are used.

In some embodiments, any of the system components 2160 may include the article preparation system 2160A or the curing system 2160D. For example, the pretreatment system 2160B may include the curing system 2160D. In some embodiments, the control system 2190 may cause the transfer system 2108 to transfer a packaged article 2112 to the curing system 2160D, after any process stage.

In some embodiments, the article preparation system 2160A and/or the curing system 2160D may use direct application of a radiant heat source, convection heat via forced air, and/or applying radiation from a light source (e.g. an LED light source) to dry the ink from the DTG printer 2160C and pretreatment solution from the pretreatment system 2160B.

Although specific embodiments of the motion and transfer systems 2140 and 2108 are discussed, the motion and transfer systems 2140 and 2108 may employ various modalities of conveyance to move packaged articles 2112 in and out of the shelving system 2120, to move packaged articles 2112 from one system component 2160 to another, or for receipt or delivery of the packaged articles 2112 in and out of the personalization system. In some embodiments, the transfer system 2108 may further include a combination of one or more of: robotic arms, actuators, grippers, platens, jigs, conveyor belts (horizontal, vertical, curved and/or angled), railed vehicles, trackless vehicles, and similar conveying means. In some embodiments, the transfer system 2108 may further be configured for manipulating system components, articles, and portions thereof within the kiosk 2100. For example, the transfer system 2108 may unpack the packaged articles 2112 from a box, hanger, tube, or fixture or may package the packaged articles 2112 into a box or tube, or onto a hanger or fixture.

In some embodiments, one or more, including all, of the system components 2160 and/or the entire kiosk 2100 may be fully sealed and/or vented to an outside of the kiosk 2100, at least during operations, in order to prevent spreading undesirable chemicals and vapors within the kiosk housing 2102 and/or to the immediate vicinity outside of the kiosk 2100. The sealing or venting differentiates the kiosk 2100 from non-kiosk personalization systems, which may require protective equipment or safety procedures to protect users or people nearby when in operation.

Figure 22A:
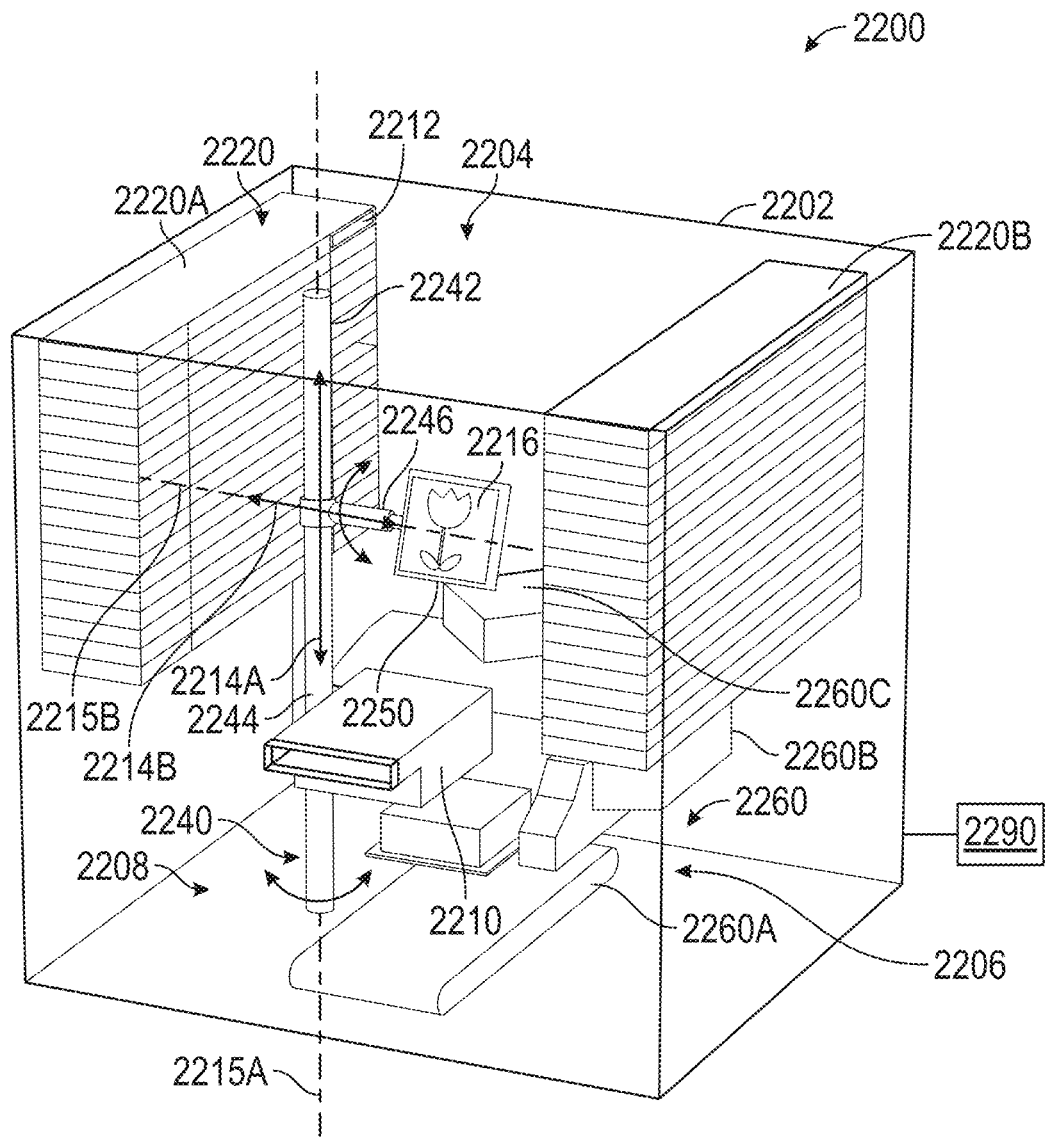
FIG. 22A depicts a trimetric view of an on-demand personalization kiosk, according to some embodiments.
Figure 22B:
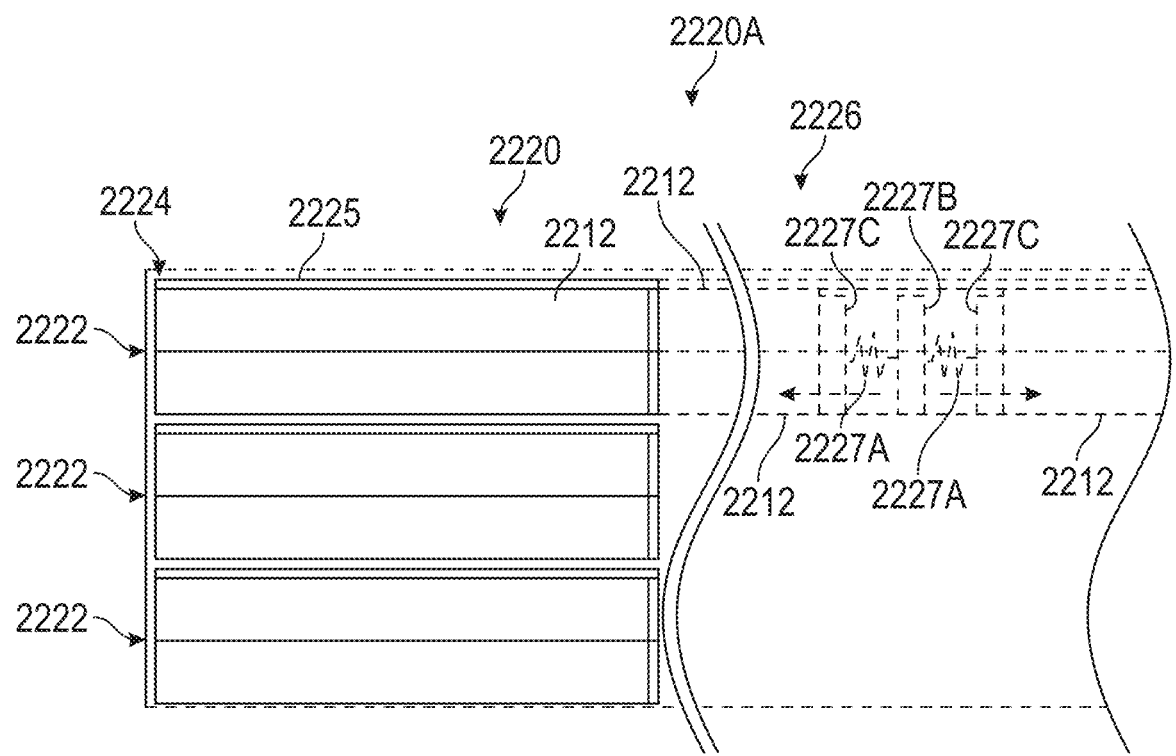
FIG. 22B depicts a partial front view, of a shelving unit, according to some embodiments.
Figure 22C:
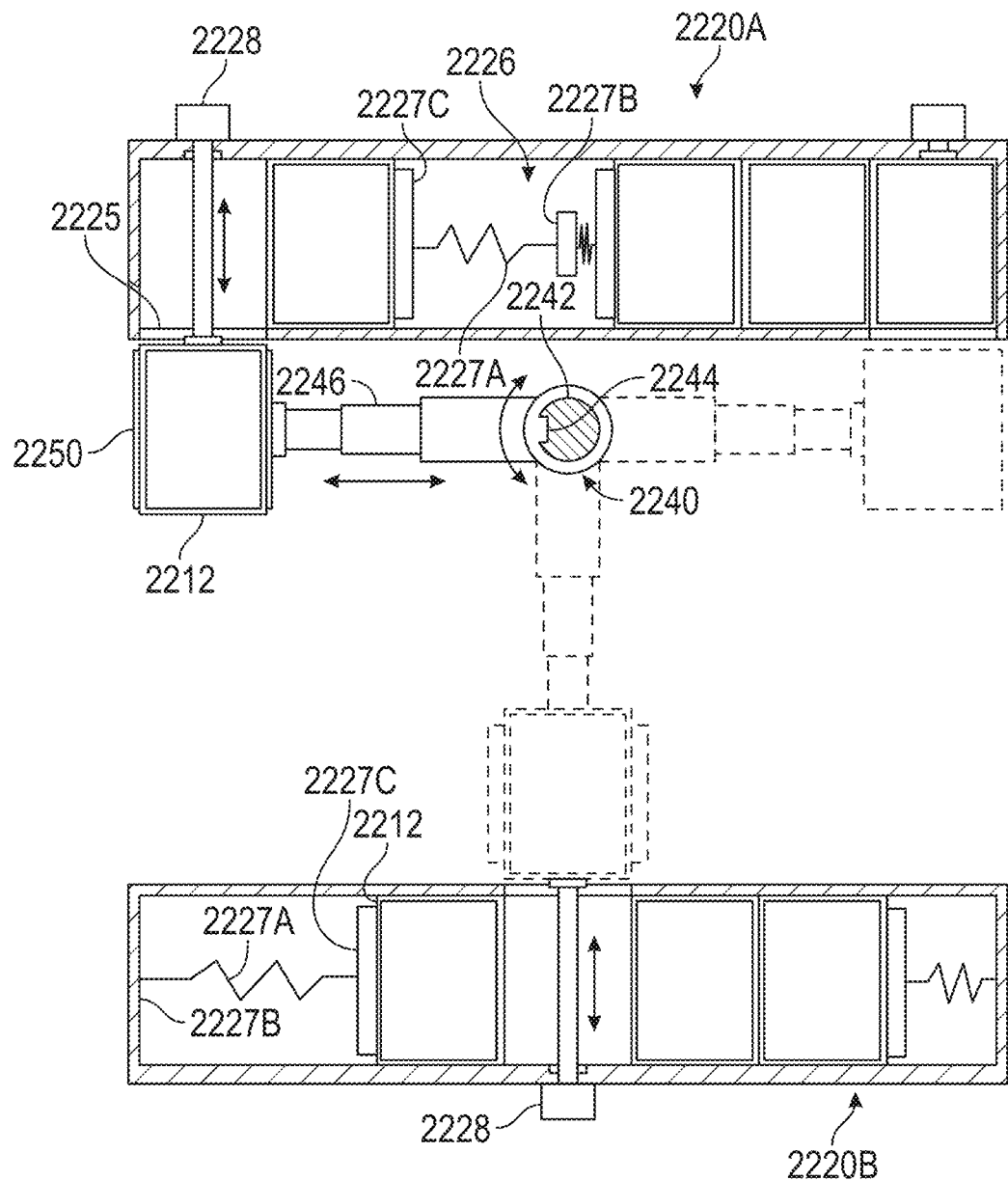
FIG. 22C depicts a cross-sectional top view of shelving units, according to some embodiments.
Figure 22F:
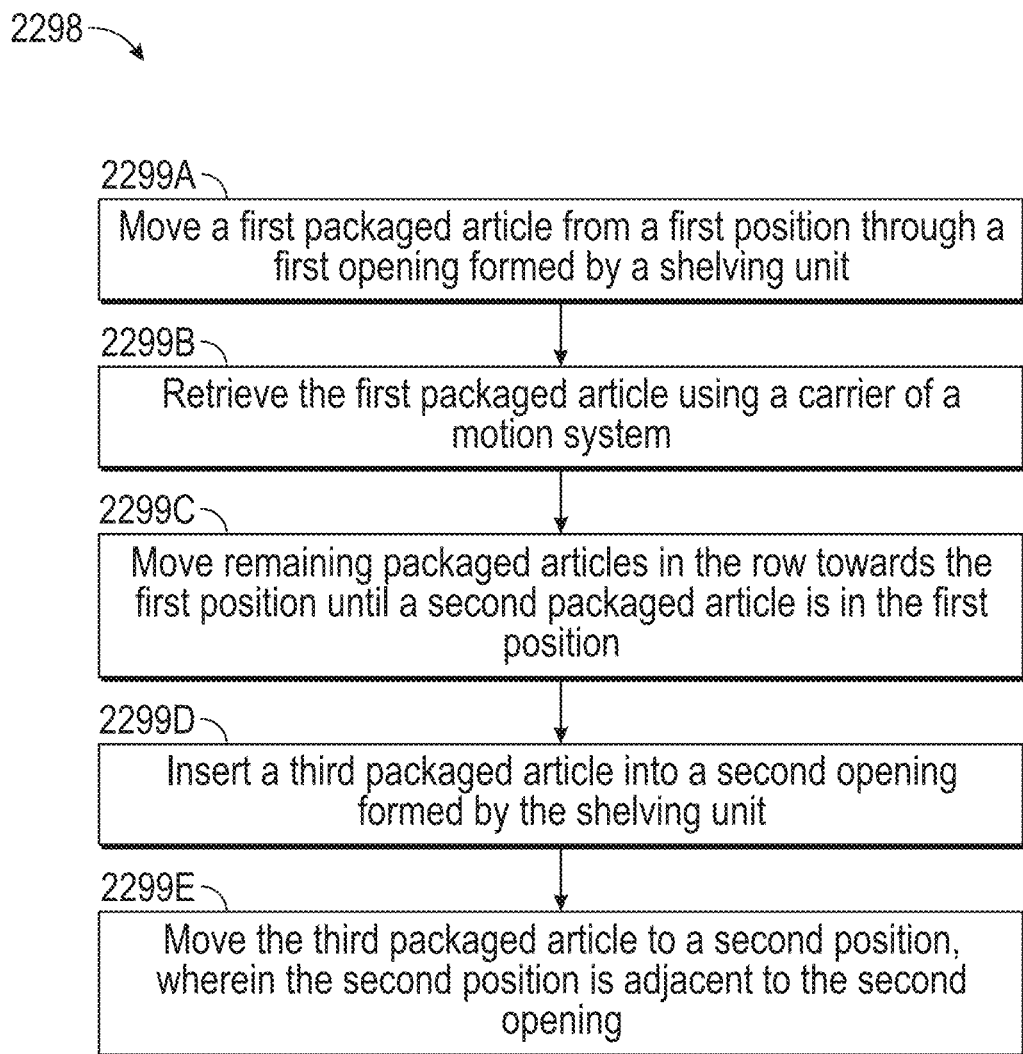
FIG. 22F depicts a flow diagram that illustrates a process for moving packaged articles through a shelving unit, according to some embodiments.
Figure 22G:
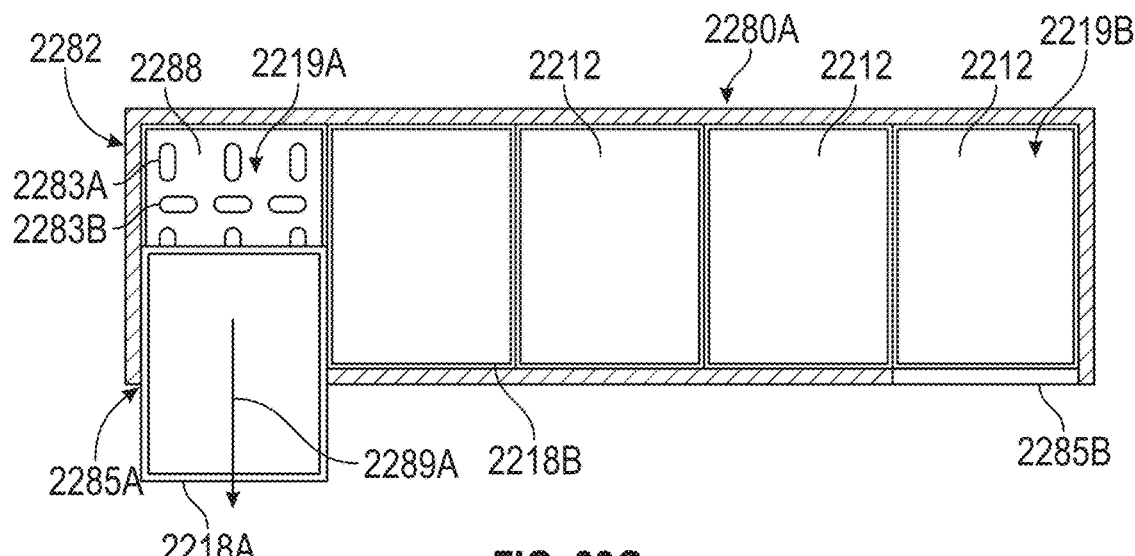
FIGS. 22G-22I schematically illustrate cross-sectional views of packaged articles at different operations of the process depicted in 22F, according to some embodiments.
Figure 22H:
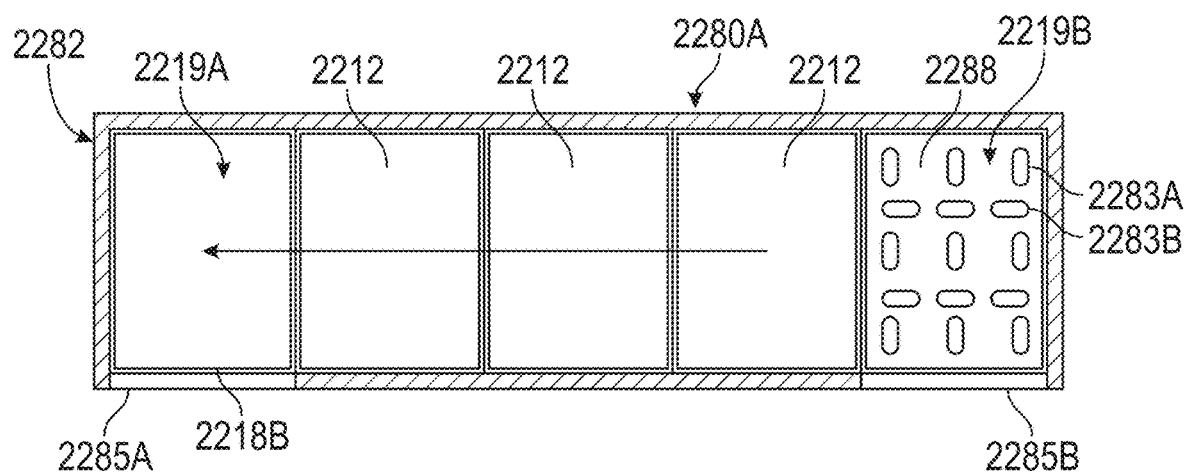
Figure 22I:
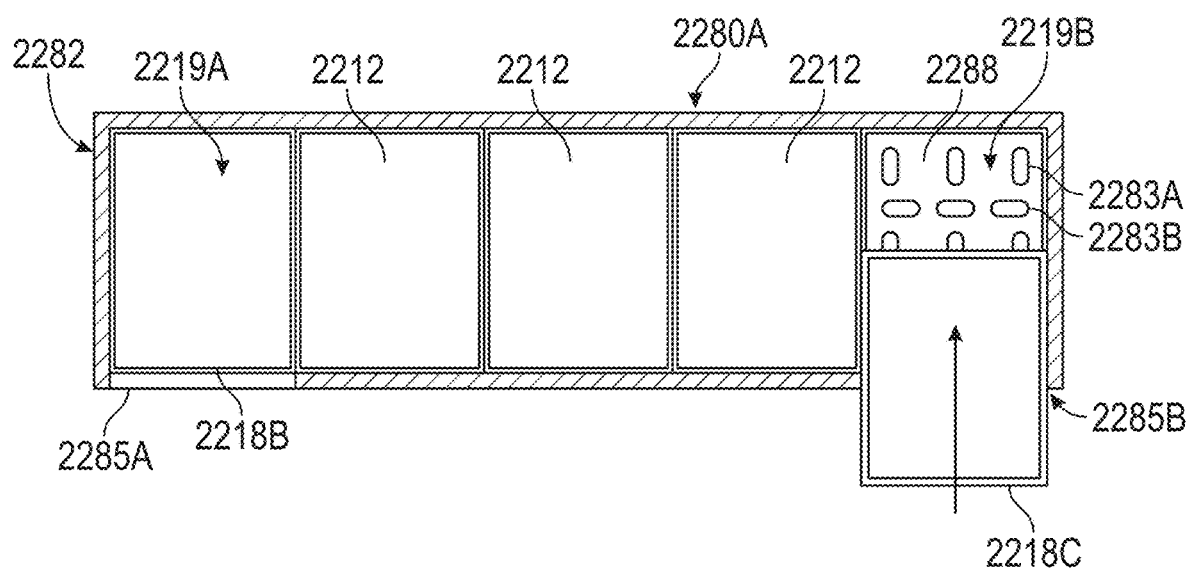
Figure 22K:
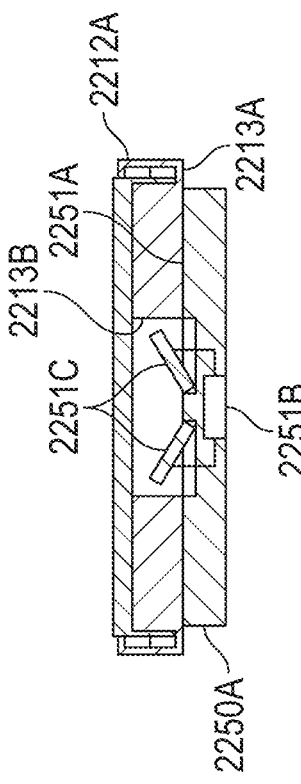
FIGS. 22J and 22K depict a trimetric and cross-sectional view of a carrier for grasping packaged articles, according to some embodiments.
Figure 22M:
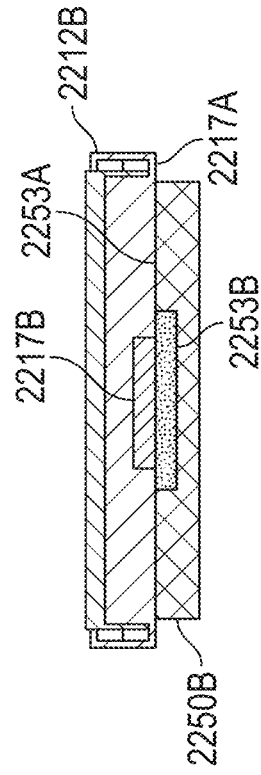
FIGS. 22L and 22M depict a trimetric and cross-sectional view of a carrier for grasping packaged articles, according to some embodiments.
Figure 22J:
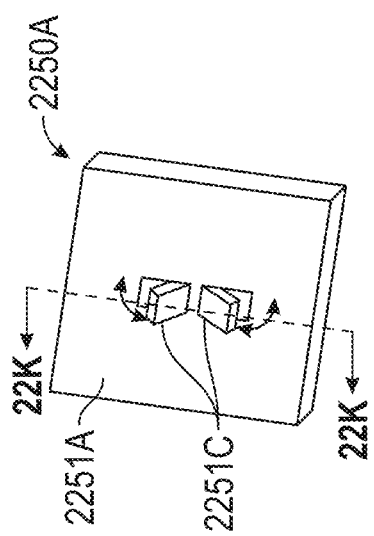
Figure 22L:
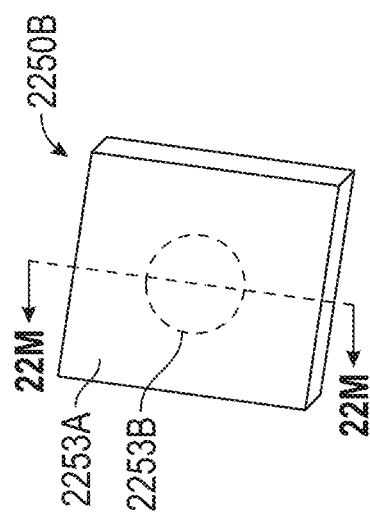
Figure 22P:
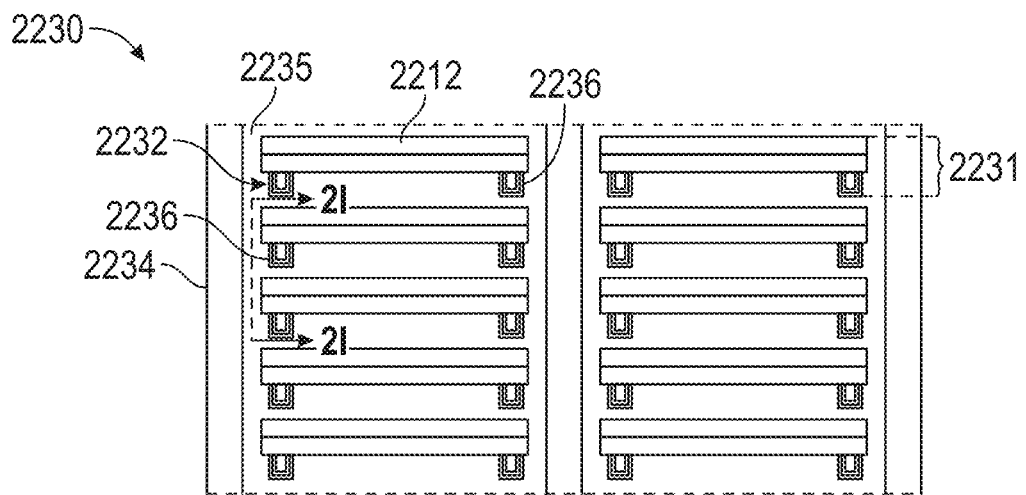
FIGS. 22P-22R depict different views of a shelving system, according to some embodiments.
Figure 22Q:
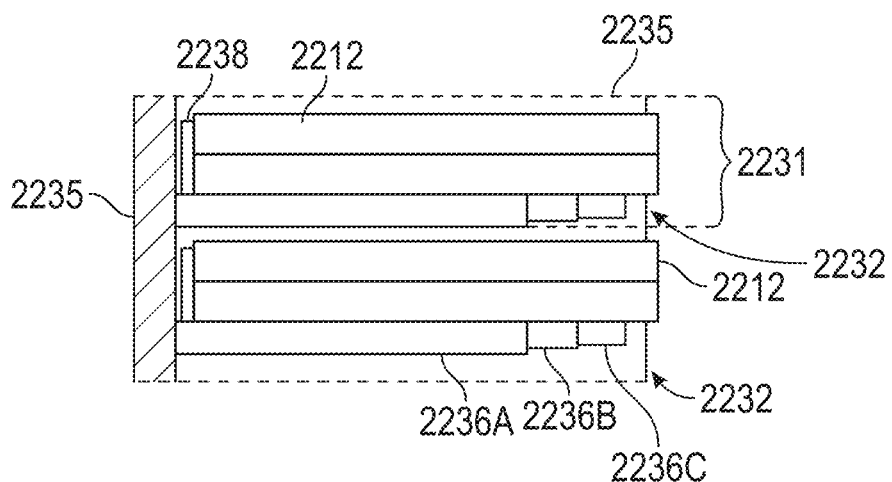
Figure 22R:
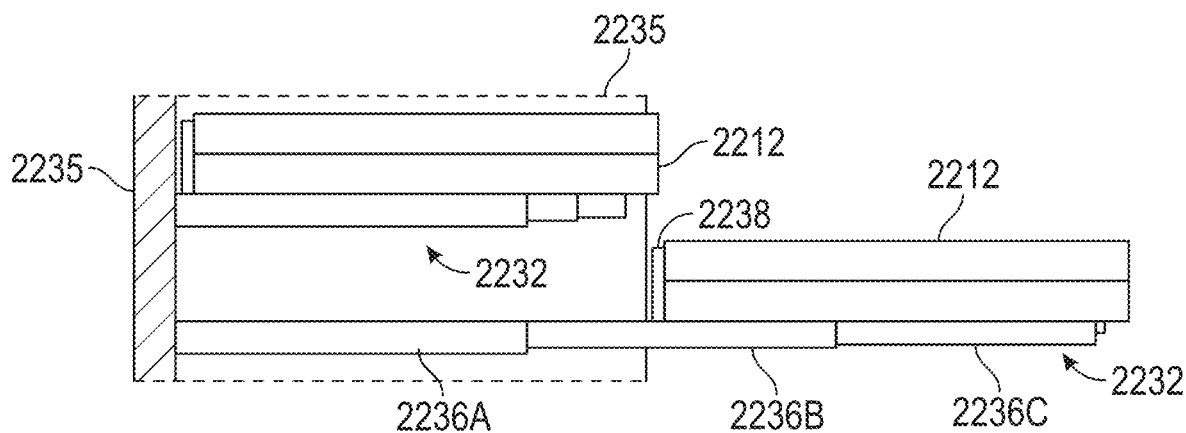

In some embodiments, the shelving system 2120 may move instead of, or in addition to, the carrier 2150, such as the shelving system 2230 discussed in relation to FIGS. 22P-22R.

Figure 21C:
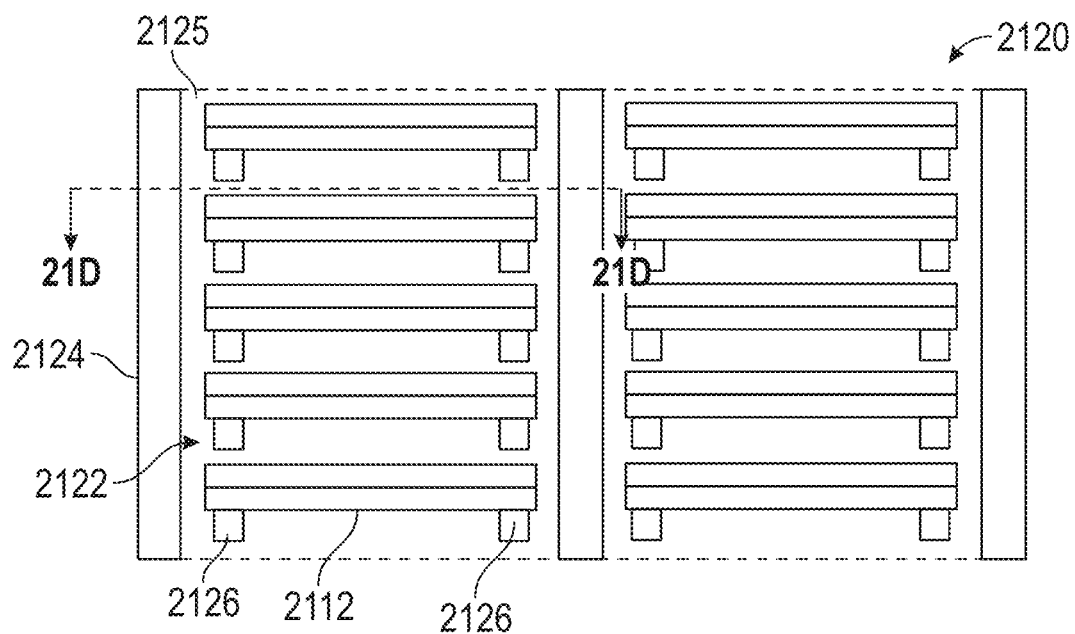
FIG. 21C depicts a front view of a shelving system, according to some embodiments.

FIG. 21C depicts a front view of the shelving system 2120, according to some embodiments. In particular, FIG. 21C shows a portion of the shelving system 2120.

The shelving system 2120 comprises a plurality of compartments 2122, each of which is formed by support members 2124, a backing plate 2125, and a pair of extruded members 2126. Thus, the shelving system 2120 includes columns of compartments 2122. The support members 2124 and backing plate 2125 provide a structure for the shelving system 2120. The extruded members 2126 are coupled to the backing plate 2125 and support/hold the packaged articles 2112. The extruded members 2126 may be welded to, fastened to using fasteners, adhered to, or unitarily formed as part of the backing plate 2125. The extruded members 2126 allow access for the carrier 2150 to grasp the packaged article 2112 from underneath (as shown on the page), such as discussed in relation to FIGS. 21G-21I. Although shown as square bar, the extruded members 2126 may include any shape, such as a rectangle, a circle, a cylinder, a hollow square or rectangle, or a triangle and the like.

In some embodiments, a shelf plate (not shown) is coupled to the extruded members 2126 and the packaged articles 2112 are disposed on the plate. In some embodiments, the shelf plate is used instead of the extruded members 2126 and the shelf plate is coupled to the backing plate 2125.

Figure 21D:
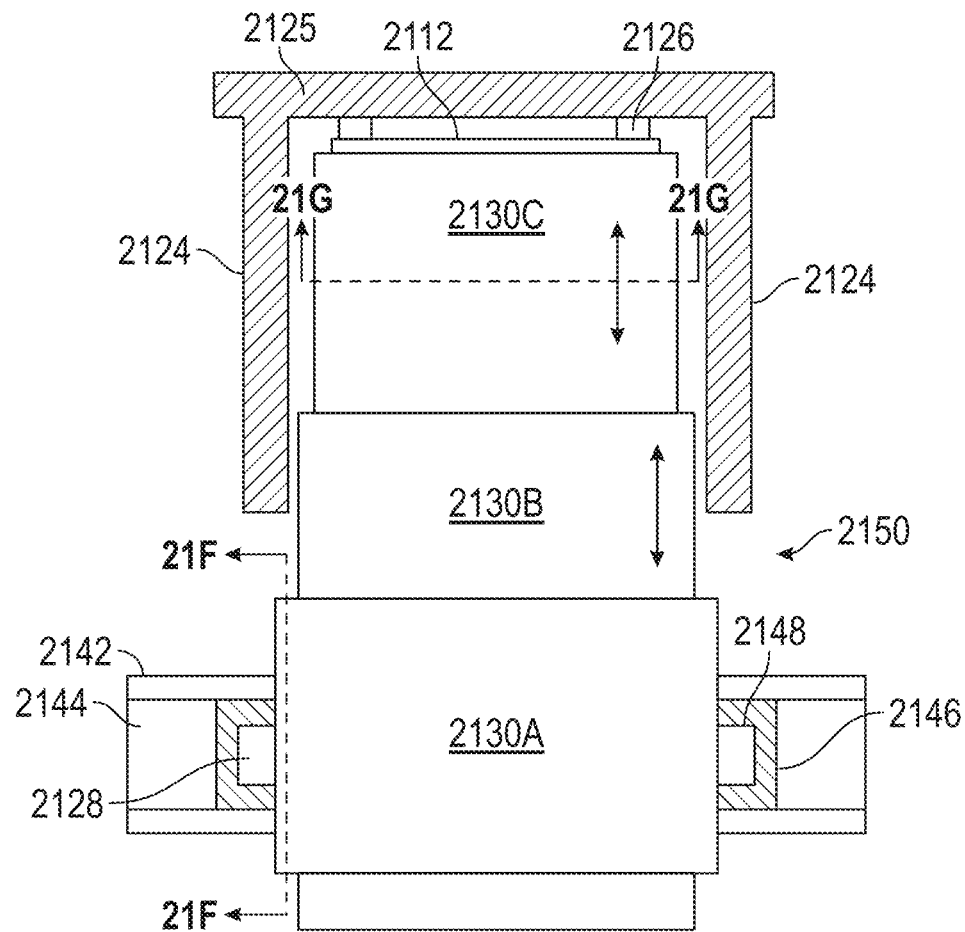
FIGS. 21D and 21E depict a cross-sectional view of a shelving system, according to some embodiments.
Figure 21E:
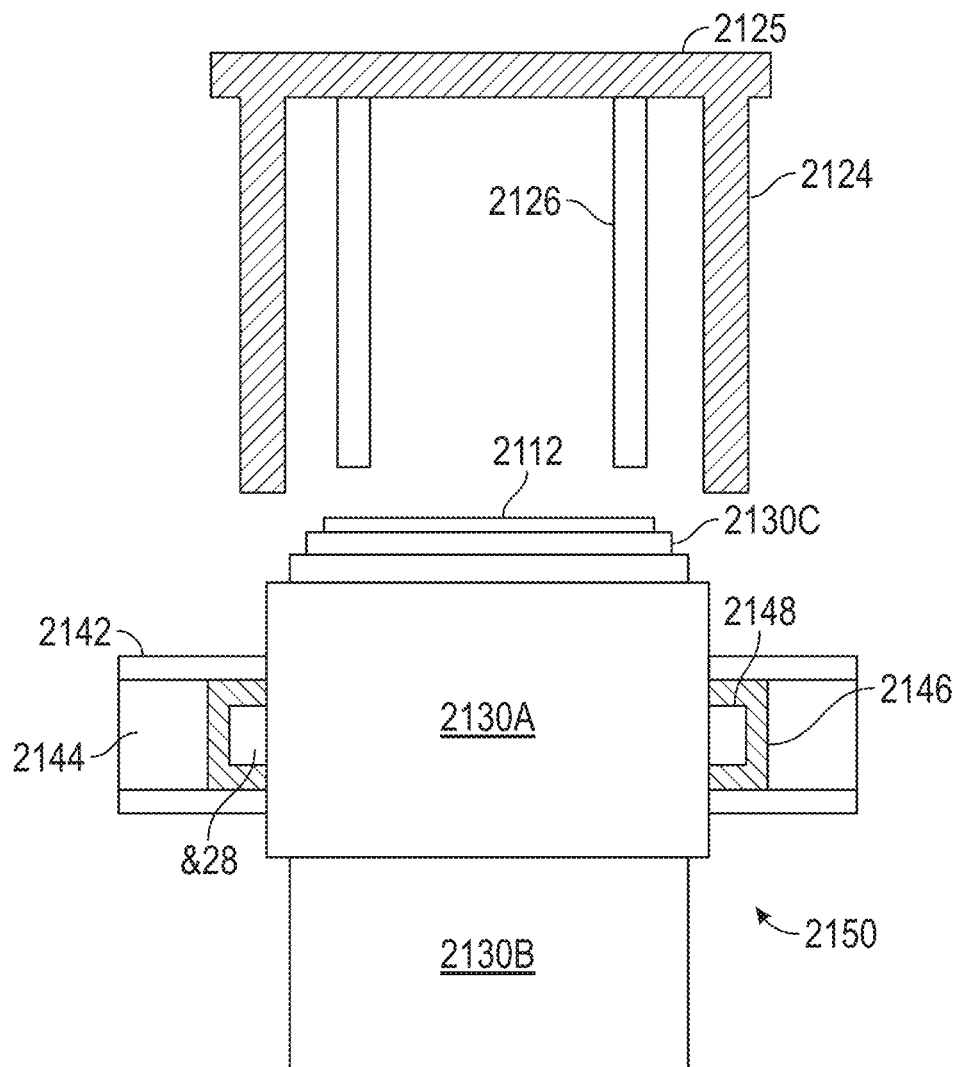

FIGS. 21D and 21E depict a cross-sectional view of the shelving system 2120, according to some embodiments. In particular, FIGS. 21D and 21E show the carrier 2150 extended and retracted, respectively, such as when grasping the packaged article 2112 from the extruded members 2126. In the embodiment depicted, the carrier 2150 comprises three extendable members, such as telescoping members 2130 (or segments), although more or less may be used. A first telescoping member 2130A remains stationary in relation to the second set of tracks 2148 via a carrier coupler 2128 while the carrier 2150 grasps the packaged article 2112. A second telescoping member 2130B moves in relation to the first telescoping member 2130A and is used to extend a third telescoping member 2130C. The third telescoping member 2130C moves in relation to the second telescoping member 2130B. The second and third telescoping members 2130B and 2130C move in the third direction, as discussed in relation to FIGS. 21A and 21B. Each telescoping member 2130 is at least partially nested or disposed inside another telescoping member 2130. For example, the third telescoping member 2130C is nested inside the second telescoping member 2130B, which is further nested inside the first telescoping members 2130A.

In some embodiments, the telescoping members 2130 may include nested rails, bars, tubes, beams, and the like. In some embodiments, the motion system 2140 may further include a combination of one or more of: robotic arms, actuators, grippers, platens, jigs, conveyor belts (horizontal, vertical, curved and/or angled), and similar conveying means to grasp the packaged articles 2112 from the telescoping members 2130, or from the extruded members 2126 discussed in relation to FIGS. 21C-21E.

Figure 21F:
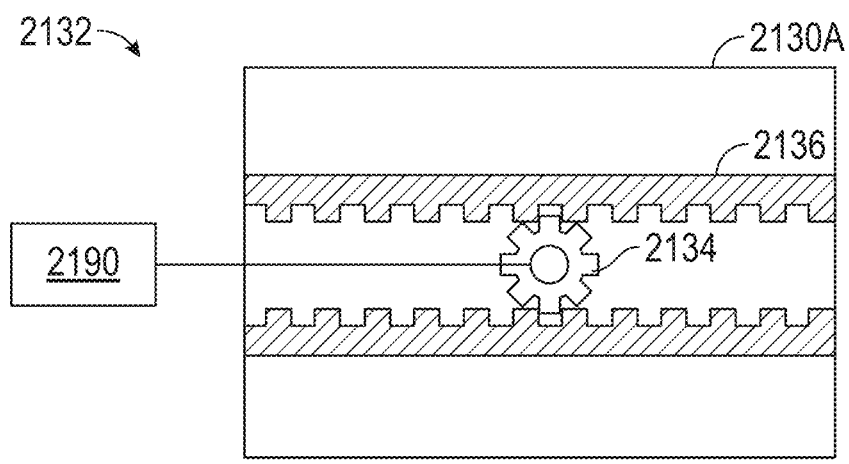
FIG. 21F depicts a cross-sectional view of the carrier from FIG. 21D, according to some embodiments.

FIG. 21F depicts a cross-sectional view of the carrier 2150 from FIG. 21D, according to some embodiments. In particular, FIG. 21F shows the third actuation system 2132, which moves the telescoping members 2130. The third actuation system 2132 is a telescoping conveyor system that includes a motorized pinion gear 2134 and a rack gear 2136. In the embodiment depicted in FIG. 21F, the rack gear 2136 includes an upper and lower rack gear above and the motorized pinion gear 2134 is disposed in between the upper and lower rack gears. The rack gear 2136 is attached to an exterior of the second telescoping member 2130B and the motorized pinion gear 2134 is coupled to an interior of the first telescoping member 2130A, such as through an actuator. The motorized pinion gear 2134 engages the rack gear 2136 to move the second telescoping member 2130B. Similarly, a motorized pinion gear 2134 is coupled to an interior of the second telescoping member 2130B and a rack gear 2136 is attached to an exterior of the third telescoping member 2130C. The control system 2190 controls the rotation of the motorized pinion gears 2134, and thus, the movement of the carrier 2150 in the third direction 2114C.

Figure 21G:
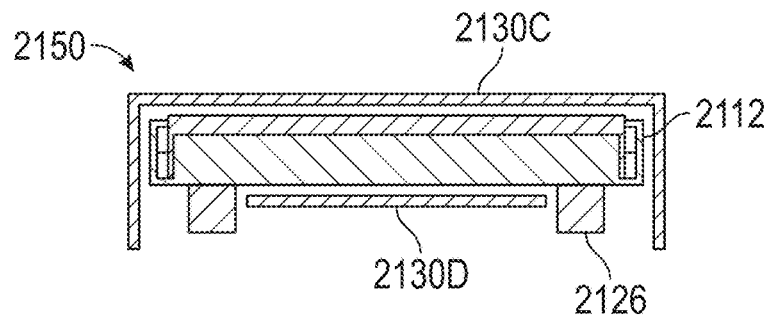
FIGS. 21G-21J depict cross-sectional views of carriers for grasping packaged articles, according to some embodiments.
Figure 21H:
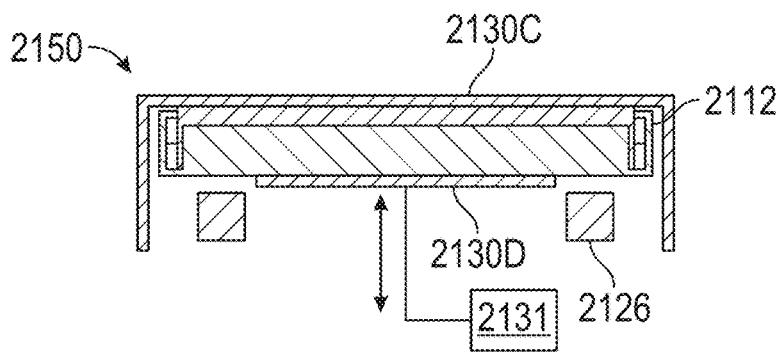

FIGS. 21G-21J depict cross-sectional views of carriers 2150 for grasping the packaged articles 2112, according to some embodiments. In particular, FIG. 21G shows the carrier 2150 partially surrounding the packaged article 2112. The third telescoping member 2130C includes a movable platform 2130D. The movable platform 2130D is positioned underneath the packaged article 2112 and adjacent to the pair of extruded members 2126, such as between the extruded members 2126, to grasp the packaged article 2112. As depicted in FIG. 21H, a grasping actuator 2131 moves the movable platform 2130D in the second direction 2114B to lift the packaged article 2112 off the pair of extruded rails and hold the packaged article 2112 in place between the third telescoping member 2130C and the movable platform 2130D. The grasping actuator 2131 may move the movable platform vertically (as shown on the page). In some embodiments, a hinge (not shown) connects the movable platform 2130D to the third telescoping member 2130C at an end near the second telescoping member 21306, and the grasping actuator 2131 rotates the movable platform 2130D about the hinge to grasp the packaged article 2112.

Figure 21I:
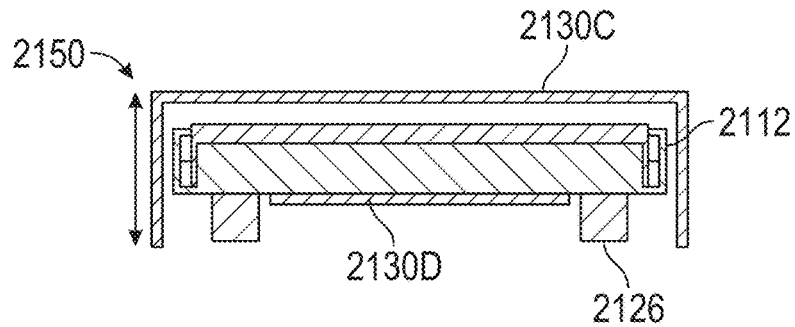

In the embodiment depicted in FIG. 21I, the movable platform 2130D is not moved by the grasping actuator 2131. Instead, the movable platform 2130D remains stationary in relation to the third telescoping member 2130C and the second actuation system 2152 (FIG. 21K) moves the carrier 2150 vertically (as shown on the page) to lift the packaged article 2112 off the extruded members 2126.

Figure 21J:
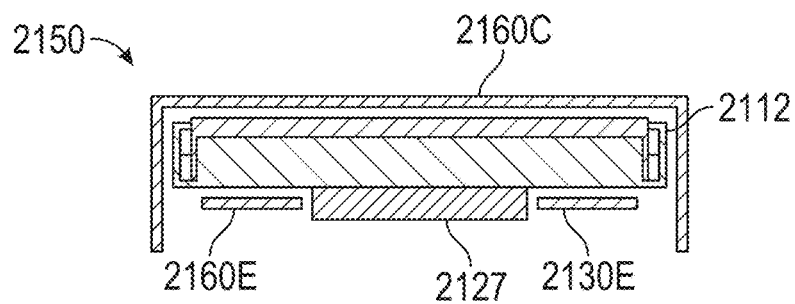
Figure 21M:
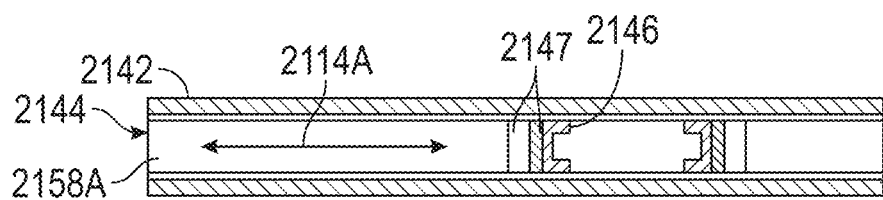
Figure 21N:
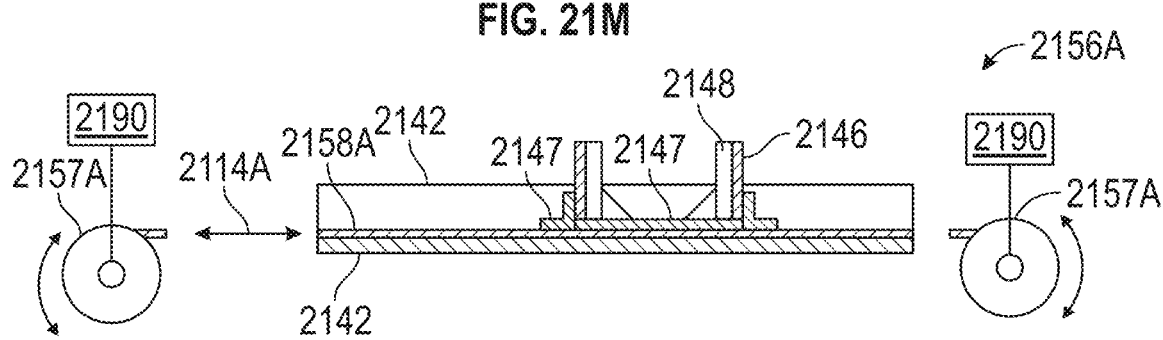

In the embodiment depicted in FIG. 21J, the shelving system 2120 uses a single extruded member 2127 instead of the pair of extruded members 2126. The carrier 2150 includes movable forks 2130E instead of the movable platform 2130D. The movable forks 2130E are positioned adjacent to each side of the extruded member 2127, such as the extruded member 2127 is between the movable forks 2130E and the movable forks 2130E are used to grasp the packaged article 2112 in a similar manner as the movable platform 2130D previously discussed.

FIGS. 21K-21P depict cross-sectional views of different actuation systems used to move the motion system 2140, according to some embodiments. In particular, FIGS. 21K and 21L show two different embodiments of the second actuation system 2152, which may be used with one or both of the second pair of rails 2146. In the first embodiment, which is shown in FIG. 21K, a second actuation system 2152A uses a lift belt 2153A (or rope, chain, and the like) connected to a lift motor 2154A at one end and to the carrier coupler 2128 at another end to move the carrier 2150 in the second direction 2114B. The lift motor 2154A rotates to move the lift belt 2153A, which in turn moves the carrier coupler 2128, which in turn moves the carrier 2150. An alignment roller 2155 (e.g., a pulley) aligns the lift belt 2153A such that the lift belt 2153A pulls on the carrier 2150 in a direction parallel to the second set of tracks 2148 (e.g., the second direction 2114B). The carrier coupler 2128 travels on one of the second set of tracks 2148, which are a channel formed in each of the second pair of rails 2146.

In the second embodiment, which is shown in FIG. 21L, a second actuation system 2152B uses a threaded rod 2153B coupled to a lift motor 2154B. The threaded rod 2153B is disposed through the carrier coupler 2128, which comprises mating threads. The lift motor 2154B rotates the threaded rod 2153B, which in turn engages mating threads of the carrier coupler 2128 to move the carrier coupler 2128, which in turn moves the carrier 2150 in the second direction 2114B.

In some embodiments, the carrier coupler 2128 may have a non-stick coating, such as polytetrafluoroethylene (PTFE), to reduce friction between the carrier coupler 2128 and the second set of tracks 2148. In some embodiments, the carrier coupler 2128 may use a non-stick tape to reduce friction.

FIGS. 21M-21P show three different embodiments of the first actuation system 2156, which may be used with one of both of the first pair of rails 2142. In the first embodiment, which is shown in cross-sectional top and side views of FIGS. 21M and 21N, respectively, a first actuation system 2156A uses shift motors 2157A to move the second pair of rails 2146 in the first direction 2114A. The shift motors 2157A are coupled to a shift belt 2158A. A coupling bracket 2147 connects the second pair of rails 2146 to another and to the shift belt 2158A. One of the shift motors 2157A rotates and moves the shift belt 2158A, which in turn moves the coupling bracket 2147, which in turn moves the second pair of rails 2146 in the first direction 2114A (e.g., left as shown on the page). Another shift motor 2157A (i.e., not the one of the shift motors 2157A) may also rotate to move the second pair of rails 2146 in the first direction 2114A (e.g., right as shown on the page).

Figure 21O:
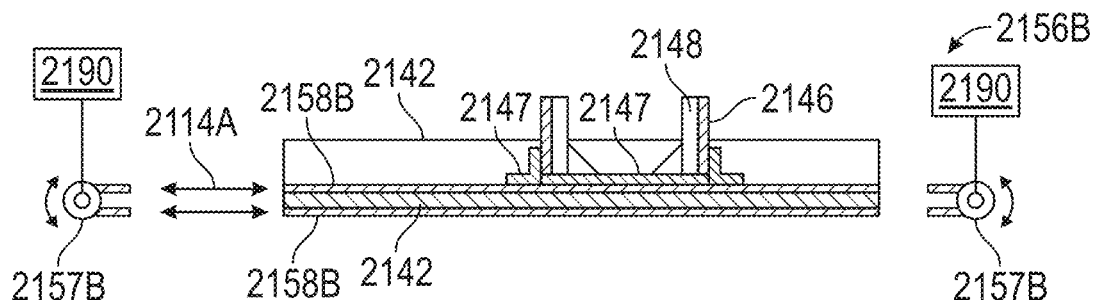

In a second embodiment, which is shown in FIG. 21O, a second actuation system 2156B uses shift motors 2157B to move the second pair of rails 2146 in the first direction 2114A. A shift belt 2158B connects the shift motors 2157B, which rotate at the same time or individually, to move the shift belt 21586 and further move the second pair of rails 2146 in the first direction 2114A.

Figure 21P:
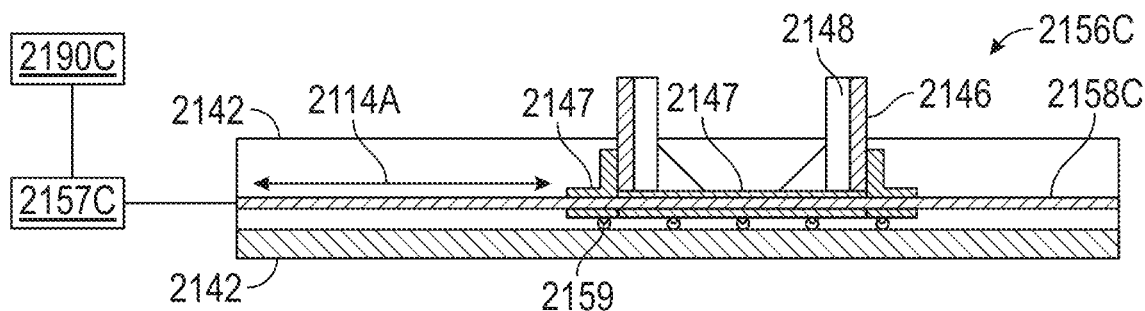

In a third embodiment, which is shown in FIG. 21P, a second actuation system 2156C uses a shift motor 2157C to move the second pair of rails 2146 in the first direction 2114A. The shift motor 2157C rotates a threaded rod 2158C, which is disposed through the coupling bracket 2147, to move the second pair of rails 2146 in the first direction 2114A. The coupling bracket 2147 uses wheels 2159 to travel along the first set of tracks 2144.

The control system 2190 may control any of the actuations systems 2156, 2152, and 2132, such as any of the motorized pinion gear 2134 and the motors 2154 and 2157, to move the carrier 2150.

Although certain embodiments of the first, second, and third actuation systems 2156, 2152, and 2132 are discussed in relation to FIGS. 21F and 21K-21P, other types of linear actuation systems are contemplated. In some embodiments, the first, second, and/or third actuation systems 2156, 2152, and 2132 may use mechanical or electro-mechanical linear actuators, belt-drive actuators, hydraulic linear actuators, pneumatic linear actuators, or piezoelectric linear actuators.

In some embodiments, the second pair of rails 2146 and/or the carrier coupler 2128 may comprise wheels, such as the wheels 2159 discussed in relation to FIG. 21P, that engage the first and second tracks 2144 and 2148, respectively. The first and second tracks 2144 and 2148 comprise a shape corresponding to the wheels to allow the wheels to ride on the tracks 2144 and 2148.

Garment Personalization Kiosk with Rotatable Robotic Retrieval System

FIG. 22A depicts a trimetric view of an on-demand personalization kiosk 2200, according to some embodiments.

The on-demand personalization kiosk 2200 (referred to as the kiosk 2200) is similar to the kiosk 2100 discussed in relation to FIGS. 21A and 21B, except as noted. For example, the kiosk 2200 includes a housing 2202. An article retrieval system 2204, an article personalization system 2206, and a transfer system 2208 are disposed within the housing 2202. The kiosk 2200 further includes a dispenser 2210 and a control system 2290.

The article retrieval system 2204 includes a shelving system 2220 and a motion system 2240 to house and to retrieve a plurality of packaged articles 2212 to be personalized by the kiosk 2200. In the depicted embodiment, the packaged articles 2212 include the packaging 101 and article 105 discussed in relation to FIGS. 2-4, although the kiosk 2200 may be configured to use packaged articles having other packaging and articles discussed herein, such as the packaging 201 and the article 205 discussed in relation to FIGS. 5A and 5B, such as the packaging 301 and the article 305 discussed in relation to FIGS. 6 and 7, such as the packaging 401 and article 405 discussed in relation to FIGS. 8A and 8B, such as the packaging 501 and article 505 discussed in relation to FIGS. 9A-9C, such as the packaging 701 and article 705 discussed in relation to FIGS. 12A and 12B. The shelving system 2220 includes two similar shelving units 2220A and 2220B to dispense the packaged articles 2212 to the motion system 2240, as discussed in relation to FIG. 22B.

The motion system 2240 is used to retrieve a packaged article 2212 from either of the shelving units 2220A and 2220B. The motion system 2240 includes a support member 2242 having a first track 2244, a retrieval member 2246 movably coupled to the support member 2242, and a carrier 2250, which is used to grasp the packaged articles 2212. The carrier 2250 is coupled to the retrieval member 2246 at an end opposite the support member 2242. The support member 2242 may be a shaft, a rail, a bar, a beam, a tube, a column, a pillar, and the like. The first track 2244 may be a groove in or an extension on the support member 2242. For example, the first track 2244 may be a rack gear, an I-beam or cutouts of an I-beam. In some embodiments, the support member 2242 forms a first channel within that runs a length of the support member 2242 and the first track 2244 is a second channel extending from the first channel through an outer surface of the support member 2242. The retrieval member 2246 may be a shaft, a rail, a bar, a tube, and the like.

The retrieval member 2246 moves along the first track 2244 in a first direction 2214A. The support member 2242 rotates about a first axis 2215A and the carrier 2250 rotates about a second axis 2215b. The rotation of the support member 2242 is shown in the cross-sectional top view of FIG. 22C. In the embodiment depicted in FIG. 22A, the retrieval member 2246 comprises extendable or telescoping members (or segments) to move the carrier 2250 in a second direction 2214B. For example, the retrieval member 2246 may comprise nested rails, bars, tubes, beams, and the like. In some embodiments, the retrieval member 2246 may be similar to the telescoping members 2130 discussed in relation to FIGS. 21D-21F. Thus, the motion system 2240 may move the carrier 2250 in four independent directions to grasp a desired packaged article 2212 from the shelving system 2220.

The support member 2242 is coupled to the housing 2202, such as to a ceiling, floor, or shelf of the housing 2202. The retrieval member 2246 is orthogonal to the support member 2242, the second direction 2214B is orthogonal to the first direction 2214A, the first axis 2215A is parallel to the first direction 2214A, and the second axis 2215B is parallel to the second direction 2214B. The motion system 2240 includes a first actuation system to move retrieval member 2246 on the first track 2244, a second actuation system to rotate the support member 2242 about the first axis 2215A, a third actuation system to move the retrieval member 2246 in the second direction 2214B, and a fourth actuation system to rotate the carrier 2250 about the second axis 2215B. Thus, the retrieval member 2246 may move the carrier 2250 toward and away from shelving system 2220. The actuation systems may be similar to those discussed in relation to FIGS. 21D-21P. For example, the first actuation system may be similar to the second actuation systems 2152 discussed in relation to FIGS. 21K and 21L or the third actuation system 2132 discussed in relation to FIG. 21F. The third actuation system may be similar to the first actuation systems 2156 discussed in relation to FIG. 21M-21P or the third actuation system 2132 discussed in relation to FIGS. 21D-21F. In some embodiments, the first and third actuation systems may include linear actuators such as a mechanical or electromechanical linear actuators, belt-drive actuators, hydraulic linear actuators, pneumatic linear actuators, or piezoelectric linear actuators. In some embodiments, the second and fourth actuation systems include a rotary actuator such as a rack-and-pinion actuator, a vane actuator, a helix actuator, a planetary actuator, a linear cylinder, a scotch-yoke actuator, a sprocket actuator, a bladder actuator, a direct-drive motor, and the like.

The article personalization system 2206 is similar to the article personalization system 2106 discussed in relation to FIGS. 21A and 21B, except as noted, and may include any of the ironing system, heat press, heat radiation system, heat convection system, roller, or pinch rollers. The article personalization system 2206 includes a plurality of system components 2260. In the embodiment depicted in FIG. 22A, the system components 2260 include an article preparation system 2260A, a direct-to-garment (DTG) printer 2260B, and a curing system 2260C. The system components 2260 depicted in FIG. 22A are for illustrative purposes and the actual system components 2260 may have any shape. In some embodiments, the DTG printer 2260B does not include an outer shell or casing. The lack of casing or outer shell helps accommodate repairs, restocking, maintenance, automated loading and unloading, or manual loading and unloading by an operator or a user, for example, in a semi-manual embodiment of the kiosk 2200.

The system components 2260 are positioned and oriented within reach of a transfer system 2208, which in the embodiment depicted in FIG. 22A, is the motion system 2240. The transfer system 2208 transfers the packaged articles 2212 to/from/between the system components 2260 for processing, similar to the transfer system 2108 discussed in relation to FIG. 21A. The transfer system 2208 may present the packaged articles 2212 to the user at different stages of the personalization process, such as presenting a personalized packaged article 2216 after the curing system 2260C dries the printed image or design. The packaged article 2212 may be presented through a window in the housing 2202. In some embodiments, the packaged article 2216 is presented before the personalization process begins (e.g., before the transfer system 2208 moves the personalized packaged article 2216 to the system components 2260). In such embodiments, the personalized packaged article 2216 is displayed and a projector user interface, such as discussed in relation to FIGS. 36-39, uses a projector to project an image or design to be printed on the personalized packaged article 2216. The personalized packaged article 2216 may be visible to the user through the window, a display, or a two-way mirror. This unique method allows for presentation of an actual visualization of the image or design on the personalized packaged article 2216, rather than a simulated visualization, to the user before order confirmation. The packaged articles 2212 may be presented to the user to enhance the personalization process or to request approval from the user to continue the personalization process. The control system 2290 controls the kiosk 2200, similar to the control system 2190 discussed in relation to FIG. 21A.

The kiosk 2200 differs from non-kiosk personalization systems in a similar manner as the kiosk 2100 discussed in relation to the top-front-right view of FIG. 21A and the top-left-rear view of 21B.

In some embodiments, the retrieval member 2246 is rotatably coupled to the support member 2242 and rotates about the support member 2242. For example, the retrieval member 2246 may couple to the support member 2242 through a collar. The collar may include a rotary actuator to rotate the retrieval member 2246 about the support member 2242. In some embodiments, the support member 2242 does not rotate.

FIG. 22B depicts a partial front view of the shelving unit 2220A, according to some embodiments.

The shelving unit 2220A includes several rows 2222 of packaged articles 2212. Each row 2222 of the several rows 2222 has a dispenser portion 2224 at each end, a supply device 2226, and a dispenser actuator 2228. The packaged articles 2212 are arranged in the rows 2222. The dispenser portion 2224 presents the packaged articles 2212 to the motion system 2240 through an opening 2225 formed by the shelving unit 2220A, which is located where the carrier 2250 can retrieve the packaged articles 2212 (e.g., within reach of the motion system 2240). The dispenser actuator 2228 moves the packaged articles 2212, for example, a packaged article 2212 adjacent to the dispenser actuator 2228, through the opening 2225 in the dispenser portion 2224 and onto the carrier 2250 of the motion system 2240. Once the dispenser portion 2224 presents the adjacent packaged article 2212, the supply device 2226 moves another packaged article 2212 in the row 2222 to the dispenser portion 2224. The supply device 2226 includes a compliant mechanism 2227A coupled to a fixed element 2227B and a movable element 2227C. The compliant mechanism 2227A may couple to the fixed element 2227B through a fastener or bracket, or may be integrally formed with the fixed element 2227B. The compliant mechanism 2227A comprises an elastic object that stores mechanical energy, such as a spring or flexible structure. For example, the packaged articles 2212 push the movable element 2227C towards the fixed element 2227B, which compresses the compliant mechanism 2227A against the fixed element 2227B and stores mechanical energy. When the supply device moves the another packaged article 2212 to the dispenser portion 2224, the compliant mechanism 2227A exerts the stored mechanical energy (e.g., a force) on and moves the movable element 2227C, which in turn moves the packaged articles 2212 towards the dispenser portion 2224. Thus, the compliant mechanism 2227A is "biased" to move the packaged articles 2212 towards the dispenser portion 2224. In some embodiments, the supply device 2226 comprises an actuator, such as a linear actuator, instead of the compliant mechanism 2227A, fixed element 2227B and movable element 2227C.

FIG. 22C depicts a cross-sectional top view of the shelving units 2220A and 2220B, according to some embodiments.

The shelving unit 2220B is similar to the shelving unit 2220A, except there is only one dispenser portion 2224 in a center of the row 2222, and the fixed element 2227B is an inner wall of the shelving unit 2220B. In some embodiments, the shelving unit 2220B has the dispenser portions 2224 at each end of the rows 2222, similar to the shelving unit 2220A. The motion system 2240 extends the retrieval member 2246 to retrieve the packaged articles 2212 from the dispenser portions 2224 of the shelving unit 2220B.

FIGS. 22D and 22E depict cross-sectional top views of shelving units 2280A and 2280B, respectively, according to some embodiments. In particular, FIG. 22D shows the shelving unit 2280A, which is similar to the shelving unit 2220A discussed in relation to FIGS. 22B and 22C, except as noted. The shelving units 2280A and 2280B may be part of the shelving system 2220 (FIG. 22A).

The shelving unit 2280A includes several rows 2282 (one of which is shown) of packaged articles 2212 (FIGS. 22G-22I). Each row 2282 has a dispenser portion 2284 at each end (e.g., a first end and a second end), a supply device 2286, and a dispenser actuator. In the depicted embodiment, the supply device 2286 includes a conveyor belt system 2287 and the dispenser actuator is a multi-directional conveyor system 2288. The multi-directional conveyor system 2288 of the dispenser portion 2284 moves the packaged articles 2212 in a first direction 2289A and presents the packaged articles 2212 to the motion system 2240 through a first opening 2285A formed by the shelving unit 2280A at the first end of the row 2282. Once the dispenser portion 2284 presents a packaged article 2212, the conveyor belt system 2287 of the supply device 2286 moves another packaged article 2212 in the row 2282 in a second direction 2289B (e.g., along a length of the row 2282) and to the dispenser portion 2284. The first direction 2289A is orthogonal to the second direction 2289B. The dispenser portion 2284 at the second end of the row 2222 may be used to dispense the packaged articles 2212, or to receive packaged articles 2212 through a second opening 2285B formed by the shelving unit 2280A as discussed in relation to FIGS. 22F-22I. In some embodiments, the dispenser portion 2284 at the first end of the row 2282 is used to receive packaged articles 2212.

The conveyor belt system 2287 includes a conveyor belt, head pulley, tail pulley, and idlers. The multi-directional conveyor system 2288 includes a first plurality of motorized wheels 2283A and a second plurality of motorized wheels 2283B that rotate in place. The first plurality of motorized wheels 2283A are controlled independently of the second plurality of motorized wheels 2283B, for example, by the control system 2290 (FIG. 22A). The first plurality of motorized wheels 2283A rotate in the first direction 2289A and are used to dispense and/or receive the packaged articles 2212. The second plurality of motorized wheels 2283B rotate in the second direction 2289B and are used to transfer the packaged articles 2212 to and from the conveyor belt system 2287. The multi-directionality of the multi-directional conveyor system 2288 converts a motion of the packaged articles 2212 between the first direction 2289A and the second direction 2289B.

The motorized wheels 2283A and 2283B are driven by a belt or chain actuation system. In some embodiments, the motorized wheels 2283A or 2283B are coupled to a roller that is coupled to the belt or chain drive system, such that when the roller rotates, the motorized wheels 2283A or 2283B connected to the roller rotate. In some embodiments, each wheel of the plurality of wheels 2283A and/or 2283B is driven by a belt or chain drive system. In some embodiments, the belt or chain system may be similar to the shift motors 2157A and shift belt 2158A discussed in relation to FIGS. 21N and 21O. Although a few drive systems are described, it any drive system or multi-directional conveyor system commercially available is contemplated.

FIG. 22E shows the shelving unit 2280B, which is similar to the shelving unit 2220B discussed in relation to FIG. 22C, except as noted.

The shelving unit 2280B includes several rows 2282 (one of which is shown) of packaged articles 2212. Each row 2282 includes the dispenser portion 2284, the supply device 2286, and the dispenser actuator (e.g., the multi-directional conveyor system 2288). The multi-directional conveyor system 2288 is positioned in a middle of the row 2222 and the conveyor belt system 2287 is positioned on each of two sides of the multi-directional conveyor system 2288. The multi-directional conveyor system 2288 moves the packaged articles 2212 in the first direction 2289A through an opening 2285C formed by the shelving unit 2280B to transfer the packaged articles 2212 to or from the motion system 2240. The conveyor belt systems 2287 move the packaged articles 2212 in the second direction 2289B towards the multi-directional conveyor system 2288, for example, to transfer the packaged articles to the multi-directional conveyor system 2288.

In some embodiments, a different conveyor system may be used as the conveyor belt system 2287. In some embodiments, a wheeled conveyor system, such as the multi-directional conveyor system 2288, may be used instead of the conveyor belt system 2287. In some embodiments, the conveyor belt system 2287 may only comprise the second plurality of motorized wheels 2283B.

In some embodiments, shelving unit 2280A and/or 2280B may be used with or instead of the shelving units 2220A and 2220B (FIGS. 22B and 22C).

FIG. 22F is a flow diagram that illustrates a method 2298 for moving the packaged articles 2212 through a shelving unit 2280A, according to embodiments described herein. FIGS. 22G-22I schematically illustrate a cross-sectional view of the packaged articles 2212 at different operations 2299 of the method 2298 depicted in FIG. 22F, according to some embodiments. Therefore, FIG. 22F and FIGS. 22G-22I are herein described together for clarity.

The method 2298 shown in FIG. 22F begins at operation 2299A by moving a first packaged article 2218A from a first position 2219A through the first opening 2282A formed by the shelving unit 2280A. FIG. 22G depicts the operation 2299A and shows the multi-directional conveyor system 2288 moving the first packaged article 2218A in the first direction 2289A (and towards the motion system 2240 as discussed in relation to FIG. 22C) by rotating only the first plurality of motorized wheels 2283A. The first position 2219A is adjacent to the opening 2285A and at the dispenser portion 2284 at the first end of the row 2222 (FIG. 22D).

The method 2298 shown in FIG. 22F continues to operation 2299B with retrieving the first packaged article 2218A using the carrier 2250 of the motion system 2240. Although discussed in relation to the shelving unit 2220A, FIG. 22C depicts an example of the operation 2299B and shows the motion system 2240 retrieving the packaged article 2212. The motion system 2240 may similarly retrieve the first packaged article 2218A from the shelving unit 2280A discussed in relation to FIG. 22G.

The method 2298 shown in FIG. 22F continues to operation 2299C with moving remaining packaged articles 2212 in the row 2222 towards the first position 2219A until a second packaged article 2218B is in the first position 2219A. FIG. 22H depicts the operation 2299C and shows the multi-directional conveyor system 2288 and the conveyor belt system 2287 (both hidden by the packaged articles 2212) moving the packaged articles 2212 in the second direction 2289B towards the first position 2219A. The multi-directional conveyor system 2288 moves the second packaged article 2218B by rotating only the second plurality of motorized wheels 2283B. The second packaged article 2218B is shown in the first position 2219A adjacent to the first opening 2282A.

The method 2298 shown in FIG. 22F continues to operation 2299D with inserting a third packaged article 2218C into the second opening 2285B formed by the shelving unit 2280A. FIG. 22I depicts the operation 2299D and shows the third packaged article 2218C moving through the second opening 2285B. The motion system 2240 (not shown) may insert the third packaged article 2218C into the second opening 2285B such that the third packaged article 2218C at least partially rests on the multi-directional conveyor system 2288. The multi-directional conveyor system 2288 moves the third packaged article 2218C in the first direction 2289A (and away from the motion system 2240) by rotating only the first plurality of motorized wheels 2283A.

The method 2298 shown in FIG. 22F continues to operation 2299E by moving the third packaged article 2218C to a second position 22198. The second position 22198 is adjacent to the second opening 2285B. Although not expressly shown, the third packaged article 2218C is positioned in the second position 2219B adjacent to the second opening 2285B similar to how the second packaged article 2218B is positioned in the first position 2219A in FIG. 22H. The second position 2219B is at the dispenser portion 2284 at the second end of the row 2222 (FIG. 22D).

The method 2298 may be used to manage an inventory of packaged articles 2212 in the shelving unit 2280A. The method 2298 may be used to sort through packaged articles 2212 having different characteristics (e.g., article type, shirt size, shirt type, material type, shirt fit, and the like) to select a packaged article 2212 for personalization. Using the discussion in relation to FIGS. 22G-22H as an example, the second packaged article 2218B may have characteristics required for personalization (e.g., a Men's large T-shirt). The first packaged article 2218A is moved to the motion system 2240 and the second packaged article 2218B is moved to the first position 2219A. The motion system 2240 returns the first packaged article 2218A to the shelving unit 2280A (at the second position 2219B) and the first article 2218A becomes the third packaged article 2218C. The second packaged article 2218B is then moved to the motion system 2240 to be personalized as discussed in relation to FIG. 22A. The inventory of packaged articles 2212 may be managed, for example, by the control system 2290 (FIG. 22A).

Although the method 2298 is discussed in relation to the shelving unit 2280A, it may similarly apply to the shelving unit 2280B (FIG. 22E). For example, the multi-directional conveyor system 2288 moves the first packaged article 2218A through the opening 2285C and the motion system 2240 retrieves the first packaged article 2218A. Either of the conveyor belt systems 2287 may move the packaged articles 2212 disposed on the conveyor belt system 2287 to the multi-directional conveyor system 2288, where the second packaged article 22186 is presented to the multi-directional conveyor system 2288. Alternatively, the motion system 2240 may insert the third packaged article 2218C into the opening 2285C and the multi-directional conveyor system 2288 moves the third packaged article 2218C in the second direction 2289A (away from the motion system 2240). The third packaged article may then remain on the multi-directional conveyor system 2288 or be moved to either of the conveyor belt system 2287. In some embodiments, there are two conveyor belt systems 2287 in the row 2222 and one is used to store packaging of the packaged articles 2212 and another is used to store packaged articles 2212 ready for personalization by the kiosk 2200.

In some embodiments, the third packaged article 2218C is the first packaged article 2218A.

In some embodiments, the first packaged article 2218A has different characteristics than the second packaged article 2218B, the remaining packaged articles 2212 in the row 2222 have at least two different characteristics, and the packaged articles 2212 and/or 2218B are moved from the first position to the second position until a packaged article 2212 having desired characteristics is positioned in the first position.

Some embodiments further include personalizing the packaged article 2212 having desired characteristics using the plurality of system components 2260 of an article personalization system 2206. In such embodiments, the system components comprise the article preparation system 2260A, the DTG printer 2260B, and the curing system 2260C.

Some embodiments further include personalizing the first packaged article 2218A using the plurality of system components 2260 of an article personalization system 2206. In such embodiments, the system components 2260 comprise the article preparation system 2260A, the DTG printer 2260B, and the curing system 2260C and the packaged articles 2212 each comprise a packaging and an article.

Some embodiments further include removing an article of the first packaged article 2218A from a packaging of the first packaged article 2218A. In such embodiments, the third packaged article 2218C is the packaging of the first packaged article 2218A.

FIGS. 22J and 22K depict a trimetric and cross-sectional view of a mechanical carrier 2250A for grasping packaged articles 2212, according to some embodiments. The mechanical carrier 2250A includes a holding surface 2251A, a mechanical actuator 2251B, and a gripper or articulable member, such as rotatable arms 2251C. A packaged article 2212A includes an underside 2213A and forms a package opening 2213B in the underside 2213A. The holding surface 2251A of the mechanical carrier 2250A is positioned adjacent to the underside 2213A of the packaged article 2212A. For example, the holding surface 2251A supports the packaged article 2212 by the underside 2213A. In another example, the holding surface 2251A contacts the underside 2213A. The mechanical actuator 2251B moves the rotatable arms 2251C towards the underside 2213A of the packaged article 2212A and the rotatable arms 2251C engage the package opening 2213B, which causes the mechanical carrier 2250A to grasp the packaged article 2212A, for example, while the motion system 2240 moves. The rotatable arms 2251C may be flush with the holding surface 2251A when not engaging the package opening 2213B.

FIGS. 22L and 22M depict a trimetric and cross-sectional view of a carrier for grasping packaged articles, according to some embodiments. The electro-magnetic carrier 2250B includes a holding surface 2253A and a gripper, such as an electromagnet 2253B. A packaged article 2212B includes an underside 2217A and a package magnet 2217B disposed in the packaged article 2212B, as shown, or flush with the underside 2217A. The holding surface 2253A is positioned adjacent to the underside 2217A of the packaged article 2212B. The control system 2290 activates the electromagnet 2253B at a polarity opposite of a polarity of the package magnet 2217B and the electromagnet 2253B engages the package magnet 2217B, which causes the carrier 2250 to grasp the packaged article 2212B.

FIG. 22N depicts a trimetric view of a movable shelving system 2221, according to some embodiments. The article personalization system 2206 and the housing 2202 are not depicted for simplicity.

The shelving system 2221 may be used with or instead of the shelving system 2220. The shelving system 2221 includes shelving units 2221A, a pair of rails 2221B having tracks 2221C, and an actuation system (not shown). The shelving units 2221A differ from the shelving units 2220A and 2220B and do not have the dispenser portion 2224, supply device 2226, or dispenser actuator 2228. The shelving units 2221A include columns of packaged articles 2212, similar to the shelving system 2120 discussed in relation to the top-front-right view of FIG. 21A and the top-left-rear view of 21B. The actuation system moves the shelving units 2221A along the tracks 2221C, which allows the motion system 2240 to access the packaged articles 2212 in each column of the shelving unit 2221A.

FIG. 22O depicts a trimetric view of the motion system 2240, according to some embodiments. The article personalization system 2206 and the housing 2202 are not depicted for simplicity.

In the depicted embodiments, the motion system 2240 includes a track system 2241 having a pair of rails 2241A, tracks 2241B, and an actuation system (not shown). The actuation system moves the motion system 2240 along the tracks 2241B of the rails 2241A, which allows the motion system 2240 to access the packaged articles 2212 in each column of the shelving unit 2221A.

The actuation systems are not shown in FIGS. 22N and 22O, but may be similar to the first actuation systems 2156 discussed in relation to FIGS. 21M-21P. The track system 2241 and motion system 2240 may be also be used with the shelving system 2220 discussed in relation to FIGS. 22A-22C.

FIGS. 22P-22R depict different views of a shelving system 2230, according to some embodiments. The shelving system 2230 may be used with or instead of the shelving systems 2220 and 2221 discussed in relation to FIGS. 22A-22C and 22N and 22O. The shelving system 2230 is similar to the shelving system 2220 discussed in relation to FIG. 21C, except as noted, and includes a plurality of compartments 2231, each of which is formed by support members 2234, a backing plate 2235, and a pair of extruded members 2236. The shelving system 2230 further includes an article dispensing system 2232 to present the packaged articles 2212. The article dispensing system 2232 includes the extruded members 2236 and a push plate 2238. The extruded members 2236 each include three extendable members (or segments), such as a first telescoping member 2236A, a second telescoping member 2236B, and a third telescoping member 2236C, although more or less may be used. The first telescoping member 2236A remains fixed to the backing plate 2235. The second and third telescoping members 2236B and 2236C move in relation to the first telescoping member 2236A and to each other. The push plate 2238 couples to one of the telescoping members 2236A-C and contacts the packaged article 2212 to move the packaged article 2212 with the extruded members 2236. Thus, each compartment 2231 of the compartments 2231 may move the packaged articles 2212 towards and away from the motion system 2240 in a direction orthogonal to the support member 2242. The push plate 2238 may be welded to, fastened to using fasteners, adhered to, or unitarily formed as part of the one of the telescoping members 2236A-C. In some embodiments, the push plate 2238 is not used.

In some embodiments, the extruded members 2236 may comprise nested rails, bars, tubes, beams, and the like.

Garment Personalization Kiosk with Articular Robotic Retrieval System

Figure 23A:
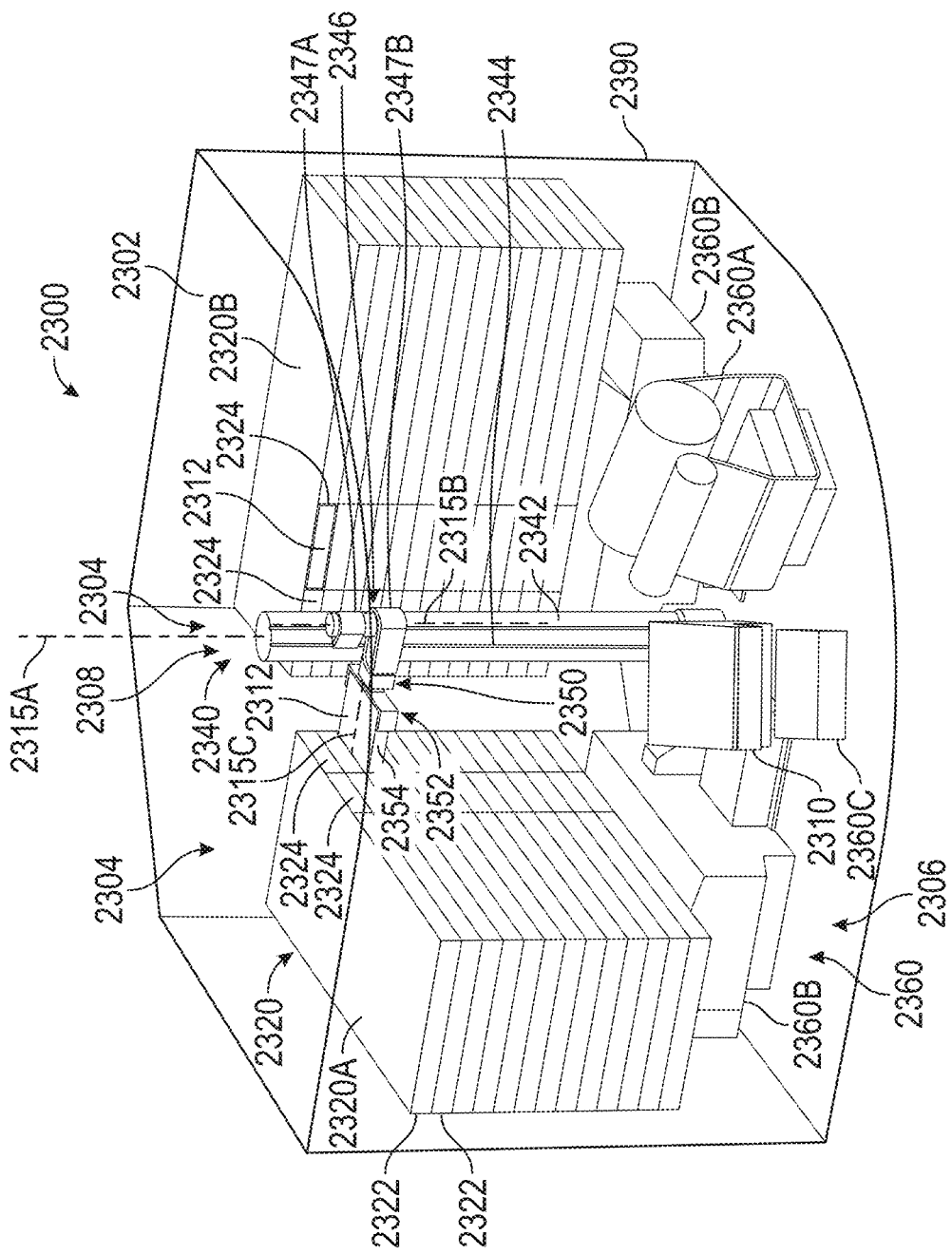
FIG. 23A depicts trimetric views of on-demand personalization kiosk, according to some embodiments.

FIG. 23A depicts trimetric views of on-demand personalization kiosk 2300, according to some embodiments.

The on-demand personalization kiosk 2300 (referred to as the kiosk 2300) is similar to the kiosks 2100 and 2200 discussed in relation to previous figures, except as noted. For example, the kiosk 2300 includes a housing 2302. Disposed within the housing are an article retrieval system 2304, an article personalization system 2306, and a transfer system 2308. The kiosk 2300 further includes a dispenser 2310 and a control system 2390.

The article retrieval system 2304 includes a shelving system 2320 and a motion system 2340 to house and to retrieve a plurality of packaged articles 2312 to be personalized by the kiosk 2300. The packaged articles 2312 includes the packaging 101 and article 105 discussed in relation to FIGS. 2-4, although the kiosk 2300 may be configured to use packaged articles having other packaging and articles discussed herein, such as the packaging 201 and the article 205 discussed in relation to FIGS. 5A and 5B, such as the packaging 301 and the article 305 discussed in relation to FIGS. 6 and 7, such as the packaging 401 and article 405 discussed in relation to FIGS. 8A and 8B, such as the packaging 501 and article 505 discussed in relation to FIGS. 9A-9C, such as the packaging 701 and article 705 discussed in relation to FIGS. 12A and 12B. In the embodiment depicted in FIG. 23A, the shelving system 2320 includes two similar shelving units 2320A and 2320B to dispense the packaged articles 2312 to the motion system 2340 Each shelving unit 2320A and 2320B includes several rows 2322 of packaged articles 2312 having a dispenser portion 2324 at one end, as further discussed in relation to FIG. 23B. The shelving units 2320A and 2320B are positioned between 45 degrees and 135 degrees apart. In some embodiments, the shelving units 2320A and 2320B are positioned between 60 degrees and 120 degrees apart. In some embodiments, the shelving units 2320A and 2320B are positioned between 80 degrees and 100 degrees apart. In some embodiments, the shelving units 2320A and 2320B are positioned about 90 degrees apart, where about may be +/−10%.

The motion system 2340 is positioned in between shelving units 2320A and 2320B, and is used to retrieve the packaged articles 2312 from the shelving units 2320A and 2320B, such as from the dispenser portion 2324. The motion system 2340 includes a support member 2342 having a track 2344, a retrieval member 2346 movably coupled to the support member 2342, and a carrier 2350, which is used to grasp the packaged articles 2312. The support member 2342 may be a shaft, a rail, a bar, a beam, a tube, a column, a pillar, and the like. The track 2344 may be a groove in or an extension on the support member 2342. For example, the track 2344 may be a rack gear, an I-beam, or cutouts of an I-beam. In some embodiments, the support member 2342 forms a first channel within that runs a length of the support member 2342 (e.g., similar to a hole or channel in a cylinder) and the first track 2344 is a second channel extending from the first channel through an outer surface of the support member 2342. The retrieval member 2346 may be a shaft, a rail, a bar, a tube, and the like.

The retrieval member 2346 comprises a first linkage member 2347A and a second linkage member 2347B. The first and second linkage members 2347A and 2347B may be a shaft, a rail, a bar, a beam, a tube, and the like. The first linkage member 2347A is coupled to the track 2344 at one end and to the second linkage member 2347B at another end opposite the one end. For example, the first linkage member may be coupled to the track though an actuation system. The second linkage member 2347B is rotatably coupled to the first linkage member 2347A, and is coupled to the carrier 2350 at an end opposite an end coupled to the first linkage member 2347A. The carrier 2350 is rotatably coupled to the retrieval member 2346. The support member 2342 rotates about a first axis 2315A, the second linkage rotates about a second axis 2315B, and the carrier 2350 rotates about a third axis 2315C. The first and second linkage members 2347A and 2347B, the carrier 2350, and the support member 2342 may each be coupled to a corresponding member through a joint and/or an actuation system.

The retrieval member 2346 moves along the track 2344 to position the carrier 2350 adjacent to the packaged articles 2312 at different heights or rows of the shelving system 2320. The first and second linkage members 2347A and 2347B position the carrier 2350 adjacent to the packaged articles 2312 at different columns of the shelving system 2320, and move the carrier 2350 towards and away from the shelving system 2320 to grasp the packaged articles 2312.

Figure 23B:
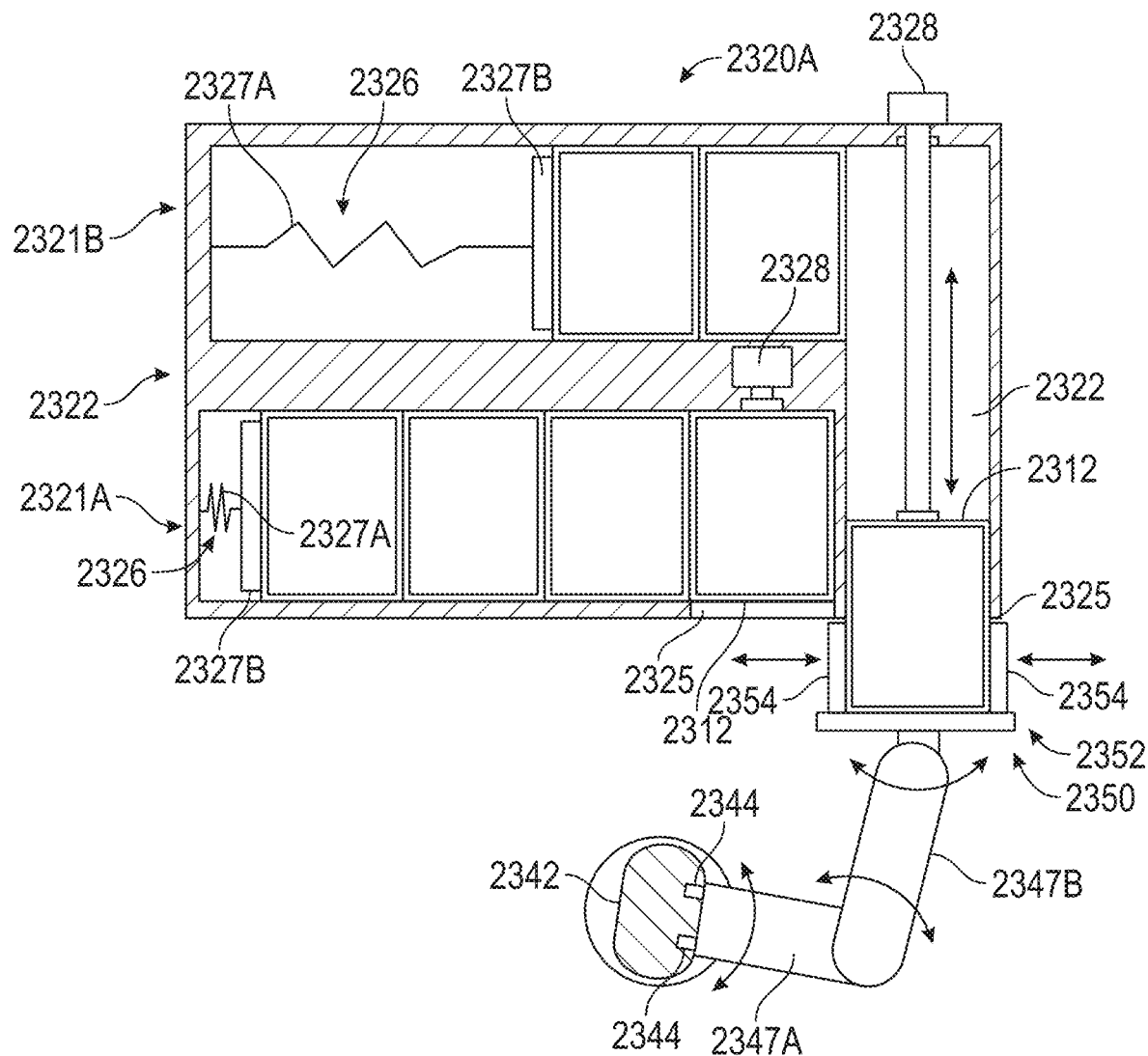
FIG. 23B depicts a cross-sectional top view of a shelving unit, according to some embodiments.

The carrier 2350 may grasp the packaged articles 2312 through different means and may include a gripper or claw. As shown in FIG. 23B, the carrier 2350 includes a gripper 2352 having a pair of articulable members 2354 to engage a feature of the packaged articles 2312, such as sides of the packaged articles 2312. The articulable members 2354 may be a shaft, a rail, a bar, a beam, a tube, an arm, and the like. The articulable members 2354 may move toward and away from another. In some embodiments, the articulable members 2354 include grips configured to grip the packaged article 2312. For example, the grips may be made of a slip-resistant or anti-slip material. The articulable members 2354 attach to a body, which may contain an opening actuator (not shown) configured to open and close the articulable members 2354 of the carrier 2350. The support member 2342 is coupled to the housing 2302, such as a floor or a shelf of the housing. The first linkage member 2347A is orthogonal to the support member 2342, the second axis 2315B is parallel to the first axis 2315A, and the third axis 2315C is orthogonal to the second axis 2315B. The motion system 2340 includes several actuation systems (not shown) to move retrieval member 2346 on the track 2344, rotate the support member 2342 about the first axis 2315A, rotate the second linkage member 2347B about the second axis 2315B, rotate the carrier 2350 about the third axis 2315C, rotate the carrier 2350 about the third axis 2315C, and move the articulable members 2354. The actuation systems may be similar to those discussed in relation to FIGS. 21D-21P. For example, the actuation system to move retrieval member 2346 on the track 2344 may be similar to the second actuation systems 2152 discussed in relation to FIGS. 21K and 21L or the third actuation system 2132 discussed in relation to FIG. 21F. In some embodiments, the actuation system to move retrieval member 2346 may include linear actuators such as a mechanical or electro-mechanical linear actuators, belt-drive actuators, hydraulic linear actuators, pneumatic linear actuators, or piezoelectric linear actuators. The actuation systems to rotate the support member 2342, the second linkage member 2347B, and the carrier 2350 include a rotary actuator such as a rack-and-pinion actuator, a vane actuator, a helix actuator, a planetary actuator, a linear cylinder, a scotch-yoke actuator, a sprocket actuator, a bladder actuator, a direct-drive motor, and the like.

The article personalization system 2306 is similar to the article personalization system 2206 discussed in relation to FIG. 22A, except as noted, and includes a plurality of system components 2360 such as an article preparation system 2360A, a DTG printer 2360B, and a curing system 2360C. The system components 2360 are positioned and oriented within reach of a transfer system 2308, which in the embodiment depicted in FIG. 23A is the motion system 2340. In some embodiments, the transfer system 2308 is similar to the transfer system 2208 discussed in relation to FIG. 22A. The control system 2390 controls the kiosk 2300, similar to the control system 2190 discussed in relation to FIG. 21A. The system components 2360 depicted in FIG. 23A are for illustrative purposes and the actual system components 2360 may have any shape, such as previously discussed in relation to the system components 2160 in FIG. 21A.

The kiosk 2300 differs from non-kiosk personalization systems in a similar manner as the kiosk 2100 discussed in relation to the top-front-right view of FIG. 21A and the top-left-rear view of 21B.

In some embodiments, the first linkage member 2347A is rotatably coupled to the support member 2342 and rotates about the support member 2342. For example, the first linkage member 2347A may couple to the support member 2342 through a collar. The collar may include a rotary actuator to rotate the first linkage member 2347A about the support member 2342. In some embodiments, the support member 2342 does not rotate.

In some embodiments, other means of grasping may be used. The articulable members 2354 may use self-centering springs, electromagnetism, or electrostatic adhesion to grasp the packaged article 2312. In some embodiments, the opening actuator may be a mechanical, an electromechanical, a hydraulic, a pneumatic, or a piezoelectric actuator. In some embodiments, the carrier 2350 may be soft grippers that include an outer skin made of rubber or similar material. In one embodiment, the gripper fingers may include surface features that enhance the ability for the grippers to grab the packaged article 2312. In some embodiments, the carrier 2350 may be a conveyor belt that items can be loaded onto and ejected from. In some embodiments, one of the articulable members 2354 may move while the other remains stationary.

In some embodiments, the packaged articles 2312 are housed in the shelving system 2220 discussed in relation to FIG. 22O.

In some embodiments, the motion system 2340 comprises a direct-drive robot. In some embodiments, the motion system 2240 discussed in relation to FIGS. 22A and 22O may be used with the kiosk 2300. In some embodiments, the shelving units 2221A and 2221B discussed in relation to FIG. 22N are used and the motion system 2340 positions the carrier 2350 to grasp the packaged articles 2312. In some embodiments, the shelving system 2221 discussed in relation to FIG. 22N may be used instead of the shelving system 2320.

FIG. 23B depicts a cross-sectional top view of the shelving unit 2320A, according to some embodiments.

Each row 2322 of the shelving unit 2320A contains a first dispenser system 2321A and a second dispenser system 2321B. The first dispenser system 2321A is positioned in front of the second dispenser system 2321B. The first and second dispenser systems 2321A and 2321B each comprise the dispenser portion 2324, a supply device 2326, and a dispenser actuator 2328, similar to the shelving unit 2220A discussed in relation to FIGS. 22B and 22C. The dispenser portions 2324 of the first and second dispenser systems 2321A and 2321B are adjacent to another and within reach of the motion system 2340. Each dispenser portion 2324 uses a dispenser actuator 2328 to present the packaged articles 2312 to the motion system 2340 through an opening 2325 formed by the shelving unit 2320A. The supply devices 2326 each use a compliant mechanism 2327A and a movable element 2327B to move another packaged article 2312 in the row 2322 to the dispenser portions 2324.

The shelving unit 2320B is similar to the shelving unit 2320A, and as shown in FIG. 23A, is a mirror of the shelving unit 2320A.

FIG. 23C depicts a cross-sectional top view of a shelving units 2380, according to some embodiments. In particular, FIG. 23C shows the shelving unit 2380, which is similar to the shelving unit 2320A discussed in relation to FIG. 23B and the shelving unit 2280A discussed in relation to FIGS. 22D-22E and 22G-22I, except as noted. The shelving unit 2380 may be part of the shelving system 2320 (FIG. 23A).

Figure 23E:
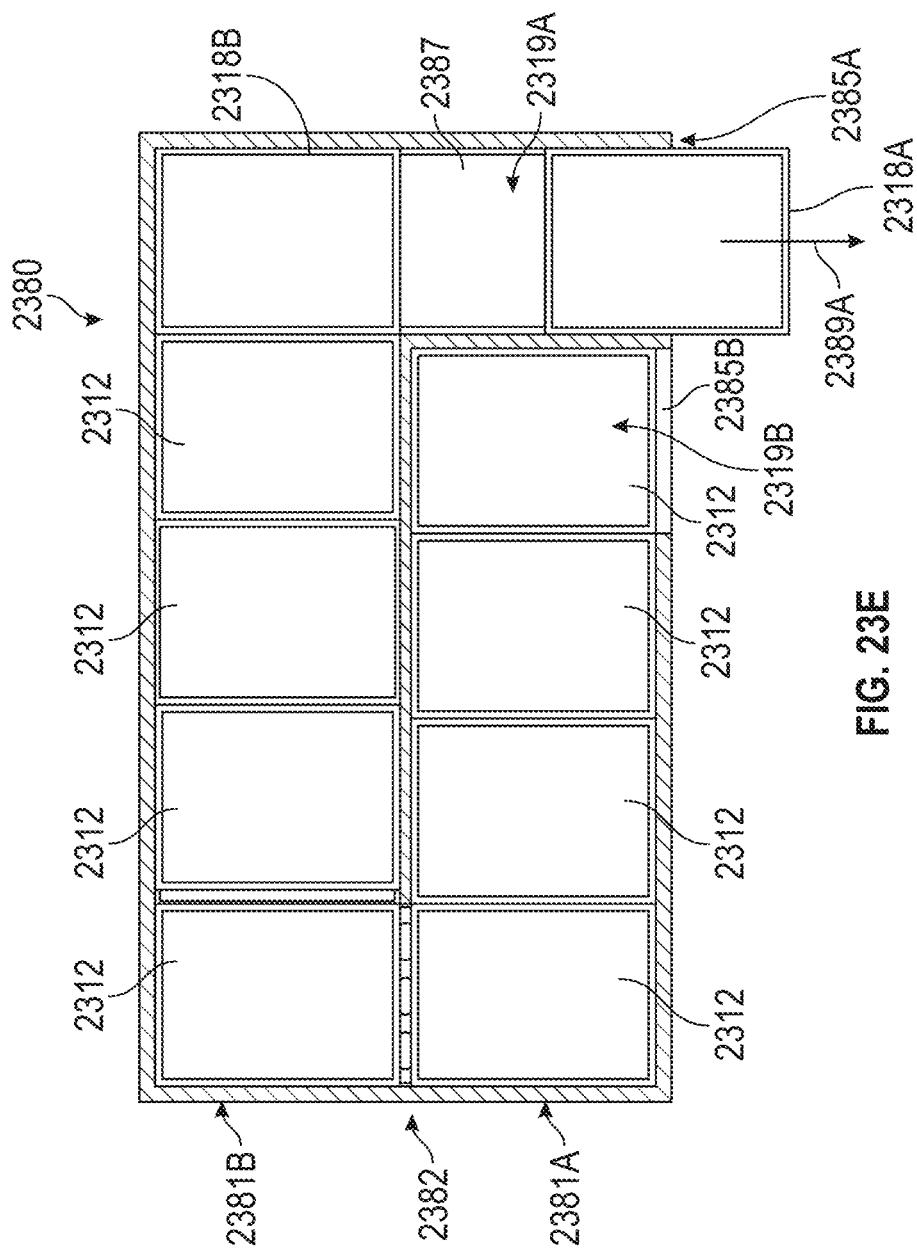
Figure 23G:
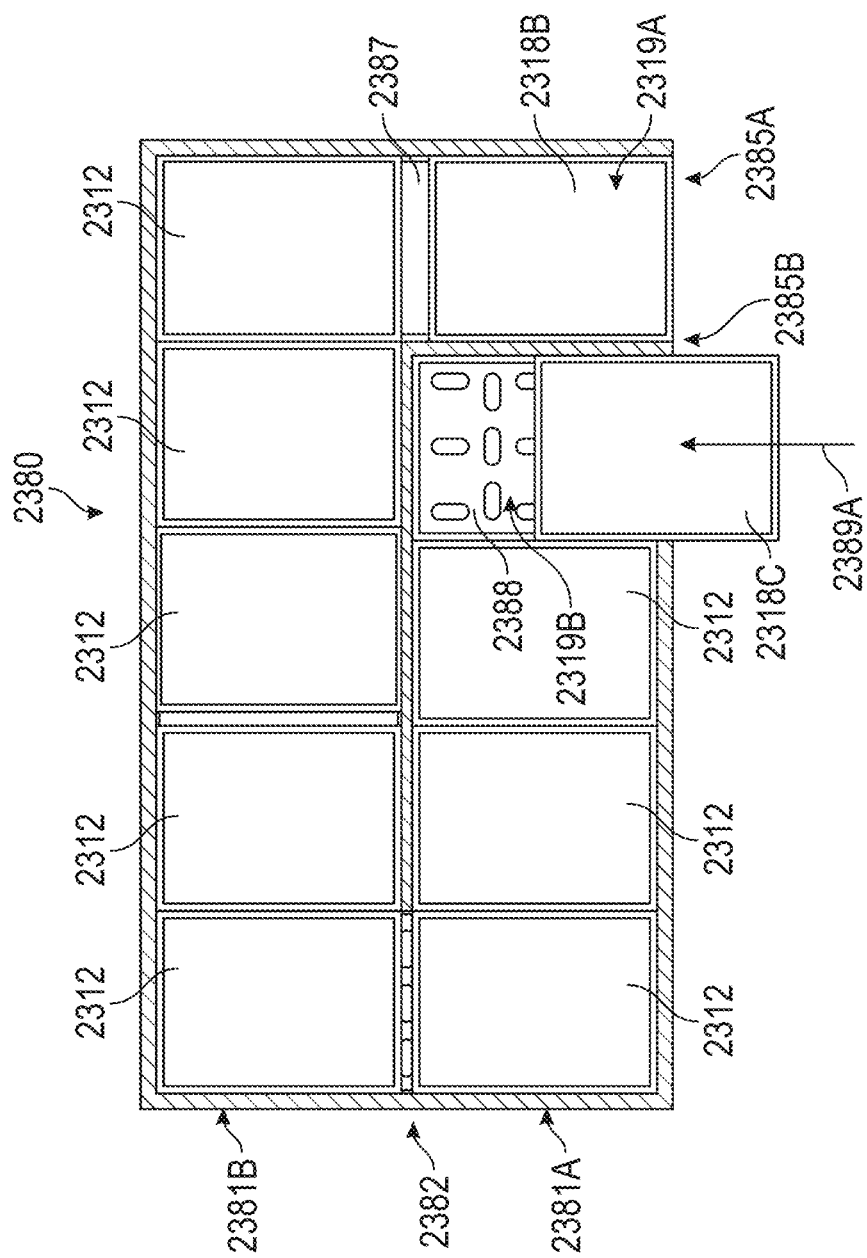

The shelving unit 2380 includes several rows 2382 (one of which is shown) of packaged articles 2312 (FIGS. 23E-23G). Each row 2382 has two dispenser portions 2384 at one end, a supply device 2386, and a dispenser actuator (e.g., multi-directional conveyor system 2388). The packaged articles 2312 travel between the dispenser portions 2384 and through a first aisle 2381A and a second aisle 2381B formed by the row 2322 using the supply device 2386, which includes conveyor belt systems 2387 and multi-directional conveyor systems 2388. A multi-directional conveyor system 2388 moves the packaged articles 2312 (FIGS. 23E-23G) between the first and second aisles 2381A and 2381B. The conveyor belt systems 2387 are similar to the conveyor belt system 2287 discussed in relation to FIG. 22D and move the packaged articles 2312 in a first direction 2389A or a second direction 2389B. The multi-directional conveyor systems 2388 are similar to the multi-directional conveyor systems 2288 discussed in relation to FIG. 22D and include a first plurality of motorized wheels 2383A that rotate in the first direction 2389A and a second plurality of wheels 2383B that rotate in the second direction 2389B. The multi-directional conveyor systems 2388 are used to transfer the packaged articles 2312 to and from the conveyor belt systems 2387 and to convert a motion of the packaged articles 2312 between the first direction 2389A and the second direction 2389B. The first direction 2389A is orthogonal to the second direction 2389B. The dispenser portions are used to receive or dispense the packaged articles 2312.

FIG. 23D is a flow diagram that illustrates a method 2398 for moving the packaged articles 2312 through a shelving unit 2380A, according to embodiments described herein. FIGS. 23E-23G schematically illustrate a cross-sectional view of the packaged articles 2312 at different operations 2399 of the method 2398 depicted in FIG. 23D, according to some embodiments. Therefore, FIG. 23D and FIGS. 23E-23G are herein described together for clarity.

The method 2398 shown in FIG. 23D begins at operation 2399A by moving a first packaged article 2318A from a first position 2319A through a first opening 2385A formed by the shelving unit 2380. FIG. 23E depicts the operation 2399A and shows the multi-directional conveyor system 2388 moving the first packaged article 2318A in the first direction 2389A (and towards the motion system 2340 as discussed in relation to FIG. 23B) by rotating only the first plurality of motorized wheels 2383A. The first position 2319A is adjacent to the first opening 2385A and at the dispenser portion 2384 at the first end of the row 2322 (FIG. 23C).

The method 2398 shown in FIG. 23D continues to operation 2399B with retrieving the first packaged article 2318A using the carrier 2350 of the motion system 2340. Although discussed in relation to the shelving unit 2320A, FIG. 23B depicts an example of the operation 2399B and shows the motion system 2340 retrieving the packaged article 2312. The motion system 2340 may similarly retrieve the first packaged article 2318A from the shelving unit 2380A discussed in relation to FIG. 23E.

The method 2398 shown in FIG. 23D continues to operation 2399C with moving remaining packaged articles 2312 in the row 2322 through the first and second aisles 2381A and 2381B and towards the first position 2319A until a second packaged article 2318B is in the first position 2319A. FIG. 23F depicts the operation 2399C and shows the multi-directional conveyor systems 2388 and the conveyor belt systems 2387 (both hidden by the packaged articles 2312)

moving the packaged articles 2312 in the first and second directions 2389A and 2389B towards the first position 2319A. The multi-directional conveyor system 2388 moves the second packaged article 23188 to the first position 2319A by rotating only the second plurality of motorized wheels 2383B. The second packaged article 2318B is shown in the first position 2319A adjacent to the first opening 2382A.

The method 2398 shown in FIG. 23D continues to operation 2399D with inserting a third packaged article 2318C into a second opening 2385B formed by the shelving unit 2380. The second opening 2385B may be adjacent to the first opening 2385A. FIG. 23G depicts the operation 2399D and shows the third packaged article 2318C moving through the second opening 2385B. The motion system 2340 (not shown) may insert the third packaged article 2318C into the second opening 2385B such that the third packaged article 2318C at least partially rests on the multi-directional conveyor system 2388. The multi-directional conveyor system 2388 moves the third packaged article 2318C in the first direction 2389A (and away from the motion system 2340) by rotating only the first plurality of motorized wheels 2383A.

The method 2398 shown in FIG. 23D continues to operation 2399E by moving the third packaged article 2318C to a second position 23198. The second position 23198 is adjacent to the second opening 2385B. Although not expressly shown in FIG. 23G, the third packaged article 2318C is positioned in the second position 2319B adjacent to the second opening 2385B similar to how the second packaged article 2318B is positioned in the first position 2319A in FIG. 23F. The second position 2319B is at the dispenser portion 2384 at the second end of the row 2322 (FIG. 23C).

The method 2398 may be used to manage an inventory of packaged articles 2312 in the shelving unit 2380 in a similar manner as the method 2298 discussed in relation to FIGS. 22G-22I. The method 2398 may be used to sort through packaged articles 2312 having different characteristics to select a packaged article 2312 for personalization.

In some embodiments, the third packaged article 2318C is the first packaged article 2318A.

In some embodiments, the first packaged article 2318A has different characteristics than the second packaged article 2318B, the remaining packaged articles 2312 in the row 2322 have at least two different characteristics, and the packaged articles 2312 and/or 2318B are moved from the first position to the second position until a packaged article 2312 having desired characteristics is positioned in the first position.

Some embodiments further include personalizing the packaged article 2312 having desired characteristics using the plurality of system components 2360 of an article personalization system 2306. In such embodiments, the system components comprise the article preparation system 2360A, the DTG printer 2360B, and the curing system 2360C.

Some embodiments further include personalizing the first packaged article 2318A using the plurality of system components 2360 of an article personalization system 2306. In such embodiments, the system components 2360 comprise the article preparation system 2360A, the DTG printer 2360B, and the curing system 2360C and the packaged articles 2312 each comprise a packaging and an article.

Some embodiments further include removing an article of the first packaged article 2318A from a packaging of the first packaged article 2318A. In such embodiments, the third packaged article 2318C is the packaging of the first packaged article 2318A.

The shelving unit 2380 discussed in relation to FIGS. 23C-23G is an embodiment of a shelving unit that may be part of the shelving system 2320. A mirrored-version of the shelving unit 2380 may also be used by the shelving system 2320. The mirrored-version of the shelving unit 2380 is similar to the shelving unit 2380 in the same manner as the shelving unit 2320B is similar to the shelving unit 2320A. For example, the mirrored-version of the shelving unit 2380 contains the same disclosed features as the shelving unit 2380, except the features are mirrored from what is shown in FIGS. 23C and 23E-23G.

Garment Personalization Kiosk with Pneumatic Retrieval System

Figure 24A:
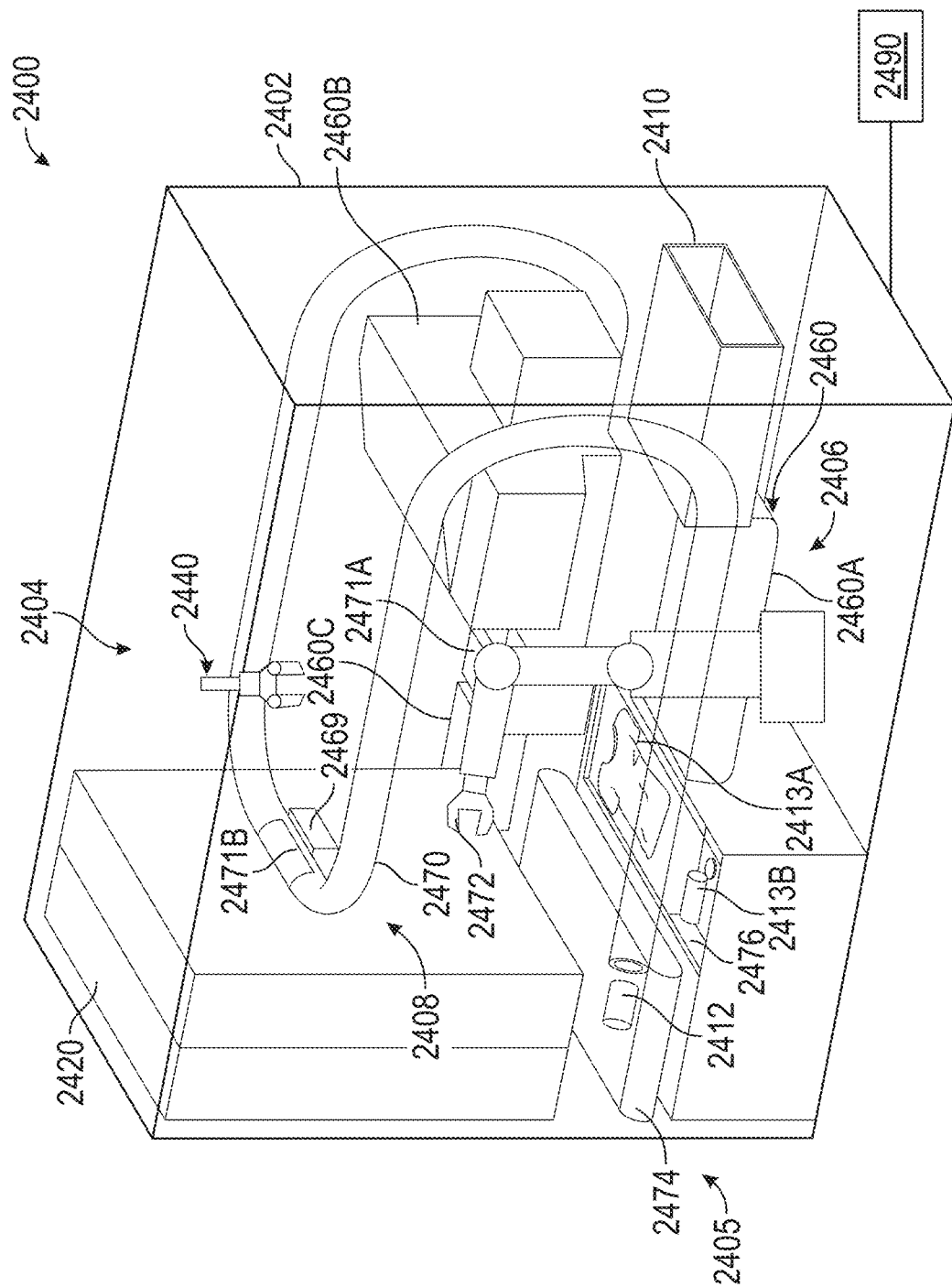
FIG. 24A depicts a trimetric view of an on-demand personalization kiosk, according to some embodiments.

FIG. 24A depicts a trimetric view of an on-demand personalization kiosk 2400, according to some embodiments.

The on-demand personalization kiosk 2400 (referred to as the kiosk 2400) is similar to the kiosks discussed in relation to previous figures, except as noted. For example, the kiosk 2400 includes a housing 2402. Disposed within the housing 2402 are an article retrieval system 2404, an article unpacking system 2405, an article personalization system 2406, and a transfer system 2408. The kiosk 2400 further includes a dispenser 2410 and a control system 2490.

The article retrieval system 2404 includes a shelving system 2420 and a motion system 2440 to house and to retrieve a plurality of packaged articles 2412 to be personalized by the kiosk 2400. The packaged articles 2412 are the packaged article 805P discussed in relation to FIG. 15, although the kiosk 2400 may be configured to use packaged articles having the container 840 and other packaging and articles discussed herein, such as the packaging 601 and the article 605 discussed in relation to FIGS. 10 and 11, such as the packaging 901 and the article 905 discussed in relation to FIGS. 16-18. The shelving system 2420 may be a rotatable shelving system 2421 as discussed in relation to FIGS. 24B and 24C, or a rotatable shelving system 2425 as discussed in relation to FIG. 24F. The motion system 2440 is coupled to the housing 2402, such as to a ceiling of the housing 2402, and is discussed in relation to FIGS. 24D and 24E.

The article personalization system 2406 is similar to the article personalization system 2206 discussed in relation to FIG. 22A, except as noted. The article personalization system 2406 includes a plurality of system components 2460 such as an article preparation system 2460A, a DTG printer 2460B, and a curing system 2460C. The system components 2460 are positioned and oriented within reach of a transfer system 2408, which transfers the packaged articles 2412 between the system components 2460. The system components 2460 depicted in FIG. 24A are for illustrative purposes and the actual system components 2460 may have any shape, such as previously discussed in relation to the system components 2160 in FIG. 21A.

The transfer system 2408 includes a pneumatic tube 2470 having a propulsion source 2471A and a hatch 2471B, and further includes a robotic arm 2472. The hatch 2471B is opened and closed to remove or insert the packaged articles 2412 and to seal the pneumatic tube 2470. The pneumatic tube 2470 is supported by a tube support 2469 coupled to the shelving system 2420, and in some embodiments, may be coupled to the housing 2402. The motion system 2440 delivers a packaged article 2412 of the packaged articles 2412 to the pneumatic tube 2470. The pneumatic tube 2470 uses the propulsion source 2471A, such as a vacuum pump and/or a compressed air supply, to transport the packaged article 2412 to the article unpacking system 2405.

The article unpacking system 2405 includes a receiving station 2474 and an unpacking station 2476. The receiving station 2474 receives the packaged article 2412 from the pneumatic tube 2470. The unpacking station 2476 removes articles and packaging from tubes 2413B (the articles and packaging are referred to as unpackaged articles 2413A once removed from the tube 2413B) and prepares the unpackaged articles 2413A for processing by the article personalization system 2406. For example, the unpacking station 2476 unrolls the unpackaged article 2413A using a robotic arm, a gripper, and a gravitational force. In some embodiments, the unpacking station 2476 includes a platform or table and unrolls the unpackaged article 2413A by placing it on the platform or table and pushing it with a robotic arm. In some embodiments, the unpacking station 2476 may use a roller or pinch rollers to unroll the unpackaged article 2413A. In the depicted embodiment, the tubes 2413B are the container 840 discussed in relation to FIGS. 13-15. The robotic arm 2472 transports the unpackaged articles 2413A from the receiving station 2474 and between the system components 2460, such as from the receiving station 2474 to the article preparation system 2460A, such as between article preparation system 2460A, the DTG printer 2460B, and the curing system 2460C, such as from the system components 2460 to the dispenser 2410. In some embodiments, the robotic arm 2472 positions the packaged articles 2412 on the system components 2460. In the depicted embodiment, the unpackaged article 2413A includes the packaging 801 and the article 805 discussed in relation to FIGS. 13-15. In some embodiments, such as where the packaged article 2412 is the packaged article 805P (FIG. 15), the robotic arm 2472 grasps the hanger 810 and/or the bottom support member 850 of the unpackaged article 2413A to transport the unpackaged article 2413A.

The control system 2490 controls the kiosk 2400, similar to the control system 2190 discussed in relation to FIG. 21A.

The kiosk 2400 differs from non-kiosk personalization systems in a similar manner as the kiosk 2100 discussed in relation to the top-front-right view of FIG. 21A and the top-left-rear view of 21B.

In some embodiments, the receiving station 2474 comprises the unpacking station 2476. In some embodiments, the receiving station 2474 includes a conveyor system, such as a conveyor belt or a lift. The conveyor system allows the receiving station 2474 to deliver the packaged articles 2412 to the unpacking station 2476. In some embodiments, the conveyor system delivers the unpackaged articles 2413A to the transfer system 2408 and/or the system components 2460. In some embodiments, the article unpacking system 2405 comprises a robotic arm or grippers for unpacking the article and moving the unpackaged article 2413A.

In some embodiments, the transfer system 2408 comprises the motion system 2440. In such embodiments, there is no robotic arm 2472 and the motion system 2440 moves the unpackaged articles 2413A between the system components 2460. In some embodiments, the receiving station 2474 is a conveyor system, such as the conveyor belt system 2287 or the multi-directional conveyor system 2288 discussed in relation to FIGS. 22D-22E and 22G-22I. In some embodiments, the shelving system 2420 dispenses the packaged articles 2412 to the conveyor system by dropping the packaged articles 2412 on the conveyor system. The conveyor system moves the packaged articles 2412 to the pneumatic tube 2470 to be transported to the hatch 2471B.

The motion system 2440 unpacks the packaged articles 2412 and moves the unpackaged articles 2413A between the system components 2460.

In some embodiments, the pneumatic tube 2470 moves the tubes 2413B to a storage system (not shown) to be later evaluated by an operator. In some embodiments, the pneumatic tube 2470 may be used to move the packaged article 2412 between the system components 2460. In such embodiments, a robotic arm or grippers may be used at each outlet of the pneumatic tube 2470 to unpack the article and move the unpackaged article 2413A to the system components 2460. In some embodiments, the article unpacking system 2405 is disposed at each outlet of the pneumatic tube 2470. In some embodiments, the article unpacking system 2405 further comprises an article repacking system to repack the unpackaged article 2413A into the tube 2413B.

FIG. 24B-24C depict side and front views of the rotatable shelving system 2421, according to some embodiments.

The rotatable shelving system 2421 (referred to as shelving system 2421) includes a casing 2422, a plurality of rotatable carousels 2424 of packaged articles 2412, and a motorized system 2426. The casing 2422 is not shown in FIG. 24C for simplicity. The rotatable carousels 2424 are disposed inside the casing 2422 and include a chain 2427, although in some embodiments a belt or cable may be used. The motorized system 2426 moves the rotatable carousels 2424 and includes a motorized gear 2426A and an idler gear 2426B, although in some embodiments, a motorized pulley and an idler pulley may be used. The motorized gear 2426A moves the chain 2427, which in turn moves the rotatable carousels 2424, which in turn move the plurality of packaged articles 2412 to the motion system 2440 when the motion system 2440 retrieves the packaged articles 2412, as discussed in relation to FIGS. 24D and 24E.

A shelving actuation system 2428 moves each rotatable carousel 2424 of the rotatable carousels 2424 independently of another, which beneficially allows the control system 2490 to queue packaged articles 2412 into each rotatable carousel 2424. In some embodiments, the rotatable carousels 2424 move together and not independently of another.

Figure 24D:
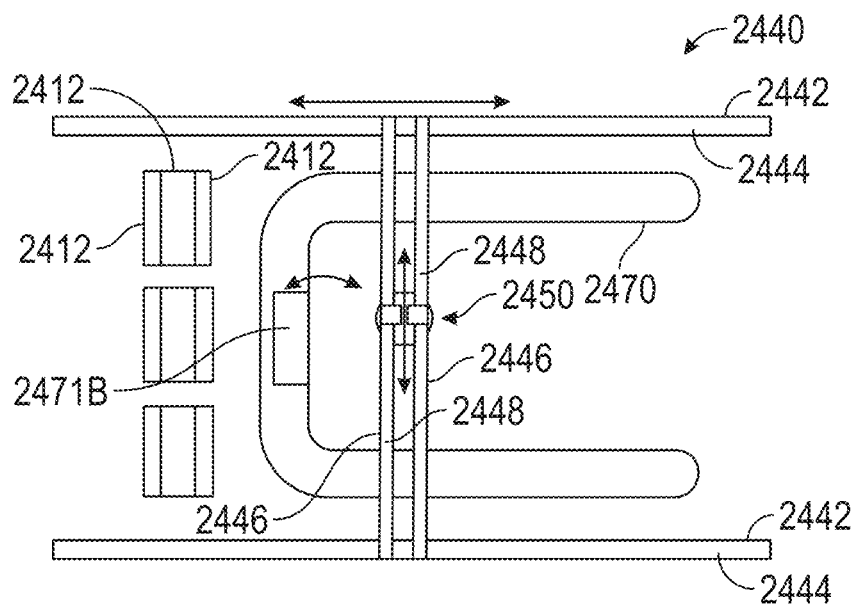
FIGS. 24D and 24E depict overhead and front views of a motion system, according to some embodiments.
Figure 24E:
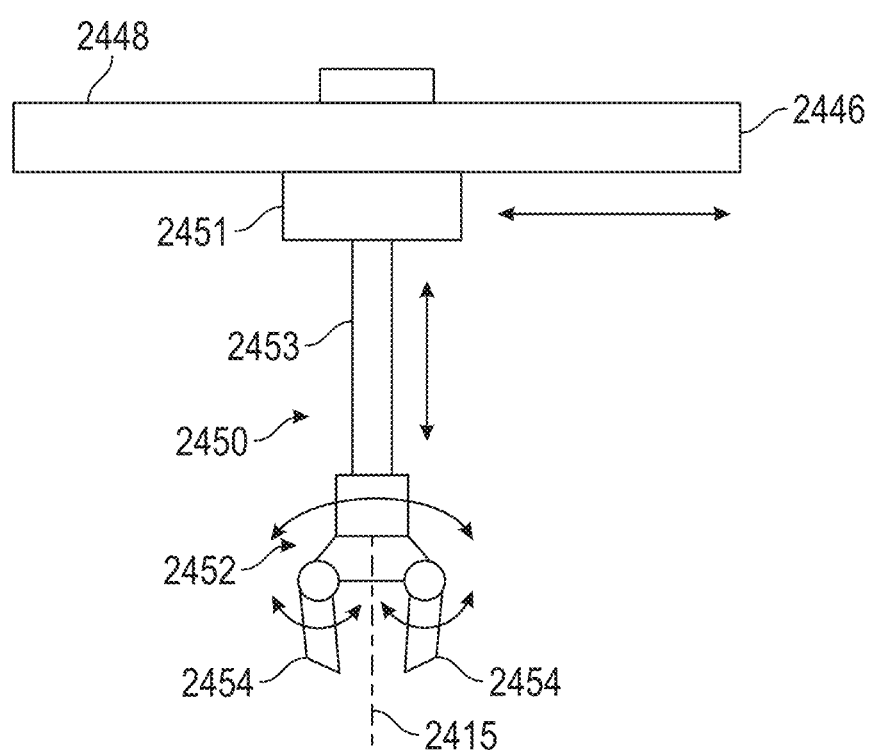

FIGS. 24D and 24E depict overhead and front views of the motion system 2440, according to some embodiments.

The motion system 2440 includes a pair of guide rail members 2442 having a first track 2444, a pair of positioning rail members 2446 having a second track 2448, and a carrier 2450, which is used to grasp the packaged articles 2412. The rail members 2442 and 2446 may be a shaft, a rail, a bar, a beam, a tube, a column, a pillar, and the like. The tracks 2444 and 2448 may be a groove in or an extension on the rail members 2442 and 2446, respectively. For example, the first track 2444 may be a rack gear, an I-beam or cutouts of an I-beam. In some embodiments, the guide rail members 2442 forms a first channel within that runs a length of the guide rail members 2442 and the first track 2444 is a second channel extending from the first channel through an outer surface of the guide rail members 2442.

The carrier 2450 includes a carriage 2451, a gripper 2452, and an extendable (or telescoping) member 2453 that connects the gripper 2452 to the carriage 2451. The carrier 2450 is positioned near the packaged articles 2412 by moving the positioning rail members 2446 on the first track 2444 and the carrier 2450 on the second track 2448 via the carriage 2451. The gripper 2452 is positioned near or adjacent to the packaged articles 2412 via the extendable member 2453. The gripper 2452 includes articulable members 2454 that rotate to grasp the packaged articles 2412. In some embodiments, the articulable members 2454 move toward and away from another, similar to the movement of the carrier 2350 discussed in relation to FIG. 23A. The gripper 2452 is rotatably coupled to the carriage 2451, such as through a joint and/or an actuation system, and rotates about an axis 2415. In some embodiments, only one positioning rail member 2446 is used. In some embodiments, the extendable members 2453 may include nested rails, bars, tubes, beams, and the like. In some embodiments, the extendable members 2453 may be similar to the telescoping members 2130 discussed in relation to FIG. 21D-21G or the retrieval member 2246 discussed in relation to FIG. 22A.

The guide rail members 2442 are in a substantially parallel relationship. The positioning rail members 2446 are in a substantially parallel relationship and are orthogonal to the guide rail members 2442. The motion system 2440 includes several actuation systems (not shown) to move the positioning rail members 2446 on the first track 2444, move the carrier 2450 on the second track 2448, move the extendable member 2453 in a direction orthogonal to the rail members 2442 and 2446, rotate the gripper 2452 about an axis 2415, and move the articulable members 2454. The actuation systems may be similar to those discussed in relation to FIGS. 21K-21P.

Figure 24F:
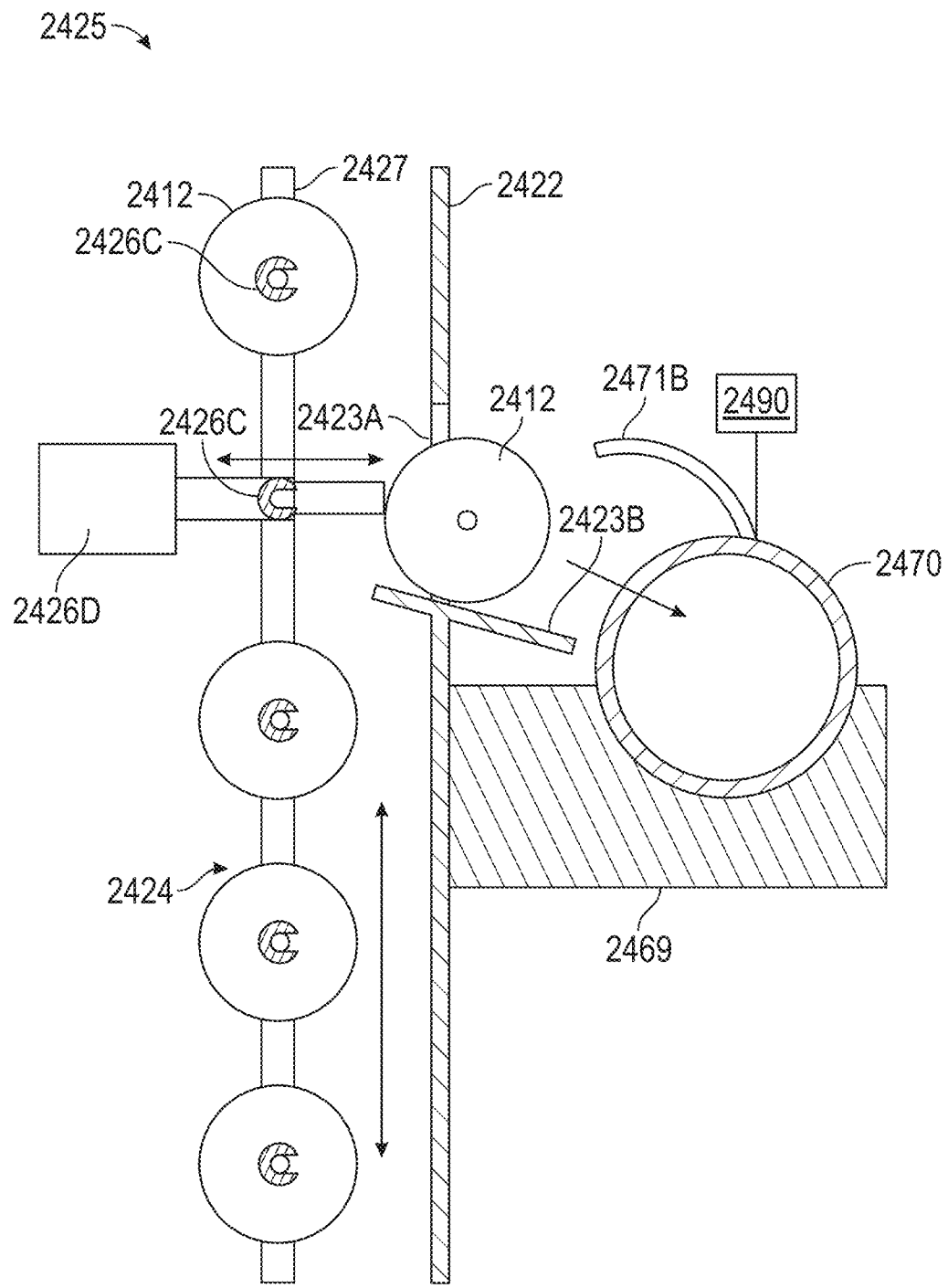
FIG. 24F depicts a cross-sectional side view of a rotatable shelving system, according to some embodiments.

FIG. 24F depicts a cross-sectional side view of a rotatable shelving system 2425, according to some embodiments. The rotatable shelving system 2425 (referred to as shelving system 2425) is similar to the shelving system 2421, except as noted, and may used with, or instead of the rotatable shelving systems 2420 and/or 2421.

The packaged articles 2412 are removably coupled to the chain 2427 though a friction-fit coupling 2426C. The friction-fit coupling 2426C forms a C-shaped notch that engages a feature of the packaged articles 2412 using an interference fit. The motorized system 2426 further includes a de-coupling actuator 2426D to de-couple the packaged articles 2412 from the coupling 2426C. For example, rotation of the rotatable carousel 2424 is stopped at a desired packaged article 2412. The de-coupling actuator 2426D pushes the desired packaged article 2412 to remove it from the coupling 2426C. The casing 2422 forms an opening 2423A and includes a chute 2423B. The de-coupling actuator 2426D pushes the desired packaged article 2412 through the opening 2423A and to the chute 2423B, which guides the desired packaged article 2412 to the pneumatic tube 2470. The pneumatic tube 2470 receives the desired packaged article 2412 through a hatch 2471B. The control system 2490 opens and closes the hatch 2471B to seal the pneumatic tube 2470. In some embodiments, such as depicted in FIG. 24A, the packaged article 2412 may form the seal with the pneumatic tube 2470.

In some embodiments, the C-shaped notch of the coupling 2426C does not use an interference fit to engage the packaged articles 2412. For example, the C-shaped notch may be larger than the feature of the packaged articles 2412 and gravity may retain the feature in the C-shaped notch. In some embodiments, the coupling 2426C couples to the packaged articles 2412 using a magnet that engages a magnet of the packaged articles 2412.

In some embodiments, the shelving system 2425 is used without the motion system 2440. In some embodiments, the chute 2423B of the shelving system 2425 comprises a lip to hold the packaged articles 2412 in place for the motion system 2440 to grasp. In some embodiments, the transfer system 2408 comprises the motion system 2440 and there is no robotic arm 2472. In some embodiments, there is no motion system 2440.

Garment Personalization Kiosk with Storage Rail Retrieval System

Figure 25A:
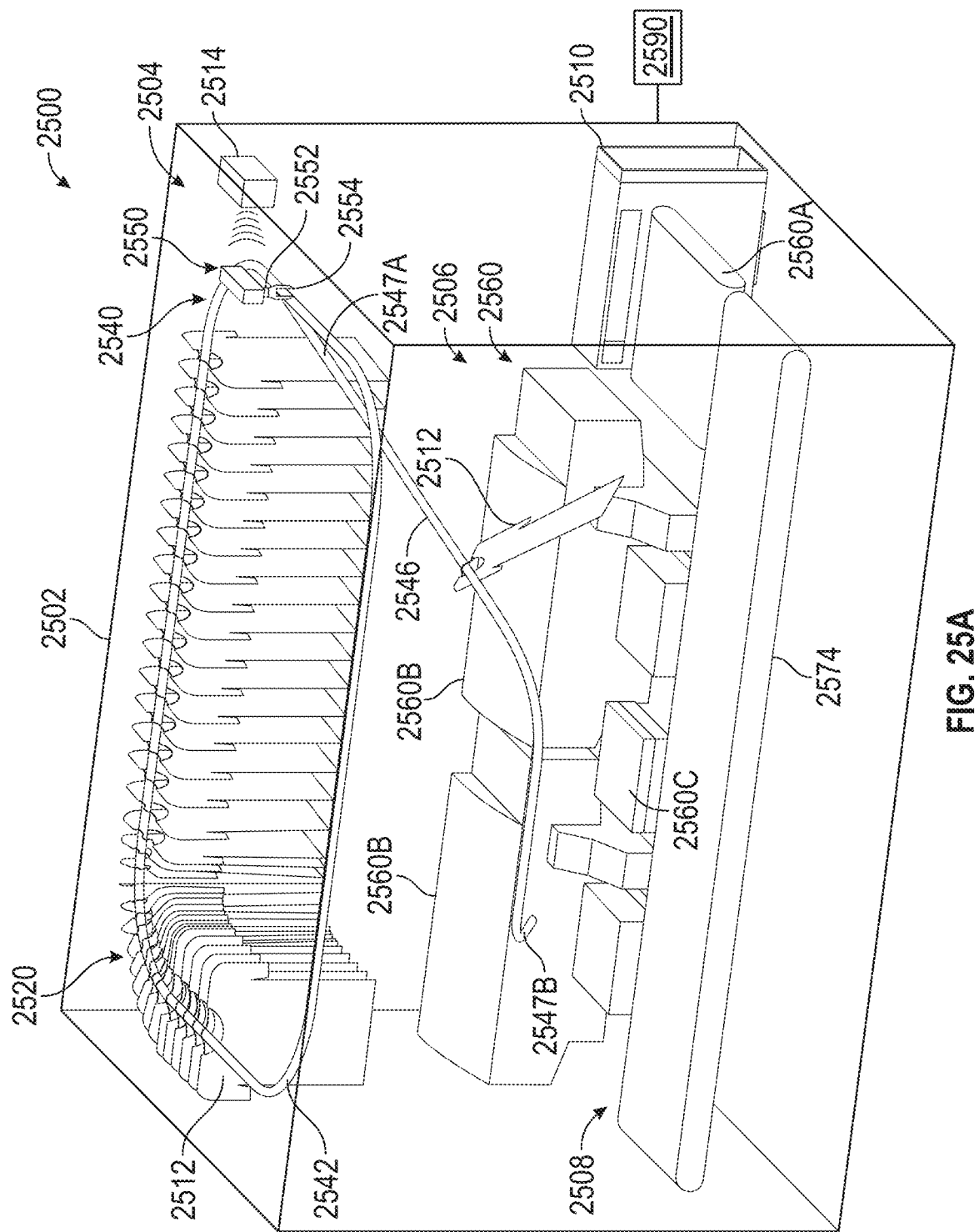
FIG. 25A depicts a trimetric view of an on-demand personalization kiosk, according to some embodiments.

FIG. 25A depicts a trimetric view of an on-demand personalization kiosk 2500, according to some embodiments.

The on-demand personalization kiosk 2500 (referred to as the kiosk 2500) is similar to the kiosks discussed in relation to previous figures, except as noted. For example, the kiosk 2500 includes a housing 2502. Disposed within the housing 2502 are an article retrieval system 2504, an article personalization system 2506, and a transfer system 2508. The kiosk 2500 further includes a dispenser 2510 and a control system 2590. The transfer system 2508 is not fully shown in FIG. 25A for simplicity, and is discussed in relation to FIGS. 25H and 25I.

The article retrieval system 2504 includes a shelving system 2520 to house and to retrieve a plurality of packaged articles 2512 to be personalized by the kiosk 2500, a motion system 2540 to retrieve the packaged articles 2512, and a sensor 2514 to identify each packaged article 2512 of the packaged articles 2512. The packaged articles 2512 include the packaging 1001 and article 1005 discussed in relation to FIGS. 19 and 20, although the kiosk 2500 may be configured to use packaged articles having other packaging and articles discussed herein, such as the packaging 601 and the article 605 discussed in relation to FIG. 10, such as the packaging 701 and the article 705 discussed in relation to FIGS. 12A and 12B, such as the packaging 801 and the article 805 discussed in relation to FIG. 13, such as the packaging 901 and the article 905 discussed in relation to FIGS. 16-18. The shelving system 2520 includes a storage rail 2542 forming a channel 2544 (shown in FIGS. 25B and 25C) and a delivery rail 2546 having a first end 2547A and a second end 2547B. The first end 2547A is positioned near the storage rail 2542 and the second end 2547B is positioned near the transfer system 2508. The rails 2542 and 2546 may include a shaft, a rail, a tube, a beam, and the like. The storage rail 2542 stores the packaged articles 2512 that are to be personalized by the article personalization system 2506. The delivery rail 2546 moves the packaged articles 2512 from the storage rail 2542 to a transfer system 2508 to be personalized. The shelving system 2520 is coupled to the housing 2502, such as to a floor, platform, ceiling, or side of the housing 2502. For example, the rails 2542 and 2546 may couple to the housing through a post, bracket, or a fixture.

Figure 25B:
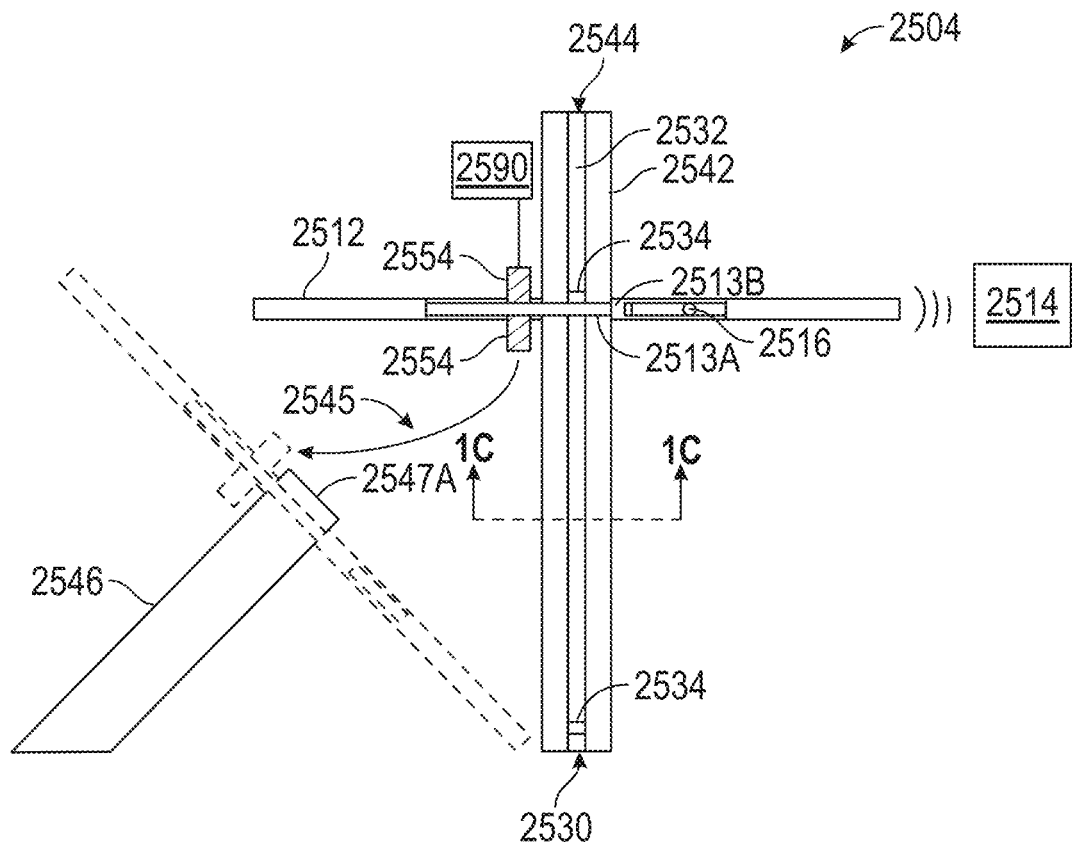
FIGS. 25B and 25C depict top and front views of an article retrieval system, according to some embodiments.
Figure 25C:
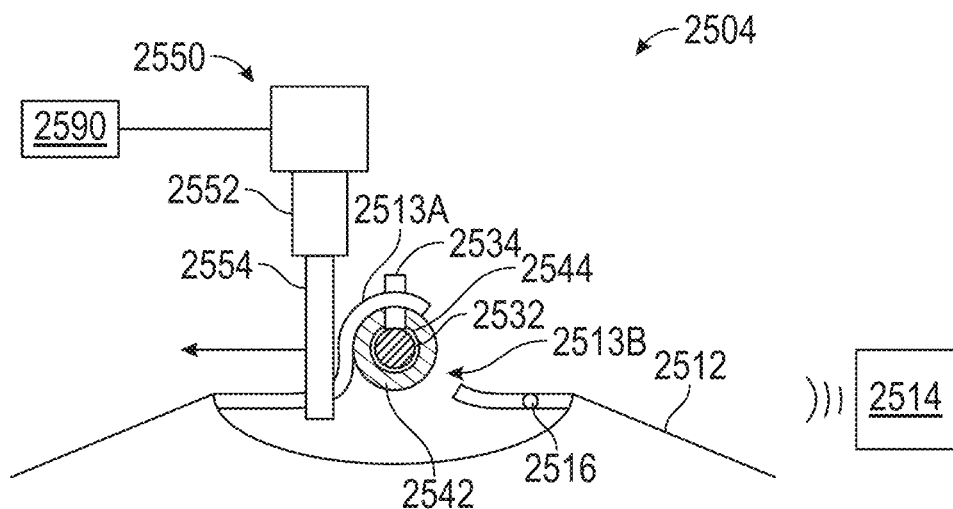

The motion system 2540 is partially disposed within the shelving system 2520, such as within the channel 2544 of the storage rail 2546, and moves the packaged articles 2512 around the storage rail 2542, as discussed in relation to FIG. 25C. The motion system 2540 includes a carrier 2550 to move the packaged articles 2512 from the storage rail 2542 to the delivery rail 2546. The carrier 2550 includes a gripper 2552 to grasp the packaged articles 2512 before moving the packaged articles 2512. The gripper 2552 includes articulable members 2554 that move to grasp the packaged articles 2512. The articulable members 2554 may be a shaft, a rail, a bar, a beam, a tube, an arm, and the like. In some embodiments, the articulable members 2554 may be similar to the articulable members 2354 discussed in relation to FIG. 23A. In some embodiments, the articulable members 2554 may be similar to the articulable members 2454 discussed in relation to FIGS. 24D and 24E. The carrier 2550 is positioned near, adjacent to, or above a location where the delivery rail 2546 is closest to the storage rail 2542. The motion system 2540 is further discussed in relation to FIGS. 25C and 25D.

The article personalization system 2506 is similar to the article personalization system 2206 discussed in relation to FIG. 22A, except as noted. The article personalization system 2506 includes a plurality of system components 2560 such as an article preparation system 2560A, DTG printers 2560B, and a curing system 2560C. The system components 2560 depicted in FIG. 25A are for illustrative purposes and the actual system components 2560 may have any shape, such as previously discussed in relation to the system components 2160 in FIG. 21A. The system components 2560 are positioned and oriented within reach of the transfer system 2508. The transfer system 2508 transfers the packaged articles 2512 between the system components 2560. The transfer system 2508 includes a receiving station 2574 to receive the packaged articles 2512 from the delivery rail 2546.

The control system 2590 controls the kiosk 2500, similar to the control system 2190 discussed in relation to FIG. 21A. The control system 2590 uses the sensor 2514 to control the carrier 2550, such as to selectively move a to-be-personalized packaged article 2512 from the storage rail 2542 to the delivery rail 2546. For example, the packaged articles 2512 include an identification feature 2516, such as a bar code, QR code, near field communication (NFC) tag, radio frequency identification (RFID) tag, and the like, to identify characteristics of the packaged article 2512. If the packaged article is a t-shirt, than the characteristics may include shirt size, color, shirt type (e.g., long sleeve, short sleeve, v-neck, collared, polo, etc.), material type (e.g., cotton or a blend of cotton and other materials such as polyester and/or rayon, bamboo, hemp, etc.), shirt fit (e.g., fitted, modern fit, big and tall, etc.), and the like. The sensor 2514 is a non-contact sensor and scans or reads the packaged articles 2512 to determine the characteristics of each article. The control system 2590 uses the characteristics to choose an article to personalize based on an order from a user. The sensor may couple to the housing 2502, such as through a bracket or a fixture.

The kiosk 2500 differs from non-kiosk personalization systems in a similar manner as the kiosk 2100 discussed in relation to the top-front-right view of FIG. 21A and the top-left-rear view of 21B.

In some embodiments, the control system 2590 may reference a database to determine the characteristics of the packaged articles 2512. In some embodiments, the characteristics may be contained within the identification feature 2516.

In some embodiments, the kiosk 2500 may include more than one of any of the system components 2560. In some embodiments, the system components 2560 include only one DTG printer 2560B.

In some embodiments, the article retrieval system 2504 includes an overhead conveyor. In some embodiments, the article retrieval system 2504 includes a round track conveyor. In some embodiments, the article retrieval system 2504 includes a cross-track conveyor. In some embodiments, the article retrieval system 2504 includes an I-beam trolley conveyor. In some embodiments, the article retrieval system 2504 includes an asynchronous conveyor, such as a power and free conveyor or a friction-driven conveyor. In some embodiments, the article retrieval system 2504 includes a garment conveyor.

FIGS. 25B and 25C depict top and front views of the article retrieval system 2504, according to some embodiments. In particular, FIG. 25B shows a top view of the carrier 2550 moving a packaged article 2512 from the storage rail 2542 to the delivery rail 2546.

The motion system 2540 further includes a drive system 2530 to move the packaged articles 2512 around the storage rail 2542. The drive system 2530 is disposed in the channel 2544 of the storage rail 2542. In the embodiment depicted in FIG. 25B, the drive system 2530 includes a plurality of translation members 2534 coupled to a cable 2532 that protrude outward from the storage rail 2542. The translation members 2534 may be a shaft, a rail, a bar, a beam, a tube, a tab, and the like. The translation members 2534 may be welded to, fastened to using fasteners, adhered to, or unitarily formed as part of the cable 2532. An actuation system moves the cable 2532 through the channel 2544, which in turns moves the translation members 2534, which in turn pushes the packaged articles 2512 around the storage rail 2542. For example, a hanger 2513A of the packaged articles 2512 rests on the storage rail 2542 and the translation members 2534 push the hanger 2513A of the packaged article 2512. In some embodiments, the drive system 2530 includes chain or a belt. In the depicted embodiment, the hanger 2513A is the hanger frame 1010 discussed in relation to FIGS. 19 and 20.

The control system 2590 associates the translation members 2534 with the characteristics of the packaged articles 2512 being moved. When an order is placed by a user, the carrier 2550 grasps a packaged article 2512 and moves the packaged article 2512 to the delivery rail 2546. A first gap 2513B formed by the packaged article 2512, such as in the hanger 2513A, allows the carrier 2550 to remove the packaged article 2512 from the storage rail 2542. A second gap 2545 formed between the storage rail 2542 and the first end 2547A of the delivery rail 2546 allows the hanger 2513A of the packaged article 2512 to be placed on the delivery rail 2546. The packaged article 2512 moves down the delivery rail 2546 through gravity, and stops at the second end 2547B (FIG. 25A) of the delivery rail 2546, for example, through a frictional force or a by contacting a mechanical stop such as a protrusion or tab. In some embodiments, the packaged article 2512 does not stop at the second end 2547B and instead falls on the receiving station 2574 (FIG. 25A).

In some embodiments, the hanger 2513A may be the retractable hanger 610 (FIG. 10), the stiffener 710 (FIGS. 12A and 12B), the hanger 810 (FIG. 13), or the hanger 910 (FIGS. 16-18). In embodiments where the hanger 2513A is the hanger 810 or the hanger 910, the motion system 2540 includes a gripper (e.g., a pincher having prongs or articulable members to hold the hanger 2513A, or a hook that penetrates the hanger 2513A), there is no delivery rail 2546 rail, and a robotic arm (e.g., the robotic arm 2572A or 2572B) is used to remove the hanger 2513A from the motion system 2540.

FIG. 25C shows a front view of the carrier 2550 moving a packaged article 2512 from the storage rail 2542, as discussed in relation to FIG. 25B.

FIGS. 25D and 25E depict a top view of the article retrieval system 2504, according to some embodiments. In the depicted embodiment, a storage rail 2562 is used instead of the storage rail 2542. The storage rail 2562 includes a first rail 2564 and a second rail 2566. The second rail 2566 is positioned above the first rail 2564. The first rail 2564 is similar to the storage rail 2542 discussed in relation to FIGS. 25B and 25C, and includes a drive system 2565A disposed in a channel 2565B. The drive system 2565A includes a plurality of translation members 2565C coupled to a cable 2565D that protrude outward from the first rail 2564. The cable 2565D is sized to fit inside the channel 2565B and functions similarly to the cable 2532 discussed in relation to FIG. 25C. The second rail 2566 may be a shaft, a rail, a bar, a beam, a tube, and the like.

The packaged articles 2512 are moveably coupled to the second rail 2566, for example, by the hanger 2513A. The drive system 2565A moves the packaged articles 2512 about the second rail 2566 by pushing the packaged articles 2512 using the translation members 2565C. The second rail 2566 includes a rail switch 2567 to move or selectively direct the packaged articles from the storage rail 2562 to the delivery rail 2546. For example, when a packaged article 2512 is positioned on the rail switch 2567, the rail switch 2567 rotates towards the first end 2547A of the delivery rail 2546 and the packaged article 2512 slides onto the delivery rail 2546. The translation members 2565C protrude from the first rail 2564 and are angled towards the delivery rail 2546, which allows the translation members 2565C to maintain contact with the packaged articles 2512 while the rail switch 2567 rotates towards the delivery rail 2546. The control system 2590 uses the sensor 2514 to determine when to rotate the rail switch 2567, similar to how the control system 2590 moves the carrier 2550 as discussed in relation to FIG. 25A.

FIG. 25F depicts a front view of the article retrieval system 25 04 from FIG. 25D, according to some embodiments. In particular, FIG. 25F shows a front view of rail switch 2567 moving the packaged article 2512 from the storage rail 2562, as discussed in relation to FIGS. 25B and 25C.

FIG. 25G depicts a side view of the transfer system 2508 of the kiosk 2500, according to some embodiments.

In the depicted embodiment, the transfer system 2508 includes a robotic arm 2572A moveably coupled to the receiving station 2574. The robotic arm 2572A is slidably mounted to the receiving station 2574 and moves the packaged articles 2512 between the receiving station 2574 and the system components 2560 and between the system components 2560. For example, the robotic arm 2572A is coupled to a rail of the receiving station 2574 and moves along a track of the rail, such as the rails and tracks discussed in relation to previous figures. The robotic arm 2572A also delivers the packaged articles 2512 to the dispenser 2510 after personalization. The track runs a length (L) of the receiving station 2574. An actuation system, such as one of the actuation systems discussed in relation to previous figures, moves the robotic arm along the track. In some embodiments, the robotic arm 2572A is similar to the robotic arm 2472 discussed in relation to FIG. 24A.

Figure 25H:
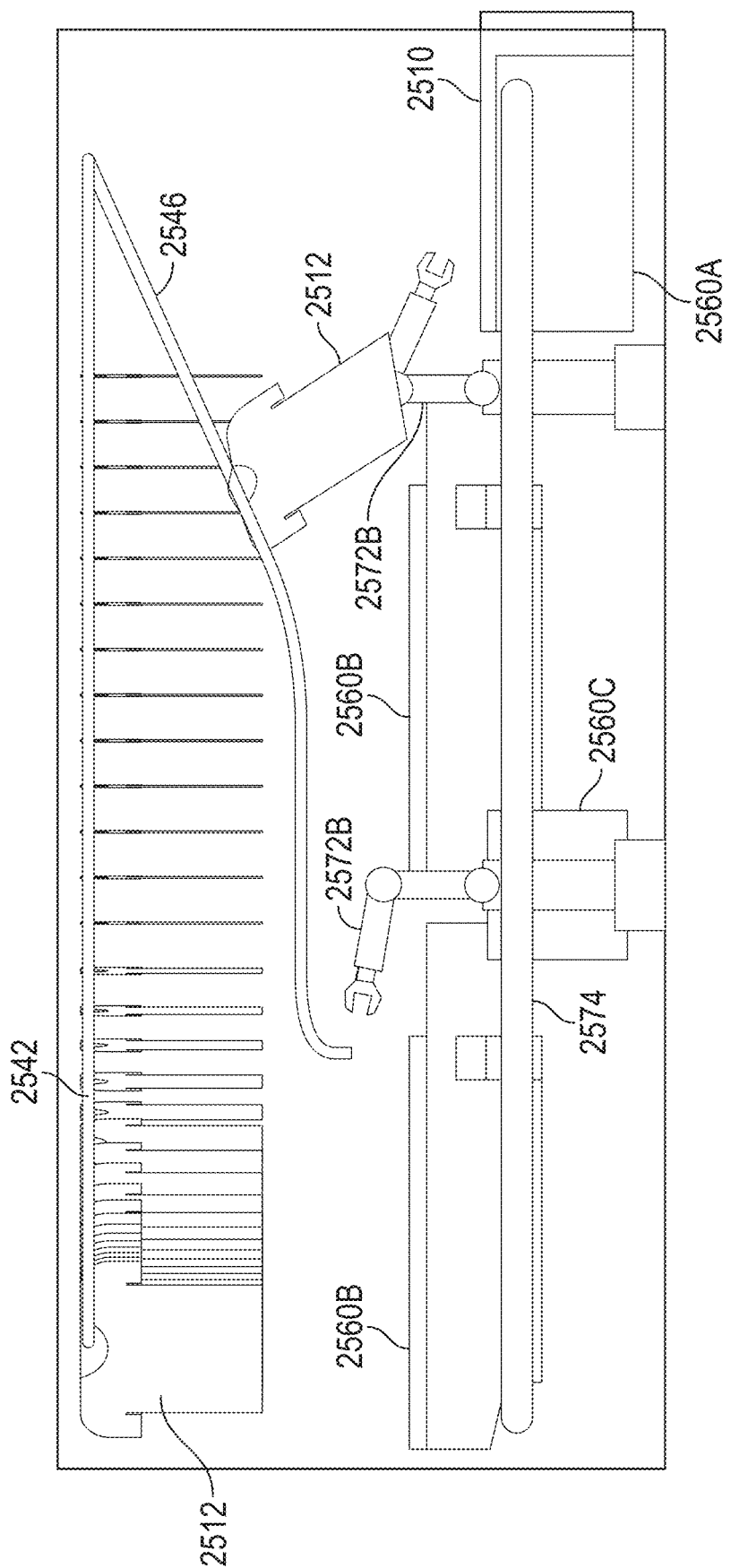
FIG. 25H depicts a side view of a transfer system of an on-demand personalization kiosk, according to some embodiments.

FIG. 25H depicts a side view of the transfer system 2508 of the kiosk 2500, according to some embodiments.

In the depicted embodiment, the transfer system 2508 includes at least two of robotic arms 2572B to move the packaged articles 2512 between the receiving station 2574 and the system components 2560 and between the system components 2560. The robotic arms 2572B are coupled to the housing 2502, such as to a floor, platform, sidewall, or a ceiling of the housing 2502. Each of the robotic arms 2572B are positioned such that the robotic arms 2572B collectively access all of the system components 2560 and the dispenser 2510. In some embodiments, the each robotic arm 2572B is similar to the robotic arm 2472 discussed in relation to FIG. 24A.

In some embodiments, the receiving station 2574 includes a conveyor system, such as a conveyor belt or a lift. The conveyor system allows the receiving station 2574 to deliver the packaged articles 2512 to the robotic arms 2572B. In some embodiments, such as the embodiment discussed in relation to FIG. 25G, the conveyor system may move the robotic arm 2572A along the length of the receiving station 2574.

Garment Personalization Kiosk with Automaton Retrieval System

Figure 26A:
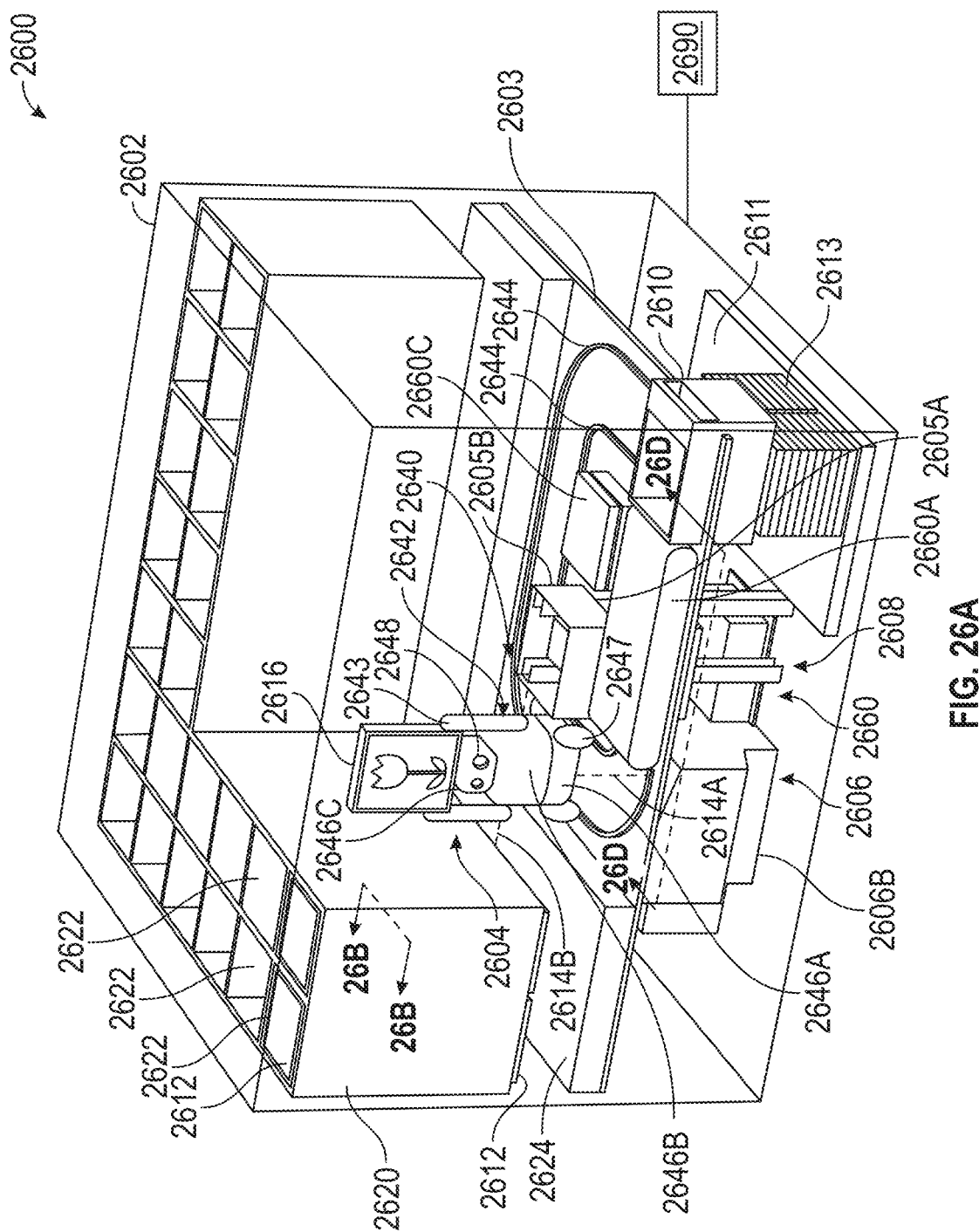
FIG. 26A depicts a trimetric view of an on-demand personalization kiosk, according to some embodiments.

FIG. 26A depicts a trimetric view of an on-demand personalization kiosk 2600, according to some embodiments.

The on-demand personalization kiosk 2600 (referred to as the kiosk 2600) is similar to the kiosks discussed in relation to previous figures, except as noted. For example, the kiosk 2600 includes a housing 2602. Disposed within the housing 2602 are an article retrieval system 2604, an article personalization system 2606, and a transfer system 2608. The kiosk 2600 further includes a dispenser 2610 and a control system 2690.

The article retrieval system 2604 includes a shelving system 2620 and a motion system 2640 to house and to retrieve a plurality of packaged articles 2612 to be personalized by the kiosk 2600. The packaged articles 2612 include the packaging 101 and article 105 discussed in relation to FIGS. 2-4, although the kiosk 2600 may be configured to use packaged articles having other packaging and articles discussed herein, such as the packaging 201 and the article 205 discussed in relation to FIGS. 5A and 5B, such as the packaging 301 and the article 305 discussed in relation to FIGS. 6 and 7, such as the packaging 401 and article 405 discussed in relation to FIGS. 8A and 8B, such as the packaging 501 and article 505 discussed in relation to FIGS. 9A-9C, such as the packaging 701 and article 705 discussed in relation to FIGS. 12A and 12B. The shelving system 2620 includes a plurality of columns 2622 (or compartments) of the packaged articles 2612 and dispenses the packaged articles 2612 onto a receiving station 2624, which is part of the motion system 2640. In the depicted embodiment, the receiving station 2624 includes a table. In some embodiments, the table may be padded. In some embodiments, the receiving station 2624 includes a conveyor system, such as a conveyor belt or a lift. The conveyor system allows the receiving station 2624 to retrieve the packaged articles 2612 from the shelving system 2620 and/or deliver the packaged articles 2612 to the motion system 2640.

The motion system 2640 includes a robot 2642 coupled to a guidance track 2644. The guidance track 2644 is coupled to a platform 2603 of the housing 2602. The robot moves along the guidance track 2644 to retrieve the packaged articles 2612 from the receiving station 2624 and deliver the packaged articles 2612 to the system components 2660. The robot 2642 includes a base 2646A, a body 2646B that rotates in relation to the base 2646A, and a head 2646C that rotates in relation to the body 2646B. The base 2646A, body 2646B, and head 2646C are disposed on a first axis 2614A. Wheels 2647 are coupled to the base 2646A, for example, though an axle or a drive train of a drive system (not shown). The wheels 2647 move the robot 2642 to different locations on the guidance track 2644, such as to retrieve packaged articles 2612 dispensed at different locations on the receiving station 2624. Thus, the guidance track 2644 is adjacent to or borders the receiving station 2624. A drive system (or motor) moves the wheels 2647 on the guidance track 2644. The drive system may be a DC motor, pneumatic motor, hydraulic motor, industrial servo, stepper motor, and the like. The wheels 2647 couple to the guidance track 2644 through a complementary shape. For example, if the guidance track 2644 is an I-beam, the wheel contacts an upper surface and a side surface of a flange of the I-beam. If the guidance track 2644 includes a recess (e.g., a notch or groove), the wheel includes a protrusion to penetrate the recess. If the guidance track 2644 includes a protrusion, the wheel includes a recess to partially surround the protrusion.

Articulable members 2643 are rotatably coupled to the body 2646B. The articulable members 2643 may be a shaft, a rail, a bar, a beam, a tube, an arm, and the like. The body 2646B rotates about the first axis 2614A, which allows the articulable members 2643 move to grasp the packaged articles 2612. For example, the body 2646B rotates to align the articulable members 2643 to a packaged article 2612 on the receiving station 2624. The articulable members 2643 rotate about a second axis 2614B towards the packaged article 2612 and grasp the packaged article 2612 through an interference fit. The second axis 2614B is orthogonal to the first axis 2614A. The articulable members 2643 may also move towards and away from another to grasp the packaged article 2612. In some embodiments, the articulable members 2643 may be similar to the articulable members 2354 discussed in relation to FIG. 23A. In some embodiments, the articulable members 2643 may be similar to the articulable members 2454 discussed in relation to FIGS. 24D and 24E. In some embodiments, the articulable members 2643 may be similar to the articulable members 2554 discussed in relation to FIG. 25A.

The head 2646C includes two eyes 2648. The eyes 2648 contain sensors, such as optical/infrared/ultraviolet cameras, distance/proximity sensors, temperature sensors, motion sensors, color sensors, and the like. The robot 2642 may use the cameras may be used to navigate the guidance track 2644, detect a presence of a packaged article on the receiving station 2624, align the packaged articles 2612 at each of the system components 2660, evaluate a quality of the packaged articles 2612 after processed by a system component 2660, and the like. The robot 2642 may use the distance/proximity sensors to navigate the guidance track 2644, detect a presence of a packaged article on the receiving station 2624, and the like. The robot 2642 may use the temperature and motion sensors to check whether the system components 2660 are finished processing the packaged articles 2612. The robot 2642 may use the color sensors evaluate a quality of the packaged articles 2612 after processed by a system component 2660. In some embodiments, the head is fixed to the body 2646B.

The article personalization system 2606 is similar to the article personalization system 2206 discussed in relation to FIG. 22A, except as noted. The article personalization system 2606 includes a plurality of system components 2660 such as an article preparation system 2660A, DTG printers 2660B, and a curing system 2660C. The system components 2660 depicted in FIG. 26A are for illustrative purposes and the actual system components 2660 may have any shape, such as previously discussed in relation to the system components 2160 in FIG. 21A. The system components 2660 are positioned and oriented within reach of the motion system 2640. For example, the system components 2660 are positioned adjacent to the guidance track 2644. In the embodiments depicted in FIG. 26A, the guidance tracks 2644 start at the article preparation system 2660A, travel around the platform 2603 in a rectangular-shaped pattern, where the curing system 2660C is inside the rectangular, and end at the dispenser 2610. The motion system 2640 transfers the packaged articles 2612 between the system components 2660.

The platform 2603 includes a chute 2605B disposed in an opening 2605A formed by the platform 2603. The chute 2605B provides the robot 2642 access to system components 2660 positioned below the platform 2603. In the embodiment depicted in FIG. 26A, the DTG printer 2660B is positioned below the platform 2603 and the article preparation system 2660A and the curing system 2660C are positioned above and are coupled to the platform 2603. The robot 2642 delivers the packaged articles 2612 to the DTG printer 2660B through the chute 2605B, for example, after the packaged articles 2612 are processed by the article preparation system 2660A. The chute 2605B is further discussed in relation to FIG. 26I.

The dispenser 2610 includes a storage system 2611. The control system 2690 may determine a packaged article 2612 is not of a desired quality and the packaged article 2612 is referred to as a rejected packaged article 2613. The control system 2690 directs the robot 2642 to move the rejected packaged article 2613 to the storage system 2611. The rejected packaged article 2613 may be later evaluated by an operator and recycled, reused, or disposed. In some embodiments, the robot 2642 presents a personalized packaged article 2612 to a user at different stages of the personalization process, such as presenting a personalized packaged article 2616 after the curing system 2660C dries the printed image or design. The packaged article 2612 may be presented through a window in the housing 2602. In some embodiments, the window is a transparent pane of material, such as a glass or a polymer/plastic, disposed in the housing 2602. In some embodiments, the window is an opening formed in the housing 2602. In some embodiments, the window is a viewing pane 4004 as discussed in relation to FIGS. 40 and 41. In some embodiments, the packaged article 2612 is displayed and a projector user interface, such as discussed in relation to FIGS. 36-39, uses a projector to project an image or design to be printed on the packaged article 2612, such as discussed in relation to the personalized packaged article 2216 in FIG. 22A. The packaged articles 2612 may be presented to the user to enhance the personalization process or to request approval from the user to continue the personalization process. If the user approves, the robot moves the personalized packaged article 2612 to the dispenser 2610. If the user does not approve, the robot 2642 moves the rejected packaged article 2613 to the storage system 2611.

The control system 2690 controls the kiosk 2600, similar to the control system 2190 discussed in relation to FIG. 21A. The control system 2690 uses the sensors in the eyes 2648 of the robot 2642 to control the robot 2642, such as to move the packaged articles 2612 between the system components 2660.

The kiosk 2600 differs from non-kiosk personalization systems in a similar manner as the kiosk 2100 discussed in relation to the top-front-right view of FIG. 21A and the top-left-rear view of 21B.

In some embodiments, the robot 2642 is coupled to the guidance track 2644 without the wheels 2647. For example, the guidance track 2644 may be a rack gear 2656 (FIG. 26K) the robot 2642 may couple to the guidance track 2644 using a motorized pinion gear 2657, as discussed in relation to FIG. 26K. In some embodiments, the robot 2642 couples to the guidance track 2644 using the actuation systems 2156 as discussed in relation to FIGS. 21M-21P. In some embodiments, the robot 2642 couples to the guidance track 2644 using the motorized system 2426 and the chain 2427 as discussed in relation to FIG. 24B. In some embodiments, the robot 2642 couples to the guidance track 2644 using the motion system 2540 disposed within the channel 2544 of the storage rail 2546 as discussed in relation to FIGS. 25B and 25C. In some embodiments, the robot 2642 is trackless and does not use the guidance track 2644. For example, the robot 2642 may use sensors, such as the sensors discussed in relation to the eyes 2648, to navigate the platform 2603.

Figure 26B:
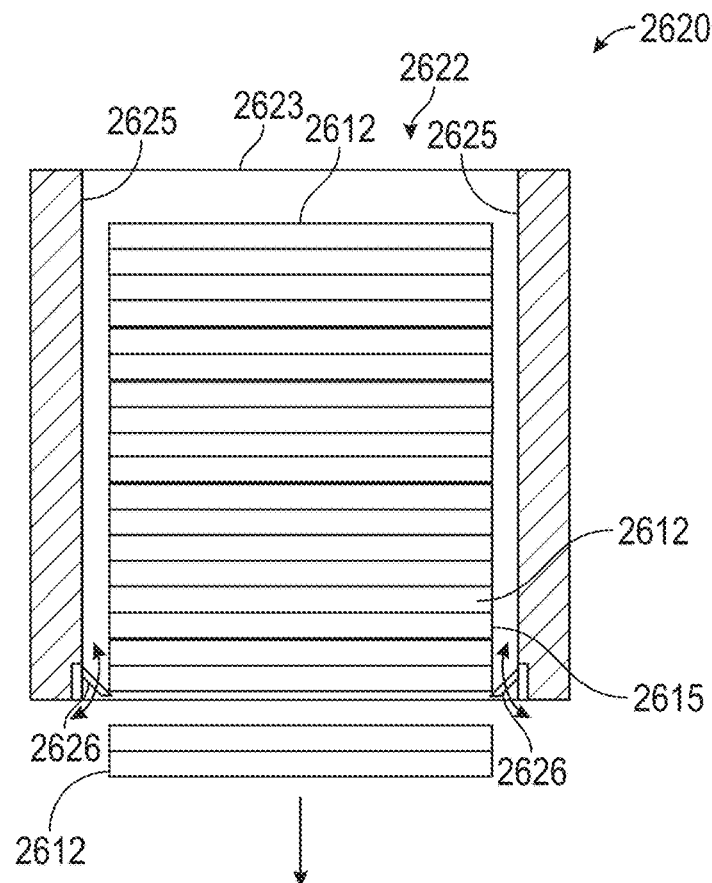
FIGS. 26B and 26C depict cross-sectional views of shelving systems, according to some embodiments.
Figure 26C:
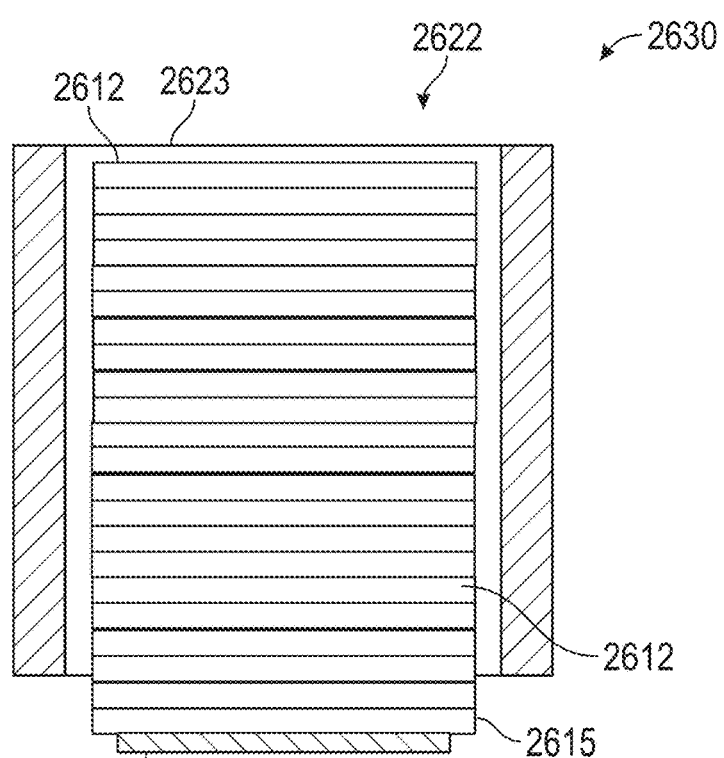

FIGS. 26B and 26C depict cross-sectional views of shelving systems, according to some embodiments. In particular, FIG. 26B shows the packaged articles 2612 disposed in a column 2622 of the shelving system 2620.

The packaged articles 2612 are loaded into a top opening 2623 of the column 2622 formed by the shelving system 2620. The packaged articles 2612 are stacked on top of another inside the column 2622. A pair of rotatable arms 2626 hold a bottom packaged article 2615 (also referred to as a to-be-dispensed packaged article) in place when in a first position, which in turn hold the packaged articles 2612 on top of the bottom packaged article 2615 in place. When a packaged article 2612 is released, the rotatable arms 2626 move away from the bottom packaged article 2615 and towards sidewalls 2625 of the column 2622 to a second position. When in the second position, the rotatable arms 2626 are flush with the sidewalls 2625 to allow the bottom packaged article 2615 to drop to the receiving station 2624 (FIG. 26A). The rotatable arms 2626 return to the first position when the bottom packaged article 2615 clears a movement path of the rotatable arms 2626. The rotatable arms 2626 catch a packaged article 2612 that was directly on top of the now-dispensed bottom packaged article 2615, which is now referred to as a new bottom packaged article 2615, and holds a new bottom packaged article 2615 in place.

A shelving actuation system moves the rotatable arms 2626 between the first position and the second position. The shelving actuation system may be a rotary actuator such as a rack-and-pinion actuator, a vane actuator, a helix actuator, a planetary actuator, a linear cylinder, a scotch-yoke actuator, a sprocket actuator, a bladder actuator, a direct-drive motor, and the like.

In some embodiments, the packaged articles 2612 in the column 2622 may have the same characteristics (e.g., the same shirt size, color, shirt type, material type, and/or shirt fit). Other columns 2622 of the shelving system 2620 may also group the packaged articles 2612 by similar characteristics, where each column 2622 houses packaged articles 2612 having different characteristics.

In some embodiments, the rotatable arms 2626 are not flush with the sidewalls 2625 when in the second position and are positioned to leave enough clearance for the bottom packaged article 2615 to drop to the receiving station 2624 (FIG. 26A) when in the second position. In some embodiments, only one rotatable arm 2626 is used to hold the bottom packaged article 2615 in position.

FIG. 26C shows a shelving system 2630, which may be used with or instead of the shelving system 2620. The shelving system 2630 is similar to the shelving system 2620, except as noted. The packaged articles 2612 are disposed in the column 2622 of the shelving system 2630. The shelving system 2630 includes a dispenser shelf 2636 to hold the packaged articles 2612 instead of the rotatable arms 2626 (FIG. 26B). The bottom packaged article 2615 rests on the dispenser shelf 2636 until the robot 2642 retrieves the bottom packaged article 2615. The packaged article 2612 that was directly on top of the now-dispensed bottom packaged article 2615 then falls on the dispenser shelf 2636.

FIG. 26D is a flow diagram that illustrates a method 2698 for moving the packaged articles 2612 through a shelving system 2680, according to embodiments described herein. The shelving system 2680 may be used with or instead of the shelving system 2620. FIGS. 26E-26H schematically illustrate a cross-sectional view of the packaged articles 2612 at different operations 2699 of the method 2698 depicted in FIG. 26D, according to some embodiments. Therefore, FIG. 26D and FIGS. 26E-26H are herein described together for clarity.

Figure 26F:
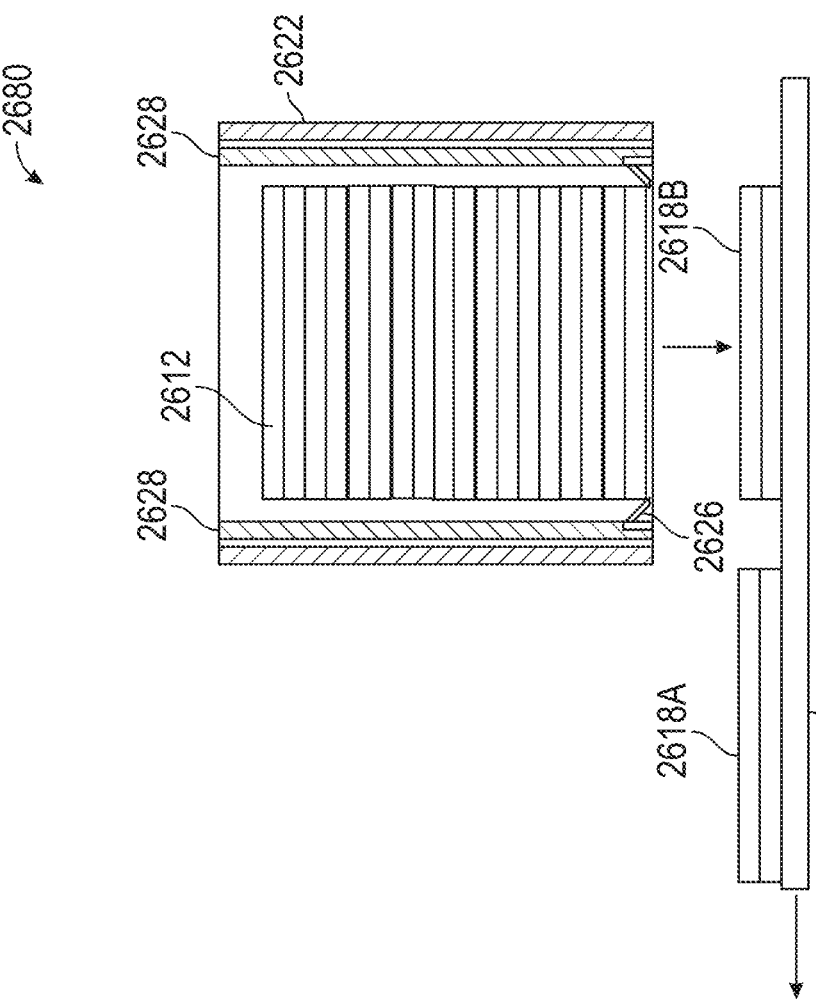
FIGS. 26E-26H schematically illustrate cross-sectional views of packaged articles at different operations of the process depicted in FIG. 23D, according to some embodiments
Figure 26E:
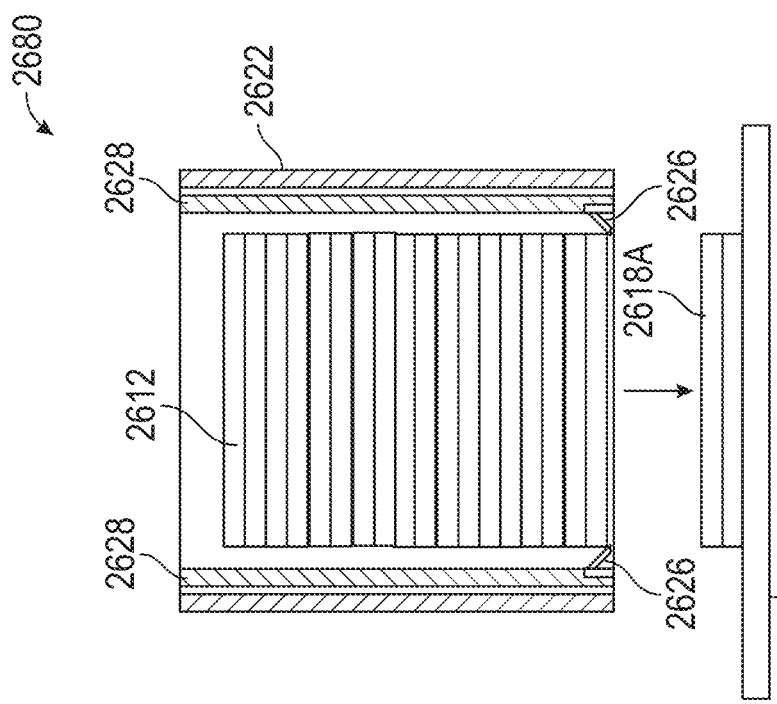

The method 2698 shown in FIG. 26D begins at operation 2699A by releasing a first packaged article 2618A onto the receiving station 2624 from a sleeve 2628 of the shelving system 2680. FIG. 26E depicts the operation 2699A and shows the sleeve 2628 releasing the first packaged article 2618A. The sleeve 2628 is disposed inside the column 2622 formed by the shelving system 2680. The column 2622 is adjacent to the receiving station 2624. The sleeve 2628 includes the pair of rotatable arms 2626 to hold a packaged article 2612 in place as discussed in relation to FIG. 26B.

The method 2698 shown in FIG. 26D continues at operation 2699B with moving the first packaged article 2618A away from the column 2622 using the motion system 2640 and operation 2699C with releasing a second packaged article 2618B from the sleeve 2628. FIG. 26F depicts the operations 2699A and 2699B and shows the receiving station 2624 moving the first packaged article 2618A using a conveyor system. In the depicted embodiment, the receiving station 2624 includes the conveyor system, which is similar to the conveyor belt system 2287 or the multi-directional conveyor system 2388 discussed in relation to FIG. 22D. For example, in some embodiments, the conveyor system may include a conveyor belt, head pulley, tail pulley, and idlers. In some embodiments, the conveyor system may also include a first plurality of motorized wheels and a second plurality of motorized wheels that rotate in place (e.g., the motorized wheels 2283A and 2283B in FIG. 22D). The motion system 2640 includes the conveyor system. Once the first packaged article 2618A is moved, the sleeve 2628 releases the second packaged article 2618B by articulating the pair of rotatable arms 2626 as discussed in relation to FIG. 26B.

The method 2698 shown in FIG. 26D continues at operation 2699D with moving the second packaged article 26186 away from the column 2622 using the motion system 2640.

Figure 26H:
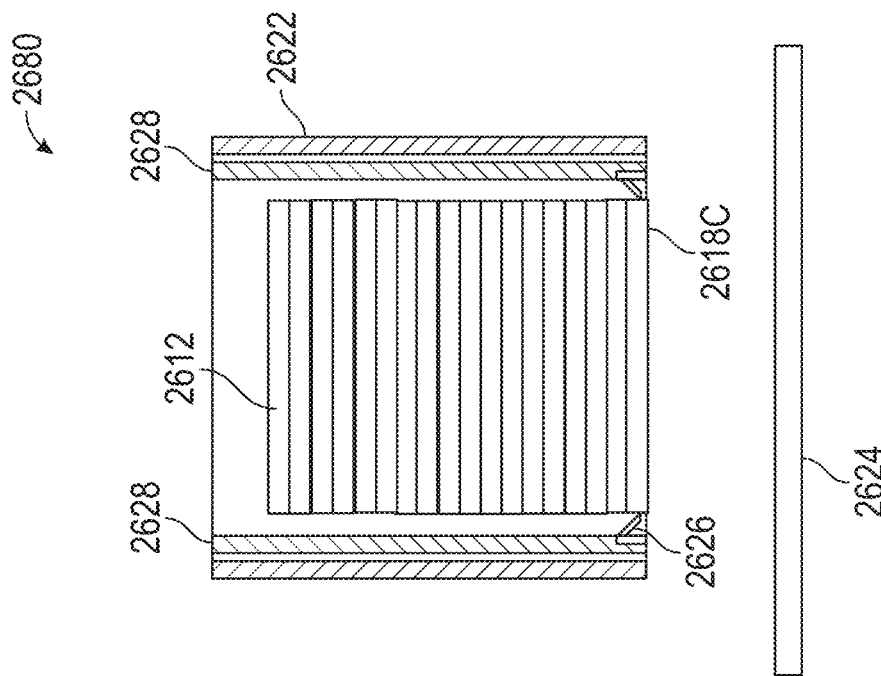
Figure 26G:
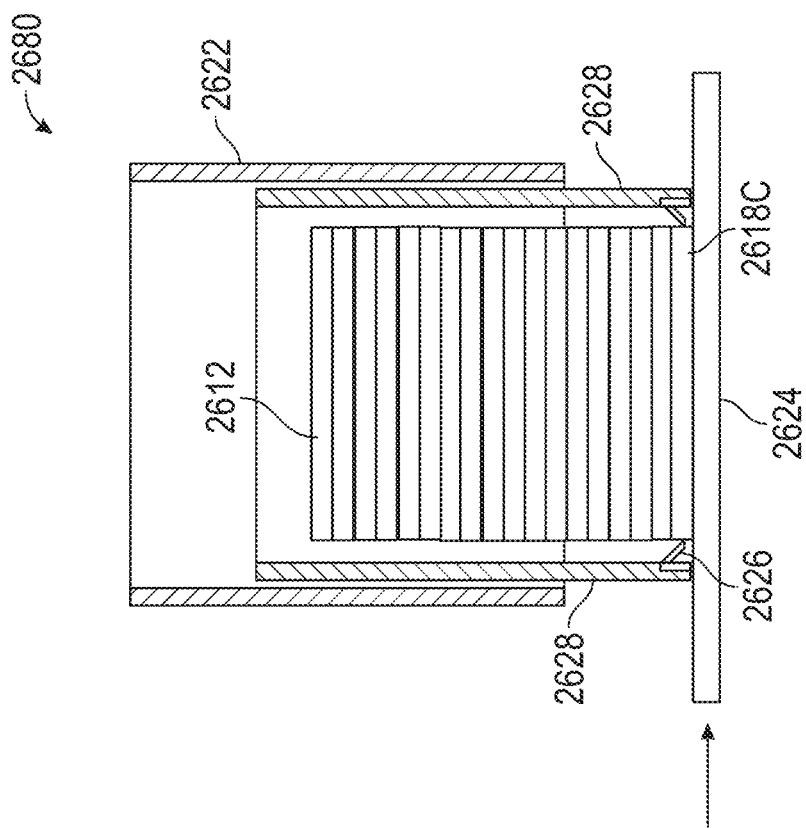

The method 2698 shown in FIG. 26D continues at operation 2699E with moving a third packaged article 2618C to a location on the receiving station 2624 adjacent to the column 2622 and operation 2699F, operation 2699F with moving the sleeve 2628 away from the column 2622 and towards the third packaged article 2618C, and operation 2699G with grasping the third packaged article 2618C using the sleeve 2628. FIG. 26G depicts the operations 2699E, 2699F, and 2699G and shows the sleeve 2628 grasping the third packaged article 2618C. The sleeve 2628 moves in relation to the shelving system 2680, for example, towards and away from the receiving station 2624. The sleeve 2628 at least partially surrounds the third packaged article 2618C and uses the pair of rotatable arms 2626 to grasp the third packaged article 2618C. A sleeve actuation system (not shown) moves the sleeve 2628 in relation to the shelving system 2680. In some embodiments, the sleeve actuation system is similar to one of the actuation systems 2152A and 2152G discussed in relation to FIGS. 21K and 21L. For example, the sleeve actuation system may use the lift belt 2153A and lift motor 2154A to move the sleeve 2628 or the threaded rod 2153G and lift motor 2154G. In some embodiments, the sleeve actuation system may use the motorized pinion gear 2134 and the rack gear 2136 discussed in relation to FIG. 21F.

The method 2698 shown in FIG. 26D continues at operation 2699H with moving the sleeve 2628 and the third packaged article 2618C towards the column 2622. FIG. 26H depicts the operation 2699H and shows the sleeve 2628 inside the column 2622 of the shelving system 2680. The third packaged article 2618C is at a bottom of a stack of packaged articles 2612 inside the sleeve 2628 and held in place by the pair of rotatable arms 2626.

The method 2698 may be used to manage an inventory of packaged articles 2612 in the shelving system 2680 in a similar manner as the method 2298 discussed in relation to FIGS. 22G-22I. The method 2698 may be used to sort through packaged articles 2612 having different characteristics to select a packaged article 2612 for personalization.

In some embodiments, the third packaged article 2618C is the first packaged article 2618A.

In some embodiments, the first packaged article 2618A has different characteristics than the second packaged article 2618B, the remaining packaged articles 2612 in the sleeve 2628 have at least two different characteristics, and the packaged articles 2612 and/or 2618B are released from the sleeve 2628 until a packaged article having desired characteristics is released on the receiving station 2624.

Some embodiments further include personalizing the packaged article 2612 having desired characteristics using the plurality of system components 2660 of an article personalization system 2606. In such embodiments, the system components comprise the article preparation system 2660A, the DTG printer 2660B, and the curing system 2660C.

Some embodiments further include personalizing the first packaged article 2618A using the plurality of system components 2660 of an article personalization system 2606. In such embodiments, the system components 2660 comprise the article preparation system 2660A, the DTG printer 2660B, and the curing system 2660C and the packaged articles 2612 each comprise a packaging and an article.

Figure 26I:
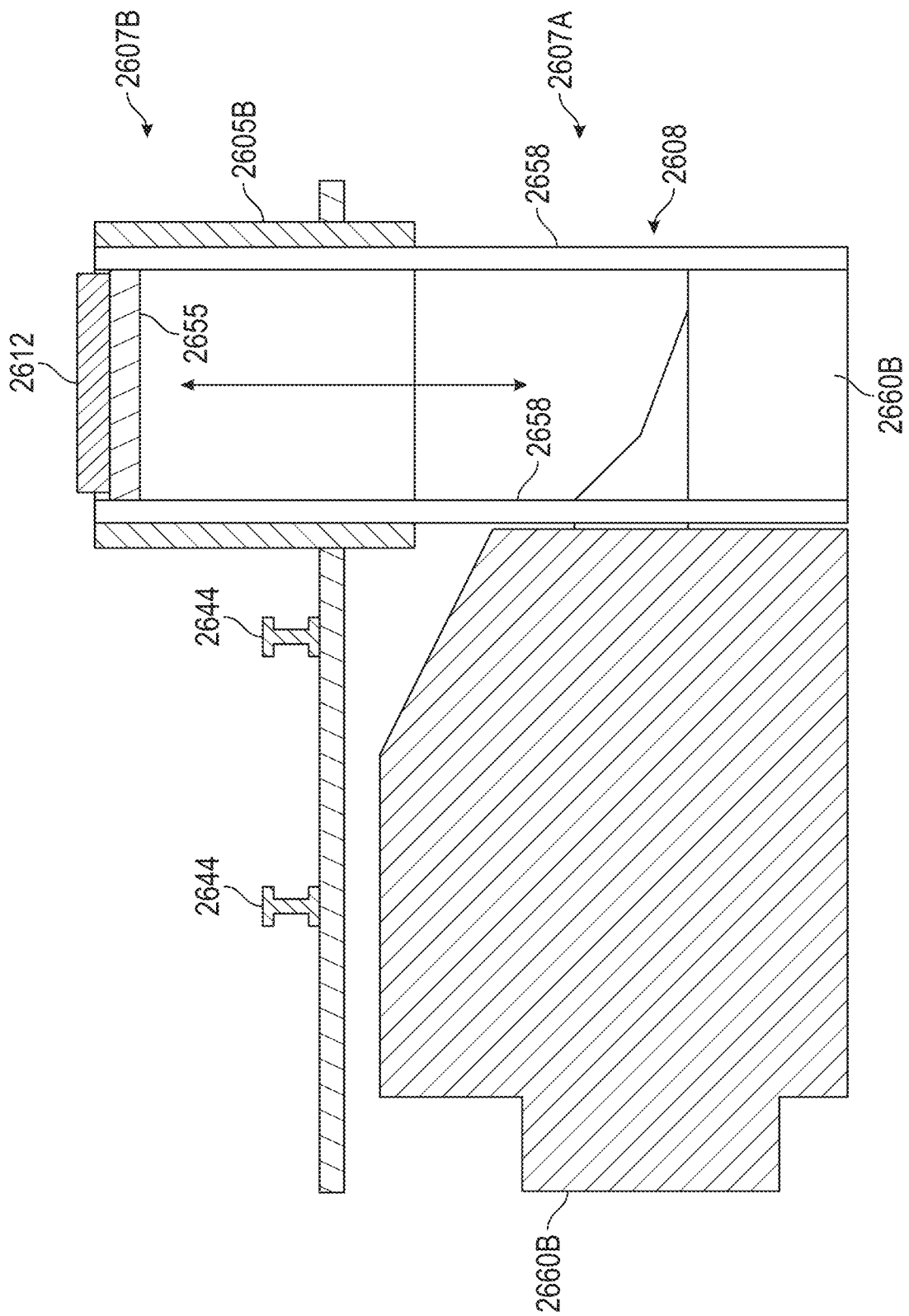
FIG. 26I depicts a cross-sectional view of a transfer system, according to some embodiments.

Some embodiments further include removing an article of the first packaged article 2618A from a packaging of the first packaged article 2618A. In such embodiments, the third packaged article 2618C is the packaging of the first packaged article 2618A FIG. 26I depicts a cross-sectional view of the transfer system 2608, according to some embodiments. The robot 2642, article preparation system 2660A, and a curing system 2660C are not shown for simplicity. The transfer system 2608 moves the packaged articles between system components located on different sides of the platforms and/or different levels of the kiosk, such as above the platform (referred to as a second level 26076) and below the platform (referred to as a first level 2607A). For example, the transfer system 2608 may move a packaged article 2612 received from the 2642 robot (FIG. 26A) to the DTG printer 2660B. The transfer system 2608 includes a pair of rails 2658 having transfer tracks 2659 (not shown) and a movable plate 2655 as discussed in relation to FIGS. 26J and 26K. The pair of rails 2658 extends vertically from a floor of the first level 2607A and to a top of the chute 2605B on the second level 2607B. Although not shown in FIG. 26I, a first actuation system 2650 may be used to move the movable plate 2655 along the transfer tracks 2659 between the first and second levels 2607A and 26076, as further discussed in relation to FIG. 26J.

Figure 26J:
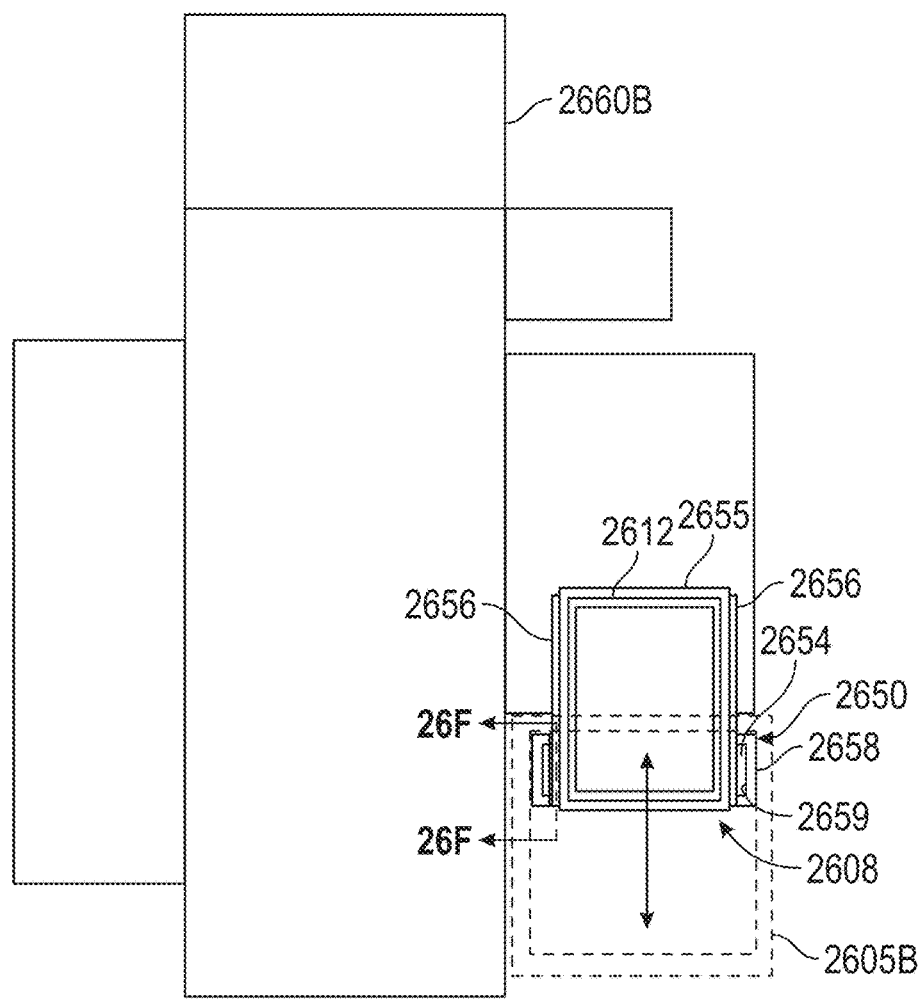
FIG. 26J depicts a top view of the transfer system from FIG. 26I, according to some embodiments.

FIG. 26J depicts a top view of the transfer system 2608 from FIG. 26I, according to some embodiments.

The first actuation system 2650 is similar to either of the second actuation systems 2152A or 21526 discussed in relation to in FIGS. 21K and 21L. For example, the pair of rails 2658 are channel beams and the transfer tracks 2659 are channels of the channel beams. Actuator couplers 2654 are coupled to the transfer tracks 2659 and the movable plate 2655. The first actuation system 2650 moves the movable plate 2655 between the first and second levels 2607A and 2607B by moving the actuator couplers 2654 on the transfer tracks 2659, similar to how the second actuation system 2152A or 2152B moves the carrier coupler 2128 in FIGS. 21K and 21L.

A second actuation system 2652 (FIG. 26K) is used to move the movable plate 2655 in a direction orthogonal to the pair of rails 2658, such as towards and away from the DTG printer 2660B. The second actuation system 2652 moves the movable plate 2655 using the rack gears 2656, such as discussed in relation to FIG. 26K.

Figure 26K:
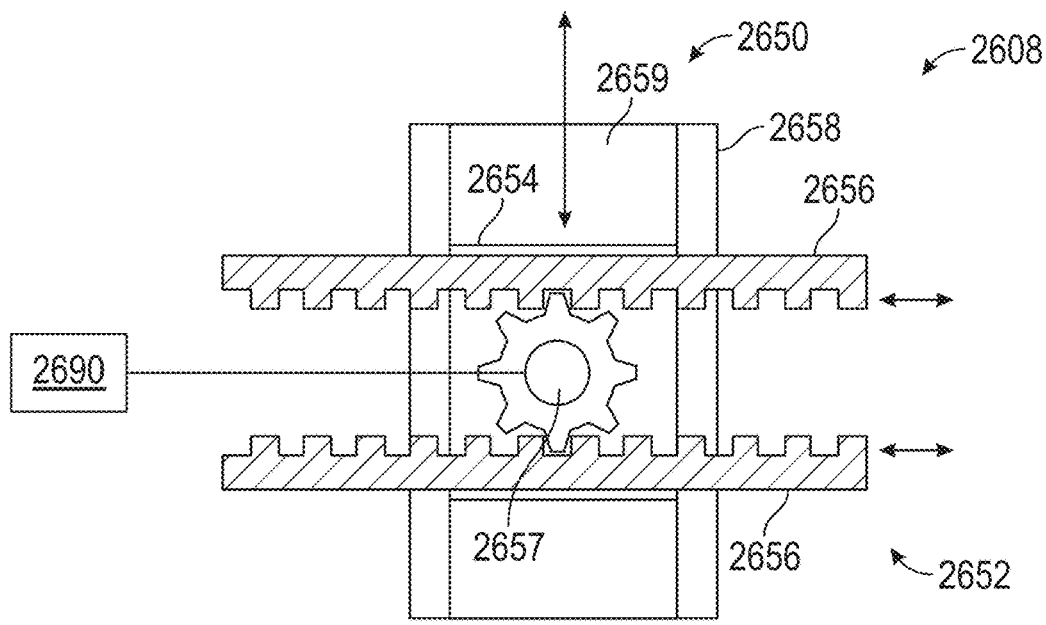
FIG. 26K depicts a cross-sectional side view of the transfer system from FIG. 26J, according to some embodiments.

FIG. 26K depicts a cross-sectional side view of the transfer system 2608, according to some embodiments. In particular, FIG. 26K shows the second actuation system 2652.

The second actuation system 2652 is similar to the third actuation system 2132 discussed in relation to FIG. 21F. For example, the second actuation system 2652 includes motorized pinion gears 2657 and rack gears 2656. The motorized pinion gears 2657 are coupled to the actuator couplers 2654, such as welded to, fastened to using fasteners, adhered to, or partially encased in the actuator couplers 2654. Thus, the motorized pinion gears 2657 are coupled to the transfer tracks 2659 and move with the actuator couplers 2654 when the first actuation system 2650 moves the actuator couplers 2654. Each rail 2658 of the pair of rails 2658 includes one actuator coupler 2654 and one motorized pinion gear 2657.

The rack gears 2656 are attached to the sides of the movable plate 2655 that are adjacent to the pair of rails 2658. The rack gears 2656 may be welded to, fastened to using fasteners, adhered to, or unitarily formed as part of the movable plate 2655. The motorized pinion gears 2657 and the rack gears 2656 are similar to the motorized pinion gear 2134 and rack gear 2136 discussed in relation to FIG. 21F. For example, each rack gear 2656 includes an upper and lower portion. The motorized pinion gear 2657 is disposed in between the upper and lower rack gears 2656. The motorized pinion gear 2657 rotates and engages the upper and lower portions of the rack gears 2656 to move the movable plate 2655 in the direction orthogonal to the pair of rails 2658.

FIG. 26K further shows how the first actuation system 2650 moves the movable plate 2655. The first action system moves the movable plate 2655 through the motorized pinion gears 2657, which move along the transfer tracks 2659 with the actuator coupler. The motorized pinion gear 2657 moves the movable plate 2655 along the transfer tracks 2659 via contact between the motorized pinion gear 2657 and the rack gear 2656. Thus, the actuator couplers 2654 are used to lift and lower the movable plate 2655 between the first and second levels 2607A and 2607B.

Garment Personalization Kiosk with Movable System Components

Figure 27A:
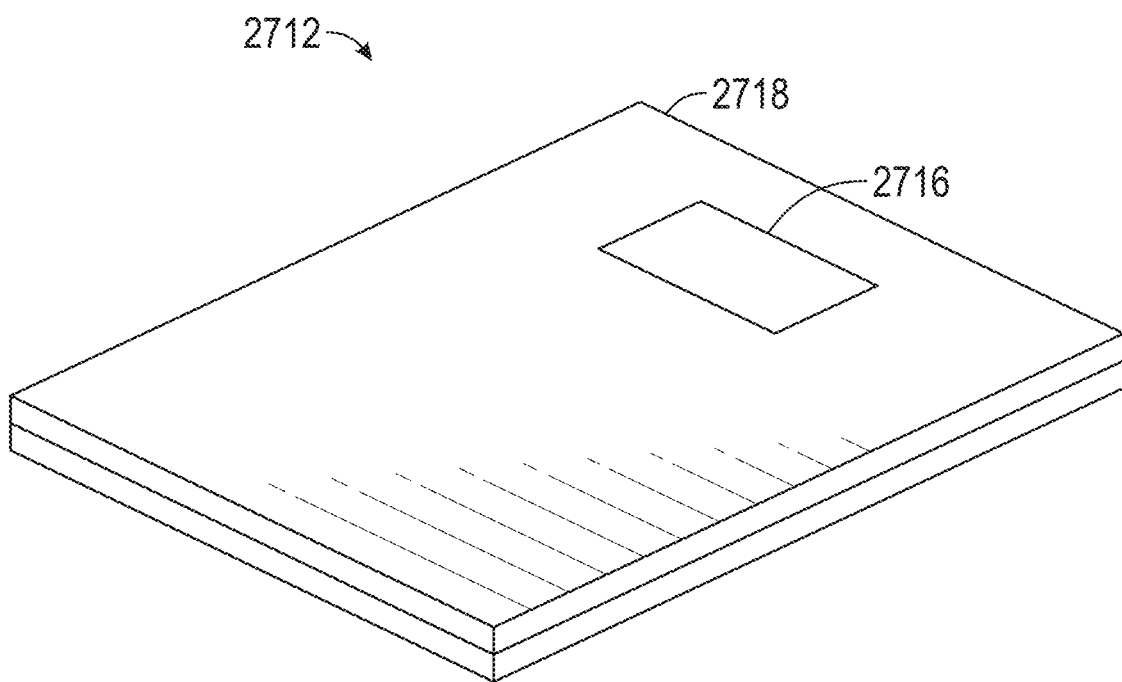
FIG. 27A depicts a trimetric view of a packaged article, according to some embodiments.

FIG. 27A depicts a rear-left-bottom trimetric view of a packaged article 2712, according to some embodiments.

The packaged article 2712 includes a packaging 2718 and an article (hidden from view), such as the packaging 101 and article 105 discussed in relation to FIGS. 2-4. The article of the packaged article 2712 is pretreated with a pretreatment solution, similar to the packaged article 15P discussed in relation to FIG. 1 or the pretreated packaged articles 2112 discussed in relation to FIGS. 21A and 21B. The packaged article 2712 includes an identification feature 2716. The identification feature 2716 is similar to the sensor or indicator in or on the packaging discussed in relation to FIGS.

1, 21A, and 21B or the identification feature 2516 discussed in relation to FIG. 25A. For example, the identification feature 2716 may include one of a bar code, QR code, near field communication (NFC) tag, radio frequency identification (RFID) tag, and the like. The identification feature 2716 is used to identify information about the packaged article 2712. For example, the identification feature may provide characteristics about the article of the packaged article 2712. The packaged article 2712 is used with an on-demand personalization kiosk 2700 as discussed in FIGS. 27B and 27C.

Figure 27B:
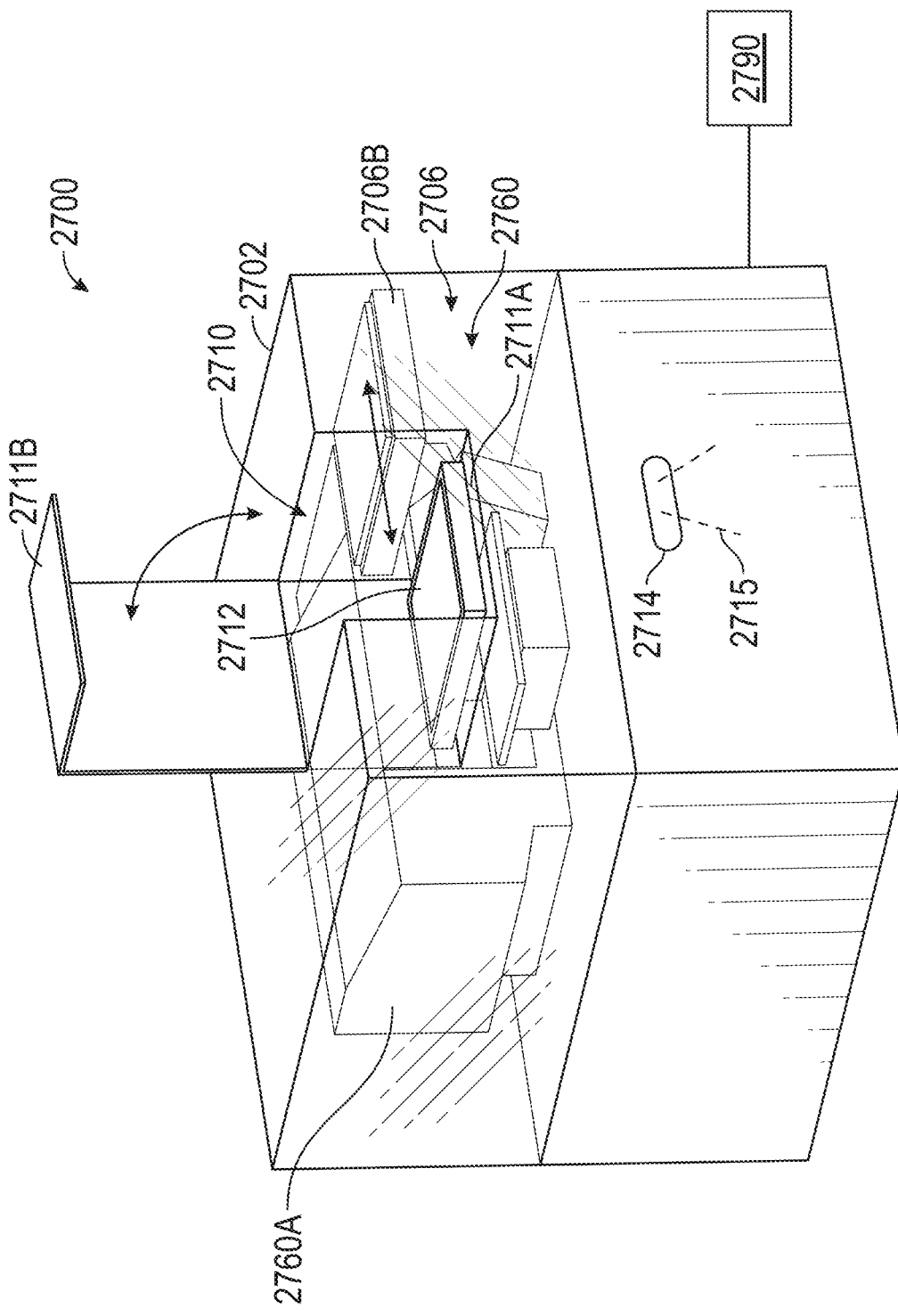
FIG. 27B depicts a trimetric view of an on-demand personalization kiosk, according to some embodiments.

FIG. 27B depicts a trimetric view of an on-demand personalization kiosk 2700, according to some embodiments.

The on-demand personalization kiosk 2700 (referred to as the kiosk 2700) is similar to the kiosks discussed in relation to previous figures, except as noted. For example, the kiosk 2700 includes a housing 2702. Disposed within the housing 2702 is an article personalization system 2706. The kiosk 2700 further includes a sensor 2714, a staging area 2710, and a control system 2790. The article personalization system 2706 is similar to the article personalization system 2206 discussed in relation to FIG. 22A, except as noted, and includes a plurality of system components 2760. The plurality of system components 2760 differ from previously discussed kiosks in that they only include a DTG printer 2760A and a curing system 2760B. The staging area 2710 provides access for a user to the DTG printer 2760A. The user may be an operator of the kiosk 2700 or a customer following instructions provided via a kiosk 2700 user interface (UI). At least a portion of the housing 2702 may be transparent to allow the user to see the system components 2760 of the kiosk 2700, although in some embodiments the housing 2702 is translucent or opaque. The kiosk 2700 further differs from the kiosks discussed in relation to FIGS. 21-26 in that the kiosk 2700 does not include an article retrieval system having a motion system and a shelving system. Thus, the kiosk 2700 has less moving parts than and may have a smaller footprint or area than the kiosks discussed in relation to FIGS. 21-26. Further, the kiosk 2700 may be transported between locations and may be transported through smaller openings and doorways than the kiosks discussed in relation to FIGS. 21-26. The system components 2760 depicted in FIG. 27B are for illustrative purposes and the actual system components 2760 may have any shape, such as previously described in relation to the system components 2160 in FIG. 21A.

The kiosk 2700 may be used to personalize packaged articles 2712, which are stored outside of the housing 2702. In the embodiment depicted in FIG. 27B, the kiosk 2700 personalizes the packaged article 2712. In some embodiments, the kiosk 2700 may be configured to use or may be compatible with packaged articles 2712 having other packaging and articles previously discussed, such the packaging and articles discussed in relation to FIGS. 1-20.

The control system 2790 controls the kiosk 2700, similar to the control system 2190 discussed in relation to FIG. 21A.

The UIs with the article personalization system 2706 to place an order for a personalized article, such as described in relation to FIGS. 30 and 65-75. Once the order is placed, the kiosk 2700 receives the order, for example, through the control system 2790, and the user retrieves a packaged article 2712, for example, from a shelving system located outside of the kiosk 2700. Thus, the kiosk 2700 increases user interaction when compared to the kiosks discussed in relation to FIGS. 21-26, which may result in a more enjoyable experience for the user. In some embodiments, the shelving system is one of the shelving systems previously discussed in relation to FIGS. 21-26. In some embodiments, the user may retrieve a packaged article from a point of sale, such as a store, vender, or retailer.

The user uses the sensor 2714 of the kiosk 2700 to scan 2715 the identification feature 2716 of the packaged article 2712. The sensor is coupled to the housing 2702. The sensor 2714 is a non-contact sensor (e.g., a bar code scanner, QR code scanner, camera, NFC tag reader, or RFID tag reader and the like) that scans or reads the identification feature 2716 to determine the characteristics of the article in the packaged article 2712. The sensor 2714 may couple to the housing 2502, such as through a bracket or a fixture. The control system 2790 uses information from the identification feature 2716 to verify the order from the user. For example, the control system 2790 may compare the information determined from scanning the identification feature 2716 to a database to verify the order before beginning the personalization process. The database may be accessed by a processor or memory of the control system 2790. In some embodiments, the identification feature 2716 may include information about the order, such as a graphic to be printed or an area of the article to print on. In such embodiments, the order information does not need to be sent to the kiosk 2700 prior to scanning the packaged article 2712 and the control system 2790 does not need to verify the order information.

Once the order is confirmed, or the kiosk 2700 receives the information about the order, the user places the packaged article 2712 into the staging area 2710 of the kiosk 2700, which includes a platform 2711A and a cover 2711B (or door), and closes the cover 2711B (such as shown in FIG. 2C). The cover 2711B is removably coupled to the housing 2702 (e.g., by a movable joint or mechanism such as a hinge) and prevents access to the kiosk 2700 during the personalization process. For example, the cover 2711B is rotatably coupled to the housing 2702 and contact or engages the housing when closed. The packaged article 2712 is then processed by the DTG printer 2760A. For example, the DTG printer 2760A prints an image or design on the packaged article 2712.

The platform 2711A may be part of the DTG printer 2760A, such as a moveable platen, tray, or feeder to move the packaged article 2712 during printing. In some embodiments, at least a portion of the DTG printer 2760A moves over the packaged article during printing. In some embodiments, the platform 2711A moves the packaged article 2712 to the DTG printer 2760A. In some embodiments, the cover 2711B is a slot in the housing 2702 or part of a tray (which also includes the platform 2711A) that is pulled out from the housing 2702. In some embodiments, the kiosk 2700 does not use the cover 2711B.

Figure 27C:
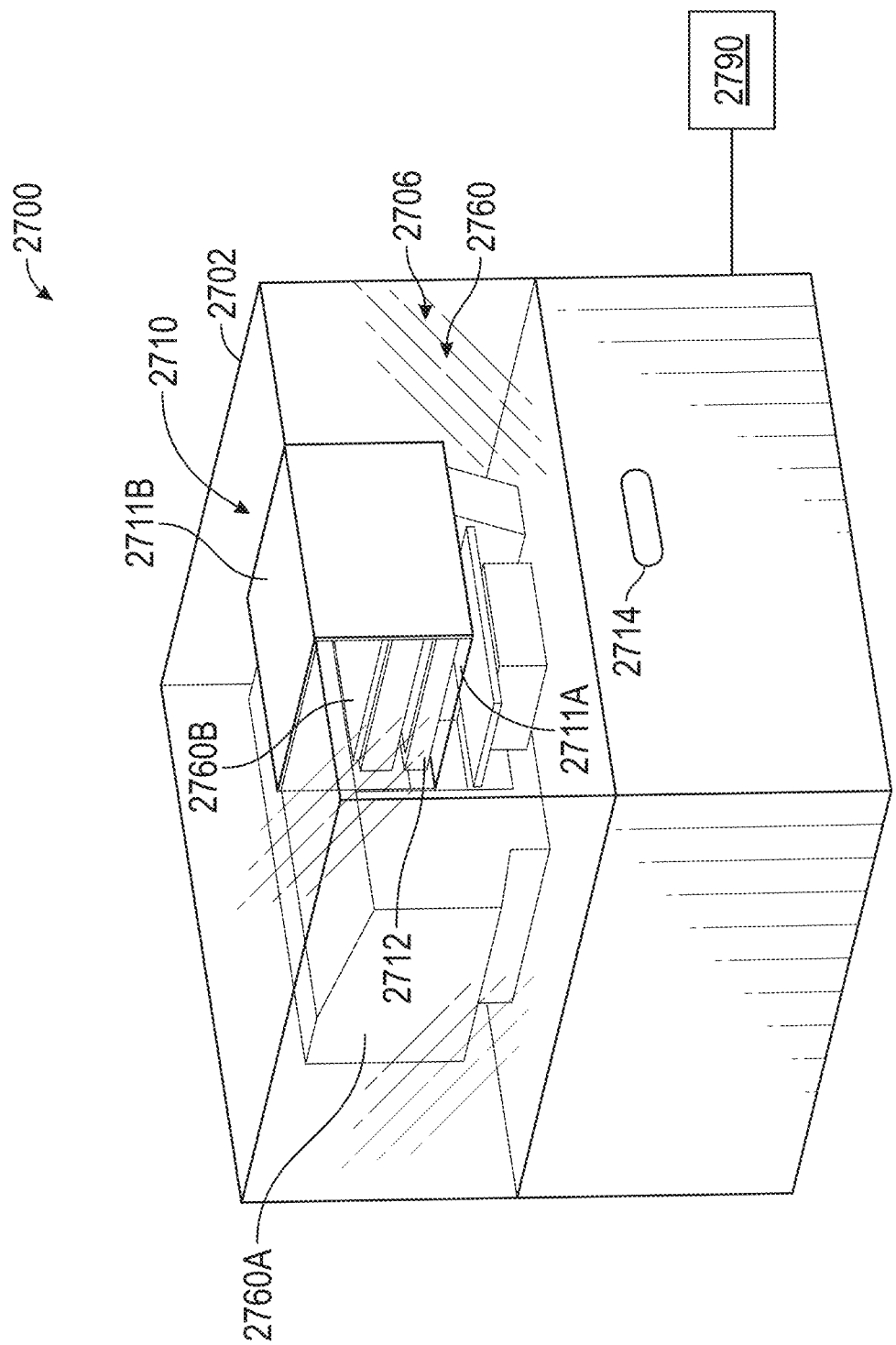
FIG. 27C depicts a trimetric view of a packaged article in an on-demand personalization kiosk, according to some embodiments.

FIG. 27C depicts a trimetric view of the packaged article 2712 in the kiosk 2700, according to some embodiments. In particular, FIG. 27C shows the curing system 2760B processing the packaged article 2712.

Once the DTG printer 2760A is finished processing the packaged article 2712, the curing system 2760B is positioned adjacent to the packaged article 2712 and the platform 2711A. For example, the curing system 2760B moves from a first positon, which is positioned away from the staging area 2710, to a second position, which is positioned over the packaged article 2712 (as shown on the page). When in the first position, no portion of the curing system 2760B is positioned over the packaged article 2712. In some embodiments, the curing system 2760B is positioned parallel and next to a surface of the packaged article 2712 that is processed by the DTG printer 2760A. In such embodiments, when in the first position, no portion of the curing system 2760B is positioned facing the packaged article 2712. When in the second position, the curing system 2760B is positioned facing packaged article 2712.

An actuation system (not shown) moves the curing system 2760B. In some embodiments, the actuation system uses a coupler, a motorized pinion gear, and a rack gear to move the curing system 2760B, similar to the second actuation system 2652 discussed in relation to FIGS. 26I-26K. In some embodiments, the actuation system uses a coupler connected to the curing system 2760B, a threaded rod, and a lift motor to move the curing system 2760B, similar to the second actuation system discussed in relation to FIG. 21L. In some embodiments, the actuation system uses articular members connected to the curing system 2760B to move the curing system 2760B, similar to the articular members 2236 discussed in relation to FIG. 22P-22R. In some embodiments, a linear actuator, such as a mechanical or electro-mechanical linear actuator, belt-drive actuator, hydraulic linear actuator, pneumatic linear actuator, or piezoelectric linear actuator, may move the curing system 2760B.

The curing system 2760B cures or dries the printed image or design on the packaged articles 2112. The actuation system returns the curing system 2760B to the second position (shown in FIG. 27B) after the printed image or design is ready. The user then opens the cover 2711B and retrieves the now-personalized packaged article 2712.

The kiosk 2700 differs from non-kiosk personalization systems in a similar manner as the kiosk 2100 described in relation to the top-front-right view of FIG. 21A and the top-left-rear view of 21B.

In some embodiments, the information about the characteristics of the packaged article 2712 and/or the order are conveyed to the kiosk 2700 through the article personalization system 2706 prior to scanning the packaged article 2712. In some embodiments, the identification feature 2716 of the packaged article 2712 is scanned 2715 to verify the packaged article is compatible for use with the kiosk 2700. In some embodiments, the identification feature 2716 of the packaged article 2712 is scanned 2715 to verify information about the packaged article 2712 (e.g., the packaging and article of the packaged article 2712). In some embodiments, the information about the packaged article 2712 is used to instruct the user on how to place the packaged article 2712 in the staging area 2710. For example, if the packaged article 2712 includes any of the packaging and articles discussed in relation to FIGS. 2-9, 12, and 19-20, the kiosk 2700 or the display 2904 discussed in relation to FIGS. 29 and 30 will instruct the user on how to position the packaged article 2712 on the staging area 2710. If the packaged article 2712 includes any of the packaging and articles discussed in relation to FIGS. 10-11 and 12-18, the user will be instructed on how to unpack the article of the packaged article 2712 and place the article on the staging area 2710. In one example using the packaging 901 and the article 905 discussed in relation to FIGS. 16-18, the user is instructed to remove the retainers 920, unroll and straighten the article 905, and use the cover 955 to secure the article 905 in place on the staging area 2710.

In some embodiments, the curing system 2760B may also be used as an article preparation system. For example, the curing system 2760B may prepare the packaged articles 2712 for personalization by the DTG printer 2760A similar to the article preparation system 2160A system discussed in relation to FIG. 21A.

Mobile Garment Personalization Kiosk

Figure 28A:
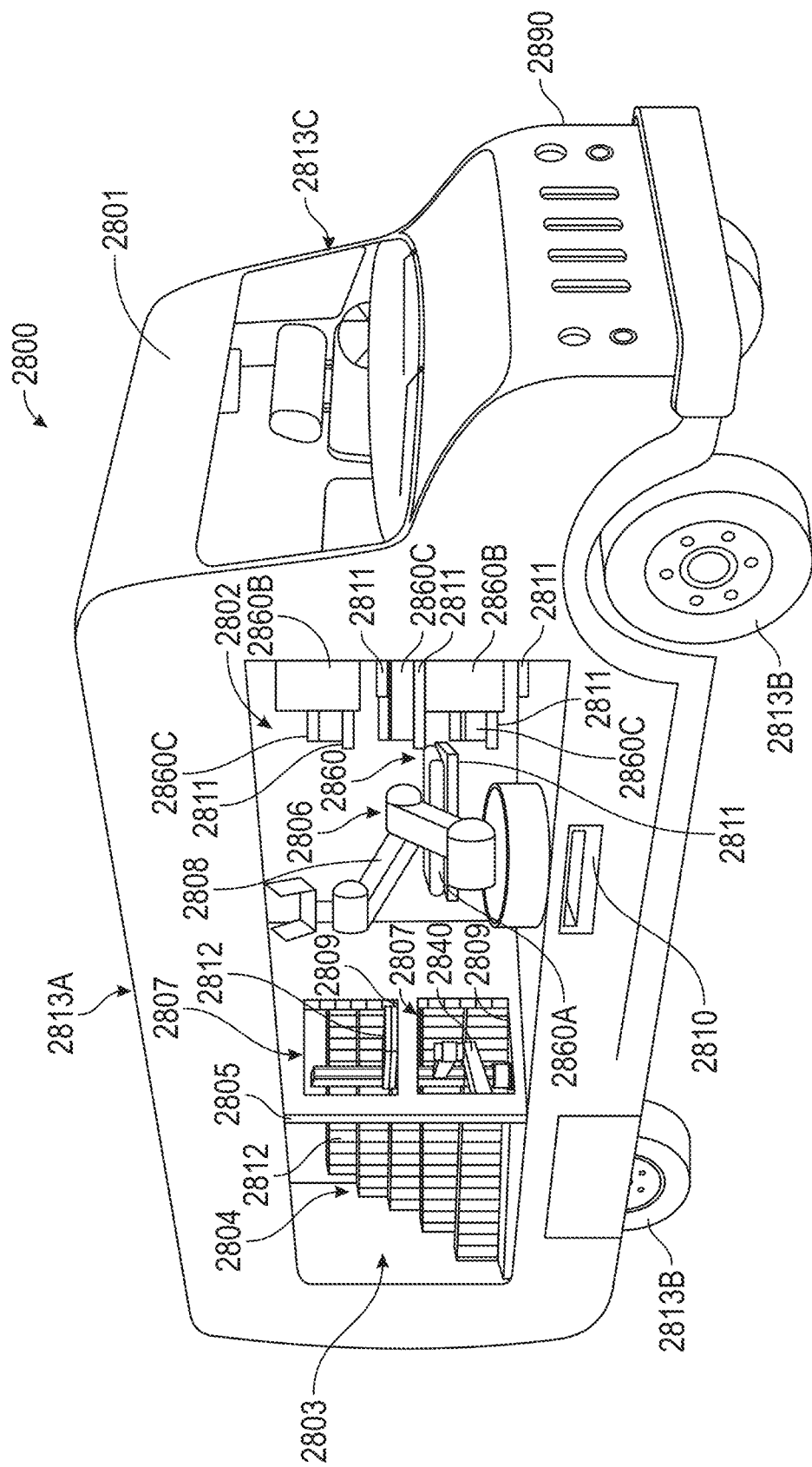
FIG. 28A depicts a perspective view of a mobile on-demand personalization kiosk, according to some embodiments.

FIG. 28A depicts a perspective view of a mobile on-demand personalization kiosk 2800, according to some embodiments.

The mobile on-demand personalization kiosk 2800 (referred to as the mobile kiosk 2800) is similar to the kiosks discussed in relation to previous figures, except as noted. For example, the mobile kiosk 2800 includes a housing 2802, which in the depicted embodiment is within or part of a vehicle, such as a van 2801 that forms the housing 2802. Disposed within the housing 2802 are an article retrieval system 2804, an article personalization system 2806, and a transfer system 2808, which perform a personalization process on a plurality of packaged articles 2812. The mobile kiosk 2800 further includes a dispenser 2810 and a control system 2890.

The van 2801 includes a body 2813A having wheels 2813B and an engine (not shown). A passenger cabin 2813C is disposed within the body 2813A and includes controls (e.g., a steering wheel, shifter, gas and brake pedals, and the like) to move the van 2801 to different locations. The mobility of the van 2801 allows the mobile kiosk 2800 to move to different sites and venues, such as conventions, concerts, trade shows, festivals, and the like.

The housing 2802 includes a window 2803 in a side of the van 2801, such as in a side of the housing 2802. The window 2803 allows a user to view the packaged articles 2812 undergo the personalization process. In some embodiments, the window 2803 is a transparent pane of material, such as a glass or a polymer/plastic, disposed in the housing 2602. In some embodiments, the window 2803 is an opening formed in the housing 2602. In some embodiments, the window 2803 is the viewing pane 4004 discussed in relation to FIGS. 40 and 41. The housing 2802 further includes a divider 2805 between a shelving system 2820 and/or a motion system 2840 and system components 2860. The divider 2805 forms openings 2807 having shelves 2809, which are used to transfer the packaged articles 2812 to the transfer system 2840 as later described. The divider 2805 is orthogonal to the window 2803 to not obstruct a view inside the housing 2802. The mobile kiosk 2800 may be configured to use any of the packaged articles discussed herein. For example, the shelving system 2820, motion system 2840, and transfer system 2808 may direct which packaged articles are used by the mobile kiosk 2800.

The shelving and motion systems 2820 and 2840 may be any of the shelving and motion systems discussed in relation to FIGS. 21-26. In some embodiments, the shelving and motion systems 2120 and 2140 discussed in relation to FIG. 21 are used. For example, the motion system 2140 retrieves the packaged articles 2812 from the shelving system 2120 and places them on the shelves 2809. In some embodiments, the shelving systems 2220 and/or 2221 and the motion system 2240 (with or without the track system 2241) as discussed in relation to FIG. 22 are used. For example, the motion system 2240 retrieves the packaged articles 2812 from the shelving unit 2220A, 2220B, 2280A, or 2280B of the shelving system 2220 and places them on the shelves 2809. In some embodiments, the shelving system 2320 and/or 2330 and the motion system 2340 as discussed in relation to FIG. 23 are used. For example, the motion system 2340 retrieves the packaged articles 2812 from the shelving unit 2320A, 2320B, or 2380 of the shelving system 2320 and places them on the shelves 2809. In some embodiments, the shelving and motion systems 2420 and 2440 and the pneumatic tube 2470 discussed in relation to FIG. 24 are used. For example, the motion system 2440 retrieves the packaged articles 2812 from the shelving system 2420 and places them on the shelves 2809. In some embodiments, shelving and motion systems 2420 and 2440 are used without the pneumatic tube 2470. In some embodiments, the shelving and motion systems 2520 and 2540 discussed in relation to FIG. 25 are used. For example, the carrier 2550 retrieves the packaged articles 2812 from the storage rail 2542 and moves them to the delivery rail 2546, which places the packaged articles 2812 on the shelves 2809. In another example, the rail switch 2567 moves the packaged articles 2812 from the storage rail 2562 to the delivery rail 2546, which places the packaged articles 2812 on the shelves 2809. In some embodiments, the shelving and motion systems 2620 (or 2680) and 2640 discussed in relation to FIG. 26 are used. For example, the motion system 2640 retrieves the packaged articles 2812 from the shelving system 2620 and places them on the shelves 2809. In some embodiments, the motion systems may deliver the packaged articles 2812 directly to the transfer system 2808 and the shelves 2809 are not used.

In some embodiments, the shelving system 2820 delivers the packaged articles 2812 to the shelves 2809 directly such that the motion system 2840 is not used. For example, any of the shelving systems 2220 (FIGS. 22B-22E and 22G-22I), 2230 (FIGS. 22P-22R), 2320 (FIG. 23B), 2425 (FIG. 24F), or 2630 (FIG. 26C) may deliver the packaged articles 2812 on the shelves 2809. In some embodiments, the shelving systems deliver the packaged article 2812 directly to the transfer system 2808 and the shelves 2809 are not used.

The article personalization system 2806 is similar to the article personalization system 2206 discussed in relation to FIG. 22A, except as noted. The article personalization system 2806 includes a plurality of system components 2860 such as an article preparation system 2860A, DTG printers 2860B, and a curing system 2860C. The system components 2860 depicted in FIG. 28A are for illustrative purposes and the actual system components 2860 may have any shape, such as previously discussed in relation to the system components 2160 in FIG. 21A. The system components 2860 are disposed on platforms 2811 at different levels. For example, the DTG printers 2860B and the curing systems 2860C are disposed on platforms 2811 at different heights from a floor of the housing 2802. The platforms 2811 are attached to walls of the housing 2802, such as through shelving brackets and fasteners (e.g., screws or bolts and the like).

The transfer system 2808 transfers the packaged articles 2812 between the system components 2860. In the embodiment depicted in FIG. 28A, the transfer system 2808 includes a robotic arm 2872 that accesses the shelves 2809, all of the system components 2860, and the dispenser 2810. The robotic arm 2872 is similar to the robotic arm 2572B discussed in relation to FIG. 25H. For example, the robotic arm 2872 comprises a gripper as an end effector that is configured to grasp the packaged articles 2812. In some embodiments, the robotic arm 2872 is slidably mounted to a rail, similar to the robotic arm 2572A discussed in relation to FIG. 25G.

In some embodiments, the transfer system 2808 may be any of the transfer systems discussed in relation to FIGS. 21-26. In some embodiments, the transfer system 2208 (e.g., the motion system 2240 with or without the track system 2241) as discussed in relation to FIG. 22 is used. For example, the transfer system 2208 transfers the packaged articles 2812 between the system components 2860. In some embodiments, the transfer system 2308 (e.g., the motion system 2340) as discussed in relation to FIG. 23 are used. For example, the transfer system 2308 transfers the packaged articles 2812 between the system components 2860. In some embodiments, the transfer system 2408 discussed in relation to FIG. 24 is used. For example, the pneumatic tube 2470 moves the packaged articles 2812 to the shelves 2809 and the robotic arm 2872 transfers the packaged articles 2812 between the system components 2860. In some embodiments, the transfer system 2608 discussed in relation to FIGS. 26I-26K is used. For example, the transfer system 2608 transfers the packaged articles 2812 between the system components 2860, which are arranged within reach of the transfer system 2808 different from shown in FIG. 28A. In some embodiments, the transfer system 2308 is similar to the transfer system 2208 discussed in relation to FIG. 22A.

The dispenser 2810 may be similar to any of the dispensers discussed in relation to FIGS. 21-26. For example, the dispenser 2810 may include the storage system 2611 to store rejected packaged articles as discussed in relation to FIG. 26A. In the depicted embodiment, the dispenser is disposed in the side of the van 2801 that includes the window 2803, and in particular, is disposed below the window 2803. In some embodiments, the dispenser may be located elsewhere in the housing 2802 that is accessible by the user.

The control system 2890 controls the mobile kiosk 2800, and may be similar to any of the control systems discussed in relation to FIGS. 21-26, such as similar to the control system 2190 discussed in relation to FIG. 21A.

The mobile kiosk 2800 differs from non-kiosk personalization systems in a similar manner as the kiosk 2100 discussed in relation to the top-front-right view of FIG. 21A and the top-left-rear view of 21B. The mobile kiosk 2800 further differs from non-kiosk personalization systems in that the kiosk 2800 may be driven to different locations.

In some embodiments, the mobile kiosk 2800 uses the system components 2760 discussed in relation to FIGS. 27B and 27C. For example, the DTG printer 2760A and a curing system 2760B may be disposed inside the housing 2802. In such embodiments, the dispenser 2810 may be the staging area 2710 and the user inserts the packaged article 2812 into the dispenser 2810.

In some embodiments, a different wheeled vehicle is used instead of the van 2801. For example, a truck, such as a pickup truck of a box truck, may be used. In other example, a bus, sport utility vehicle (SUV), cross-over vehicle, or a car and the like are used. In some examples, a trailer may be used that is towed by a vehicle, such as a cargo trailer, a converted recreational vehicle (RV), or a semi-trailer and the like.

Figure 28B:
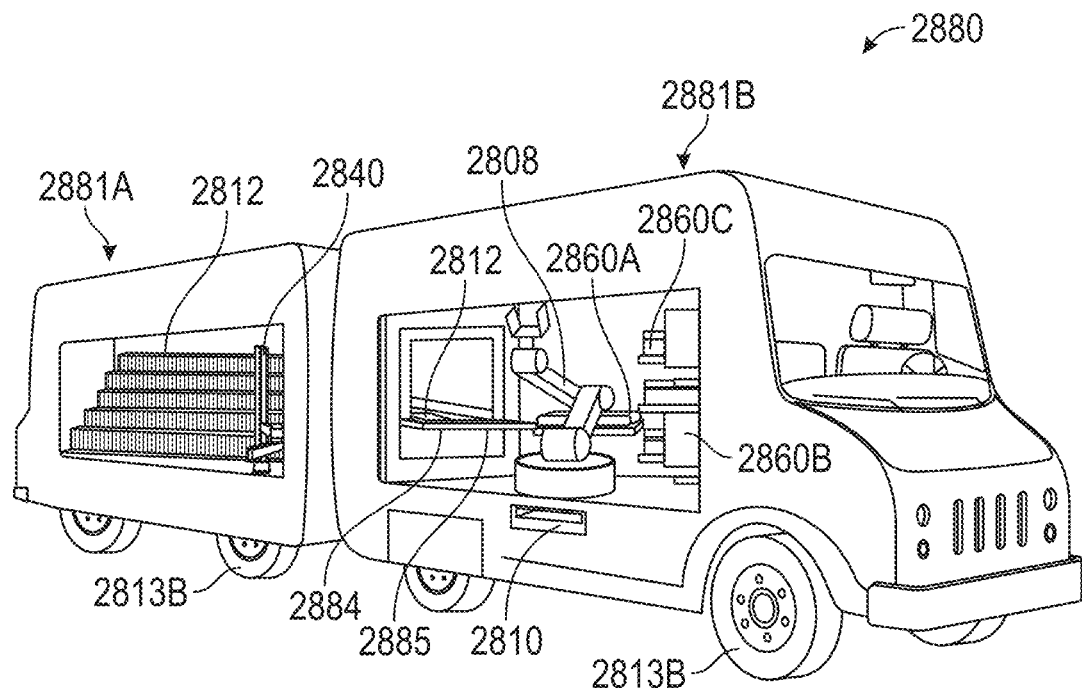
FIG. 28B-28C depict different views of a mobile on-demand personalization kiosk, according to some embodiments.
Figure 28C:
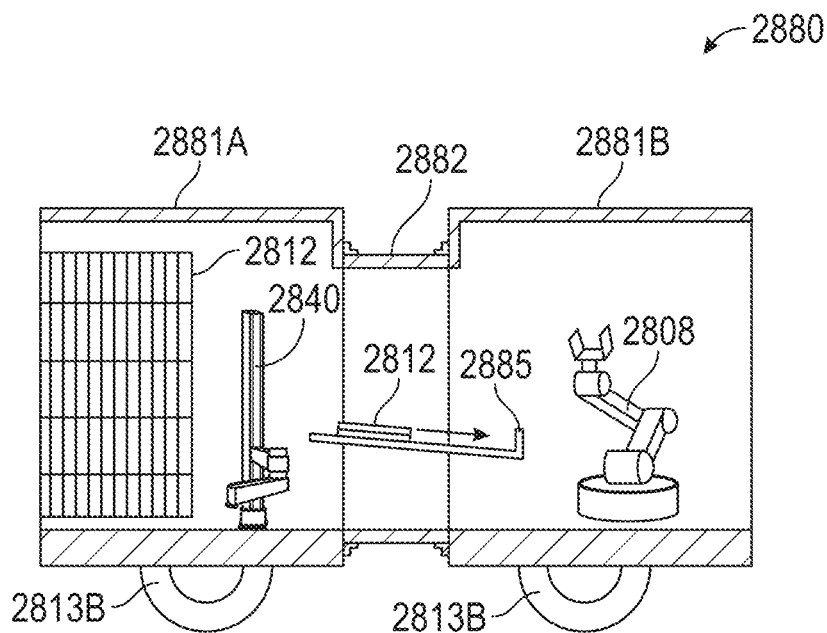

FIGS. 28B and 28C depict different views of a mobile on-demand personalization kiosk 2880, according to some embodiments. In particular, FIG. 28B shows a perspective view of the mobile on-demand personalization kiosk 2880 (referred to as the mobile kiosk 2880).

The mobile kiosk 2880 is similar to the mobile kiosk 2800 discussed in relation to FIG. 28A, except as noted. For example, the mobile kiosk 2880 includes a first van 2881A and a second van 2881B that removably couple through an interface system 2882. Each of the vans 2881A and 2881B are similar to the van 2801 (FIG. 28A). The first van 2881A includes the shelving and motion systems 2820 and 2840. The second van 2881B includes the article personalization system 2806, the transfer system 2808, and the dispenser 2810. The control system 2890 may be in either of the vans 2881A and 2881B, or link to both of the vans 2881A and 2881B through a hardwired or wireless connection.

The vans 2881A and 2881B form an opening (not shown) in a back side. The openings are disposed inside the interface system 2882 when the interface system 2882 is installed. In some embodiments, the interface system 2882 is a hard fixture, such as plastic or metal sheeting or panels, that couples to the vans 2881A an 2881B. The hard fixture removably attaches to the vans 2881A and 2881B using screws, bolts, magnets, hook and loop fasteners, butterfly fasteners, toggle latches, slot fasteners, and the like. In some embodiments, the interface system 2882 is a soft cover, such as a cloth, fabric, or leather, that couples to the vans 2881A an 2881B. The soft cover removably attaches to the vans 2881A and 2881B using screws, bolts, fabric eyelets, rope, magnets, hook and loop fasteners, snap fasteners, buttons, zippers, and the like. Thus, the interface system 2882 is configured to couple the back side of the first van 2881A to the back side of the second van 2881B. A seal, such as an O-ring or weather stripping, may be used between the interface system 2882 and the vans 2881A and 2881B to prevent water from entering through the interface system 2882. The openings allow the packaged articles 2812 to move from the first van 2881A to the second van 2881B. The openings may be closed by doors (not shown) when not in use.

A chute 2884 is disposed in the interface system 2882 and moves packaged articles 2812 from the first van 2881A to the second van 2881B. For example, the shelving or motion systems 2820 or 2840 place the packaged articles 2812 on the chute 2884, which is sloped to allow the packaged articles 2812 to slide towards the second van 2881B. A ledge 2885 or lip of the chute 2884 stops the packaged articles 2812 from sliding and hold the packaged articles 2812 on an end of the chute 2884 in the second van 2881B. The chute 2884 is coupled to the openings formed in the vans 2881A and 2881B. The transfer system 2808 grasps the packaged articles 2812 from the chute and moves the packaged articles 2812 between the system components 2860 as previously discussed in relation to FIG. 28A.

FIG. 28C shows a schematic view of the interface system 2882 and the vans 2881A and 2881B. As previously discussed in relation to FIG. 28C, the motion system 2840 moves the packaged articles 2812 from the shelving system 2820 to the chute 2884. The chute 2884 slides the packaged articles 2812 towards the second van 2881B and a ledge 2885 of the chute 2884 holds the packaged articles 2812. The transfer system 2808 moves the packaged articles 2812 from the chute 2884 to the system components 2860 (FIG. 28B) and the dispenser 2810 (FIG. 28B).

In some embodiments, the vans 2881A and 2881B form an opening in a side and the interface system 2882 couples the side of the first van 2881A to the side of the second van 2881B.

Comparison of the Kiosks

Each of the kiosks discussed herein may share similar features with other kiosks. The kiosks may use the same system components. The kiosks 2200, 2300, and 2600 use an arrangement of system components that complements their motion system and/or transfer system. The kiosks 2100, 2200, and 2300 use the motion system as the transfer system. The kiosks 2200 and 2300 use shelving systems having limited openings because the motion systems are fixed to the kiosk housing and can access a limited envelope. The kiosks 2200, 2300, and 2600 use shelving systems having moving components to transfer the packaged articles to the motion system. The kiosks 2400 and 2600 use conveyor systems (outside of the shelving systems) to move the packaged articles. The kiosks 2200 and 2300 (and in some embodiments, the kiosks 2400 and 2500) use a robotic arm to move the packaged articles. The shared features between the kiosks may be interchangeable. For example, the shelving systems of the kiosks 2200 and 2300 may be interchanged. Therefore, any description of a feature in one embodiment of a kiosk may be applied to similar kiosks. The mobile kiosk 2800 may share many of the features discussed in relation to the other kiosks, such as discussed in relation to FIG. 28.

The kiosks may also have unique features not shared with other kiosks. The kiosks 2100, 2400, and 2600 use motion systems that are not compatible with the other kiosks. The kiosks 2400 and 2500 each cannot use a shelving systems from other kiosks. Therefore, some features of a kiosk may not be applied to other kiosks or features of other kiosks may not be applied to some kiosks.

User Enhancements

Figure 29:
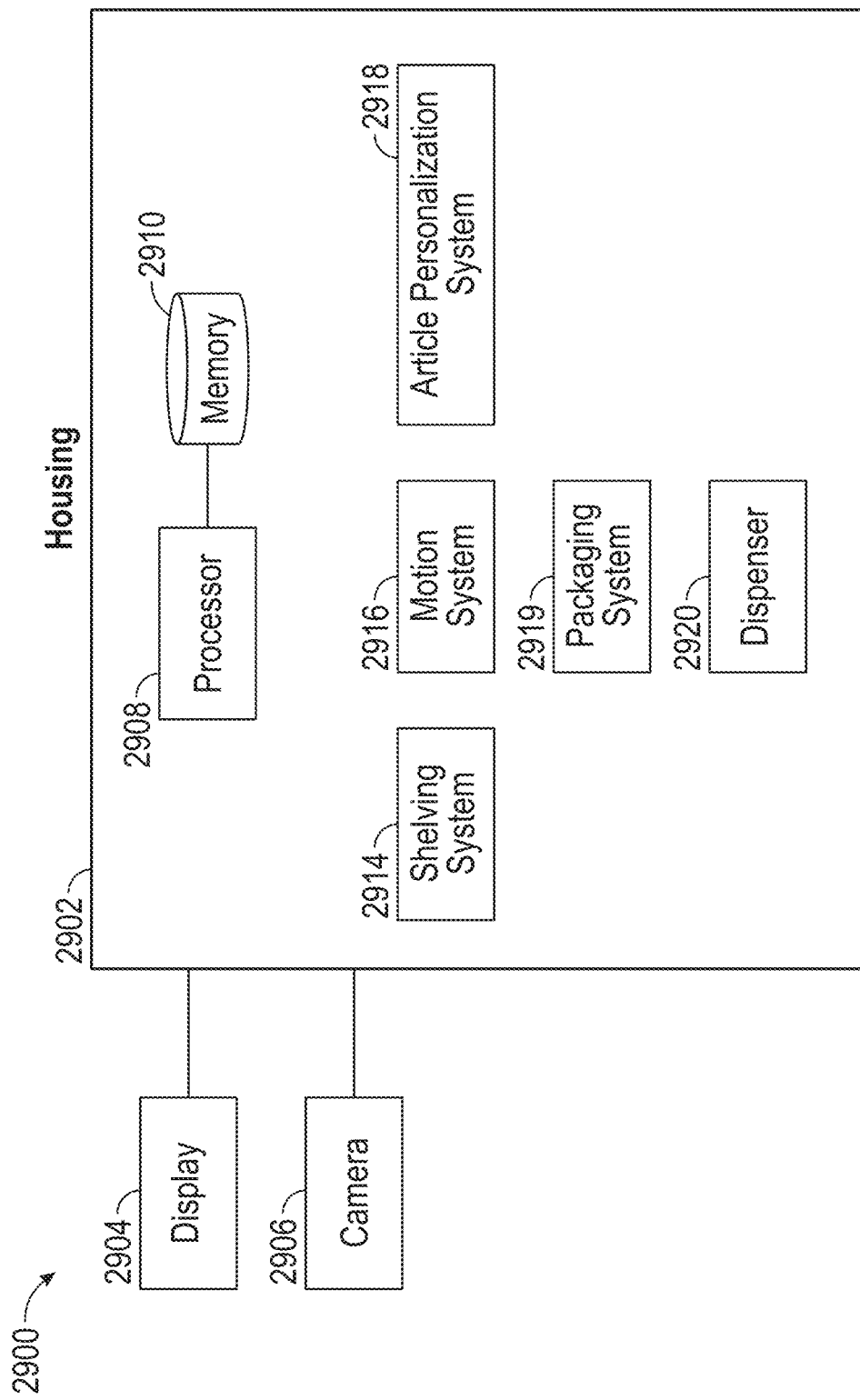
FIG. 29 illustrates an example system.

FIG. 29 illustrates an example system 2900, which may be an on-demand personalization kiosk. As seen in FIG. 29, the system 2900 includes a housing 2902, a display 2904, and a camera 2906. Generally, the system 2900 generates and presents on the display 2904 an image of a user wearing an article with a custom design to simulate the look and fit of the article on the user. In this manner, the user may see what the article and the custom design look like on the user before the user agrees to create the article with the custom design, which improves user satisfaction and reduces material waste caused by returns, in certain embodiments.

The housing 2902 may form an external shell or encasement of the kiosk. The housing 2902 may be formed using any suitable materials (e.g., metal, wood, plastic, etc.). Many of the components of the kiosk may be positioned on or in the housing 2902. As seen in FIG. 29, a processor 2908, a memory 2910, a shelving system 2914, a motion system 2916, an article personalization system 2918, a packaging system 2919, and a dispenser 2920 may be positioned within or on the housing 2902. Additionally, the display 2904 and the camera 2906 may be coupled to or attached to the housing 2902. For example, the display 2904 and the camera 2906 may be attached to an external surface of the housing 2902.

The display 2904 and the camera 2906 operate together to present to a user a simulated image of the user wearing a custom article with a design. For example, the camera 2906 may take pictures or videos of the user. The simulated image of the user wearing the custom article with the design may be generated using the image or video taken by the camera 2906. The display 2904 then presents the simulated image to the user. The simulated image includes an actual image of the user rather than an avatar or simulation of the user. For example, the simulated image may include an image of the user taken by the camera 2906, but the user in the image is wearing the custom article with the design. In some embodiments, the simulated image may be updated or regenerated as the user moves or turns. In this manner, the user may see different angles or perspectives of the custom article with the design on the user.

In some embodiments, the display 2904 and the camera 2906 are coupled or attached to an external surface of the housing 2902. The camera 2906 may be directed at the user and the display 2904 may be positioned in front of the user. As a result, when the display 2904 presents the simulated image of the user wearing the custom article with the design, the display 2904 simulates a mirror that reflects an image of the user back towards the user. In other words, the simulated image includes an actual image of the user rather than an image of an avatar or simulation of the user. The display 2904 may also create an augmented reality effect by simulating the custom article with the design being worn by the user, even though the user is not wearing the custom article with the design. In this manner, the user may see how the custom article with the design looks and fits on the user before the custom article is created. As a result, the system 2900 improves user satisfaction and reduces material waste caused by returns, in certain embodiments.

In some embodiments, the display 2904 is positioned behind a two-way mirror that presents a reflection of the user standing in front of the two-way mirror. The camera 2906 is directed at the user and captures an image or video of the user. That image or video is analyzed to determine a position of the user and a corresponding location on the display. An image or model of the custom article with the design is then presented on the display at the determined location on the display. Lighting in front of the two-way mirror or lighting behind the two-way mirror may be adjusted so that the display can be seen through the two-way mirror. As a result, the custom article with the design is presented such that the reflection of the user appears to be wearing custom article with the design.

In certain embodiments, the display 2904 and the camera 2906 are included in a pair of augmented reality glasses worn by the user. A one-way mirror is coupled to the housing 2902 and presents a reflection of the user standing in front of the one-way mirror. When the user looks at the reflection, the camera 2906 takes an image or video of the reflection. That image or video is used to detect a position of the reflection. The display 2904 then presents an image of a model of the custom article with the design at a particular location on the display 2904 such that the reflection appears to be wearing the custom article with the design when the user looks through the augmented reality glasses at the reflection. As a result, the custom article with the design is presented such that the reflection of the user appears to be wearing custom article with the design.

The processor 2908 is any electronic circuitry, including, but not limited to one or a combination of microprocessors, microcontrollers, application specific integrated circuits (ASIC), application specific instruction set processor (ASIP), and/or state machines, that communicatively couples to memory 2910 and controls the operation of the kiosk. The processor 2908 may be 8-bit, 16-bit, 34-bit, 66-bit or of any other suitable architecture. The processor 2908 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The processor 2908 may include other hardware that operates software to control and process information. The processor 2908 executes software stored on the memory 2910 to perform any of the functions described herein. The processor 2908 controls the operation and administration of the kiosk by processing information (e.g., information received from the camera 2906 and memory 2910). The processor 2908 is not limited to a single processing device and may encompass multiple processing devices.

The memory 2910 may store, either permanently or temporarily, data, operational software, or other information for the processor 2908. The memory 2910 may include any one or a combination of volatile or non-volatile local or remote devices suitable for storing information. For example, the memory 2910 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in the memory 2910, a disk, a CD, or a flash drive. In particular embodiments, the software may include an application executable by the processor 2908 to perform one or more of the functions of the personalization kiosk described herein.

The processor 2908 and the memory 2910 may operate together, to generate the simulated image of the user wearing the custom article with the design. For example, the processor 2908 may execute an application stored on the memory 2910 to generate the simulated image. The processor 2908 may receive an image or a video taken by the camera 2906. The processor 2908 may use machine learning to analyze the image or video. For example, the processor 2908 may apply machine learning to locate the user or parts of the user's body in the image or video. The processor 2908 may then scale and orient a model of the custom article with the design so that the model fits onto the user in the image or video. The processor 2908 may then superimpose the model of the custom article onto the user in the image or video to create the simulated image of the user wearing the custom article with the design. The processor 2908 then presents on the display 2904 the simulated image. As the user moves or rotates, the camera 2906 takes updates images of the user that the processor 2908 uses to update the simulated image (e.g., by applying machine learning to move or rotate the model of the article with the design). The processor 2908 then updates the display 2904 with the updated simulated image. In this manner, the display 2904 creates the effect that the user is looking at a mirror reflecting an image of the user back to the user.

As discussed previously, the shelving system 2914 may include several mechanisms for storing articles (e.g., shirts or pants). For example, the shelving system 2914 may include shelves, baskets, or rails that operate together to store uncustomized articles (e.g., raw or original articles). After a user has confirmed an article and a custom design, the article may be retrieved from the shelving system 2914 for customization.

As discussed previously, the motion system 2916 may include one or more mechanisms that move articles between the shelving system 2914, the article personalization system 2918, and the packaging system 2919. For example, the motion system 2916 may include rails, arms, or grabbers that retrieve uncustomized articles from the shelving system 2914 and move those uncustomized articles to the article personalization system 2918 for customization. In some embodiments, the motion system 2916 moves uncustomized articles from the shelving system 2914 to the article personalization system 2918 in response to a user confirming an article and custom design.

As discussed previously, the article personalization system 2918 includes one or more mechanisms that create custom designs on articles. For example, the article personalization system 2918 may include one or more printers that print custom designs onto articles, such as shirts or pants. The article personalization system 2918 may receive an uncustomized article from the motion system 2916. The article personalization system 2918 may also receive a selected design from the processor 2908. The article personalization system 2918 then prints the custom design onto the uncustomized article to create a custom article.

As discussed previously, the packaging system 2919 may receive custom articles from the article personalization system 2918 or the motion system 2916. The packaging system 2919 may fold and package the custom article using any of the various packages described previously. In certain embodiments, by folding and packaging the custom article, the packaging system 2919 protects the custom article and improves the transportability of the custom article.

The processor 2908 may control the operation of the shelving system 2914, the motion system 2916, the article personalization system 2918, and the packaging system 2919. For example, the processor 2908 may issue instructions to each of these systems to initiate the operation of these systems. After a user has confirmed an article and a custom design, the processor 2908 may issue an instruction to the motion system 2916 to retrieve an article from the shelving system 2914 and to move that article to the article personalization system 2918. The processor 2908 may also issue an instruction to the article personalization system 2918 to create the custom article with the design. The article personalization system 2918 may create the custom design on the uncustomized article retrieved by the motion system 2916. After the article personalization system 2918 has created the custom article with the design, the processor 2908 may instruct the motion system 2916 to move the custom article from the article personalization system 2918 to the packaging system 2919. The processor 2908 then issues an instruction to the packaging system 2919 to fold and package the custom article. After the packaging system 2919 has folded and packaged the custom article, the processor 2908 may instruct the motion system 2916 to move the packaged article from the packaging system 2919 to the dispenser 2920, where the packaged article is dispensed to the user. In some embodiments, the packaging system 2919 may be arranged with the dispenser 2920 such that the packaging system 2919 may dispense the packaged article directly through the dispenser 2920 without involving the motion system 2916.

The dispenser 2920 may be coupled to the housing 2902 and provides a mechanism through which a user may receive a custom article. For example, the dispenser 2920 may include a slot or chute that dispenses a custom article to a user on the outside of the housing 2902. In some embodiments, the dispenser 2920 may be arranged such that the dispenser 2920 may dispense a custom article directly from the article personalization system 2918 or a packaged article directly from the packaging system 2919. In some embodiments, the dispenser 2920 is arranged such that the dispenser 2920 dispenses custom articles or packaged articles moved by the motion system 2916.

Figure 30:
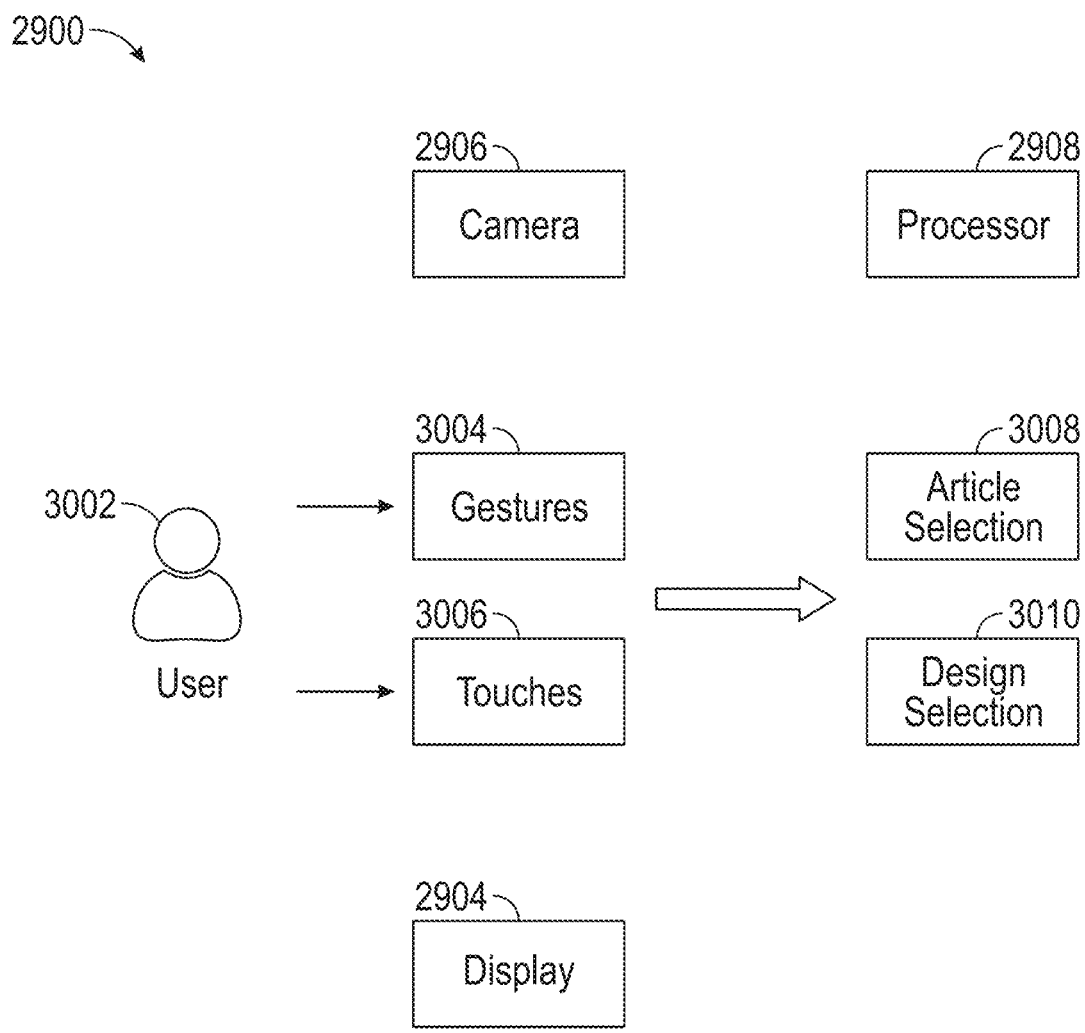
FIG. 30 illustrates article and design selection in the system of FIG. 29.

FIG. 30 illustrates article and design selection in the system 2900 of FIG. 29. As seen in FIG. 30, a user 3002 may use one or more techniques to select an article and a custom design. Generally, the display 2904 or the camera 2906 may be used to determine which article and design the user 3002 selected.

In a first technique, the user 3002 may perform a gesture 3004 to select an article or design. The camera 2906 may take images or videos of the user 3002 and send the images or videos to the processor 2908. The processor 2908 may analyze the images or videos to determine whether the user is performing certain gestures 3004 that indicate a selection. For example, the processor 2908 may determine whether the user 3002 has moved the user's 3002 arm or hand to a particular position corresponding to a location on the display 2904. When the processor 2908 determines that the user 3002 has moved an arm or hand to a position corresponding to a location on the display 2904, the processor 2908 may determine that the user 3002 has made a selection.

As an example, the display 2904 may present to the user 3002 various options for articles and designs. These options may be presented on different portions of the display 2904. The user 3002 may move the user's 3002 arm or hand such that an arm or hand of the user 3002 presented in an image or video on the display 2904 moves over to a particular portion of the display 2904. The portion of the display 2904 may display an option for an article or design. When the processor 2908 detects that the user 3002 has moved the arm or the hand such that the arm or hand in the presented image or video moves to the portion of the display 2904 displaying the article or design option, the processor 2908 may determine that the user 3002 has made a selection.

In a second technique, the user 3002 may use one or more touches 3006 to make an article or design selection. For example, the display 2904 may include touchscreen technology that detects when the user 3002 has touched a particular portion of the display 2904. The processor 2908 detects these touches 3006 on the display 2904 and determines a location of the touches 3006 on the display 2904. The processor 2908 then determines an article or design option corresponding to the location of the touch.

Based on the gestures 3004 or the touches 3006, the processor 2908 may determine one or more article selections 3008 and design selections 3010. In some embodiments, the user 3002 first makes an article selection 3008. For example, the user 3002 may first select a shirt or a pair of pants to customize. After the user 3002 makes the article selection 3008, the user 3002 makes the design selection 3010. For example, the user 3002 may select a particular logo or image to print on the selected article. In some embodiments, the user may select features about the design, including size, color combinations, position within a personalization window, orientation, complimentary personalization in one or more alternative personalization window, etc. In some embodiments, the user 3002 may make the design selection 3010 before the article selection 3008. After the user 3002 has made the article selection 3008 and the design selection 3010, the system 2900 may generate and present a simulated image of the user 3002 wearing the selected article with the selected design. As discussed previously, the simulated image may include an actual image of the user 3002 rather than an image of an avatar or simulation of the user 3002.

Figure 31:
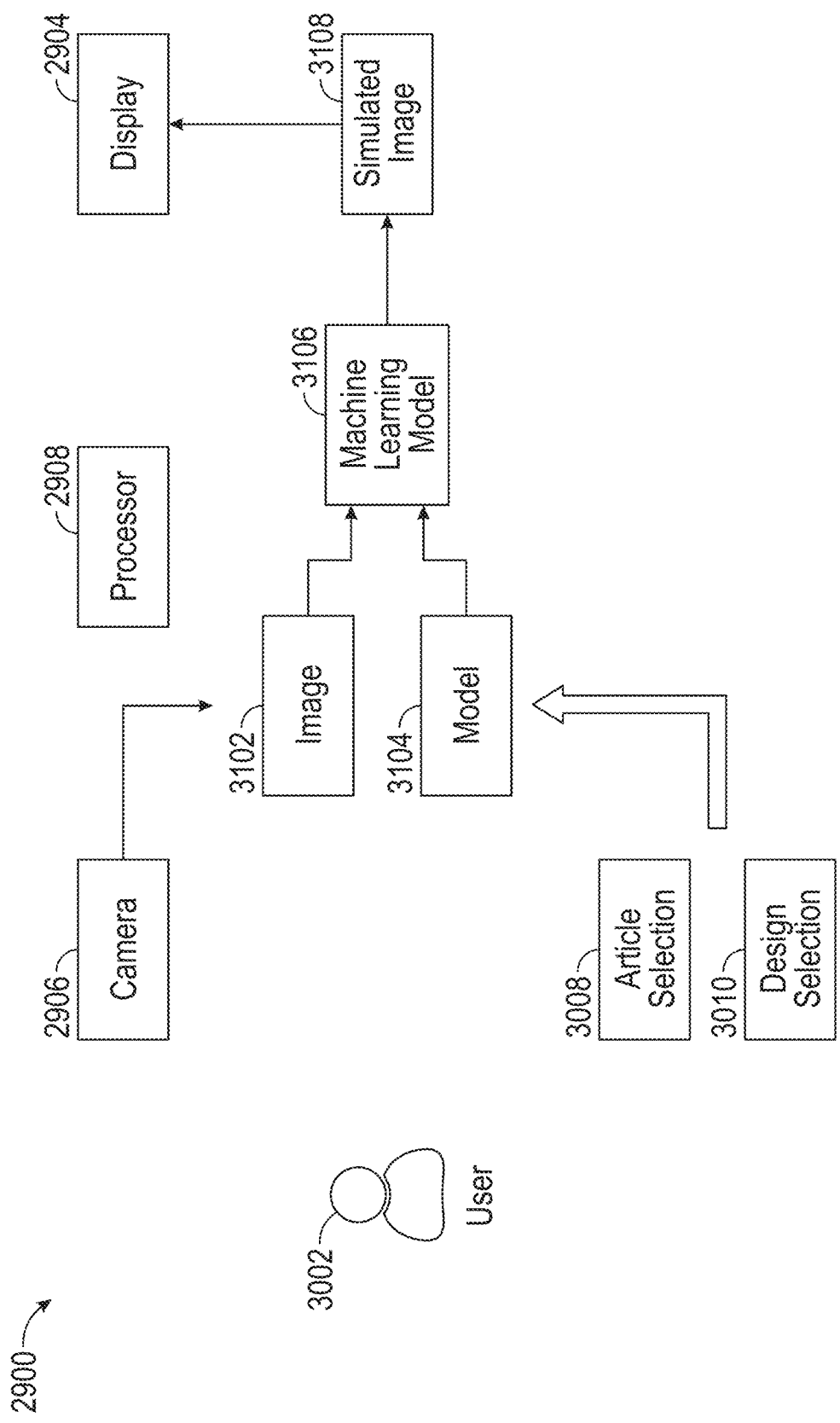
FIG. 31 illustrates simulated image generation in the system of FIG. 29.

FIG. 31 illustrates simulated image generation in the system 2900 of FIG. 29. As seen in FIG. 31, the camera 2906 takes an image 3102 of the user 3002. In some embodiments, the camera 2906 may take multiple images 3102 or a video of the user 3002. Additionally, after the user 3002 has made the article selection 3008 and the design selection 3010, the processor 2908 generates or retrieves a model 3104 of the selected article with the selected design. For example, the processor 2908 may retrieve a model of the selected article and a model of the selected design from a database. The processor 2908 may then combine these two models or superimpose the model of the selected design onto the model of the article to create the model 3104. As a result, the model 3104 is a model of the selected article with the design printed on the article.

The processor 2908 then applies a machine learning model 3106 to the image 3102 to detect the user 3002 or parts of the user's 3002 body in the image 3102. For example, the machine learning model 3106 may have been trained to analyze images to detect particular objects within the image 3102. The machine learning model 3106 may analyze colors and shapes that appear in the image 3102 to identify certain objects (e.g., body parts) in the image 3102. For example, the machine learning model 3106 may be trained to identify a head, chest, shoulder, arm, or leg of the user 3002 that appears in the image 3102. The machine learning model 3106 may determine coordinates that represent the positions or locations of these body parts in the image 3102.

The processor 2908 may use these coordinates of body parts to orient and scale the model 3104 so that the model 3104 fits onto the user as shown in the image 3102. For example, the processor 2908 may rotate the model 3104 so that the article in the model 3104 is aligned properly with the body of the user 3002 in the image 3102. Additionally, the processor 2908 may scale or size the model 3104 so that the model 3104 fits over the body of the user 3002 in the image 3102. After preparing the model 3104, the processor 2908 creates a simulated image 3108 using the image 3102 and the model 3104. For example, the processor 2908 may superimpose the model 3104 onto the body of the user 3002 in the image 3102 to create the simulated image 3108. As a result, the simulated image 3108 shows an actual image the user 3002 wearing the selected article with the selected design (as opposed to an avatar or simulation of the user 3002 wearing the selected article). The processor 2908 then presents the simulated image 3108 on the display 2904. In this manner, the user 3002 may view the display 2904 to see how the selected article with the selected design would look and fit on the user 3002 before the user 3002 confirms the creation of the article with the design. In this manner, the system 2900 improves user satisfaction and reduces material waste caused by returns, in certain embodiments.

As the user 3002 moves or turns, the camera 2906 may take additional images 3102 or video that show the movement or turning of the user 3002. The processor 2908 may apply the machine learning model 3106 to the additional images 3102 or video to detect the body parts in the additional images 3102 or video. The processor 2908 may then move or rotate the model 3104 to fit over the detected body parts in the additional images 3102 or video to produce updated simulated images 3108. The processor 2908 then presents the updated simulated images 3108 on the display 2904. The user 3002 may view the updated simulated images 3108 to see different perspectives of the article with the design.

If the user 3002 changes the selection of the article or the design, the processor 2908 updates the simulated image 3108 to show the newly selected article or design. For example, the processor 2908 may retrieve a model of the newly selected article or newly selected design from the database. The processor 2908 then orients and sizes the model so that the model fits appropriately over the detected body parts in the image 3102. The processor 2908 then flattens the model and superimposes the model onto the image 3102 of the user 3002 to generate a new simulated image 3108.

In some embodiments, the processor 2908 changes the background presented on the display 2904 to simulate the user 3002 wearing the custom article with the design in different environments (e.g., indoors or outdoors) or at different times of the day (e.g., during the day or at night). The processor 2908 may also update the lighting on the model of the custom article with the design in the simulated image 3108 to better simulate the changes in environments or times of day. In this manner, the user 3002 may see how the custom article with the design would look when worn by the user 3002 in different settings or at different times. As a result, the processor 2908 assists the user 3002 in deciding whether to purchase the custom article with the design, which improves user satisfaction and reduces material waste caused by returns, in certain embodiments.

In certain embodiments, the processor 2908 superimposes an image of the article and the design onto the image 3102 of the user 3002 to simulate the look and fit of the article with the design. Rather than retrieving and processing the model 3104 using the machine learning model 3106, the processor 2908 retrieves images of the article and the design and directly superimposes those images onto the image 3102 of the user 3002. This process uses less time and computing resources than the process shown in FIG. 31 but it may result in a less accurate simulation of the look and fit. This tradeoff between simulation accuracy and time/resource consumption may be acceptable in certain situation (e.g., when computing resources are more limited or when simulation accuracy is not as great of a concern).

Figure 32:
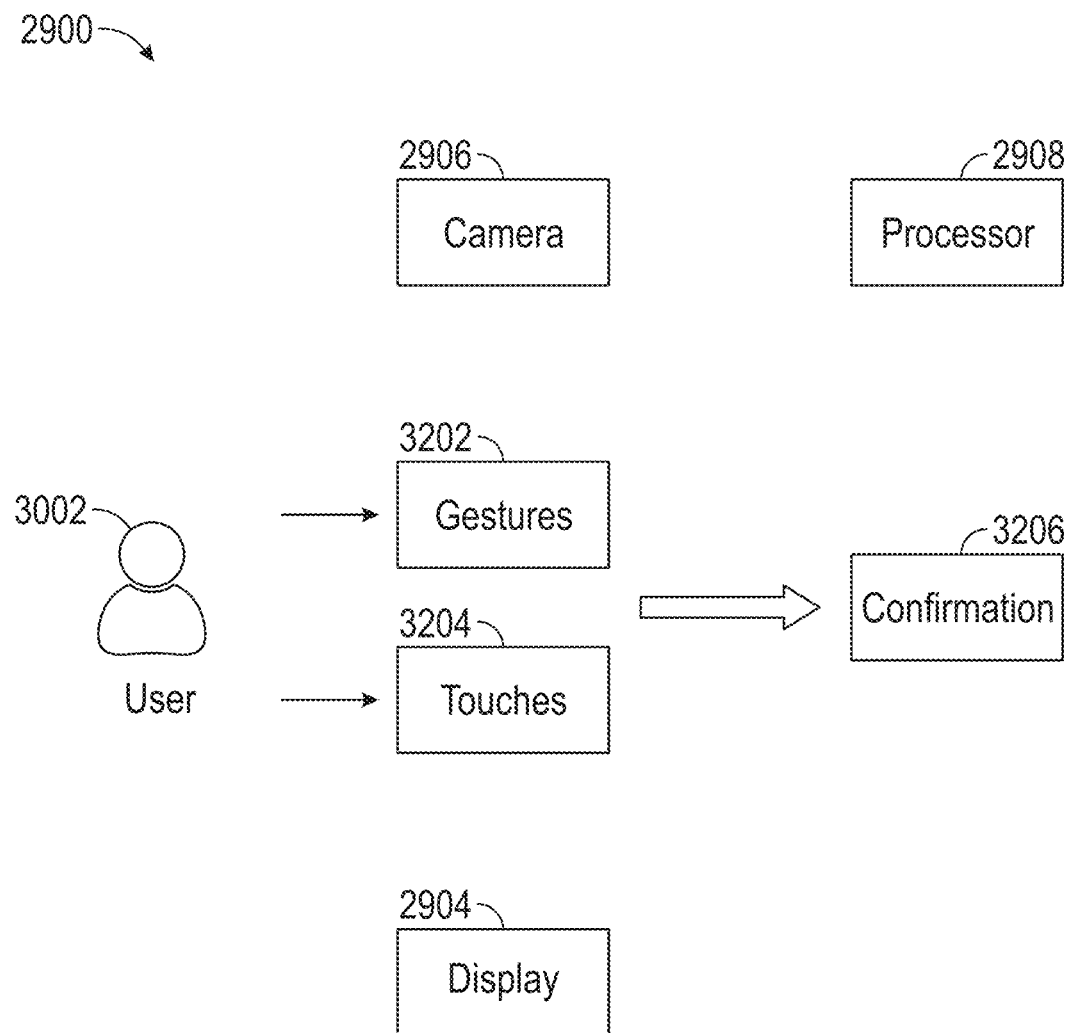
FIG. 32 illustrates article and design confirmation in the system of FIG. 29.

FIG. 32 illustrates article and design confirmation in the system 2900 of FIG. 29. Generally, the user 3002 may confirm an article or design after viewing the simulated image 3108 of the user 3002 wearing the article with the design. As seen in FIG. 32, similar to article and design selection, the user 3002 may confirm an article and design using gestures 3202 or touches 3204. For example, the camera 2906 may take images or videos of the user 3002. These images or videos are analyzed by the processor 2908 to determine whether the user 3002 has made a gesture 3202 indicating a confirmation. Additionally or alternatively, the display 2904 may include a touchscreen that detects whether the user 3002 has performed one or more touches 3204 on the display 2904. The processor 2908 analyzes these touches 3204 to determine whether the user 3002 has confirmed an article or design. In the example of FIG. 32, the processor 2908 may determine that the user 3002 has made a confirmation 3206 based on the gestures 3202 or the touches 3204. After the user 3002 has confirmed an article with a design, the system 2900 may proceed to create the article with the design.

Figure 33:
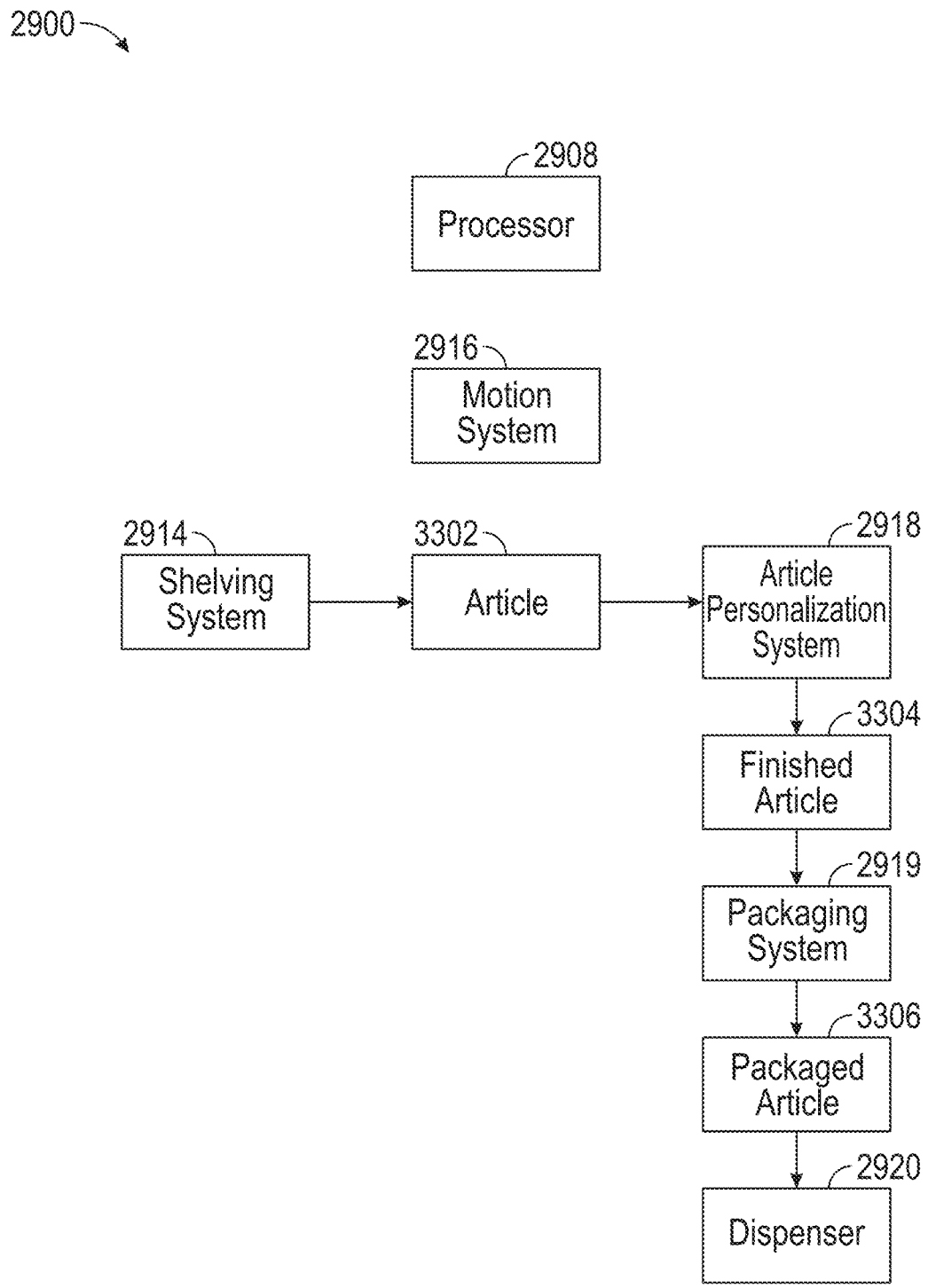
FIG. 33 illustrates article creation in the system of FIG. 29.

FIG. 33 illustrates article creation in the system 2900 of FIG. 29. As described previously, the article creation process may use one or more systems to create an article with a custom design. The processor 2908 may issue instructions to the one or more systems to perform certain tasks in creating the custom article.

As seen in FIG. 33, the article creation process begins with the shelving system 2914 storing one or more articles 3302. For example, the shelving system 2914 may include shelves, racks, buckets, barrels, or baskets that store articles 3302. After a user has confirmed an article 3302 and design, the processor 2908 issues an instruction to the motion system 2916 to retrieve the article 3302 from the shelving system 2914. The motion system 2916 may include one or more rails, grabbers, or arms that retrieve the article 3302 from the shelving system 2914.

The motion system 2916 moves the article 3302 from the shelving system 2914 to the article personalization system 2918. The processor 2908 may issue an instruction to the article personalization system 2918 to create the confirmed design on the article 3302. For example, the processor 2908 may communicate the confirmed design to the article personalization system 2918, and the article personalization system 2918 may create the confirmed design on the article 3302. The article personalization system 2918 uses one or more mechanisms to create a confirmed design on the article 3302. For example, the article personalization system 2918 may include one or more printers that print the confirmed design onto the article 3302. The article personalization system 2918 creates the design on the article 3302 to produce a finished article 3304.

The finished article 3304 is then moved to the packaging system 2919. In some embodiments, the processor 2908 issues an instruction to the motion system 2916 to move the finished article 3304 from the article personalization system 2918 to the packaging system 2919. The packaging system 2919 then folds and packages the finished article 3304 to produce the packaged article 3306. In this manner, the packaging system 2919 protects the finished article 3304 and improves the transportability of the finished article 3304, in certain embodiments. In some embodiments, the packaging system may be a semi-automatic or manual station where the packaging is performed at least partially by a personalization clerk or by the user himself.

The packaged article 3306 is then moved from the packaging system 2919 to the dispenser 2920. In some embodiments, the processor 2908 instructs the motion system 2916 to move the packaged article 3306 from the packaging system 2919 to the dispenser 2920. In some embodiments, the dispenser 2920 is arranged to dispense the packaged article 3306 directly from the packaging system 2919. The dispenser 2920 may include a slot or chute through which the packaged article 3306 is dispensed to the user.

Figure 34:
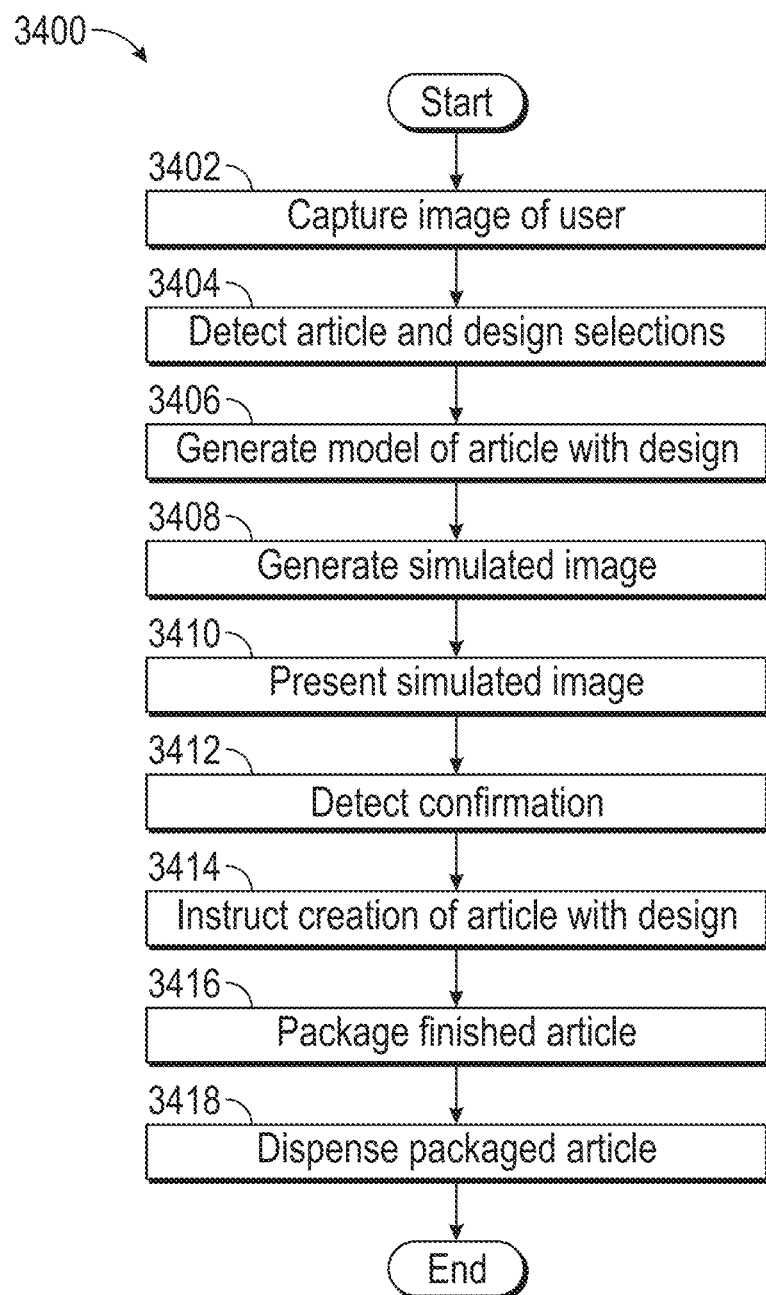
FIG. 34 is a flowchart of an example method performed by the system of FIG. 29.

FIG. 34 is a flowchart of an example method 3400 performed by the system 2900 of FIG. 29. In particular embodiments, various components of the system 2900 perform the steps of the method 3400. By performing the method 3400, the system 2900 simulates the look and fit of an article with a custom design on a user so that the user may see how the article looks and fits on the user before confirming the creation of the article. As a result, the system 2900 improves user satisfaction and reduces material waste caused by returns.

In block 3402, the camera 2906 captures an image 3102 of a user 3002. In some embodiments, the camera 2906 takes a video of the user 3002. The user 3002 may be standing in front of the system 2900, which may be an on-demand personalization kiosk. The user 3002 may be interacting with the kiosk to determine whether the user 3002 wants to create an article with a custom design.

In block 3404, the processor 2908 detects article and design selections. For example, the processor 2908 may determine the article and design selections using one or more gestures 3004 of the user 3002 detected in the image 3102 or video taken by the camera 2906. As another example, the processor 2908 may determine the article and design selections using touches 3006 detected by a touchscreen of the display 2904.

In block 3406, the processor 2908 generates a model 3104 of the selected article with the selected design. For example, the processor 2908 may retrieve a model of the article from a database and a model of the design from the database. The processor 2908 may then form the model 3104 by combining the model of the article with the model of the design. The processor 2908 may superimpose the model of the design onto the model of the article to form the model 3104.

In block 3408, the processor 2908 generates a simulated image 3108 that simulates the look and fit of the selected article with the selected design on the user 3002. The processor 2908 may apply a machine learning model 3106 to the image 3102 to determine the location of certain body parts of the user 3002 appearing in the image 3102. For example, the machine learning model 3106 may be trained to analyze colors and shapes in the image 3102 to identify and locate certain body parts that appear in the image 3102. The processor 2908 may then orient and size the model 3104 using the detected body parts in the image 3102. For example, the processor 2908 may rotate the model 3104 so that the model 3104 is properly aligned with the body parts in the image 3102. Additionally, the processor 2908 may size or scale the model 3104 so that the model 3104 fits over the body parts detected in the image 3102. The processor 2908 then superimposes the model 3104 onto the body of the user 3002 in the image 3102 to create the simulated image 3108.

In block 3412, the processor 2908 detects confirmation of the article with the design. For example, the processor 2908 may detect the confirmation 3206 using gestures 3202 detected in the image 3102 taken by the camera 2906. As another example, the processor 2908 may detect the confirmation 3206 using touches 3204 detected by the touch screen of the display 2904. The user 3002 may have provided the confirmation 3206 after viewing the simulated image 3102 of the user 3002 wearing the article with the design.

In block 3414, the processor 2908 instructs creation of the article with the design. For example, the processor 2908 may issue instructions to one or more of a motion system 2916 and an article personalization system 2918 to create the article with the design. In response to these instructions, the motion system 2916 may retrieve an article 3302 from a shelving system 2914 and move that article 3302 to the article personalization system 2918. The article personalization system 2918 then prints the confirmed design onto the article 3302.

In block 3416, the packaging system 2919 packages the finished article 3304 from the article personalization system 2918. The processor 2908 may issue an instruction to the packaging system 2919 to fold and package the finished article 3304. By folding and packing the finished article 3304, the packaging system 2919 protects the finished article 3304 and improves the transportability of the finished article 3304, in certain embodiments.

In block 3418, the packaged article 3306 is dispensed through a dispenser 2920. In some embodiments, the dispenser 2920 is arranged to dispense the packaged article 3306 directly from the packaging system 2919. In certain embodiments, the dispenser 2920 is arranged to dispense the packaged article 3306 from the motion system 2916 moving the packaged article 3306 from the packaging system 2919 to the dispenser 2920. In this manner, the dispenser 2920 provides the finished article 3304 or the packaged article 3306 to the user.

Figure 35:
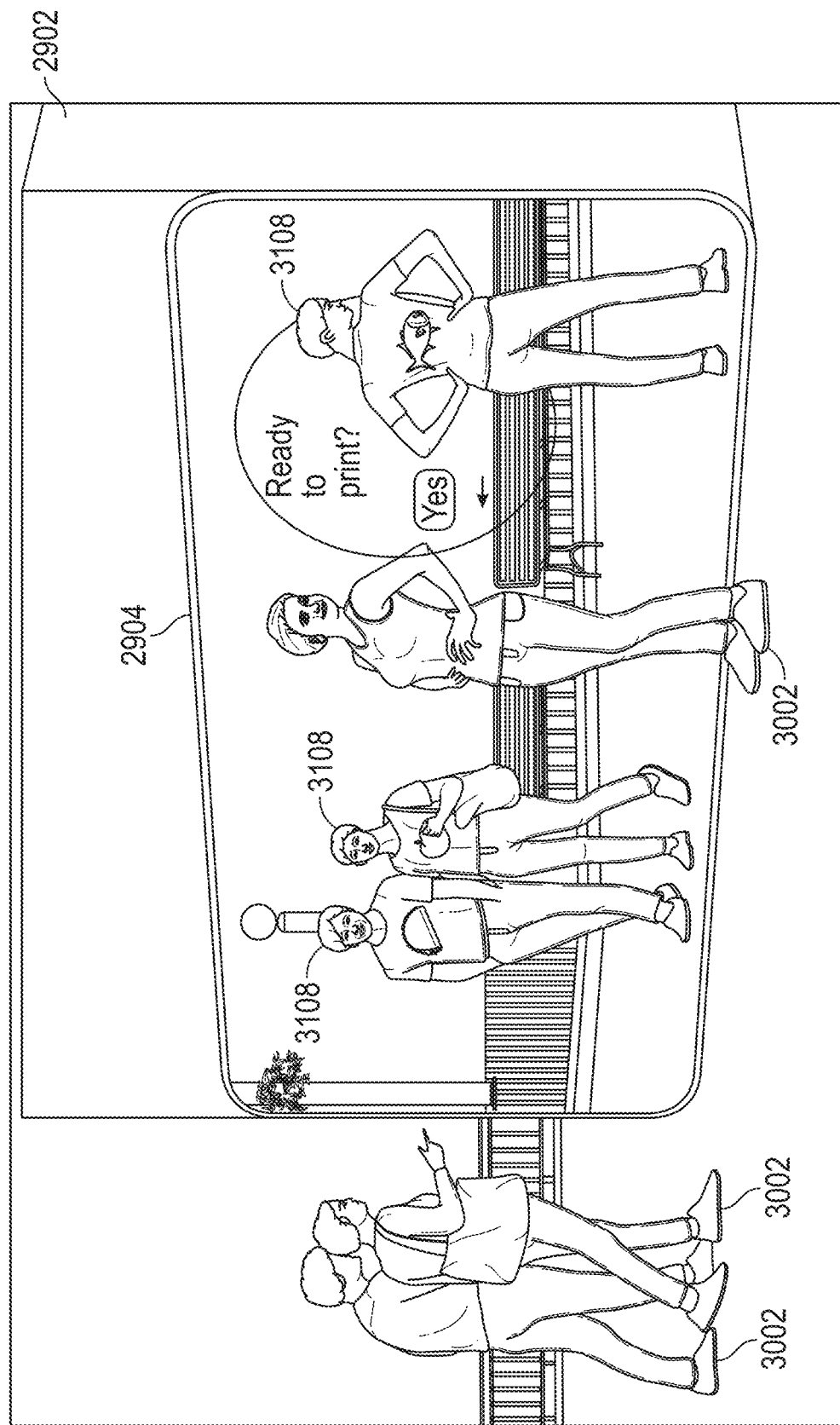
FIG. 35 illustrates an example display in the system of FIG. 29.

FIG. 35 illustrates an example display 2904 in the system 2900 of FIG. 29. As seen in FIG. 35, the display 2904 is positioned on an external surface of the housing 2902. The display 2904 presents simulated images 3108 of one or more users 3002 (e.g., life-size simulated images 3108 of one or more users 3002). Each of the simulated images 3108 show a user 3002 wearing a custom article with a design, even though the user 3002 is not wearing the custom article with the design. As a result, the display 2904 creates an augmented reality mirror effect, in which the user 3002 sees in the display 2904 what appears to be a reflection of the user 3002 wearing a custom article with a design, even though the user 3002 is not wearing the custom article with the design. As the user 3002 moves or rotates, the display 2904 may update the presentation so that the simulated image 3108 also moves or rotates with the user 3002. In this manner, the user 3002 may see different angles or perspectives of the custom article with the design on the user 3002. The user 3002 may see how the custom article looks and fits on the user 3002 before the user 3002 initiates creation of the custom article with the design. As a result, the display 2904 improves user satisfaction and reduces material waste caused by returns, in certain embodiments.

In some embodiments, the display 2904 may present promotions or games that engage users 3002 walking past the display 2904. For example, the display 2904 may present discounts for ordering a custom article. The display 2904 may present a discount code that can be entered to redeem the discount. The display 2904 may present a time period in which a user 3002 may order a custom article to receive the discount. As another example, the display 2904 may present a gift offer that comes with the purchase of a custom article. The display 2904 may display a message that offers other items to be gifted when a custom article is ordered. As another example, the display 2904 may present a game that a user 3002 may play (e.g., a simple game of chance or a skill-based game). If the user 3002 plays and wins the game, the user 3002 may be offered a discount on a custom article or the user 3002 may be rewarded a custom article, as examples. By displaying these promotions or games, the display 2904 engages the users 3002 and increases the changes that the users 3002 will interact with the personalization kiosk.

In certain embodiments, to engage potential users, the display 2904 may show the potential users wearing custom articles with designs as the potential users walk by the display 2904. For example, the camera 2906 may capture images of potential users walking by the personalization kiosk. The processor 2908 may then use these images to determine the positions of these potential users and position a custom article with a design on the reflection of the potential users. The display 2904 may display the images of the potential users to simulate a reflection of the potential users, or the display 2904 may include a mirror that reflects the potential users. The processor 2908 presents on the display 2904 the custom article with the design to make it appear as if the reflections of the potential users are wearing the custom article with the design. When the potential users see themselves wearing the custom article rather than the clothes that they are wearing, the potential users may engage or interact with the personalization kiosk. Additionally, the display 2904 may display promotions, coupons, and other types of enticements to engage with the potential user and attract them to the personalization kiosk and engage with it or explore it.

In some embodiments, the personalization kiosk and the processor 2908 implements a reservation system to reduce delays for users 3002 when waiting for the personalization kiosk to create their custom articles. A user 3002 may create a reservation using a personal device or by interacting with the personalization kiosk. The reservation may indicate a time when the user 3002 may return to create a custom article without waiting a long time for the custom article to be created. The processor 2908 may evaluate the number of pending reservations and the number of custom articles awaiting creation when determining an appropriate return time for the reservation. If a user 3002 orders a custom article without a reservation, the processor 2908 may evaluate the number of pending reservations and the number of custom articles awaiting creation to determine an expected completion time for the user's 3002 custom article. If the completion time is too far in the future, the processor 2908 may alert the user (e.g., using the display 2904 or the user's 3002 personal device) that the user 3002 may need to wait a long time for the custom article to be completed. The processor 2908 may indicate to the user 3002 that the user 3002 should return at the expected completion time, or the processor 2908 may create a reservation for the user 3002 to return to create the custom article at a later time. Alternatively, the processor 2908 may offer to the user 3002 the option to pick up the article at another nearby personalization kiosk or receive the article through shipping to his/her home.

Figure 36:
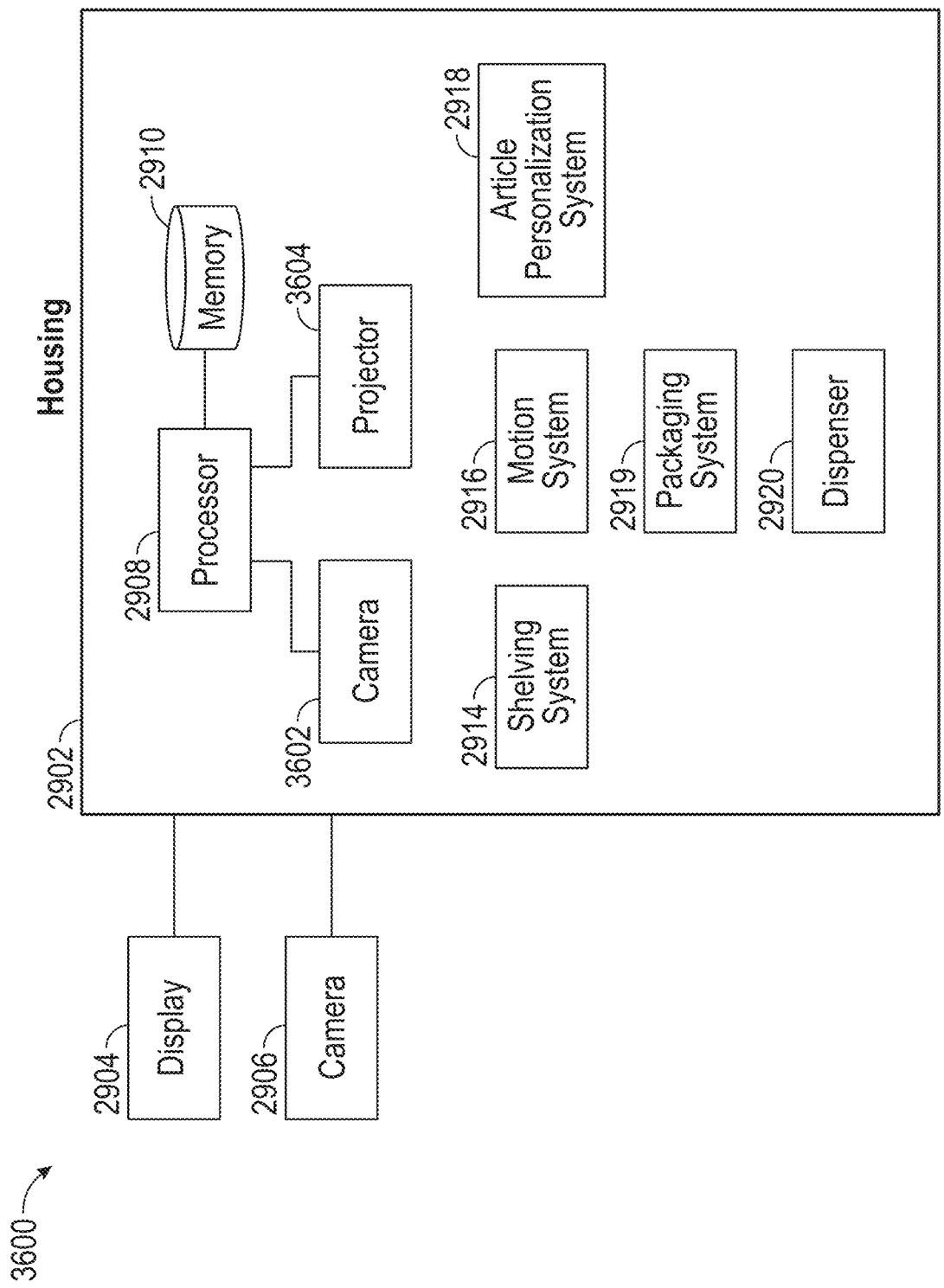
FIG. 36 illustrates an example system.

FIG. 36 illustrates an example system 3600, which may be an on-demand personalization kiosk. The system 3600 is similar to the system 2900, and the system 3600 also includes a camera 3602 and a projector 3604 disposed within the housing 2902. Generally, the camera 3602 and the projector 3604 may operate together to project designs or messages onto objects within the housing 2902 (e.g., an article being customized, an article hanging within the housing 2902, a sign or board within the housing 2902, etc.). For example, the projector 3604 may project designs onto articles to simulate what a finished article will look like. In this manner, when a user peers into the housing 2902 (e.g., through one or more of the viewing arrangements described herein), the user may see what a finished article will look like before the user confirms the creation of the article with the design, which improves user satisfaction and reduces waste caused by returns in certain embodiments. As another example, the projector 3604 may project messages indicating an identity of a user who ordered the article or a status of the article during the customization process. In this manner, when the user peers into the housing 2902, the user may easily identify the article that belongs to the user and be informed of the status of the article, which eases anxiety and improves user satisfaction in some embodiments.

The system 3600 shares many of the same components as the system 2900. For example, the system 3600 may be an on-demand personalization kiosk with a housing 2902. The housing 2902 may be a metal, wooden, or plastic housing that protects and encases other components of the system 3600. The camera 2906 may be attached to the housing 2902 and may take images or videos of a user standing outside of the housing 2902. The processor 2908 and the memory 2910 operate together to control the operation of the kiosk. The shelving system 2914, the motion system 2916, the article personalization system 2918, the packaging system 2919, and the dispenser 2920 may be positioned within or on the housing 2902. The shelving system 2914 stores articles. The motion system 2916 moves articles between the other systems within the housing 2902. The article personalization system 2918 creates custom designs onto articles from the shelving system 2914. The packaging system 2919 folds and packages finished articles from the article personalization system 2918. The dispenser 2920 dispenses finished articles to the user.

The camera 3602 is positioned within the housing 2902. Any suitable number of cameras 3602 may be positioned within the housing 2902. Generally, the camera 3602 takes images or videos of other components of the system 2900 within the housing 2902. As an example, the camera 3602 may take images or videos of an article in the housing 2902 with a design projected onto the article. As another example, the camera 3602 may take images or videos of the article personalization system 2918 while the custom article with the design is being created. These images or videos may be presented on the display 2904 so that the user may watch the custom article being created, which enhances the user experience, in certain embodiments.

In some embodiments, a user may use a personal device (e.g., a mobile phone or laptop) to view the images or videos taken by the camera 3602. For example, the user may login to an application on the user's mobile phone to see the images or videos taken by the camera 3602. The user may scan identifiers on the housing 2902 or enter a particular code into the application. A backend system (e.g., servers, networks, and other computers) may link the user's device to the kiosk and to the article being created. The backend system then communicates the images or videos taken by the camera 3602 to the user's device.

The projector 3604 is positioned within the housing 2902 and projects images or message onto objects within the housing 2902. Any suitable number of projectors 3604 may be positioned within the housing 2902. As an example, a projector 3604 may project designs onto articles within the housing 2902 to simulate how a finished article will look. When a user selects an article, the motion system 2916 may retrieve the selected article from the shelving system 2914. The motion system 2916 may hang or suspend the selected article within the housing 2902 such that the user may see the selected article (e.g., when peering into the housing 2902 or on the display 2904). When the user selects a design, the projector 3604 may project the selected design onto the selected article to simulate what the design will look like on the article. The user may then view the article with the projected design (e.g., by peering into the housing 2902 or on the display 2904). In this manner, the user is given an opportunity to see what the selected article will look like with the design.

In some embodiments, a projector 3604 projects designs onto articles that are different from the article that will be customized. After the user views the article with the projected design and confirms the selected article and design, the motion system 2916 may retrieve another article from the shelving system 2914 to be customized by the article personalization system 2918. In this manner, the article with the projected design may remain hanging and visible for the user to see during the article creation process.

In certain embodiments, the user may issue commands that allow the user to see different perspectives of the article with the projected design. For example, the user may issue instructions using the user's mobile device or by performing gestures or touches (e.g., as described with respect to FIGS. 29 and 30). In response to these instructions, the motion system 2916 may rotate or flip the selected article. As the article rotates or flips, the projector 3604 may also adjust the projection to maintain the look of the design on the article. For example, the projector 3604 may be rotated or tilted to maintain the projection on the correction section of the article. As another example, the focus of the projector 3604 may be adjusted to maintain the focus of the projected design. One or more other projectors 3604 may also be activated to project the design onto the rotated or flipped shirt. For example, one or more projectors 3604 at other positions within the housing 2902 may be activated to project the design onto the rotated or flipped article. In this manner, the user may be allowed to see different perspectives of the article with the projected design.

The user may also issue commands that adjust lighting conditions within the housing 2902. For example, the user may issue instructions using the user's mobile device or by performing gestures or touches (e.g., as described with respect to FIGS. 29 and 30). In response to these instructions, lighting in the housing 2902 may be adjusted (e.g., change brightness, change colors, etc.). In this manner, the user may be allowed to see the article with the projected design in different lighting conditions.

If the user decides to change the article or the design, the components within the housing 2902 may respond accordingly. As an example, if the user selects a different design, the projector 3604 may change the projection and project the newly selected design onto the selected. As another example, if the user selects a different article, the motion system 2916 may return the previously selected article to the shelving system 2914. The motion system 2916 may then retrieve the newly selected article from the shelving system 2914 and hang or suspend the newly selected article in the housing 2902. The projector 3604 then projects the selected design onto the newly selected article so the user can see what the newly selected article looks like with the design.

In some embodiments, a projector 3604 projects messages onto objects within the housing 2902. As an example, the projector 3604 may project messages onto the article that is hanging or suspended within the housing 2902 or onto a sign or a board within the housing 2902. The projector 3604 may project the messages at any suitable time (e.g., when the article with the design is being created). The messages may indicate any suitable information. For example, the messages may identify a user who ordered the article (e.g., "[NAME]'s shirt is being created"). As another example, the message may identify a status of the article or the step of the customization process that is being performed (e.g., "We are retrieving your shirt," "We are printing your design," or "We are folding your finished shirt"). These messages may change or update as the article progresses through the customization process. The user may view these messages (e.g., by peering into the housing 2902 or on the display 2904) to stay informed of the article creation process, which enhances the user experience.

In an example, a projector 3604 may also project a portion of the design onto a suspended or hanging article to indicate how close the custom article is to completion. For example, when the custom article is halfway complete, the projector 3604 may project half of the selected design onto the suspended or hanging article to indicate that the custom article is halfway done. As the custom article continues closer to completion, the projector 3604 may adjust the projection to include a larger percentage of the design.

Figure 37:
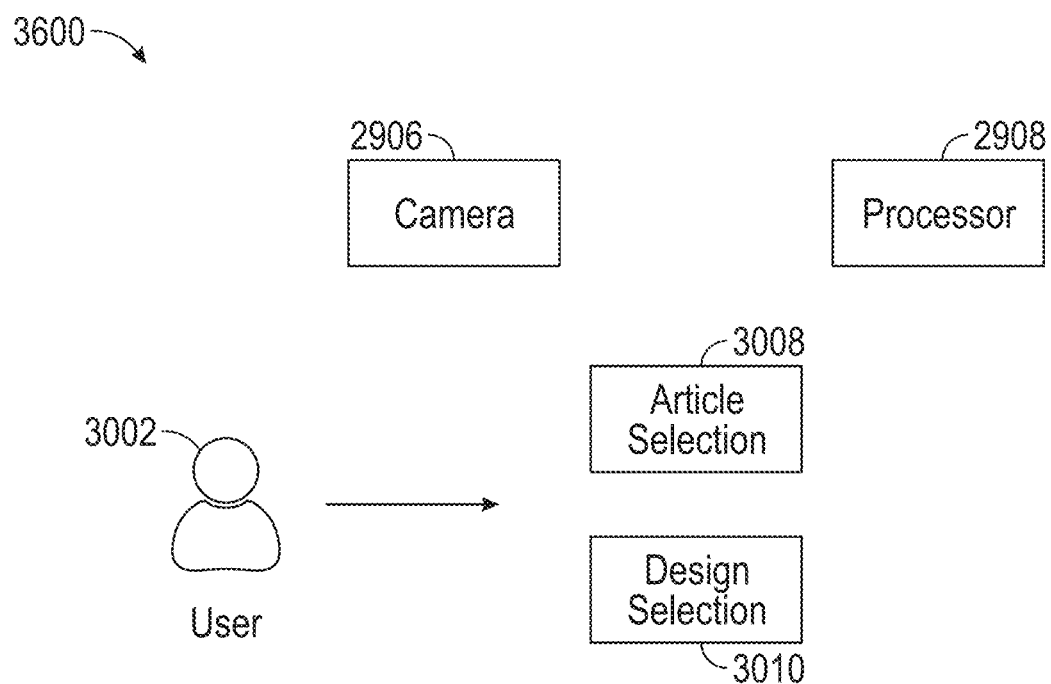
FIG. 37 illustrates article and design selection in the system of FIG. 36.

FIG. 37 illustrates article and design selection in the system 3600 of FIG. 36. Generally, the article and design selection process in the system 3600 is similar to the article and design selection process in the system 2900. For example, the user 3002 may indicate an article selection 3008 and a design selection 3010 using gestures detected in an image or video taken by the camera 2906. As another example, the user 3002 may indicate the article selection 3008 or the design selection 3010 using touches on a touchscreen. When the processor 2908 receives the article selection 3008 and the design selection 3010, the processor 2908 may begin the projector adjustment process to show the user 3002 what the selected design would look like when projected onto the selected article worn by the user.

Figure 38:
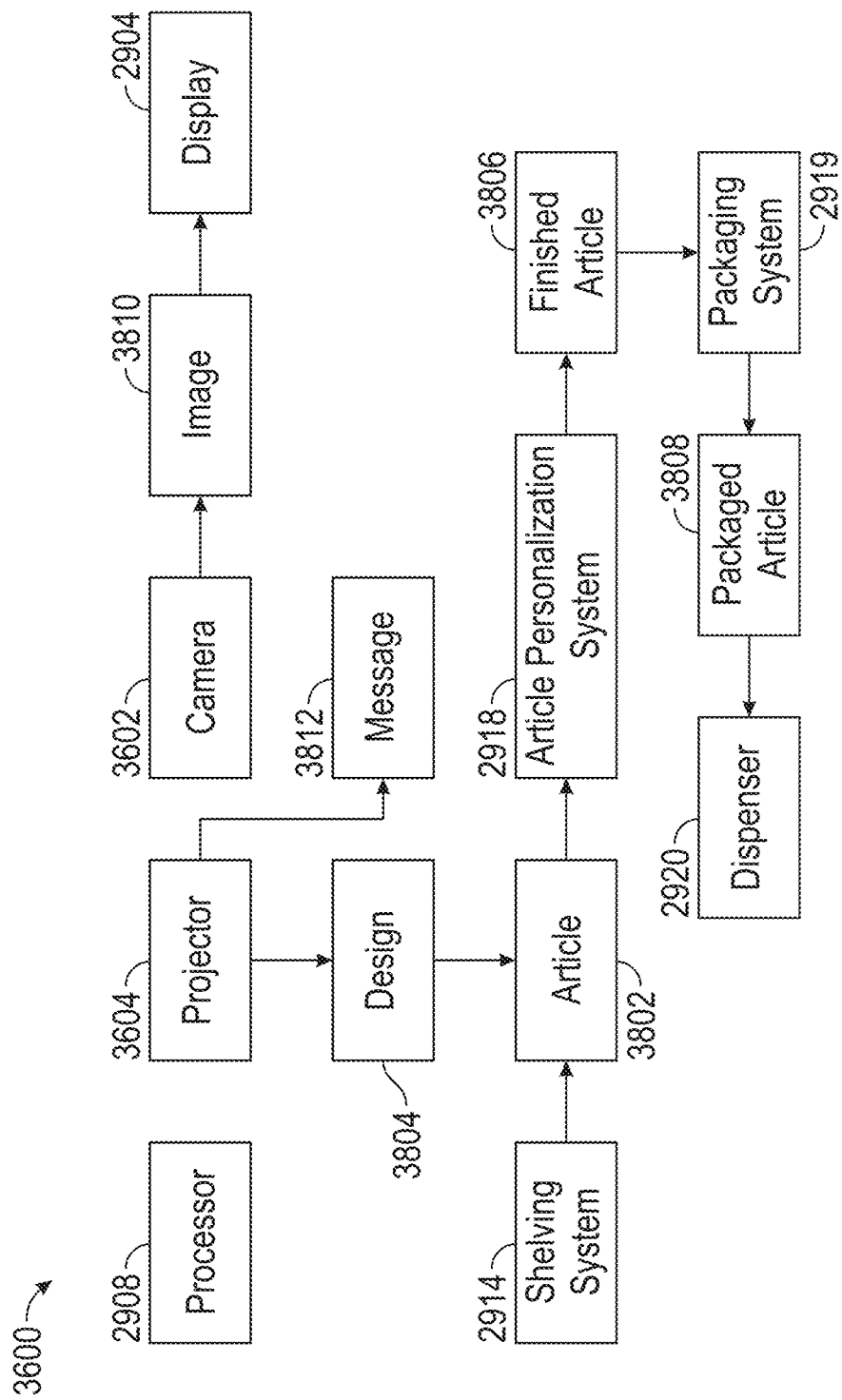
FIG. 38 illustrates design projection in the system of FIG. 36.

FIG. 38 illustrates design projection in the system 3600 of FIG. 36. As seen in FIG. 38, an article 3802 is retrieved from the shelving system 2914. The article 3802 may have been retrieved in response to the user 3002 selecting the article 3802 (as described in FIG. 37). After the user 3002 selects the article 3802 and the design 3804, the motion system 2916 may retrieve the article 3802 from the shelving system 2914 and hang or suspend the article 3802 within the housing 2902. The projector 3604 then projects the design 3804 onto the article 3802. The user 3002 may then look at the article 3802 (e.g., by peering into the housing 2902 or by viewing the display 2904) to see how the design 3804 will look on the article 3802.

If the user 3002 does not want the article 3802 or the design 3804, the user 3002 may change one or more of the selections. If the user 3002 selects a new article 3802, the motion system 2916 may return the article 3802 to the shelving system 2914 and retrieve the newly selected article 3802 from the shelving system 2914. The projector 3604 then projects the design 3804 only the newly selected article 3802. If the user 3002 selects a new design 3804, the projector 3604 adjusts the projection to project the newly selected design 3804 only the article 3802.

In some embodiments, one or more cameras 3602 disposed within the housing 2902 take images 3810 of different components within the housing 2902. The display 2904 then presents those images 3810 so that the user 3002 may see what is occurring in the housing 2902. For example, a camera 3602 may take an image 3810 of the article 3802 with the projected design 3804. When this image 3810 is presented on the display 2904, the user 3002 can view the display 2904 to see what the finished article will look like. As another example, the camera 3602 may take an image 3810 of messages projected by the projector 3604 to indicate the status of the article 3802 during the customization process (e.g., the stage of the customization process). In this manner, the user 3002 can view the display 2904 to see the status of the customization.

In certain embodiments, the projector 3604 projects a message 3812 on objects within the housing 2902. For example, the projector 3604 may project the message 3812 on the article 3802, a sign, or a board within the housing 2902. The message may include any suitable information. For example, the message 3812 may indicate an identity of the user 3002 who ordered the creation of the article 3802 with the design 3804 (e.g., "This is [NAME]'s shirt"). As another example, the message 3812 may indicate a status of the article 3802 (e.g., "We are retrieving your shirt," "We are printing your design," or "We are folding your finished shirt"). The user 3002 may view these messages 3812 (e.g., by peering into the housing 2902 or by viewing the display 2904). The messages 3812 may inform the user 3002 as to what is happening with the article 3802, which increases user 3002 engagement and satisfaction in certain embodiments.

After the user 3002 confirms the article 3802 and the design 3804, the article creation process discussed with respect to FIG. 33 begins. The processor 2908 instructs the motion system 2916 to move the article 3802 (or another article 3802 from the shelving system 2914) to the article personalization system 2918. The article personalization system 2918 then creates the design 3804 on the article 3802 (e.g., by printing the design 3804 onto the article 3802) to produce a finished article 3806. The processor 2908 instructs the motion system 2916 to move the finished article 3806 to the packaging system 2919, which folds and packages the finished article 3806 to produce the packaged article 3806. The dispenser 2920 dispenses the packaged article 3808.

Figure 39:
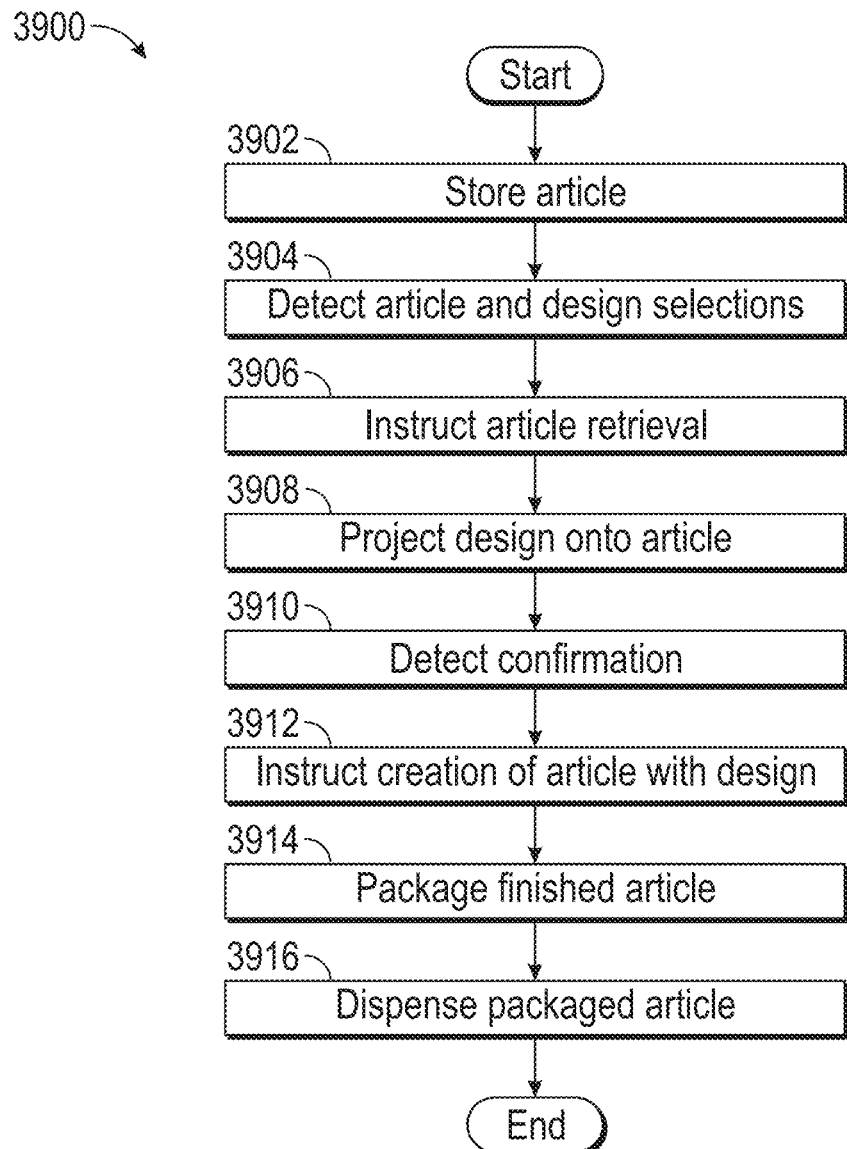
FIG. 39 is a flowchart of an example method performed by the system of FIG. 36.

FIG. 39 is a flowchart of an example method 3900, performed by the system 3600 of FIG. 36. In particular embodiments, various components of the system 3600 perform the method 3900. By performing the method 3900, a selected design 3804 is projected so that the user may see how the design would look on a selected article 3802 before the user 3002 requests creation of a custom article with the design 3804.

In block 3902, the shelving system 2914 stores an article 3802 for later retrieval. In block 3904, the processor 2908 detects article and design selections made by a user 3002. The article selection may be for the article 3802 stored in the shelving system 2914. In response to the article selection, the processor 2908 instructs the motion system 2916 to retrieve the article 3802 from the shelving system 2914 in block 3906. The motion system 2916 retrieves the article 3802 and hangs or suspends the article 3802 in the housing 2902.

In block 3908, the processor 2908 instructs the projector 3604 to project the selected design 3804 onto the article 3802. In response, the projector 3604 projects the selected design 3804 onto the article 3802 so that the user 3002 may see how the design 3804 would look on the article 3802 (e.g., by peering into the housing 2902 or by viewing the display 2904). If the user 3002 does not like the article 3802 or the design 3804, the user 3002 may change the selections. If the user 3002 selects a new article 3802, the processor 2908 may instruct the motion system 2916 to retrieve the newly selected article 3802 and have the projector project the design 3804 onto the newly selected article 3802. If the user 3002 selects a new design 3804, the processor 2908 may instruct the projector 3604 to project the newly selected design 3804 onto the article 3802.

In block 3910, the processor 2908 detects that the user 3002 has confirmed the article 3802 and the design 3804. The processor 2908 instructs the creation of the article 3802 with the design 3804 in block 3912.

In response to the instruction, one or more systems within the housing 2902 create the article with the design. For example, the motion system 2916 may move the article 3802 to the article personalization system 2918. The article personalization system 2918 then prints the design 3804 onto the article 3802. The motion system 2916 may move the finished article 3806 from the article personalization system 2918 to the packaging system 2919.

In block 3914, the packaging system 2919 folds and packages the finished article 3806 from the article personalization system 2918. In this manner, the packaging system 2919 protects the finished article 3806 and improves the transportability of the finished article 3806, in certain embodiments.

In block 3916, the dispenser 2920 dispenses the packaged article 3808 from the packaging system 2919. For example, the motion system 2916 may move the packaged article 3808 from the packaging system 2919 to the dispenser 2920. As another example, the dispenser 2920 may be arranged so that the dispenser 2920 dispenses the packaged article 3808 directly from the packaging system 2919. The user 3002 may then receive the packaged article 3808 with the design selected by the user 3002.

Certain adjustments may be made to the housing 2902 to enhance the user experience. For example, various viewing arrangements may be added to the housing 2902 so that the user 3002 may see how the kiosk creates the custom article. In some embodiments, the viewing arrangement allows the user 3002 to see messages projected onto the article during the customization process.

Figure 40:
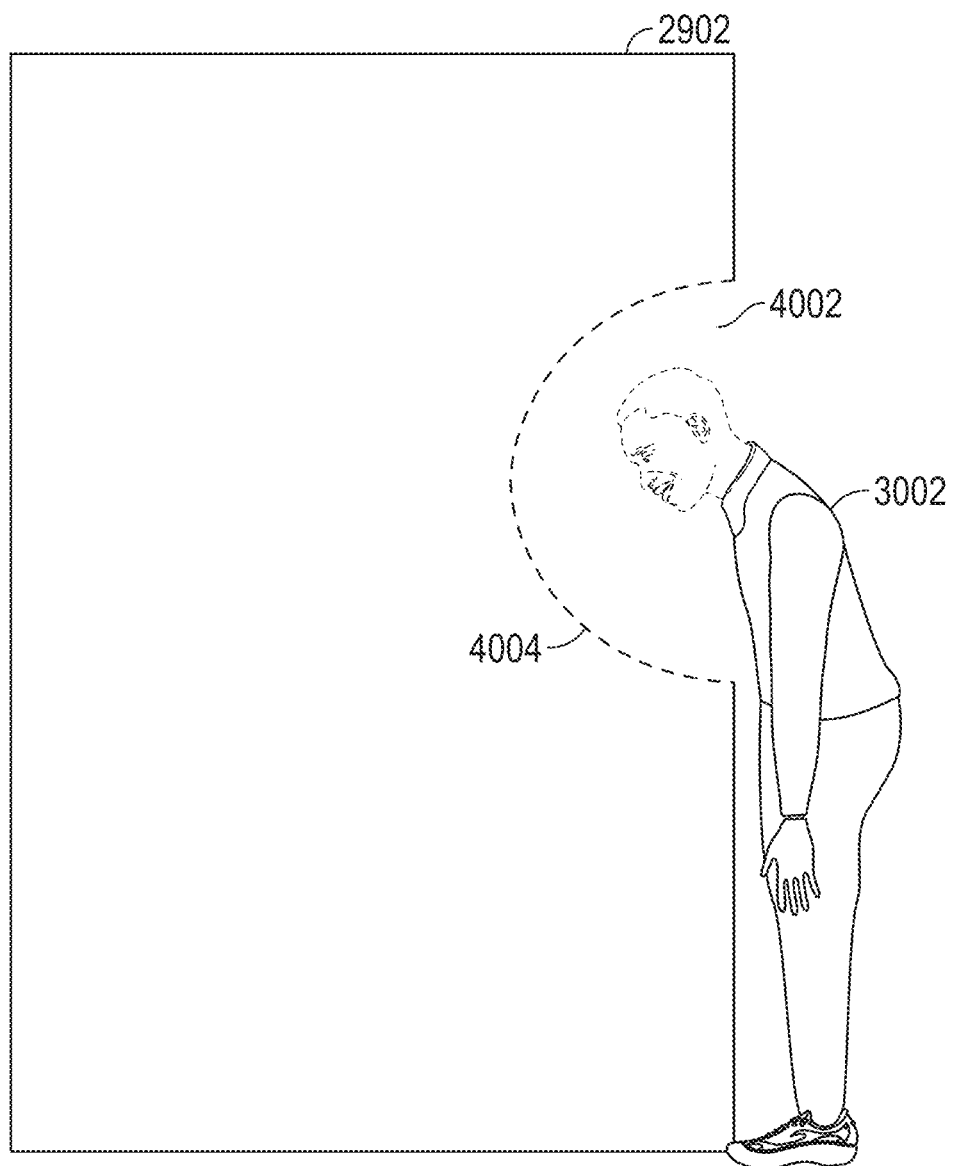
FIG. 40 illustrates an example viewing arrangement.

FIG. 40 illustrates an example viewing arrangement. As seen in FIG. 40, the housing 2902 defines an aperture 4002 that extends into the housing 2902. The aperture 4002 may be defined on a side of the housing 2902. The housing 2902 may define any suitable number of apertures 4002 in the surfaces of the housing 2902.

A viewing pane 4004 coupled to the housing 2902 defines the boundary of the aperture 4002. In the example of FIG. 40, the viewing pane 4004 is a curved surface that extends into or out of the housing 2902, where the curvature of the surface is either convex, concave or nearly flat. The viewing pane 4004 may be formed using any suitable material. For example, the viewing pane 4004 may be a translucent material, such as glass or plastic, that allows the user 3002 to view into the housing 2902. The viewing pane 4004 may allow the user 3002 to see the various systems within the housing 2902, such as the article personalization system 2918, while a custom article is being created.

In the example of FIG. 40, the viewing pane 4004 extends into the housing 2902 and defines an aperture 4002 into which the user 3002 may position the user's 3002 head. As a result, the aperture 4002 and the viewing pane 4004 serve as a viewport through which the user 3002 may view the creation of a custom article. For example, the user 3002 may view the article personalization system 2918 as the article personalization system 2918 creates a design onto an article. In this manner, the aperture 4002 and the viewing pane 4004 enhance the user experience by allowing the user 3002 to see the inner workings of the kiosk.

Figure 41:
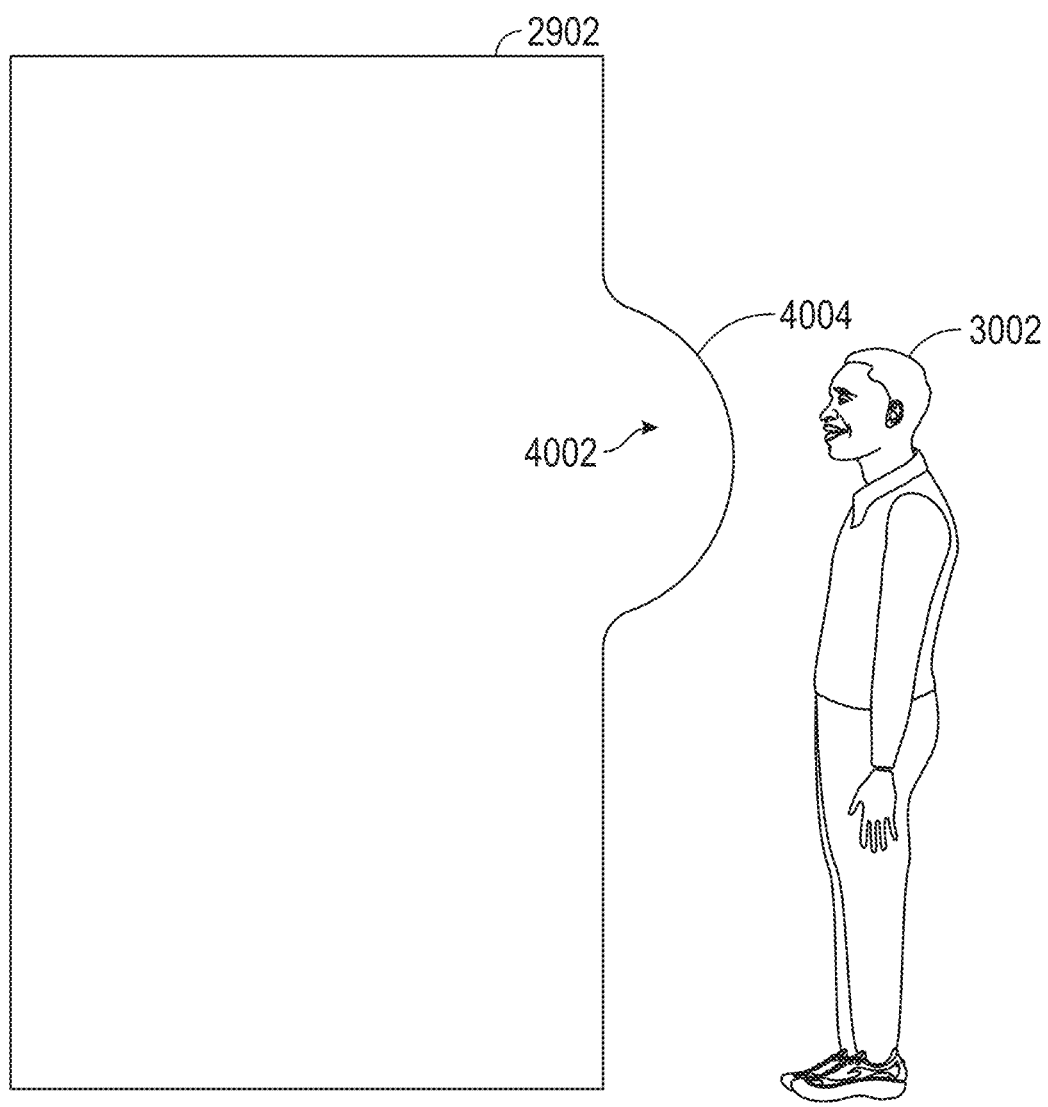
FIG. 41 illustrates an example viewing arrangement.

FIG. 41 illustrates an example viewing arrangement. Like the viewing arrangement of FIG. 40, the housing 2902 defines an aperture 4002 on a side of the housing 2902. A viewing pane 4004 coupled to the housing 2902 defines the boundary of the aperture 4002. In the example of FIG. 41, however, the viewing pane 4004 is curved and extends out of the housing 2902 towards the user 3002. As a result, the user 3002 may peer through the viewing pane 4004 without positioning the user's 3002 head within the aperture 4002. Thus, the viewing pane 4004 serves as a window into the housing 2902. By peering through the viewing pane 4004, the user 3002 may see the article as the article is being created within the housing 2902.

The housing 2902 may define any suitable number of apertures 4002 with viewing panes 4004 that define the boundary of the apertures 4002. Any suitable number of viewing panes 4004 (e.g., those shown in FIGS. 40 and 41) may be used with the housing 2902. For example, the housing 2902 may include any suitable number of viewing panes 4004 that extend into the housing 2902 and any suitable number of viewing panes 4004 that extend out of the housing 2902. Each of the viewing panes 4004 may be placed strategically at different locations to provide different views or perspectives into the housing 2902 (e.g., to allow views of different stages of the custom article creation process). In this manner, the housing 2902 provides numerous ways for the user 3002 to peer into the housing 2902. Additionally, the housing 2902 may provide the user 3002 several different perspectives of the systems within the housing 2902.

Figure 42:
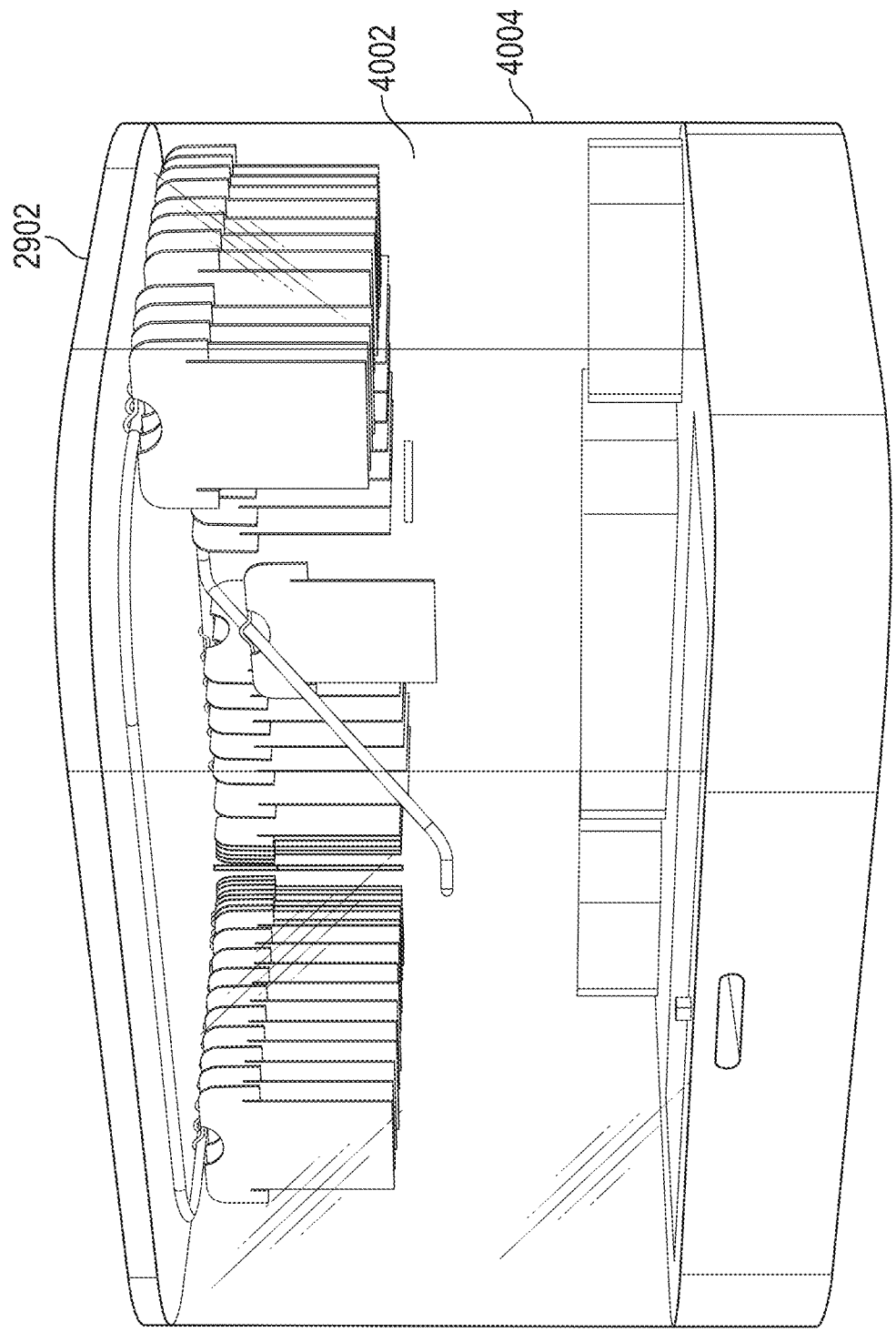
FIG. 42 illustrates an example viewing arrangement.

FIG. 42 illustrates an example viewing arrangement. As seen in FIG. 42, the housing 2902 defines an aperture that extends across multiple sides of the housing 2902. For example, the aperture 4002 may extend across the sides and the front of the housing 2902. The aperture 4002 may also extend across a majority of the height of the housing 2902.

A viewing pane 4004 is positioned within the aperture 4002. In the example of FIG. 42, the viewing pane 4004 is flat and extends across the left and right sides and the front of the housing 2902. Additionally, the viewing pane 4004 extends across the majority of the height of the housing 2902. The viewing pane 4004 may be made using any suitable material, such as a translucent glass or plastic. In this manner, the viewing pane 4004 allows a user 3002 to view into the housing 2902 to see how a custom article is created. The viewing pane 4004 effectively serves as a large window into the housing 2902.

Figure 43:
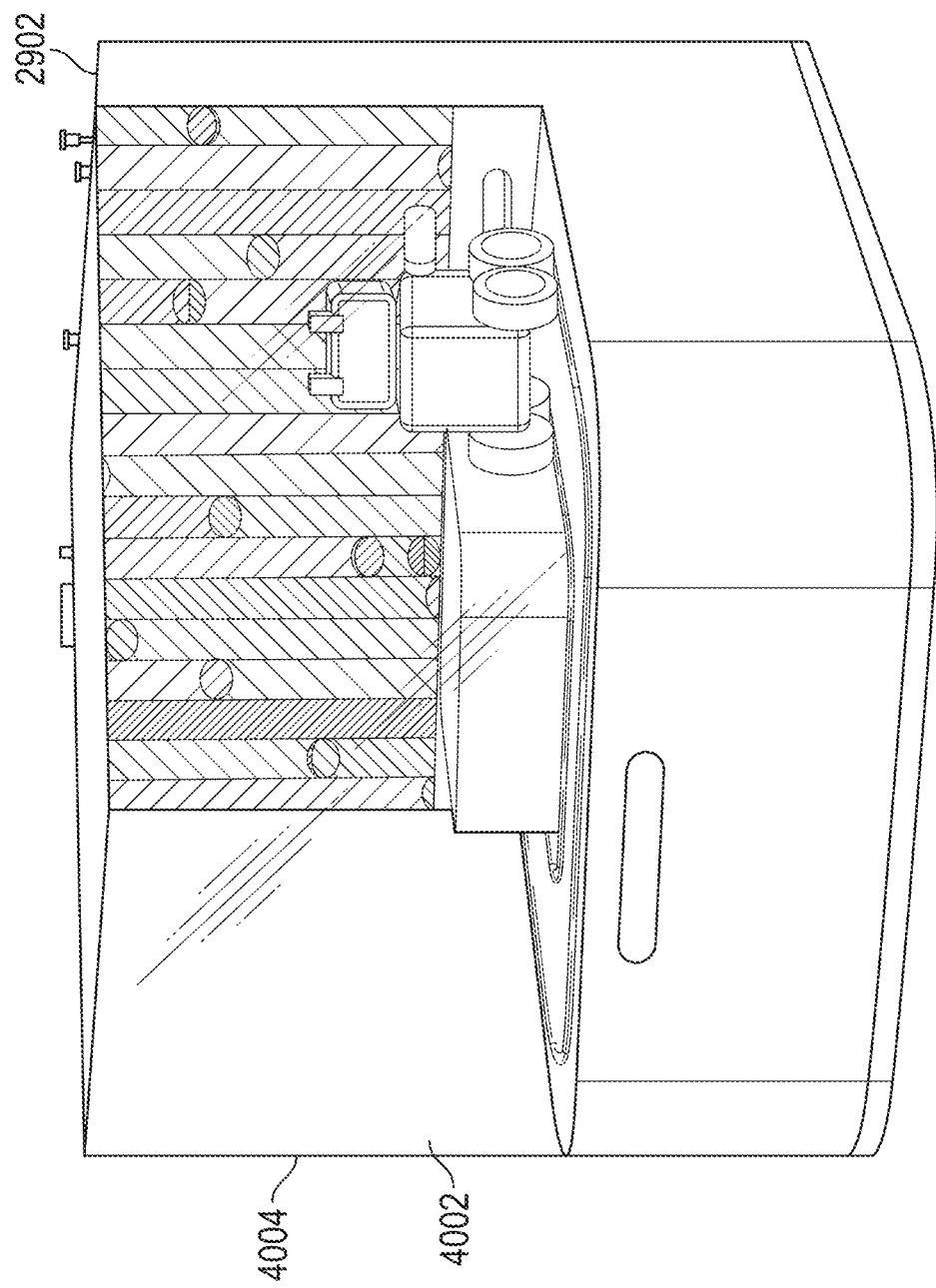
FIG. 43 illustrates an example viewing arrangement.

FIG. 43 illustrates an example viewing arrangement. As seen in FIG. 43, the housing 2902 defines an aperture 4002 that extends across multiple sides of the housing 2902. Specifically, the aperture 4002 may extend across the left and right sides and the front of the housing 2902. The aperture 4002 may have any suitable height. In the example of FIG. 43, the aperture 4002 extends from the top of the housing 2902 to approximately halfway down the housing 2902.

A viewing pane 4004 is positioned on the housing 2902 within the aperture 4002. The viewing pane 4004 may be flat and formed using any suitable material, such as a translucent metal or plastic. The viewing pane 4004 extends across the sides and the front of the housing 2902 and effectively serves as a window into the housing 2902. The user 3002 may view the systems within the housing 2902 by looking through the viewing pane 4004. For example, the user 3002 may see the various systems in the housing 2902 creating a custom article.

Any of the viewing arrangements shown in FIGS. 40 through 43 may include displays and may be touch sensitive. For example, the viewing panes 4004 may include a display that presents information to the user 3002. For example, the viewing panes 4004 may display article options and design options to the user 3002. The viewing panes 4004 may also include touch detection technology that detect the location of a touch of the user 3002 on the viewing pane 4004. For example, the user 3002 may use touches on the viewing panes 4004 to select and confirm articles and designs.

In some embodiments, the viewing pane 4004 may include a two-way mirror that provides different views to the user 3002. For example, the viewing pane 4004 may act as a mirror that provides a reflection of the user 3002. When the user 3002 is interacting with the viewing pane 4004, the viewing pane 4004 may transition to display information to the user 3002 and to allow the user 3002 to make selection (e.g., through touches on the viewing pane 4004). After the user 3002 has confirmed article and design selections, the viewing pane 4004 transitions to allow the user 3002 to see through the viewing pane 4004 into the housing 2902.

Figure 44:
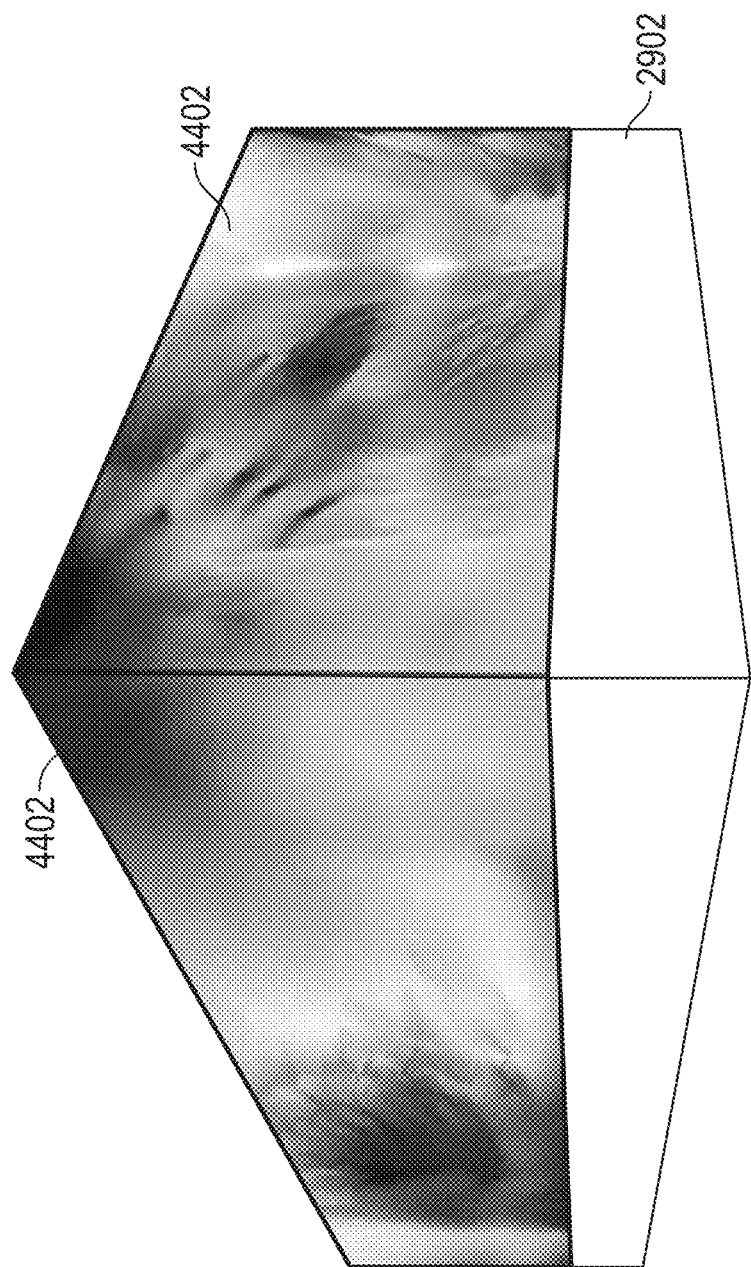
FIG. 44 illustrates an example viewing arrangement.

FIG. 44 illustrates an example viewing arrangement. As seen in FIG. 44, one or more displays 4402 may be positioned on the housing 2902. The displays 4402 may extend across multiple sides of the housing 2902. The displays 4402 may be similar to the display 2904 described with respect to FIG. 29. The displays 4402 may present images or videos of the systems within the housing 2902 creating a custom article. For example, the camera 2912 within the housing 2902 (as described with respect to FIG. 29) may take images or videos of the systems within the housing 2902. The displays 4402 may present those images or videos after the user 3002 has confirmed an article and design selection.

Some embodiments of the personalization kiosk include a combination of viewing panes 4004, cameras 2906, and displays 2904. The viewing panes 4004 may allow the user 3002 to see inside the housing 2902. The cameras 2906 may take images of the user 3002 that are used to process a model of a selected article and design. The display 2904 may include a two-way mirror that presents a reflection of the user 3002. The display 2904 may also display the processed model at a location corresponding to the reflection of the user 3002 to simulate the user 3002 wearing the article.

Figure 45:
FIG. 45 illustrates an example collaboration feature.
Figure 46:
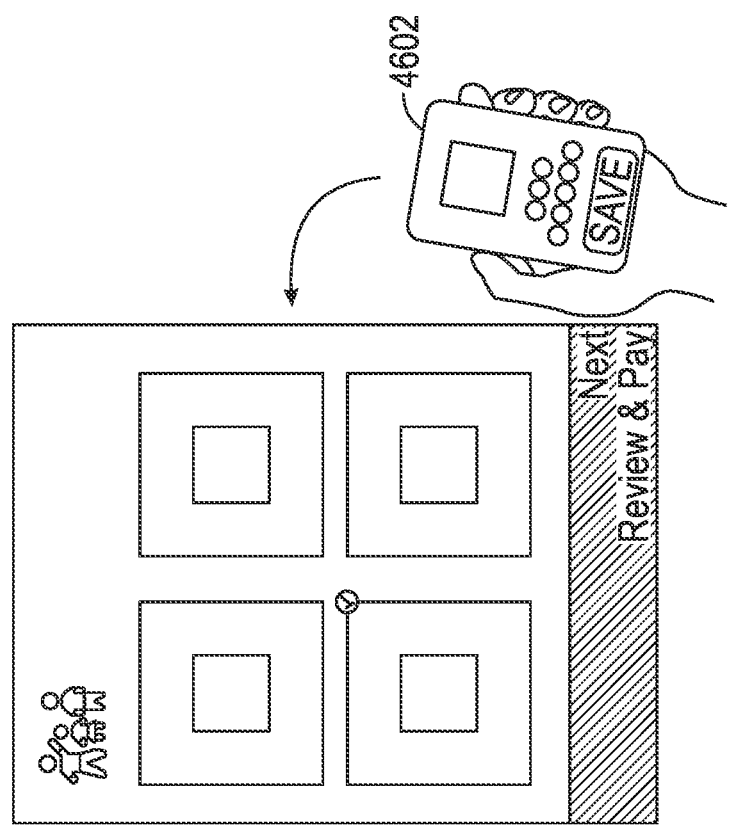
FIG. 46 illustrates an example collaboration feature.
Figure 47:
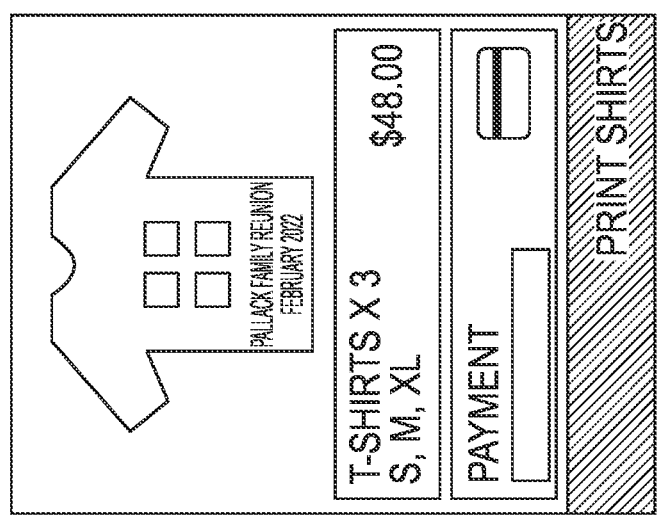
FIG. 47 illustrates an example collaboration feature.

FIGS. 45 through 47 illustrate an example collaboration feature. Multiple users 3002 may use this feature to collaborate on the customization of articles. The collaboration feature may be implemented using any suitable device. For example, the users 3002 may interact with personal devices or with the display 2904 to use the collaboration feature to customize an article with designs. In alternative embodiments, the users 3002 may collaborate using any number of devices, including the order entry systems associated with the vending kiosk, personal computers, personal pads and mobile phones and smart watches.

FIG. 45 shows an initial screen for the collaboration feature, where one or more users 3002 input the initial settings for the collaboration. As seen in FIG. 45, the settings include providing a name for the collaboration (e.g., "Family Reunion 2022"), selecting a base design for the article, and providing the number of users 3002 in the collaboration. After the settings are provided, the users 3002 may proceed to the next screen.

FIG. 46 shows a screen of the collaboration feature that may follow the screen shown in FIG. 45. In this screen, each user 3002 may select a design for a portion of the article. In the example of FIG. 46, each user 3002 may choose a design for a corresponding square on the screen. For example, for a family reunion shirt, each family member may select a picture of themselves or a picture of an event from the reunion to include on the shirt. Each user 3002 may use a personal device 4602 (e.g., a phone, tablet, laptop, etc.) to select a design in some embodiments. Each user 3002 may also interact with the display 2904 of a personalization kiosk to select the design. When a user 3002 has selected a design, the corresponding square on the screen may show the selected design. Some users 3002 may select multiple designs for the collaboration. For example, a user 3002 in the example of FIG. 46 may select designs for multiple squares.

FIG. 47 shows a screen of the collaboration feature that may follow the screen shown in FIG. 46. This screen may appear after every user 3002 in the collaboration has confirmed their design. In this screen, the article with the selected designs is shown. On this screen, a user 3002 may confirm the designs for the article and order a number of the articles. After the user 3002 has ordered the articles, the personalization kiosk may create the ordered articles with the selected designs.

Figure 48:
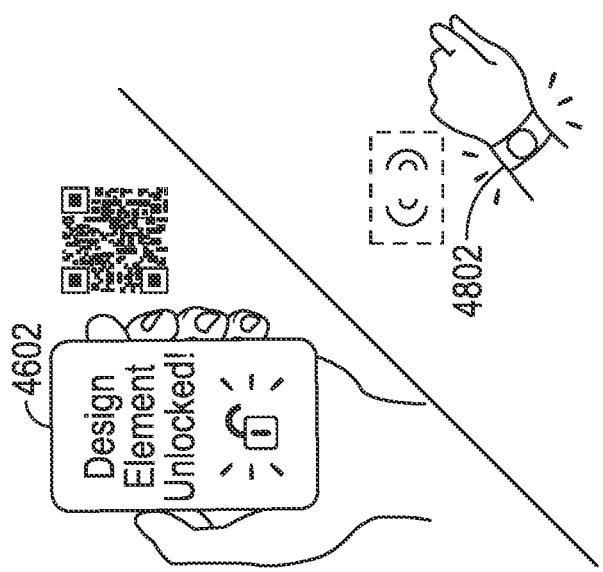
FIG. 48 illustrates an example customization based on user experiences.
Figure 49:
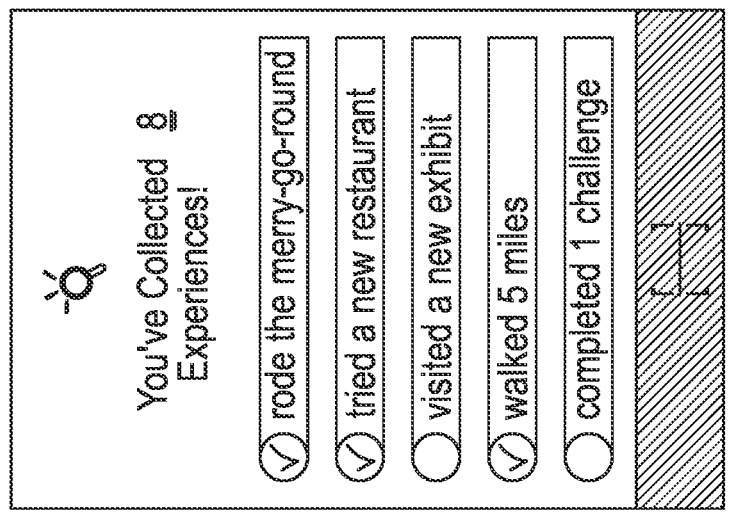
FIG. 49 illustrates an example customization based on user experiences.
Figure 50:
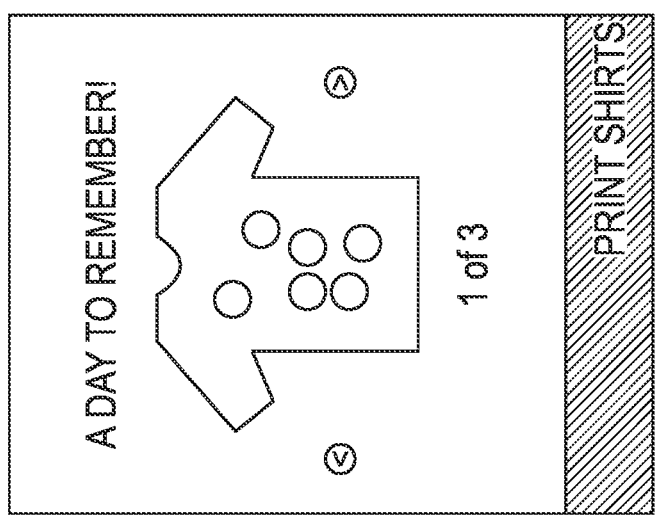
FIG. 50 illustrates an example customization based on user experiences.

FIGS. 48 through 50 illustrate an example customization process based on user experiences. A user 3002 may use this feature to customize an article using data collected for the user 3002 as the user 3002 participated in certain activities or events. For example, at a theme park, data may be collected about the various attractions that the user 3002 visited. When the user 3002 visited a personalization kiosk, the collected data may be used to create a design that showed the attractions the user 3002 visited.

FIG. 48 shows examples of how a user 3002 may indicate that the user 3002 has participated in certain activities or events. In one example, the user 3002 may use a personal device 4602 to scan a code (e.g., a barcode or a matrix barcode) at the activity or event. When the code is scanned, data may be collected indicating that the user has participated in the activity or event. The personal device 4602 may also indicate to the user 3002 that a new design pertaining to the activity or event is available for the user 3002 to use. In another example, the user 3002 may scan a wearable device 4802 (e.g., a watch or band) that is registered to the user 3002 at the activity or event. When the wearable device 4802 is scanned, data may be collected indicating that the user has participated in the activity or event.

FIG. 49 shows a screen that indicates the activities or events in which the user 3002 has participated or can participate. The user 3002 may view this screen using the personal device 4602 or the display 2904 at the personalization kiosk. The screen may indicate the designs that are available to the user 3002 and the activities or events in which the user 3002 may participate to make more designs become available. In the example of FIG. 49, the screen indicates that the user 3002 has designs for riding the merry-go-round, trying a new restaurant, and walking five miles. The screen also indicates that the user 3002 may obtain additional designs if the user 3002 visits a new exhibit or completes a challenge.

FIG. 50 shows a screen of the customization process. The screen shows an article with a design created using the data indicating the activities or events in which the user 3002 participated. For example, the design may include pictures or icons representing the activities or events. The user 3002 may select from any suitable number of designs with different arrangements of the pictures or icons. After the user 3002 selects and confirms a design, the personalization kiosk may create the custom article to commemorate the user's 3002 participation in the activities or events.

In some embodiments, the user 3002 may create the design for the article by interacting with a cartoon (e.g., a cartoon character on the display 2904 of the personalization kiosk). The cartoon may ask questions about the user's 3002 desires (e.g., the type of article the user 3002 likes, the color the user 3002 likes, the design the user 3002 likes). The personalization kiosk may include a microphone that allows the user 3002 to verbally respond to the cartoon. When the user 3002 provides a response to the cartoon, an article worn by the cartoon may change to match the user's 3002 response. At the end of the interaction with the cartoon, the cartoon may be wearing the custom article with the design desired by the user 3002. The user 3002 may then order the custom article with the design worn by the cartoon, and the personalization kiosk may create the custom article with the design.

Figure 52:
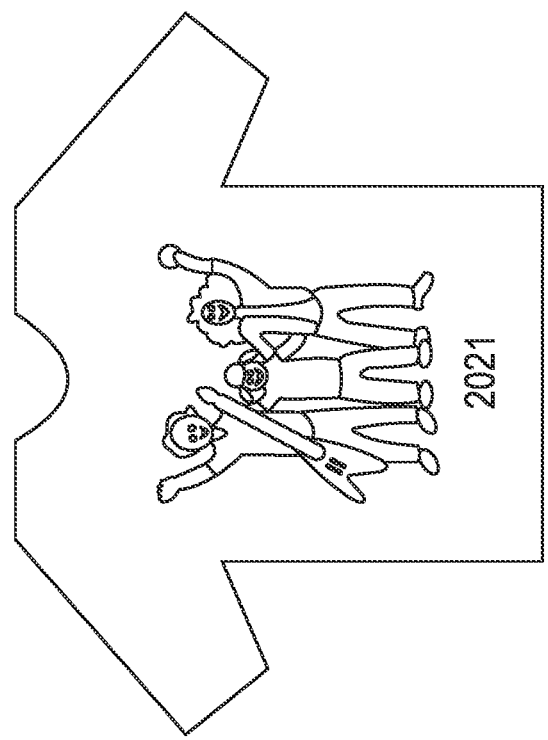
FIG. 52 illustrates an example customization based on user poses.

FIGS. 51 and 52 illustrate an example customization based on user poses. Using this feature, one or more users 3002 may create a design for an article by performing certain gestures or poses.

FIG. 51 shows certain poses being performed at the personalization kiosk (e.g., in front of the display 2904). The personalization may capture the poses (e.g., using the camera 2906 at the personalization kiosk). The display 2904 may also show the poses being performed (e.g., by reflecting the poses using a mirror or by displaying the poses captured by the camera 2906). The personalization kiosk may then create a design using the captured poses. In the example of FIG. 51, three people are performing poses in front of the display 2904 at the personalization kiosk. The camera 2906 at the kiosk captures these poses, and the personalization kiosk creates a design using these poses. The personalization kiosk then creates an article with this design. As an example, the design may include cartoon characters performing the same poses as those captured by the camera 2906. As another example, the design may include images of the people performing the poses.

FIG. 52 illustrates another example article created using captured poses. In the example of FIG. 52, the custom article includes a design with three people performing captured poses. Two of the people are raising an arm and putting their other arm around another person. Other design elements (e.g., caps and guitar) may have been added by the personalization kiosk.

Figure 53:
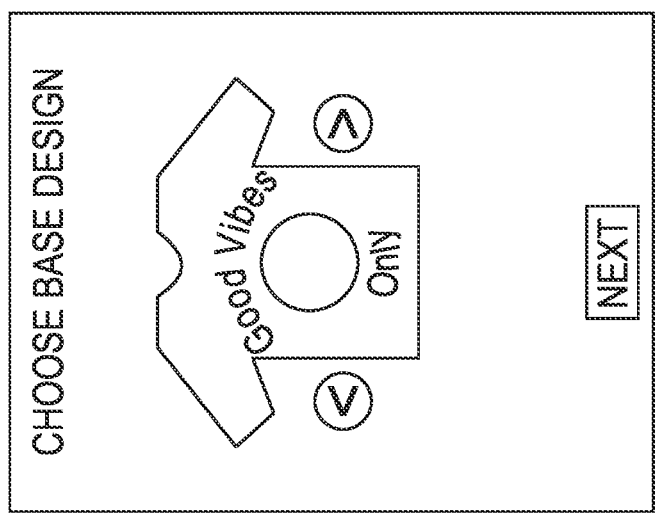
FIG. 53 illustrates an example customization based on a user image.
Figure 54:
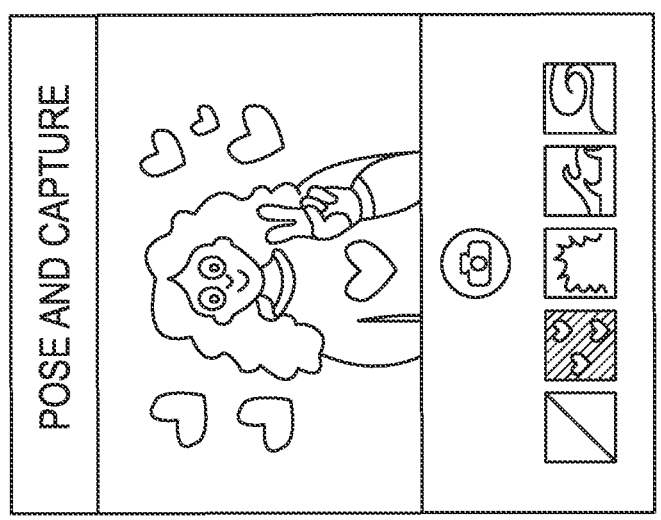
FIG. 54 illustrates an example customization based on a user image.
Figure 55:
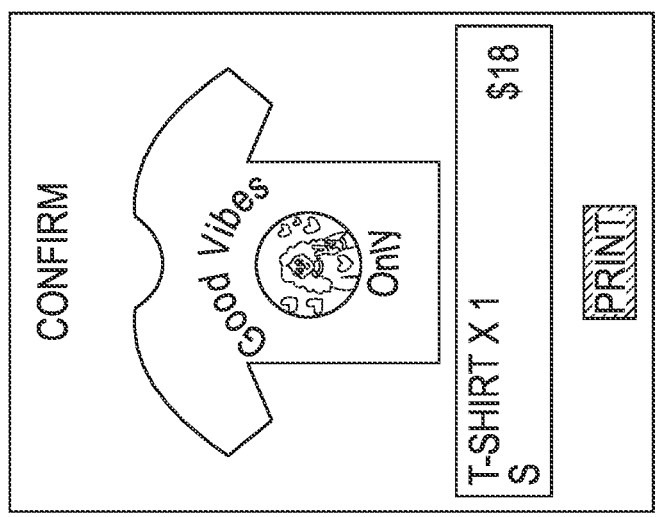
FIG. 55 illustrates an example customization based on a user image.

FIGS. 53 through 55 illustrate an example customization process based on a user image. Using this feature, a user 3002 may create a design for a custom article using an image of the user 3002.

FIG. 53 shows a screen showing base design options. The user 3002 may see this screen on a personal device or on the display 2904 of the personalization kiosk. On this screen, the user 3002 may select an article with a base design to use with the image of the user 3002. In the example of FIG. 53, the user 3002 is viewing an article with the message "good vibes only."

FIG. 54 shows a screen with an image of the user 3002, which may be shown after the user 3002 selects the article with the base design. The user 3002 may see this screen on a personal device or on the display 2904 of the personalization kiosk. The image of the user 3002 may be captured by the personal device or by the camera 2906 of the personalization kiosk. The user 3002 may also add other design elements to the design on this screen. In the example of FIG. 54, the user 3002 has selected to add hearts to the design. The user 3002 may select the design elements by using the personal device or by using gestures or touches with the personalization kiosk.

FIG. 55 shows a screen with an image of the custom article and the design, which may be shown after the user 3002 confirms the article and the design based on the user image. As seen in FIG. 55, the custom article includes the base design (e.g., "good vibes only") and the design that includes the image of the user and selected design elements (e.g., hearts). On this screen, the user 3002 may view the custom article and the design and order the custom article. After the user 3002 orders the custom article, the personalization kiosk creates the custom article with the design that includes the image of the user 3002.

Certain base designs may allow the user 3002 to position an image of the user 3002 onto other body types (e.g., body types of other characters). For example, the base design may include a spacesuit and the custom article may show an image of the user's face in the spacesuit to simulate the user 3002 as an astronaut.

Figure 56:
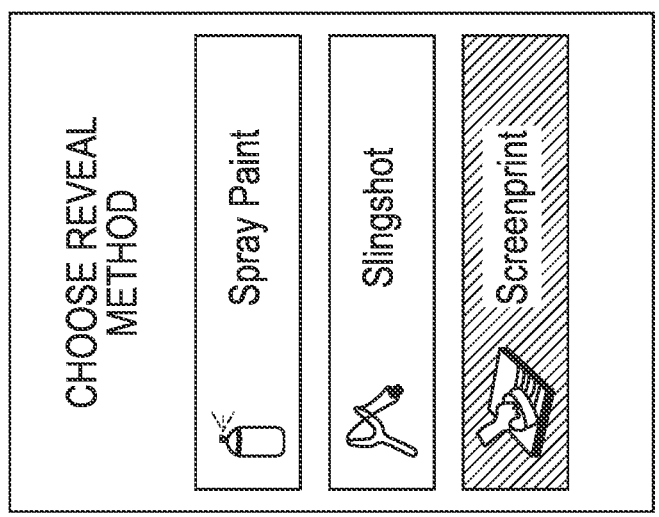
FIG. 56 illustrates an example customization reveal feature.
Figure 57:
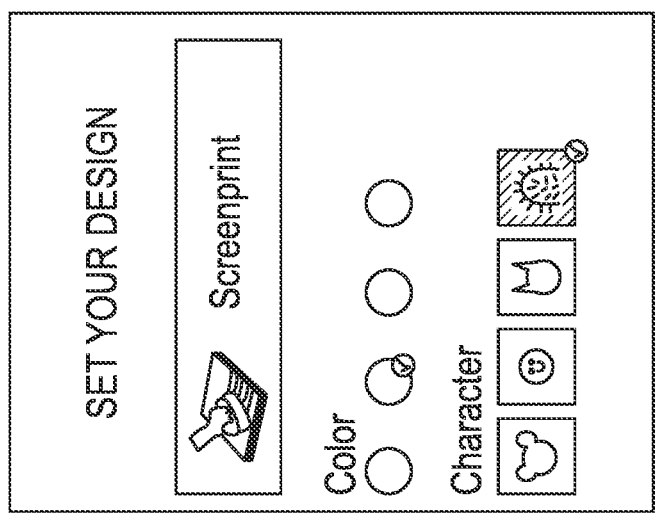
FIG. 57 illustrates an example customization reveal feature.
Figure 58:
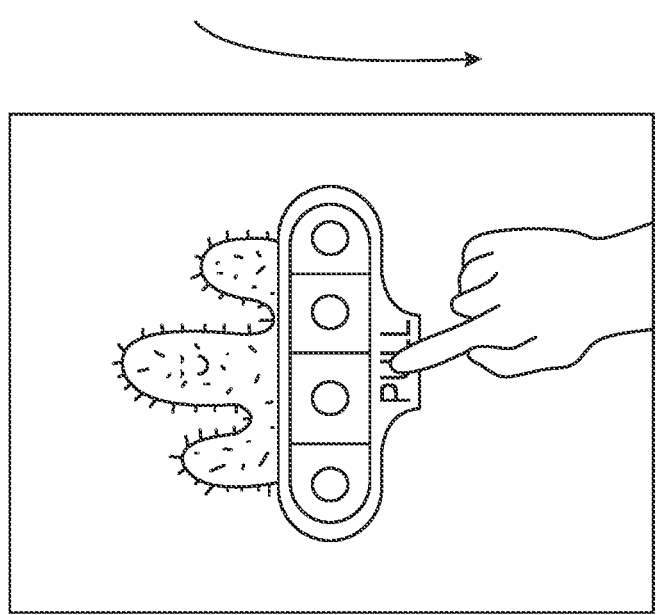
FIG. 58 illustrates an example customization reveal feature.

FIGS. 56 through 58 illustrate an example customization reveal feature. Using this feature, a user 3002 may select different options for how a design is revealed digitally (e.g., on the user's 3002 personal device or on the display 2904 of the personalization kiosk).

FIG. 56 shows a screen of different options for revealing a customization or design. The user 3002 may see this screen on a personal device or on the display 2904 of the personalization kiosk. As seen in FIG. 56, the reveal options include spray paint, slingshot, and screenprint. The user 3002 may interact with this screen to select one or more of the reveal options. In the example of FIG. 56, the user 3002 has selected the screenprint reveal option.

FIG. 57 shows a screen with different design options, which may be shown after the user 3002 selects the reveal option. The screen may show any suitable number of design options. In the example of FIG. 57, the user 3002 may select a color and a character for the design. The user 3002 has selected a particular color and a cactus character for the design.

FIG. 58 shows a screen that allows the user 3002 to reveal the design according to the selected reveal option, which may be shown after the user 3002 selects the design options. As seen in FIG. 58, the screen shows a bar that instructs the user 3002 to drag downwards on the bar. The user 3002 may drag down on the bar to simulate a screenprinting of the selected cactus character. As the user 3002 drags down on the bar, the cactus character is revealed according to screenprinting effect. As used here, screenprinting is referring to the effect used to reveal the image displayed on the display of a user device. The process of personalization of an article by printing the selected image may be accomplished by direct to garment or DTG printing, screen-printing, dye-sublimation, embroidery or any other suitable method.

Figure 59:
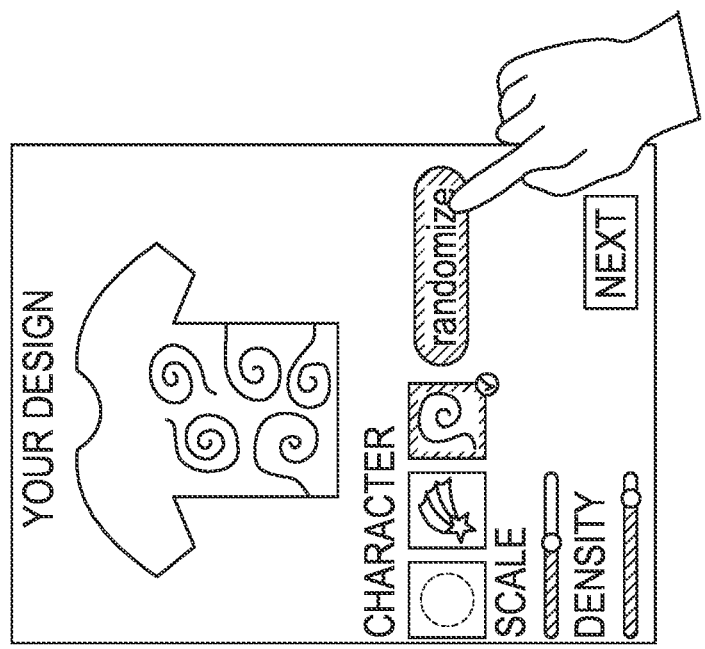
FIG. 59 illustrates an example guided customization feature.
Figure 60:
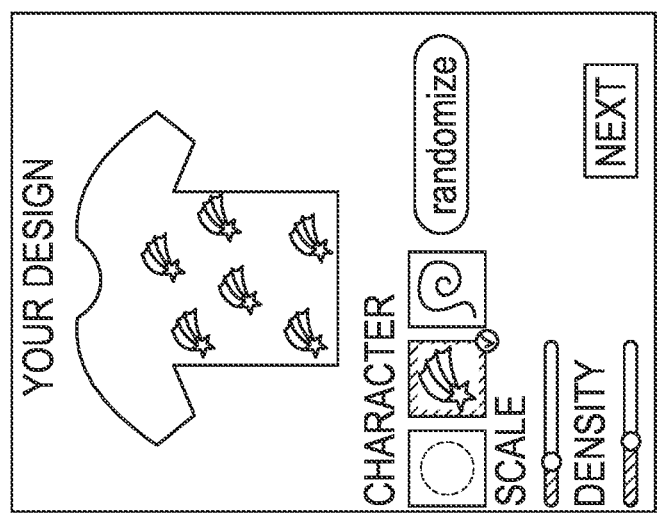
FIG. 60 illustrates an example guided customization feature.
Figure 61:
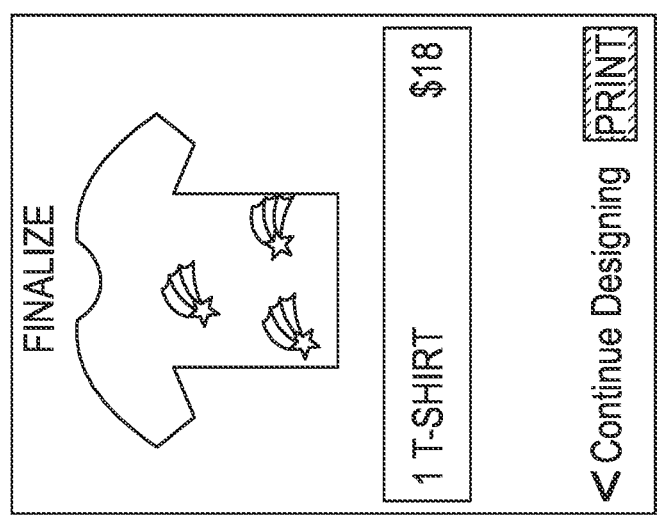
FIG. 61 illustrates an example guided customization feature.

FIGS. 59 through 61 illustrate an example guided customization process. This process may be implemented on a user's 3002 personal device (e.g., through an app downloaded onto the user's 3002 personal device) or on a display 2904 at the personalization kiosk. The process may assist and guide the user 3002 through the customization process.

FIG. 59 shows a screen that shows design options. The user 3002 may interact with this screen to select a design. In the example of FIG. 59, the user 3002 has selected a design with spirals. Additionally, the screen allows the user 3002 adjust certain options or settings for the design. In the example of FIG. 59, the user 3002 may interact with the screen to adjust the scale and density of the spirals. By dragging on different bars, the user 3002 may increase or decrease the size and density of the spirals on the custom article. In exemplary embodiments, as the user 3002 adjusts the options available, the display may adjust the representation of the user design as displayed to reflect the effects of the user changes to the options with regards to the user selected design. In alternative embodiments, the user selected design is only adjusted after the user indicates he has made all his desired changes, at which point the system may display the image of the use selected design corresponding to the user changes to the options, and the user has a chance to accept or edit the options again.

FIG. 60 shows a screen that shows design options. In the example of FIG. 60, the user 3002 has selected a design with stars. Additionally, the user 3002 has interacted with the bars to set the scale and density of the stars on the custom design. as seen in the example of FIG. 60, the stars are smaller and less densely placed relative to the spirals in the example of FIG. 59.

FIG. 61 shows a screen that shows the custom article with the selected design options, which may be shown after the user confirms the design options (e.g., design, size, and density). In the example of FIG. 61, the user has selected the star design with a particular size and density. The user 3002 may interact with the screen to confirm the custom article. After the user 3002 confirms the custom article with the selected design options, the personalization kiosk creates the custom article. In some embodiments, the personalization kiosk may offer the user 3002 various options based on the user selected design (e.g., the additional personalization of an appropriately scaled version of the user selected design onto another surface of the same article such as the sleeves)

FIGS. 62 through 65 illustrate an example guided customization process. This process may be implemented on a user's 3002 personal device or on a display 2904 at the personalization kiosk. The process may assist the user 3002 in drawing and creating a design.

Figure 62:
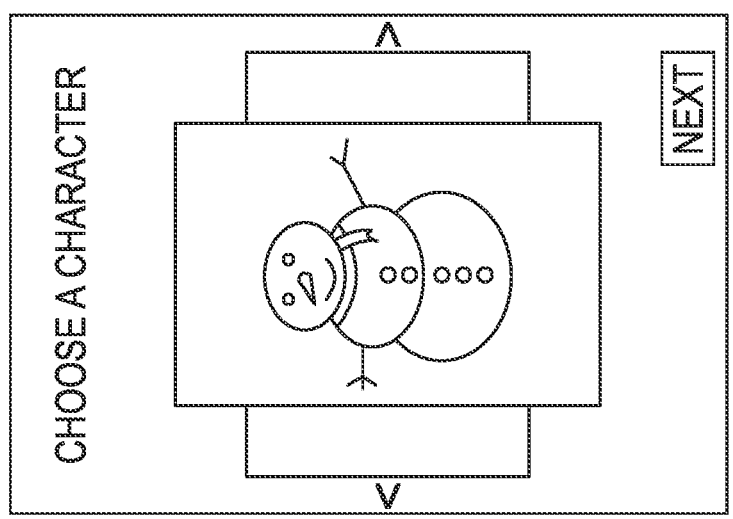
FIG. 62 illustrates an example guided customization feature.

FIG. 62 shows a screen that shows design options. On this screen, the user 3002 may cycle through different design options for a custom article. In the example of FIG. 62, the user 3002 selects a design with a snowman.

Figure 63:
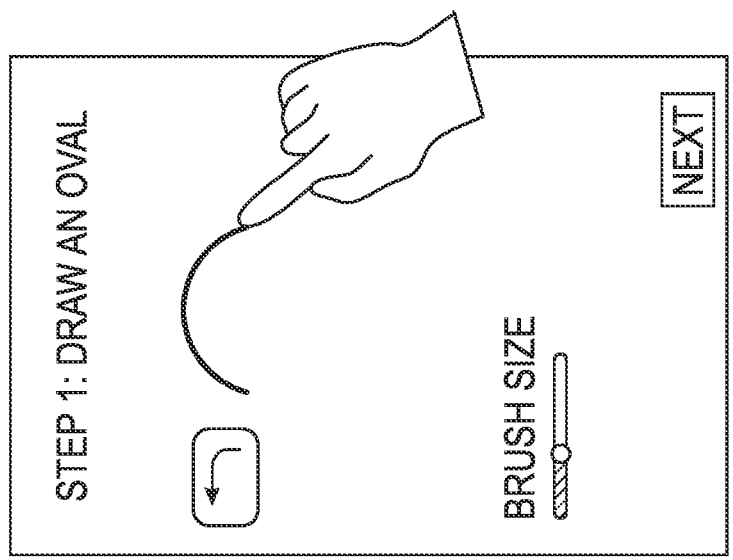
FIG. 63 illustrates an example guided customization feature.

FIG. 63 shows a screen that allows the user 3002 to draw the selected design, which may be shown after the user selects the design. As seen in FIG. 63, the screen shows an outline or watermark of the selected design. Because the user 3002 selected the snowman design, the screen shows an outline or watermark of the snowman. The user 3002 may drag a finger on the screen according to the outline or watermark to draw the snowman. The screen also allows the user 3002 to adjust one or more drawing settings. In the example of FIG. 63, the user 3002 may drag on a bar to increase or decrease the size of a virtual brush used to draw the snowman. By adjusting the size of the virtual brush, the user 3002 adjusts the thickness of the lines created when drawing the snowman.

Figure 64:
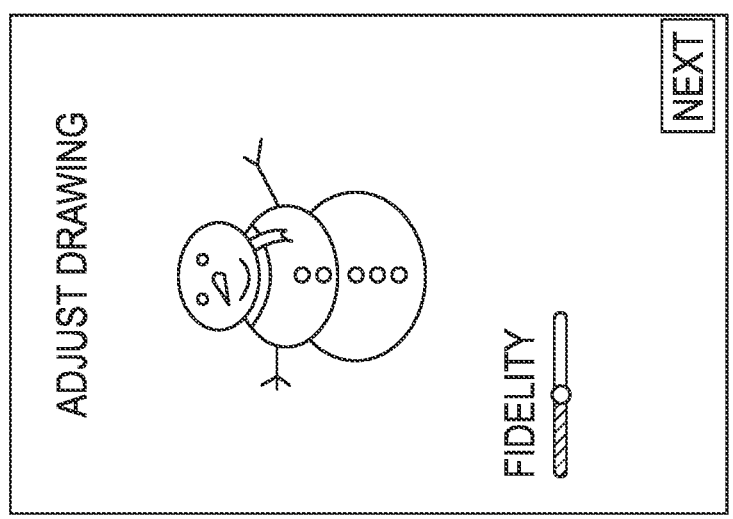
FIG. 64 illustrates an example guided customization feature.

FIG. 64 shows the screen after the user 3002 has finished drawing the snowman. As seen in FIG. 64, the screen includes a bar that allows the user to adjust the fidelity of the design. By adjusting the fidelity, the user 3002 adjusts how closely the drawn snowman resembles the selected snowman design or the drawn snowman. If the user 3002 prefers the selected snowman design over the drawn snowman, the user 3002 increases the fidelity.

Figure 65:
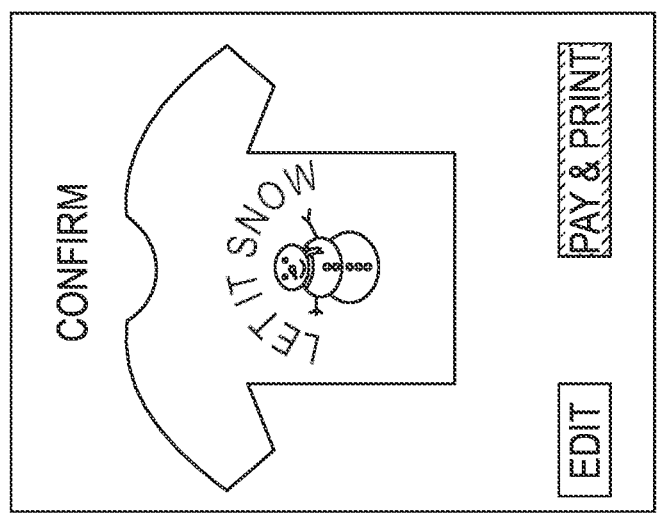
FIG. 65 illustrates an example guided customization feature.

FIG. 65 shows a screen that shows the custom article with the design, which may be shown after the user 3002 confirms the design. As seen in FIG. 65, the screen shows the custom article with the snowman design. The user 3002 may also order the custom article with the design on this screen. After the user 3002 orders the custom article, the personalization kiosk creates the custom article with the design.

FIGS. 66 through 71 illustrate an example guided customization process. This process may be implemented on a user's 3002 personal device or on a display 2904 at the personalization kiosk. The process may assist the user 3002 in creating a design.

Figure 66:
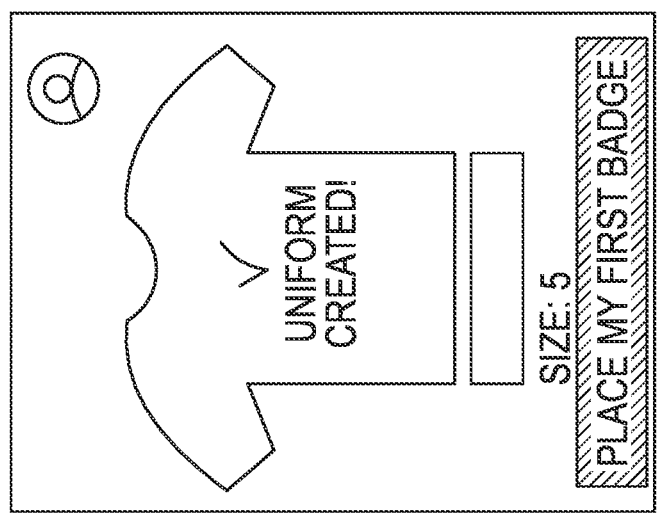
FIG. 66 illustrates an example guided customization feature.

FIG. 66 shows a screen on which the user 3002 may select an article or base design. The user 3002 may interact with the screen to select an article with a particular type or color. Additionally, the user 3002 may adjust the desired size of the article.

Figure 67:
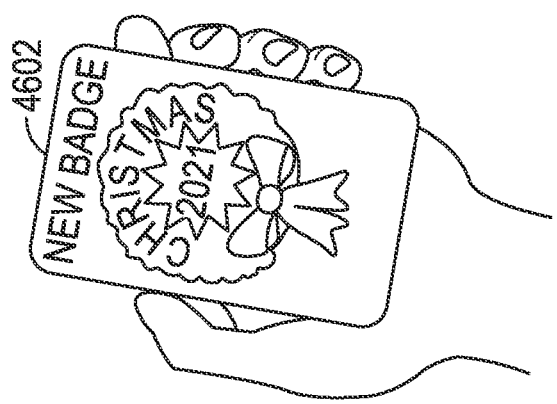
FIG. 67 illustrates an example guided customization feature.

FIG. 67 shows a screen on which the user 3002 may view badges that the user 3002 may use to create a design. In the example of FIG. 67, the screen is shown on the user's 3002 personal device 4602. The badge is a wreath with the words "Christmas 2021." The user 3002 may use the personal device 4602 to view every badge that is available for the user 3002 to use. The user 3002 may gain access to additional badges as the user 3002 participates in different activities or events.

Figure 68:
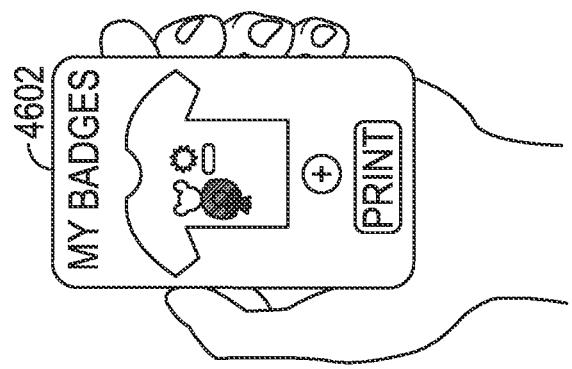
FIG. 68 illustrates an example guided customization feature.

FIG. 68 shows a screen on which the user may position badges on an article. In the example of FIG. 68, the screen is shown on the user's 3002 personal device 4602. The user 3002 has positioned various badges onto the article. Additionally, the user 3002 may order the custom article with the positioned badges on this screen. After the user 3002 orders the custom article, the personalization kiosk may create the custom article with the badges. In some embodiments, the available personalization areas on the use selected article may be adjusted (e.g., limited) based on the user's 3002 selection of design or style of article, etc.

Figure 69:
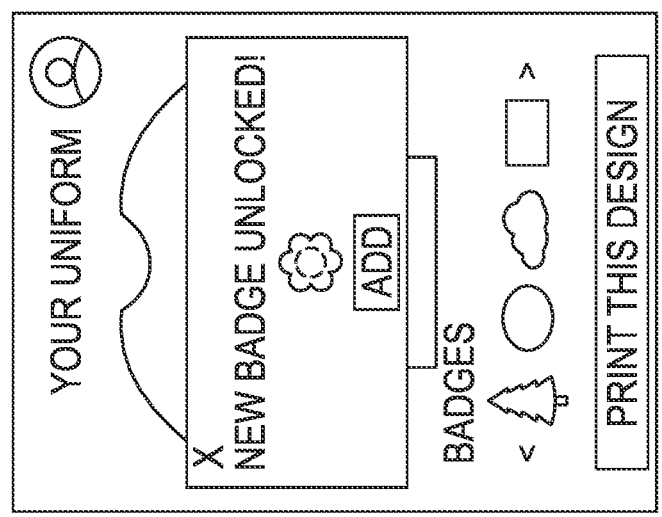
FIG. 69 illustrates an example guided customization feature.
Figure 70:
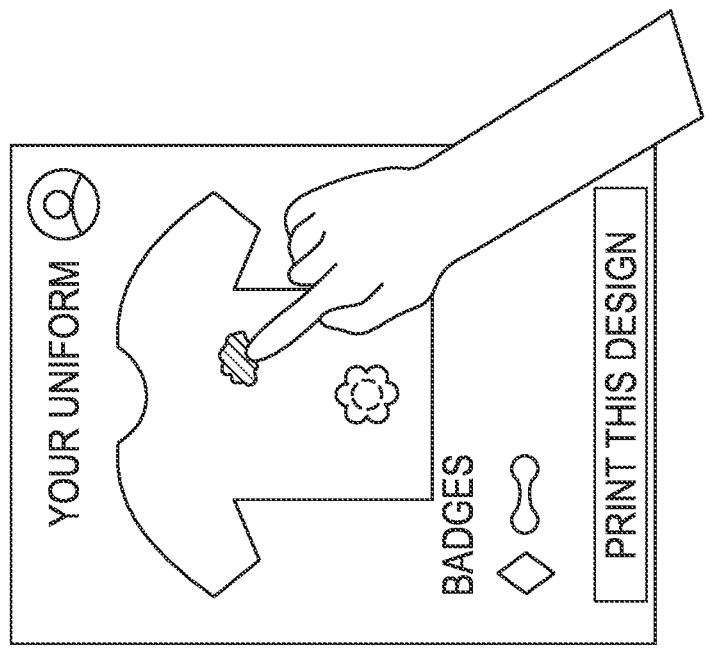
FIG. 70 illustrates an example guided customization feature.

FIG. 69 shows a screen that shows badges that are available to the user 3002. The screen also shows a message indicating that a new flower badge is available. The user 3002 may have participated in an activity or event that caused the flower badge to unlock. The screen also shows the selected article and other available badges. FIG. 70 shows the user 3002 interacting with the screen to place badges onto the article. For example, the user 3002 may drag certain badges onto the article to create a design for the article. The user 3002 may position any suitable number of badges onto the article.

Figure 71:
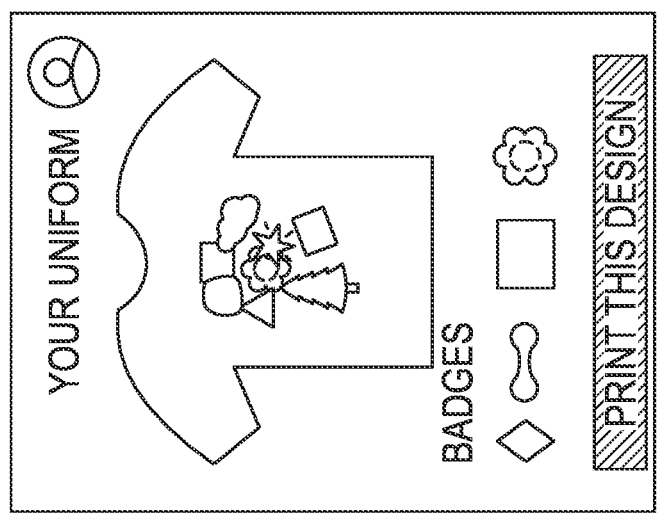
FIG. 71 illustrates an example guided customization feature.

FIG. 71 shows a screen that shows the article with the badges positioned on the article. The user 3002 may have dragged the badges onto desired and available positions on the article. The available positions may be affected by the user's 3002 selection of article and design. The user 3002 may also order the custom article on this screen. After the user 3002 orders the custom article, the personalization kiosk creates the custom article with the badges at the desired positions.

Figure 72:
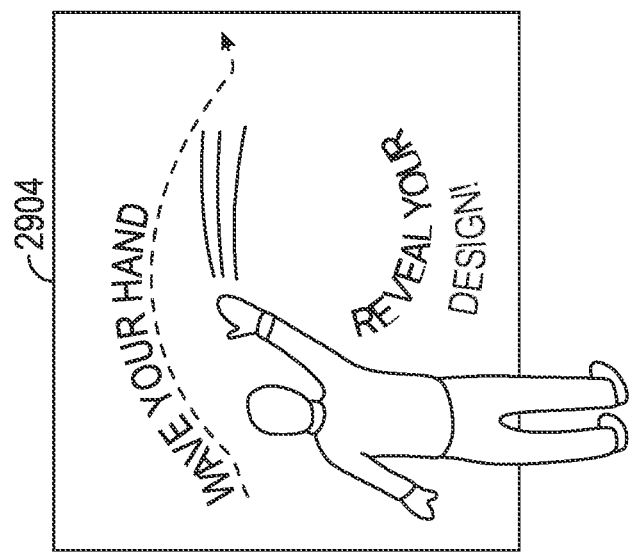
FIG. 72 illustrates an example guided customization feature.
Figure 73:
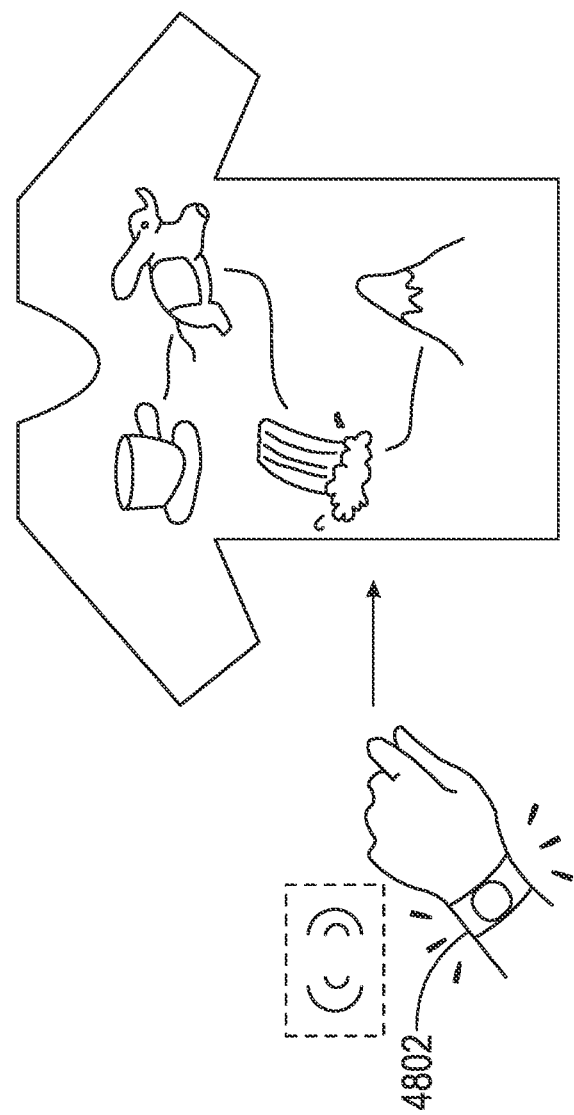
FIG. 73 illustrates an example guided customization feature.

FIGS. 72 and 73 show an example guided customization feature. As seen in FIG. 72, a user 3002 may wave a hand near the display 2904 of the personalization kiosk. The display 2904 may instruct the user 3002 to wave the hand to reveal a design for the user 3002. As seen in FIG. 73, when the user 3002 waves the hand near the display 2904, a reader in the personalization kiosk may scan a wearable device 4802 worn by the user 3002. After scanning the wearable device 4802, the personalization kiosk may retrieve data indicating activities and events that the user 3002 experienced (e.g., attractions visited by the user 3002). The personalization kiosk then designs a custom article with images showing the activities or events experienced by the user 3002. In the example of FIG. 73, the custom article shows the activities and events experienced by the user 3002 and an order in which they were experienced.

Figure 74:
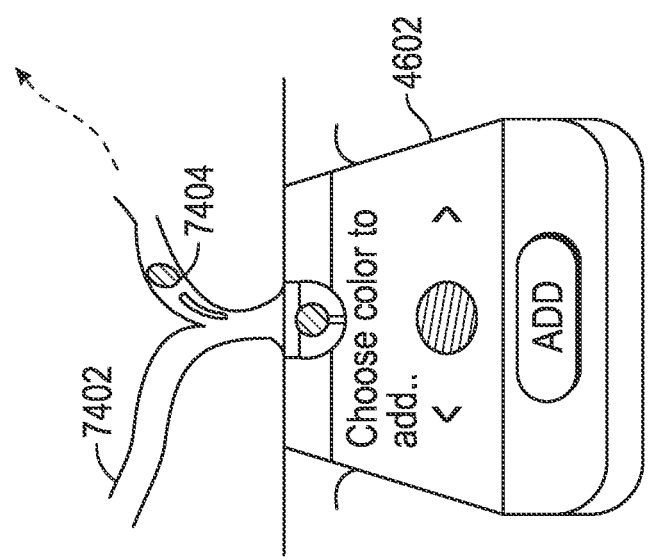
FIG. 74 illustrates an example customization feature.

FIGS. 74 and 75 illustrate an example customization feature. This feature may be implemented using the personalization kiosk and the personal device 4602 of the user. In some embodiments, a device coupled to the personalization kiosk may be used rather than the personal device 4602 of the user 3002. As seen in FIG. 74, the personal device 4602 may be docked to the personalization kiosk. The user 3002 may interact with the personal device 4602 (or a device coupled to the personalization kiosk) to select an article or a design. Different effects may be generated when the user 3002 makes different selections. For example, one or more tubes 7402 may be included in the housing 2902 of the personalization kiosk. When the user 3002 selects a particular color for the article or the design, a ball 7404 of that color may be directed through those tubes 7402. As seen in FIG. 75, the tubes 7402 may lead to a funnel and the article. Sending the balls 7404 through the tubes 7402 to the article may create an effect that further engages the user 3002, which improves user satisfaction.

In the current disclosure, reference is made to various embodiments. However, it should be understood that the present disclosure is not limited to specific described embodiments. Instead, any combination of the following features and elements, whether related to different embodiments or not, is contemplated to implement and practice the teachings provided herein. Additionally, when elements of the embodiments are described in the form of "at least one of A and B," it will be understood that embodiments including element A exclusively, including element B exclusively, and including element A and B are each contemplated. Furthermore, although some embodiments may achieve advantages over other possible solutions or over the prior art, whether or not a particular advantage is achieved by a given embodiment is not limiting of the present disclosure. Thus, the aspects, features, embodiments and advantages disclosed herein are merely illustrative and are not considered elements or limitations of the appended claims except where explicitly recited in a claim(s).

As will be appreciated by one skilled in the art, embodiments described herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments described herein may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations or block diagrams of methods, apparatuses (systems), and computer program products according to embodiments of the present disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations or block diagrams.

The flowchart illustrations and block diagrams in the Figures illustrate the architecture, functionality, and operation of possible implementations of systems, methods, and computer program products according to various embodiments of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams or flowchart illustrations, and combinations of blocks in the block diagrams or flowchart illustrations, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A kiosk system for personalizing a packaged article, comprising:
    a housing;
    a staging area configured to receive the packaged article;
    an article personalization system within the housing, the article personalization system comprising a plurality of system components configured to personalize the packaged article, wherein:
        the plurality of system components comprises a direct-to-garment (DTG) printing system and a curing system; and
        the curing system is moveable in relation to the housing, wherein:
            the curing system moves from a first position to a second position;
            the curing system is positioned away from the staging area when in the first position; and
            the curing system is adjacent to a platform of the staging area when in the second position; and
    a control system to control the kiosk system.

2. The kiosk system of claim 1, wherein:
    the staging area further comprises a cover;
    the platform is configured to receive the packaged article;
    the cover is removably coupled to the housing; and
    the cover is configured to prevent access to the kiosk system.

3. The kiosk system of claim 2, wherein the DTG printing system comprises the platform.

4. The kiosk system of claim 1, wherein an actuation system is configured to move the curing system.

5. The kiosk system of claim 1, further comprising a sensor configured to scan an identification feature of the packaged article.

6. The kiosk system of claim 5, wherein the sensor comprises at least one of a bar code scanner, a QR code scanner, a camera, a near field communication (NFC) tag reader, or a radio frequency identification (RFID) tag reader.

7. The kiosk system of claim 1, wherein at least a portion of the housing is transparent.

8. A kiosk system for personalizing a packaged article, comprising:
    a housing;
    an article personalization system within the housing, the article personalization system comprising a plurality of system components configured to personalize the packaged article, wherein:
        the plurality of system components comprises a direct-to-garment (DTG) printing system and a curing system;

the DTG printing system comprises a platform configured to receive the packaged article; and the curing system is moveable in relation to the housing, wherein:

the curing system moves from a first position to a second position;

the curing system is positioned away from the platform when in the first position; and the curing system is adjacent to the platform when in the second position; and a control system to control the kiosk system.

9. The kiosk system of claim 8, further comprising a cover rotatably coupled to the housing, wherein:

the cover is removably coupled to the housing; and the cover is configured to prevent access to the kiosk system.

10. The kiosk system of claim 8, wherein an actuation system is configured to move the curing system.

11. The kiosk system of claim 8, further comprising a sensor configured to scan an identification feature of the packaged article.

12. The kiosk system of claim 11, wherein the sensor comprises at least one of a bar code scanner, a QR code scanner, a camera, a near field communication (NFC) tag reader, or a radio frequency identification (RFID) tag reader.

13. The kiosk system of claim 8, wherein at least a portion of the housing is transparent.

\* \* \* \* \*